US006352478B1

(12) United States Patent
Gabai et al.

(10) Patent No.: US 6,352,478 B1
(45) Date of Patent: Mar. 5, 2002

(54) TECHNIQUES AND APPARATUS FOR ENTERTAINMENT SITES, AMUSEMENT PARKS AND OTHER INFORMATION AND/OR ENTERTAINMENT DISPENSING SITES

(75) Inventors: Oz Gabai; Moshe Cohen; Jacob Gabai, all of Tel Aviv; Nimrod Sandlerman, Ramat Gan, all of (IL)

(73) Assignee: Creator, Ltd., Givat Shmuel (IL)

( * ) Notice: Subject to any disclaimer, the term of this patent is extended or adjusted under 35 U.S.C. 154(b) by 0 days.

(21) Appl. No.: 09/062,500

(22) Filed: Apr. 17, 1998

(30) Foreign Application Priority Data

Aug. 18, 1997 (IL) .................................................. 121574

(51) Int. Cl.[7] .................................................. A63F 9/24
(52) U.S. Cl. .......................................... 463/42; 463/46
(58) Field of Search ...................................... 463/42, 46

(56) References Cited

U.S. PATENT DOCUMENTS

| | | |
|---|---|---|
| 4,339,798 A | 7/1982 | Hedges et al. ............... 364/412 |
| 4,712,184 A | 12/1987 | Haugerud .................... 364/513 |
| 4,840,602 A | 6/1989 | Rose .......................... 446/175 |
| 5,021,878 A | 6/1991 | Lang ........................... 358/93 |
| 5,109,222 A | 4/1992 | Welty ..................... 340/825.72 |
| 5,142,803 A | 9/1992 | Lang ........................... 40/411 |
| 5,191,615 A | 3/1993 | Aldava et al. ................. 381/3 |
| 5,195,920 A | 3/1993 | Collier ........................ 446/409 |
| 5,270,480 A | 12/1993 | Hikawa ....................... 84/645 |
| 5,289,273 A | 2/1994 | Lang ........................... 348/121 |
| 5,388,493 A | 2/1995 | Curletto ..................... 84/376 A |
| 5,504,675 A | 4/1996 | Cragun et al. .............. 364/401 |
| 5,636,994 A | 6/1997 | Tong .......................... 434/308 |
| 5,695,400 A * | 12/1997 | Fennel, Jr. et al. ........... 463/42 |
| 5,702,305 A * | 12/1997 | Norman et al. ............... 463/42 |
| 5,797,794 A * | 8/1998 | Angell ........................ 463/18 |
| 6,001,016 A * | 12/1999 | Walker et al. ................ 463/42 |
| 6,080,062 A * | 6/2000 | Olson .......................... 463/42 |

FOREIGN PATENT DOCUMENTS

DE 3009040 A 9/1981

* cited by examiner

Primary Examiner—Michael O'Neill
Assistant Examiner—Carmen D. White
(74) Attorney, Agent, or Firm—Abelman, Frayne & Schwab

(57) ABSTRACT

Amusement park apparatus including a first plurality of entertainment providing nodes playing a second plurality of games with a third plurality of players who are simultaneously playing the second plurality of games, a node controller operative to assign each player from among the third plurality of players to an individual game from among the second plurality of games and operative to control each individual node from among the first plurality of nodes such that when the individual node enters into an interaction with an individual player, the node plays, with the individual player, the game assigned to the individual player, and a communication network operative to associate each of the first plurality of nodes with the node controller.

11 Claims, 192 Drawing Sheets

Microfiche Appendix Included
(7 Microfiche, 557 Pages)

FIGURE 1A
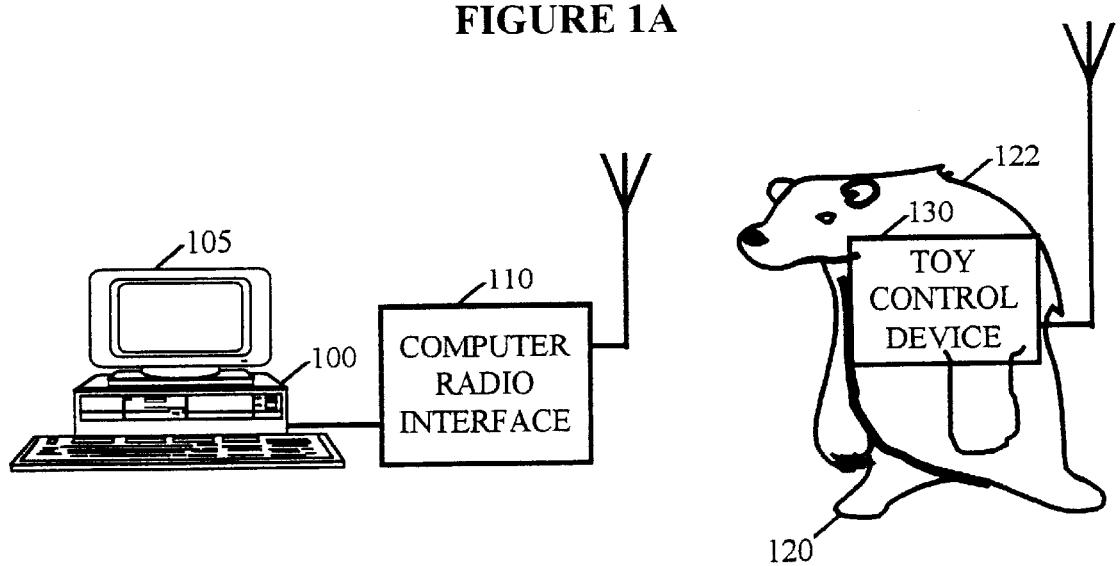
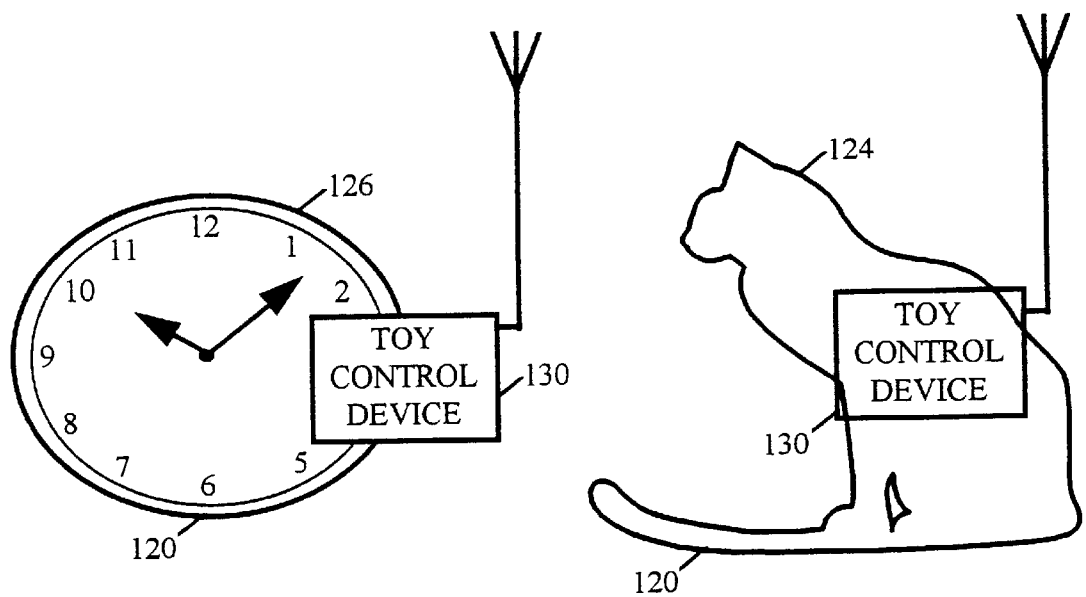

FIGURE 2B
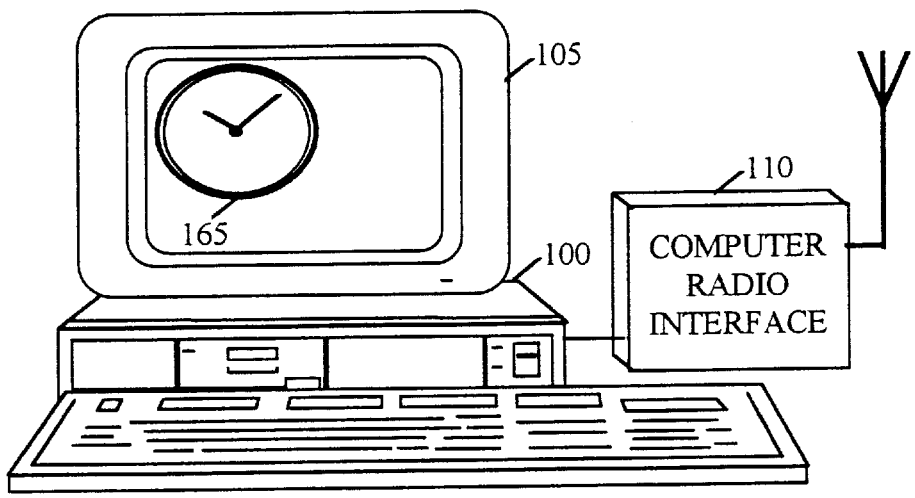
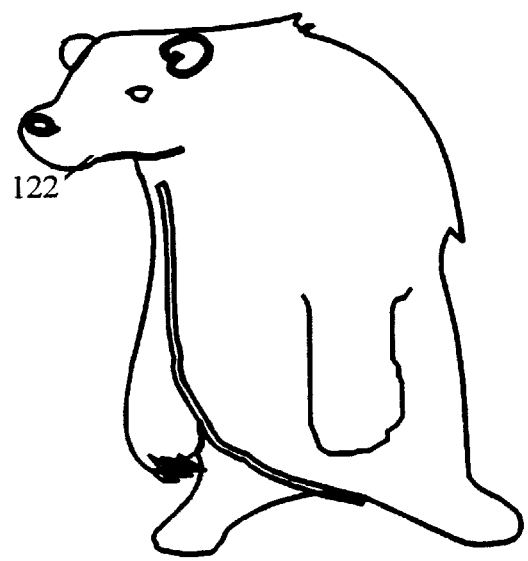

FIGURE 2C
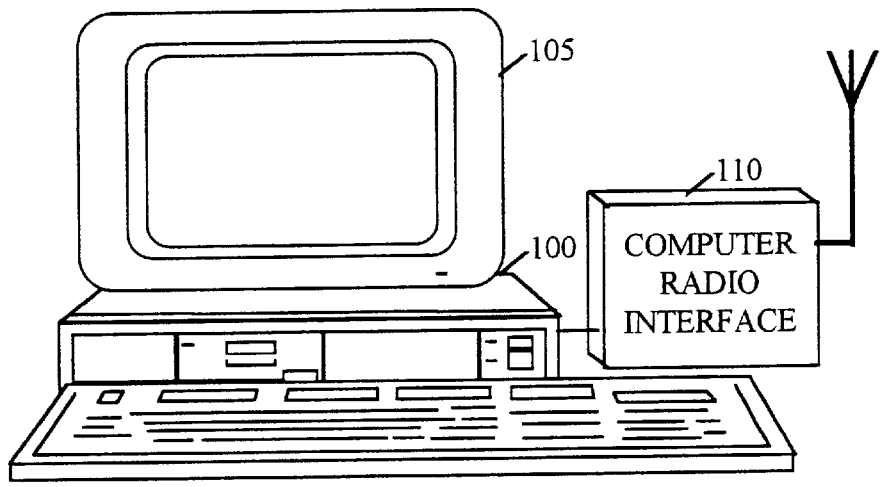
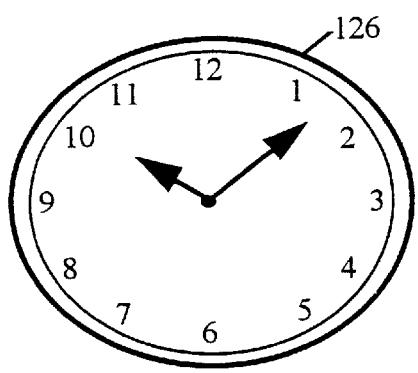
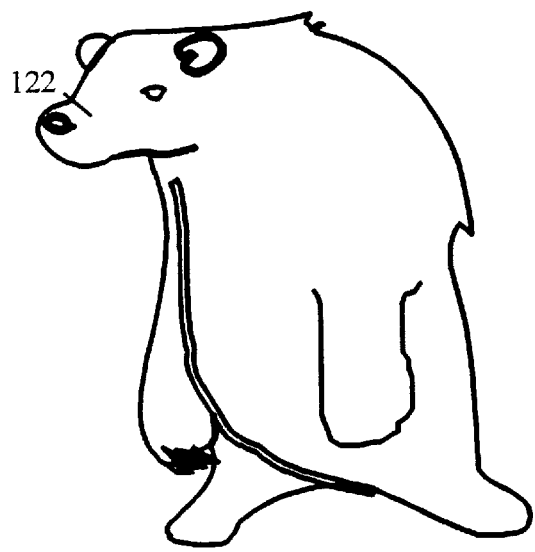

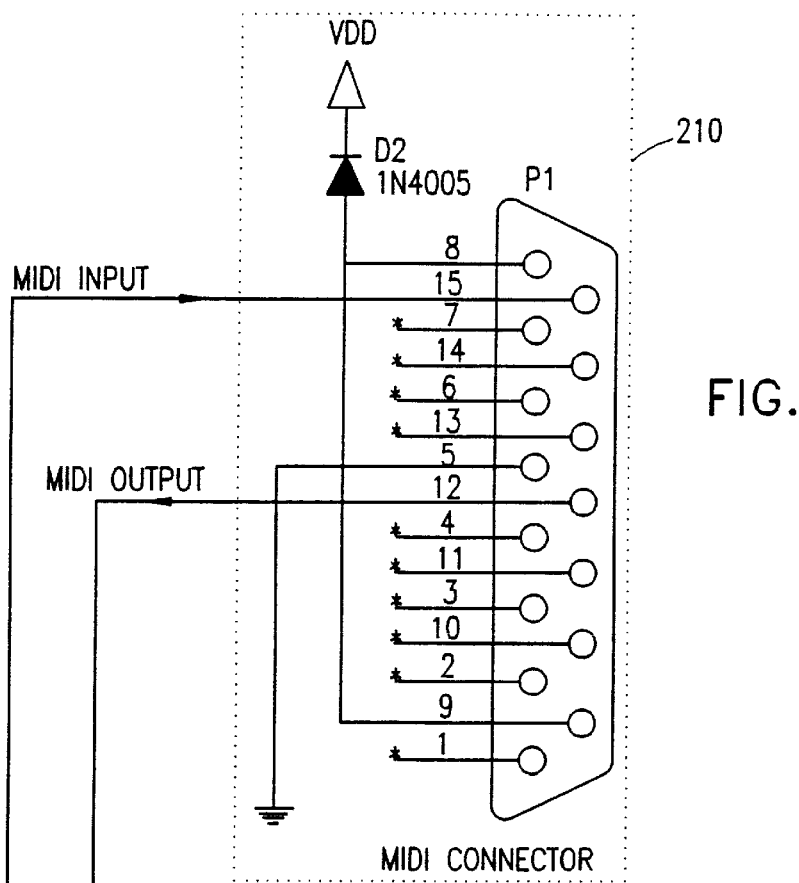
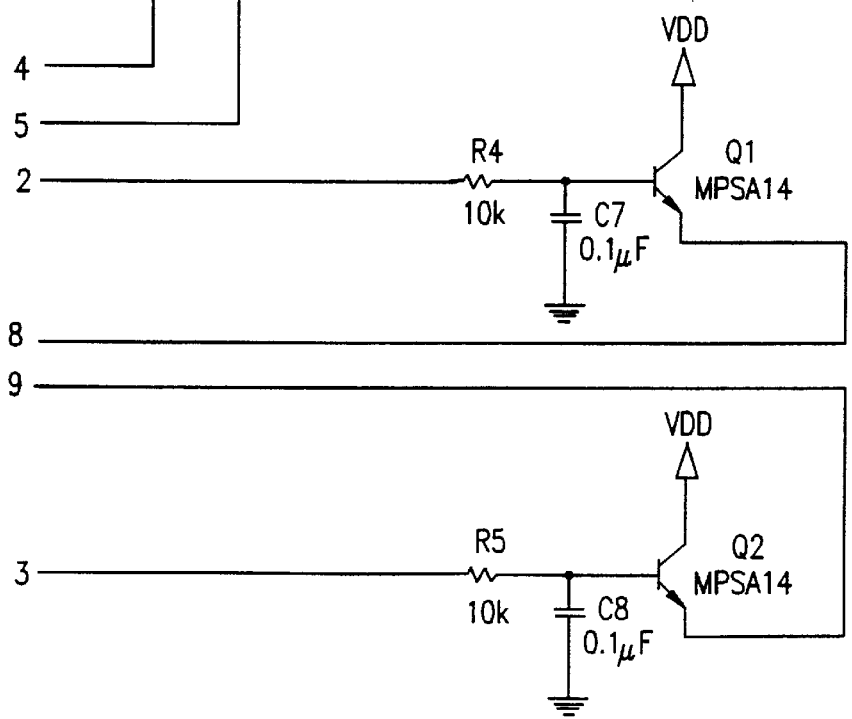
FIG. 5C

FIG. 7E
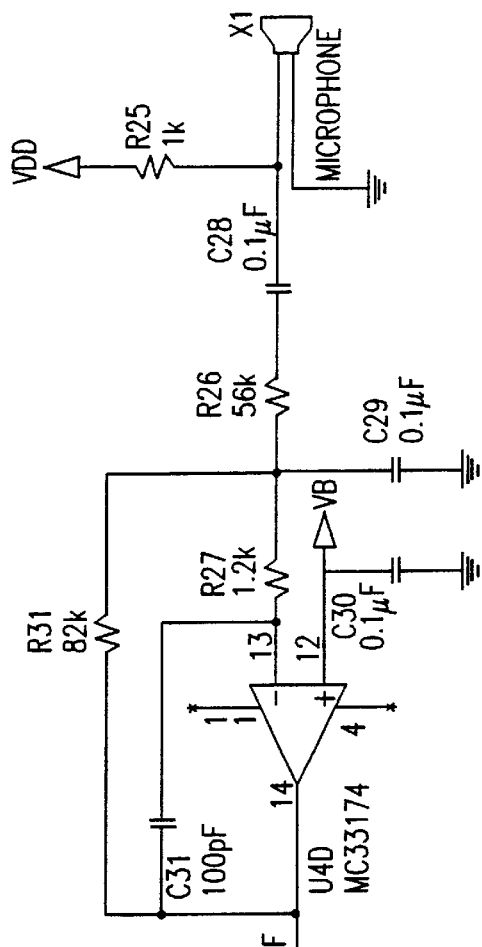
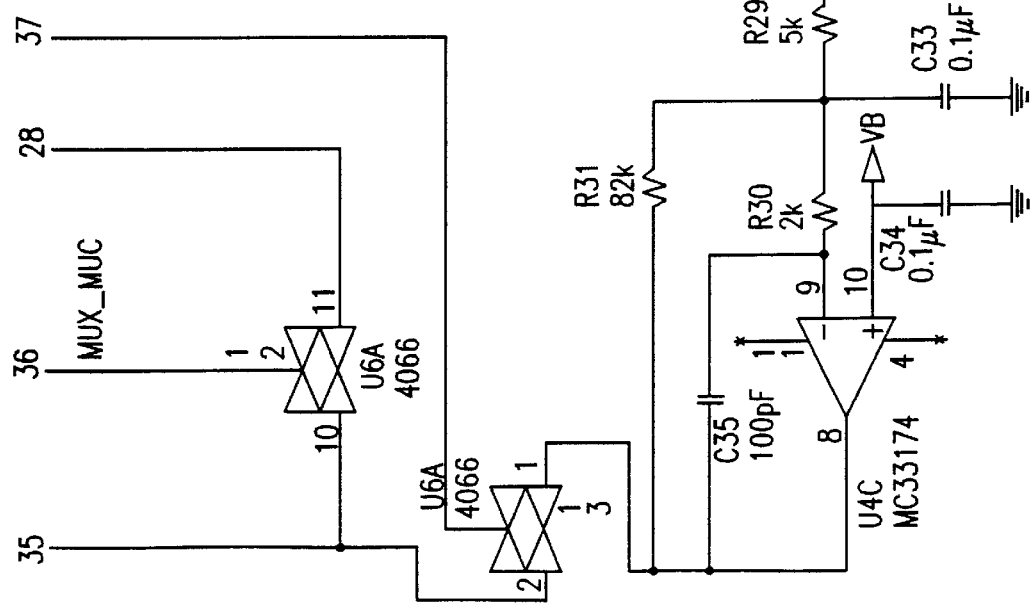

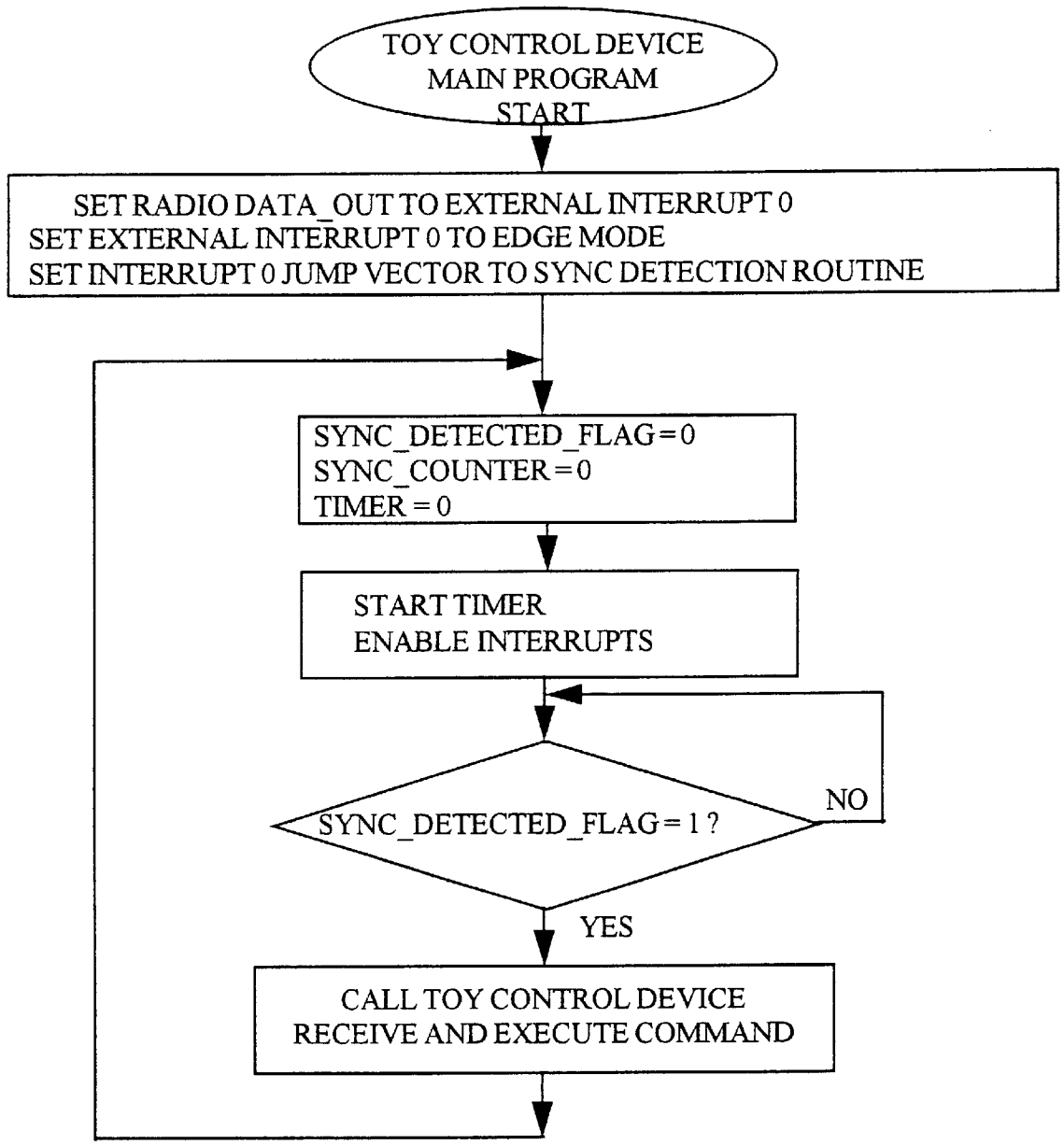

X 10 CYCLES

T_SYNC

= "0"

= "1"

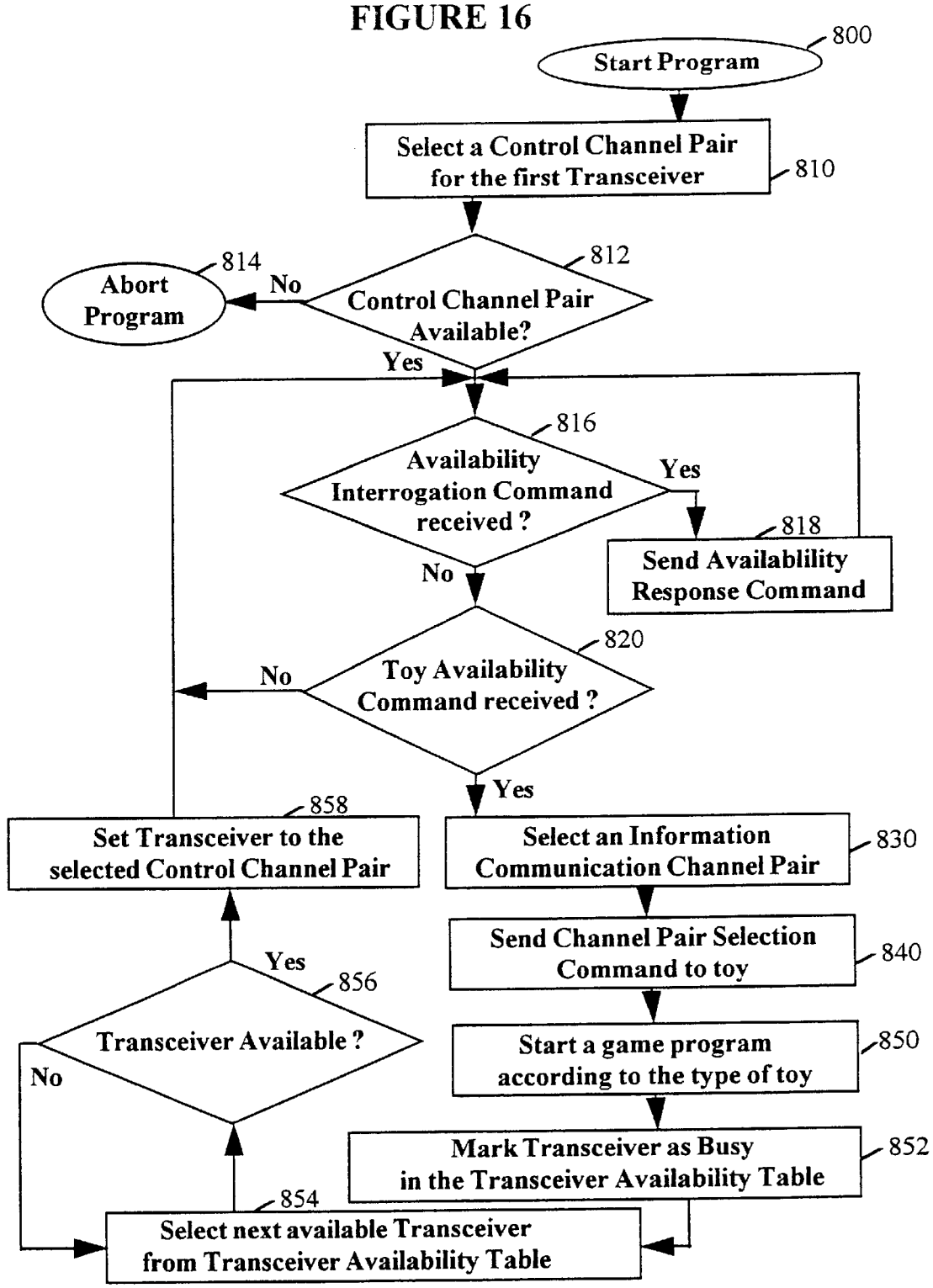

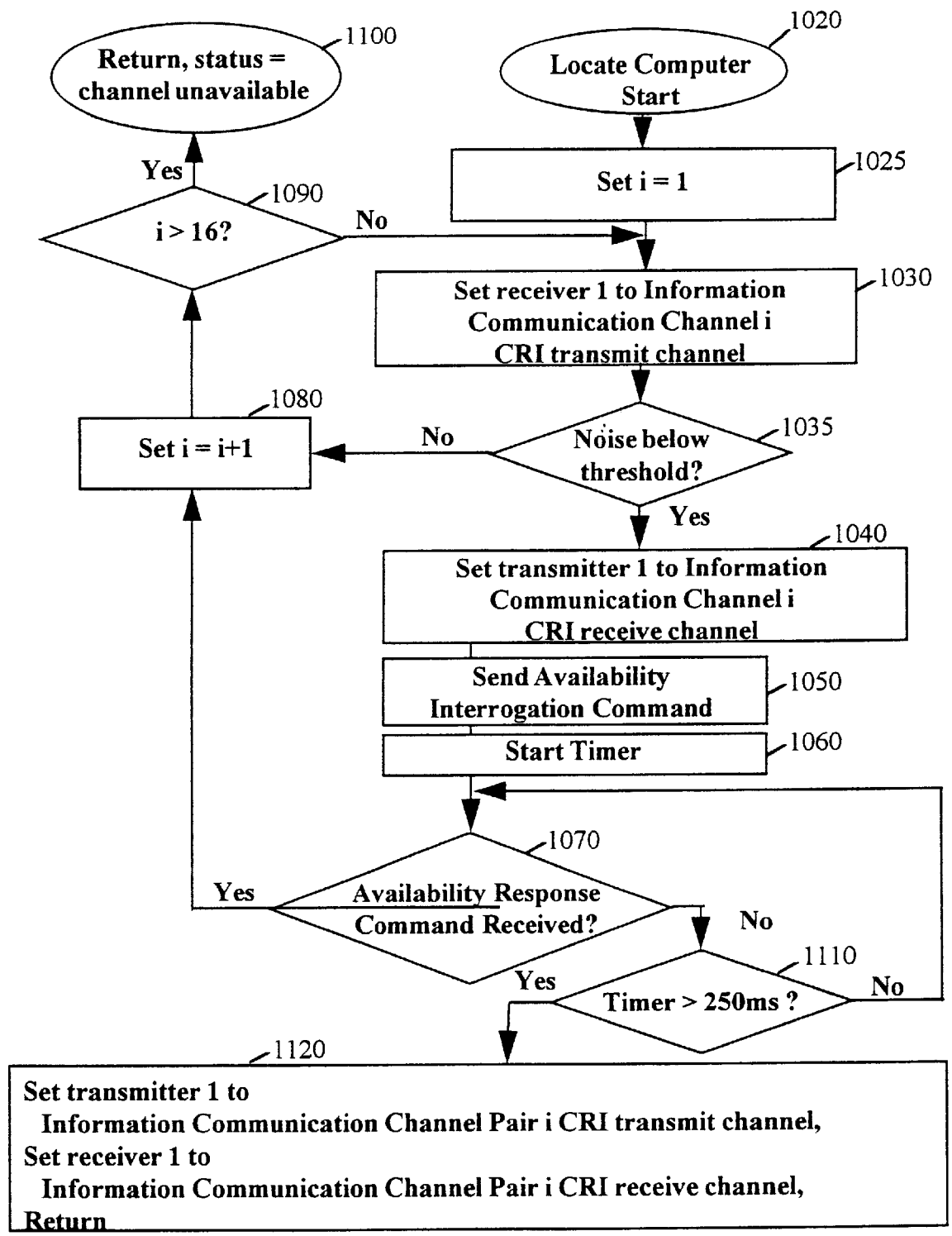

FIG. 28I
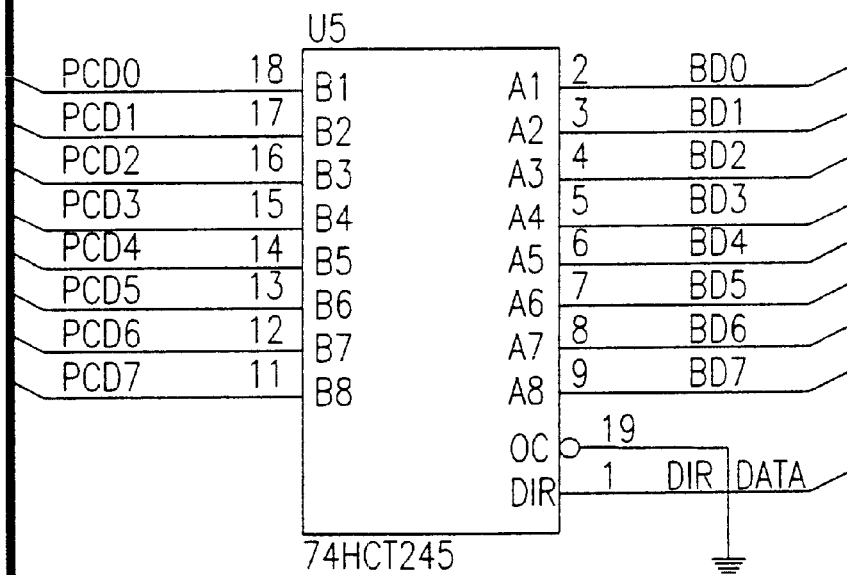
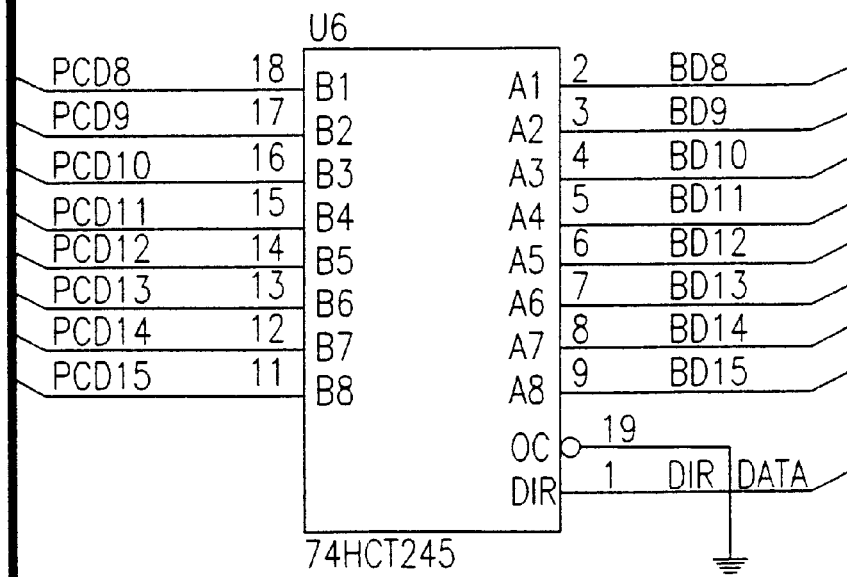

Figure 33A
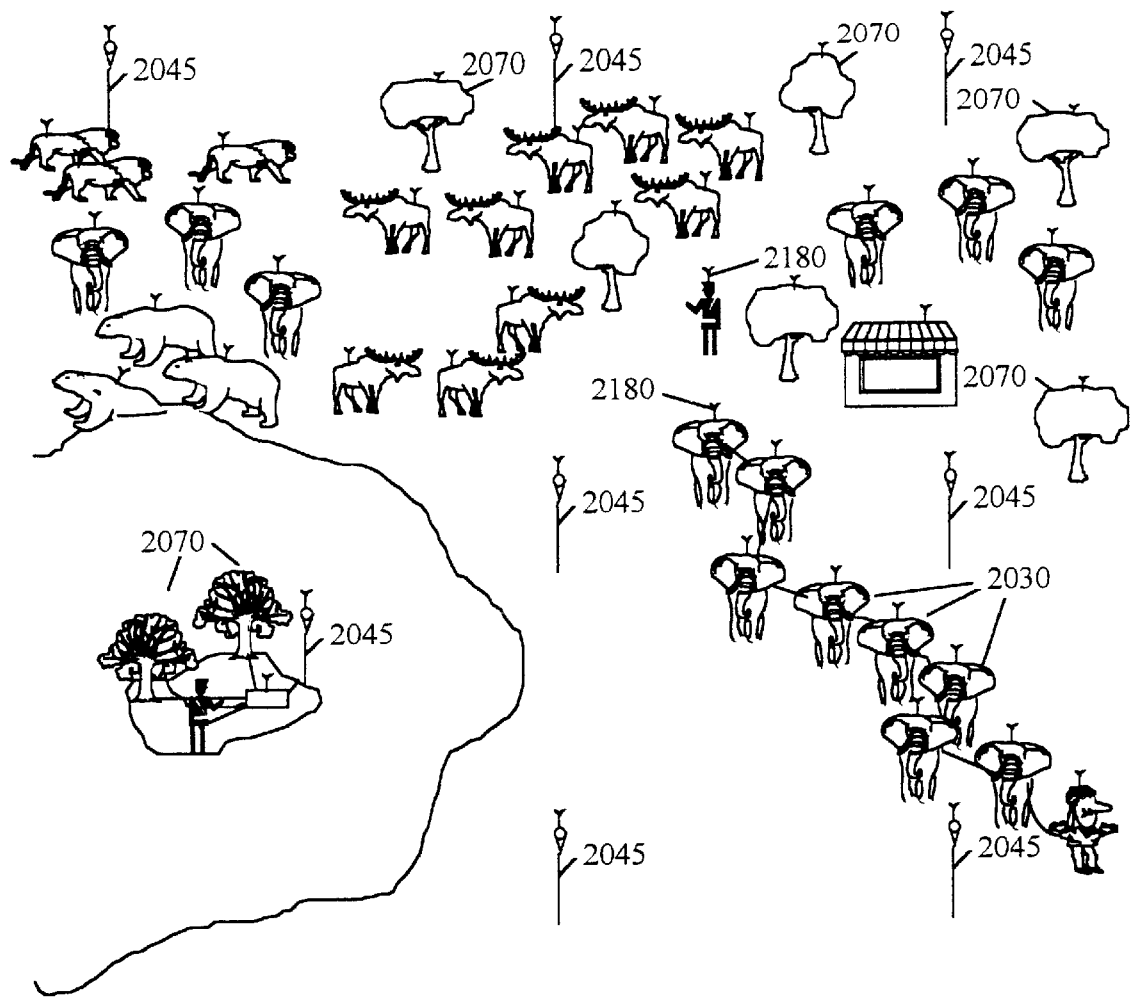
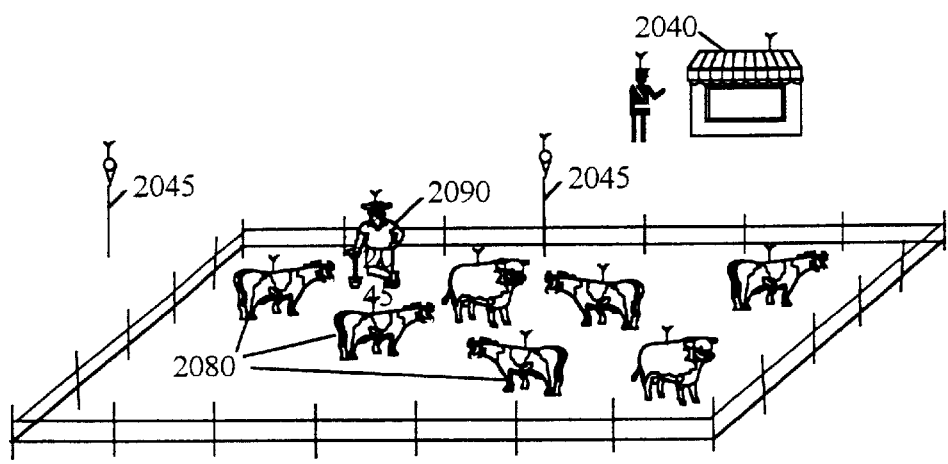

Figure 43C

```
                              ┌─2920
┌─────────────────────────────┴──────────────────────────┐
│ Game Record                                             │
│ Game Name                                               │
│ Inroduction Phrase                                      │
│ Next Game              Game-Name                        │
│ Age Range              min    max                       │
│ Level Range            min    max                       │
│ Required Credits:      Boulean expression of credits    │
│ Required Past Games:   Boulean expression of games      │
│ Number of Participating Nodes                           │
│ Node-Name-1,                                            │
│ Node-Name-2,                                            │
│ Node-Name-3,                                            │
│ ...                                                     │
└─────────────────────────────────────────────────────────┘
```

Visitor Profile Record
Name             John
Surname          Smith
Group            Class D
Sex              NA
Age              Adult
Accent           NA
Visitor ID       879634236
Level            NA
Badge ID         2384
Current Location Bear 12
Current Game     Lost Person
Current State    Searching Person
Current Credits  NA
Attribute 1      Teacher
Attribute 2      Searching Person
Attribute 3      879634279

2820

Past Game Record
Visitor ID   879634236
Game Name    Zoo Keeper
Level        3
Status       paused
State        Dear feeding
Date&Time    1508971310

Current Game Track Record
Visitor ID   879634236
Game Name    Lost Person
State Name   Guard 3
State Name   Clown 21

2840

2820

Visitor Profile Record
Name             George
Surname          Miller
Group            Dragons
Sex              NA
Age              10
Accent           NA
Visitor ID       879634279
Level            2
Badge ID         4512
Current Location Clown 23
Current Game     Lost Person
Current State    Searched Person
Attribute 1      Searched Person
Attribute 2      879634236
Attribute 3

Past Game Record
Visitor ID   879634279
Game Name    Zoo Keeper
Level        2
Status       paused
State        Bear feeding
Date&Time    1508971310

Current Game Track Record
Visitor ID   879634279
Game Name    Lost Person
State Name   Bear 4
State Name   Dear 2
State Name   Lion 14
State Name   Clown 7
State Name   Clown 21

2800    2830    2840

2830

Credits Record
Visitor ID   879634279
Game Name    Zoo Keeper
Credit 1     Deer Food

2790

Credits Record
Visitor ID   879634279
Game Name    Lost Person
Credit 1     NA

Figure 46A

| Game State Record | |
|---|---|
| Game Name | Lost Person |
| State Name | Start |
| Node Name | Class Talking |
| Condition Set 1 | Attribute = Searched Person |
| Condition Set 2 | Credit = Searching Person |
| Action Set 1 | none |
| Action Set 2 | none |
| Transition 1 | Searched Person |
| Transition 2 | Searching Person |

— 2810

| Game State Record | |
|---|---|
| Game Name | Lost Person |
| State Name | Searching Person |
| Node Name | Class Talking |
| Condition Set 1 | New Visitor (1) = Visitor |
| Condition Set 2 | Location (visitor) = Location(attribute(ID)) |
| Action Set 1 | Play "attention <visitor.visitor-name>, <attribute(ID).visitor-name> is in the vicinity of <attribute(ID).current-location>, <relative-direction(attribute(ID).current-location)" |
| Action Set 2 | Play "attention <visitor.visitor name>, <attribute(ID).visitor name> is in this vicinity" |
| Transition 1 | Searching Person |
| Transition 2 | End Game |

— 2810

| Game State Record | |
|---|---|
| Game Name | Lost Person |
| State Name | Searched Person |
| Node Name | Class Talking |
| Condition Set 1 | location (visitor) = location(attribute(ID)) |
| Condition Set 2 | New Visitor (1) = Visitor |
| Action Set 1 | Play "attention <visitor.visitor-name>, <attribute(ID).visitor-name> is here looking for you" |
| Action Set 2 | Play "attention <visitor.visitor name>, <attribute(ID).visitor name> is looking for you, please wait here" |
| Transition 1 | Searching Person |
| Transition 2 | End Game |

Game State Record
Game Name     Lost Person
State Name    End-game
Node Name     Class All
Condition Set 1   None
Action Set 1   Close game
Transition 1   None

Figure 47

Class List Record
| | |
|---|---|
| Class List ID | 8666 |
| Class Node 1 | Bear A |
| Class Node 2 | Mammals |
| Class Node 3 | Talking |

— 880

Node Figure Record
| | |
|---|---|
| Figure Record ID | Class Talking |
| Location | NA |
| Peripheral 1 | Speaker |

2850 — 2860

Node Profile Record
| | |
|---|---|
| Node ID | bear 12 |
| Figure Record ID | Bear A |
| Feature Record ID | Polar Bear |
| Location | AD9 |
| Class List | 8666 |
| Current Visitor | 879454279 |
| Waiting Visitor 1 | 674634279 |
| New Visitor 1 | 879634279 |

2890

Node Figure Record
| | |
|---|---|
| Figure Record ID | Class Bear A |
| Location | NA |
| Peripheral 1 | Microphone |
| Peripheral 2 | Speaker |
| Peripheral 3 | Eye light |
| Peripheral 4 | Head rotation motor |
| Peripheral 5 | Head nodding motor |
| Peripheral 6 | Body erection motor |

2870 — 2860

Node Feature Record
| | |
|---|---|
| Feature Record ID | Polar Bear |
| Feature Type | Voice Intonation |
| Parameter 1 (pitch) | 450 |
| Parameter 2 (rate) | 0.4 |
| Feature Type | Smile |
| Parameter 1 | on-off |
| Feature Type | Body Erection |
| Parameter 1 (speed) | X |
| Feature Type | Hand Pointing |
| Parameter 1 (angle) | X |

Figure 50A
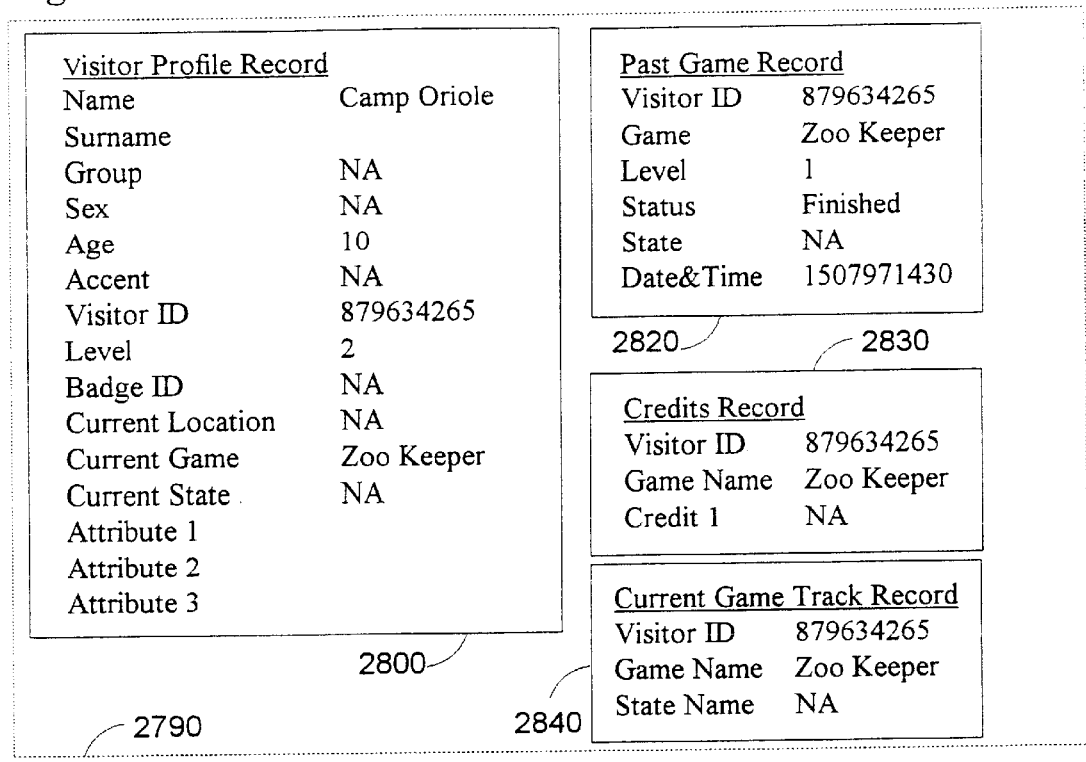
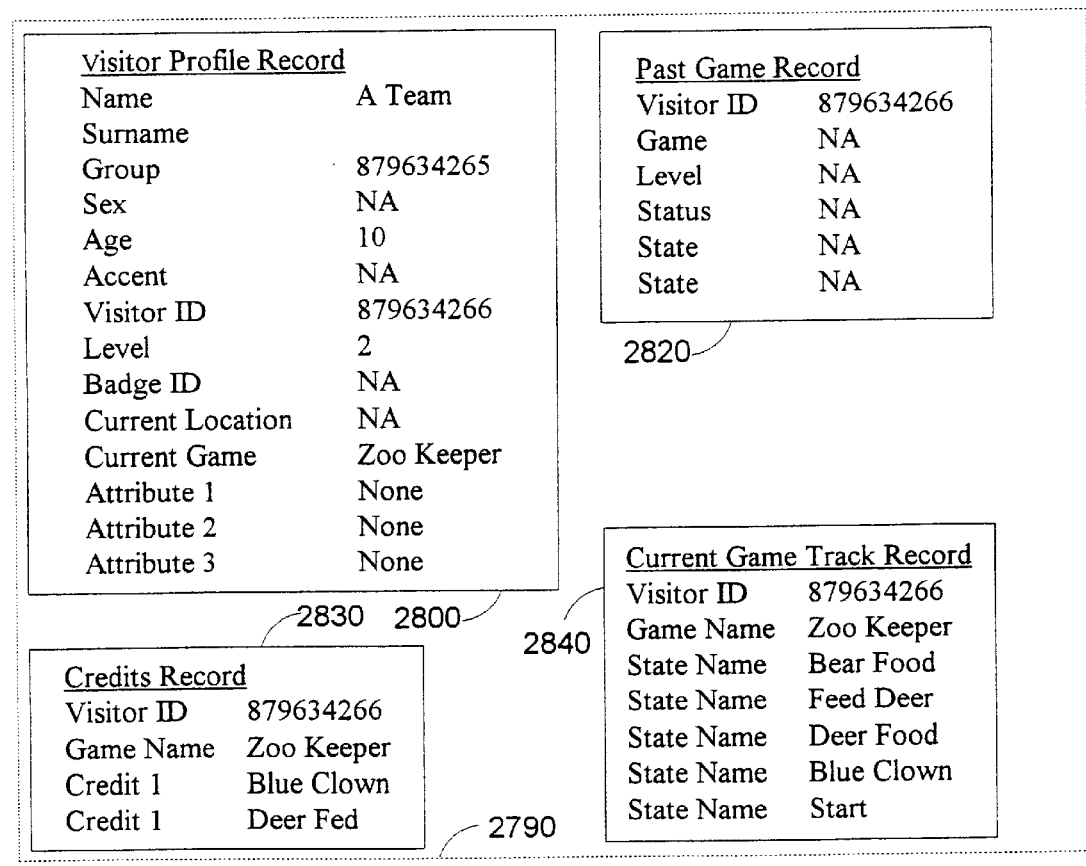

Figure 50B
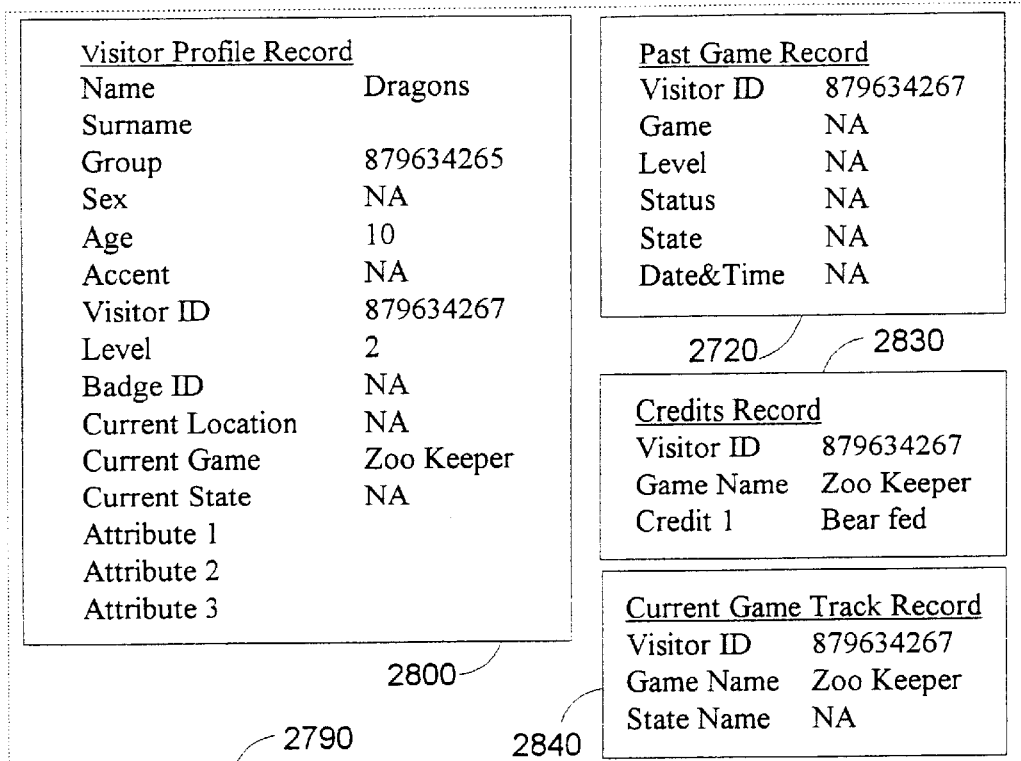
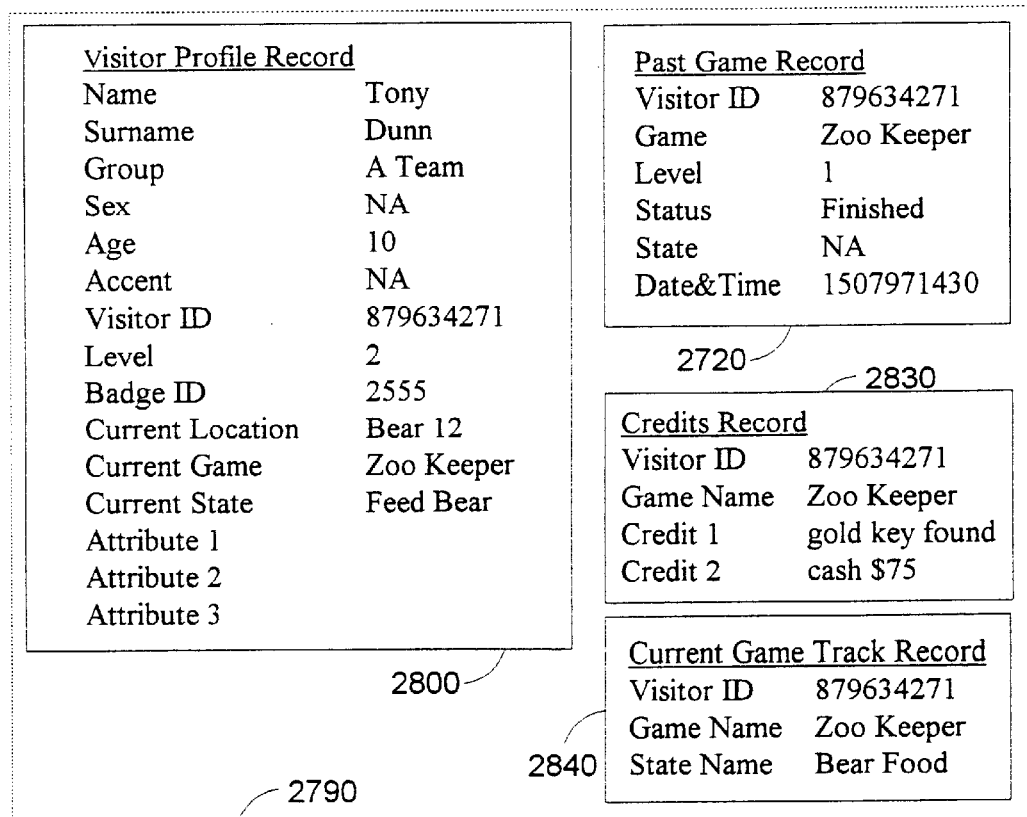

Figure 50D
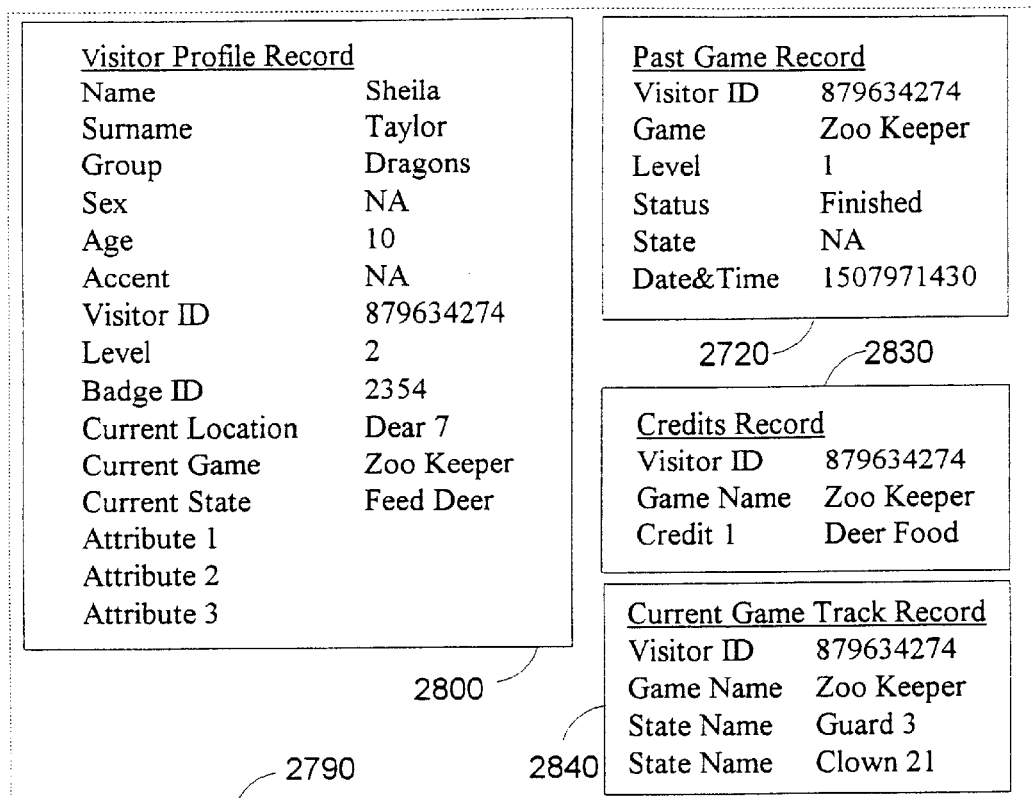
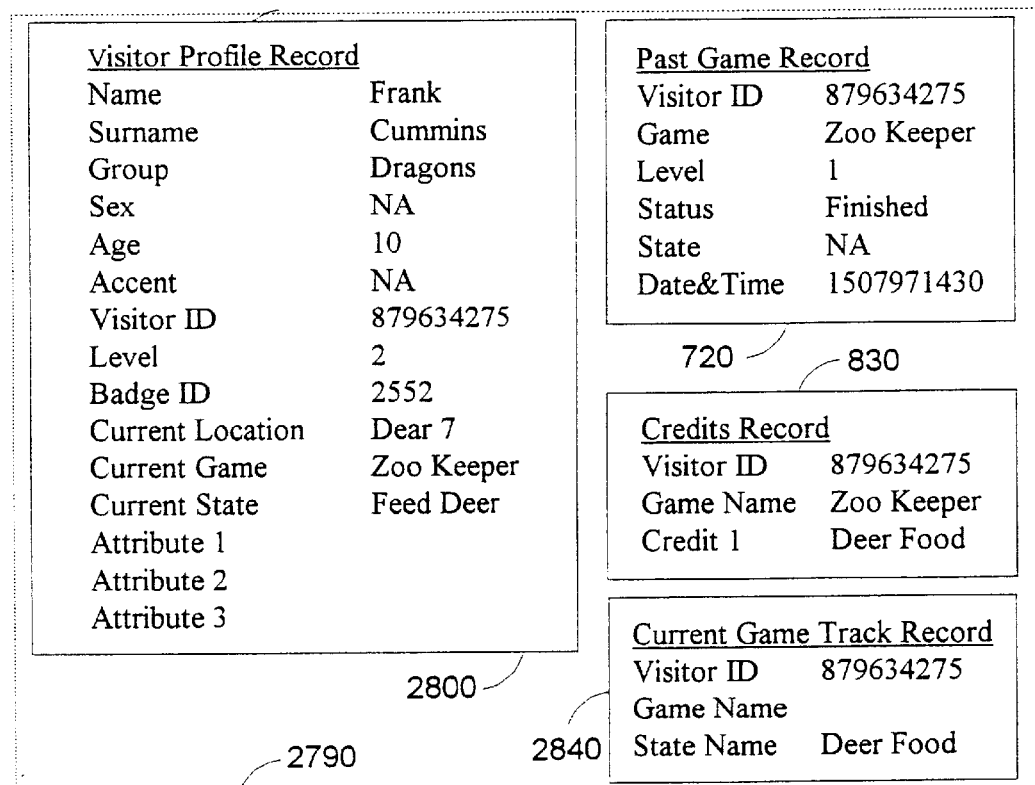

Figure 50E
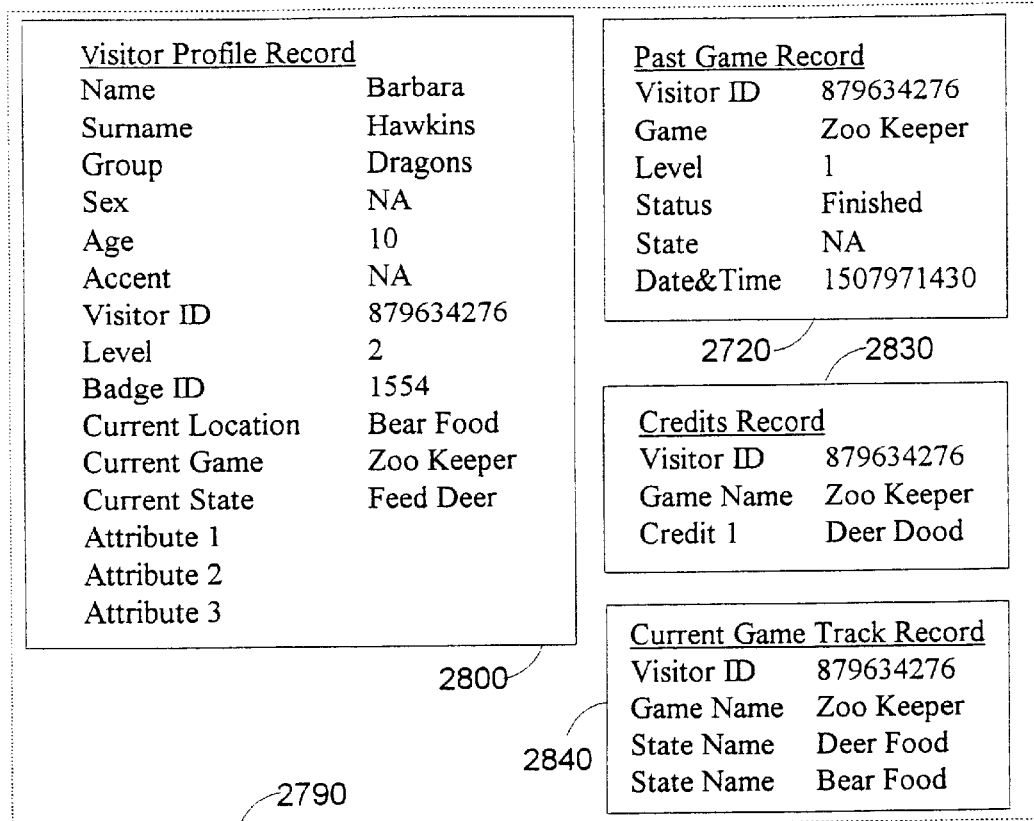
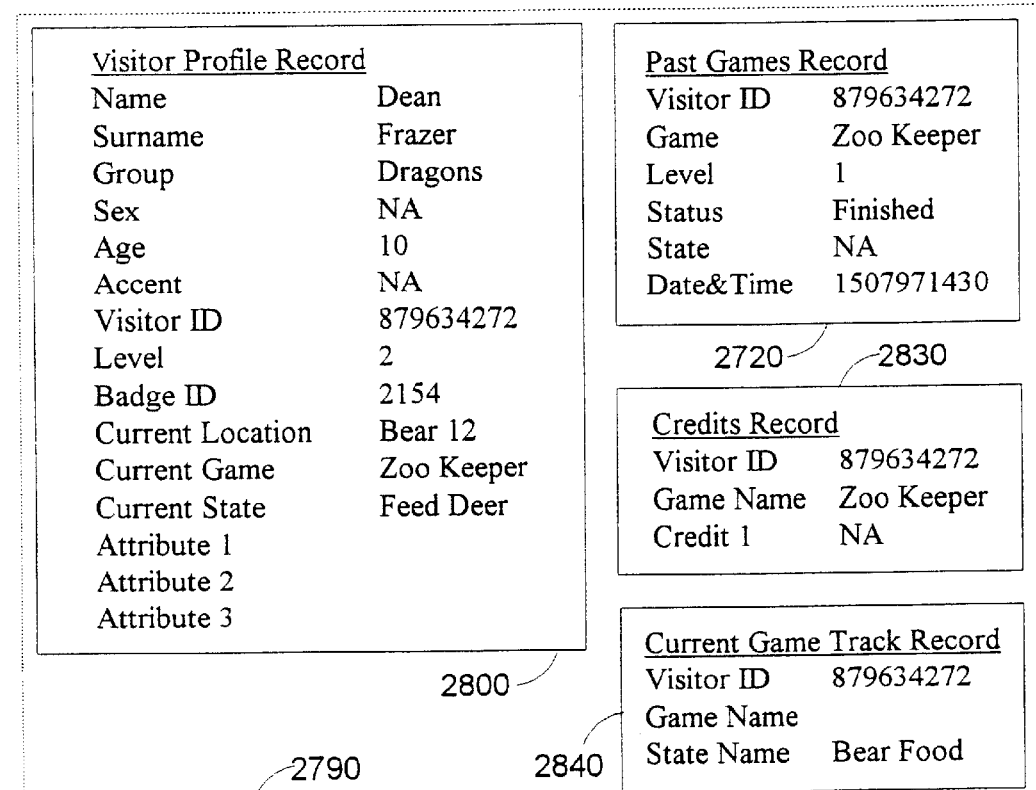

Figure 51

```
Node Figure Record
Figure Record ID    Class Talking                    ⎫
Location            NA                               ⎬ — 2860
Peipheral 1         Speaker                          ⎭

Node Figure Record
Figure Record ID    Class Reindeer                   ⎫
Location            NA                               ⎪
Peripheral 1        Microphone                       ⎪
Peripheral 2        Speaker                          ⎬ — 2860
Peripheral 3        Eye light                        ⎪
Peripheral 4        Head nodding motor               ⎪
Peripheral 5        Tail nodding Motor               ⎪
Peripheral 6        Slide motion motor               ⎭

Node Profile Record
Node ID             Reindeer 7                       ⎫
Figure Record ID    Reindeer                         ⎪
Feature Record ID   Reindeer                         ⎪
Location            AD10                             ⎪
Class List          8667                             ⎬ — 2850
Current Visitor     879454271                        ⎪
Waiting Visitor 1   674634214                        ⎪
Waiting Visitor 2   674636514                        ⎪
New Visitor 1       879634221                        ⎭

Node Feature Record
Feature Record ID   Female Reindeer                  ⎫
Feature Type  Voice                                  ⎪
Parameter 1 (pitch) 850                              ⎬ — 2870
Parameter 2 (rate)  250                              ⎭

Class List Record
Class List ID       8667                             ⎫
Class Node 1        Deer                             ⎪
Class Node 2        Mammals                          ⎬ — 2880
Class Node 3        Talking                          ⎪
...                                                  ⎭
```

| | |
|---|---|
| Game State Record | |
| Game Name | Zoo Keeper |
| State Name | Feed Bear |
| Node Name | Class Bear A |
| Condition Set 1 | Visitor.Credit = Deer Fed and Visitor.Credit = Bear Food |
| Condition Set 2 | Visitor.Credit = Bear Food |
| Condition Set 3 | Group.Credit = Deer Fed Visitor.Credit = Bear Food |
| Condition Set 4 | Default |
| Action Set 1 | Play "Thank you very much for this delicious meal" Play "I will tell you a secret, the gun store has something to help you pass the lions' gate" |
| Action Set 2 | Play "Thank you very much for this delicious meal" Play "I will tell you a secret, I have heard that my dear friend is still hungry" |
| Action Set 3 | Play "Thank you very much for this delicious meal" Play "I will tell you a secret, a sad clown knows your way" |
| Action Set 4 | Play "It's fishy, very fishy, go feed a fish eater" |
| Transition 1 | Gun Store |
| Transition 2 | Deer Food |
| Transition 3 | Blue Clown |
| Transition 4 | Bear Feeding |

| Game State Record | |
|---|---|
| Game Name | Zoo Keeper |
| State Name | Feed Deer |
| Node Name | Class Deer |
| Condition Set 1 | Credit = Bear Fed |
| Condition Set 2 | Credit = Blue Clown |
| Condition Set 3 | Group.Credit = Deer Fed |
| Condition Set 4 | Default |
| Action Set 1 | Play "Thank you very much for this delicious meal" |
| | Play "I will tell you a secret, the red clown knows how to pass the lions' gate" |
| Action Set 2 | Play "Thank you very much for this delicious meal" |
| | Play "I will tell you a secret, The jockeys will not |
| start | the race on an empty stomach" |
| Action Set 3 | Play "Thank you very much for this delicious meal" |
| | Play "I will tell you a secret, a sad clown knows your way" |
| Action Set 4 | Play "Sound the horns, send the dogs," |
| Transition 1 | Red Clown |
| Transition 2 | Horse Food |
| Transition 3 | Blue Clown |
| Transition 4 | Feed Bear |

| | |
|---|---|
| Game State Record | |
| Game Name | Tree-Quiz |
| State Name | Ask Question |
| Node Name | Class Tree |
| Condition Set 1 | Visitor.History.Game-Name = Tree-Quiz and |
| | Visitor.Credits = Tree-Quiz |
| Condition Set 2 | Visitor.History.Game-Name = Not(Tree-Quiz) |
| Condition Set 3 | Visitor.History.Game-Name = Tree-Quiz and |
| | Visitor.Credits = Not(Tree-Quiz) and |
| | Visitor.Level < 3 and |
| | Local-Parameter-2 = Answer (Local-Parameter-1) |
| Condition Set 4 | Visitor.History.Game-Name = Tree-Quiz and |
| | Visitor.Credits = Not(Tree-Quiz) and |
| | Visitor.Level => 3 and |
| | Local-Parameter-2 = Answer (Local-Parameter-1) |
| Condition Set 5 | Visitor.History.Game-Name = Tree-Quiz and |
| | Visitor.Credits = Not(Tree-Quiz) and ( |
| | Local-Parameter-2 = Not (Answer (Local-Parameter-1)) or |
| | Local-Parameter-2 = No-Response) |
| Condition Set 6 | Visitor.History.Game-Name = Tree-Quiz and |
| | Visitor.Credits = Not(Tree-Quiz) and ( |
| | Local-Parameter-2 = Not (Answer (Local-Parameter-1)) or |
| | Local-Parameter-2 = No-Response) |
| | Visitor.Level = 0 |
| Condition Set 7 | Default |

Figure 56B

| | (Continued) |
|---|---|
| Action Set 1 | Play" <Visitor.Visitor-Name>, please proceed to another node." |
| Action Set 2 | Set Visitor.Game-Name = Tree-Quiz<br>Play "Hello <visitor.visitor-name>"<br>Select Question =<br>Tree-Quiz.(Visitor.Age)(visitor.Level)(Random-Number)<br>Set <Local-Parameter-1> = Question<br>Play Question |
| Action Set 3 | Play "Correct answer <visitor.visitor-name>,<br>please proceed to the clown to receive your prize"<br>Set Visitor.Attribute-3 = Gift(Tree-Quiz)<br>Set Visitor.Attribute-4 = 0 |
| Action Set 4 | Play "Correct answer <visitor.visitor-name>,<br>to receive your prize you must visit the red clown in<br>thirty minutes, good luck."<br>Set Visitor.Attribute-3 = Gift(Tree-Quiz)<br>Set Visitor.Attribute-4 = Time(Time + 30) |
| Action Set 5 | Play "Sorry <visitor.visitor-name>, but the correct answer is <answer(Local-Parameter-1)>."<br>decrement Visitor.Level |
| Action Set 6 | Play "Thank you <visitor.visitor-name> for your participation, please proceed to another node" |
| Action Set 7 | None |
| Transition 1 | End Game |
| Transition 2 | Record Answer |
| Transition 3 | End-Game |
| Transition 4 | End-Game |
| Transition 5 | Self |
| Transition 6 | End Game |
| Transition 7 | State Default |

Figure 56C

| | (Continued) |
|---|---|
| Action Set 1 | Play" <Visitor.Visitor-Name>, please proceed to another game." |
| Action Set 2 | Set Visitor.Game-Name = Tree-Quiz<br>Play "Hello <visitor.visitor-name>"<br>Select Question =<br>  Tree-Quiz.(Visitor.Age)(visitor.Level)(Random-Number)<br>Set <Local-Parameter-1> = Question<br>Play Question |
| Action Set 3 | Play "Correct answer <visitor.visitor-name>,<br>please proceed to the clown to receive your prize"<br>Increment Visitor.Attribute-3<br>Set Visitor.Attribute-4 = 0 |
| Action Set 4 | Play "Correct answer <visitor.visitor-name>,<br>to receive your prize you must visit the red clown in<br>thirty minutes, good luck."<br>Increment Visitor.Attribute-3<br>Set Visitor.Attribute-4 = Time(Time + 30) |
| Action Set 5 | Play "Sorry <visitor.visitor-name>, but the correct answer is<br><answer(Local-Parameter-1)>."<br>decrement Visitor.Level |
| Action Set 6 | Play "Thank you <visitor.visitor-name> for your participation,<br>please proceed to the clown to receive your prize"<br>Decrement Visitor.Attribute-3 |
| Action Set 7 | None |
| Transition 1 | End Game |
| Transition 2 | Record Answer |
| Transition 3 | End-Game |
| Transition 4 | End-Game |
| Transition 5 | Self |
| Transition 6 | End Game |
| Transition 7 | State Default |

Game State Record
Game Name             Tree Quiz
State Name            Record Answer
Node Name             Class Tree
Condition Set 1       Local-Parameter-3 = Not Recording
Condition Set 2       Local-Parameter-3 = Recording and
                              Silence greater than 5 seconds and no voice
Condition Set 2       Local-Parameter-3 = Recording and
                              Silence greater than 5 seconds and voice
Condition Set 3       Local-Parameter-3 = Recording and
                              Voice and no silence
Action Set 1          Start Recording
                              Set Local-Parameter-3 = Recording(Local-Parameter-2)
Action Set 2          Set Local-Parameter-2 = No-Response
                              Set Local-Parameter-3 = Not Recording
Action Set 3          Set Local-Parameter-2 = Voice-recognition(local-Parameter-2)
                      Set Local-Parameter-3 = Not Recording
Action Set 4          None
Transition 1          Self
Transition 2          Ask-Question
Transition 3          Ask-Question
Transition 4          Self

2810

Game State Record
Game Name      Any-Game
State Name     Give-Present
Node Name      Clown
Condition Set 1        Visitor.Attribute-3 = Not Gift
Condition Set 1        Visitor.Attribute-3 = Gift
Action Set 1   Play "Hi <Visitor.Visito-Name>, please go and try a quiz""
Action Set 2   Play "Hi <Visitor.Visito-Name>, here is your present"
                       Dispense (Visitor.Attribute)
                       Set Visitor.Attribute = None
Transition 1   End Game
Transition 2   End Game

Figure 58
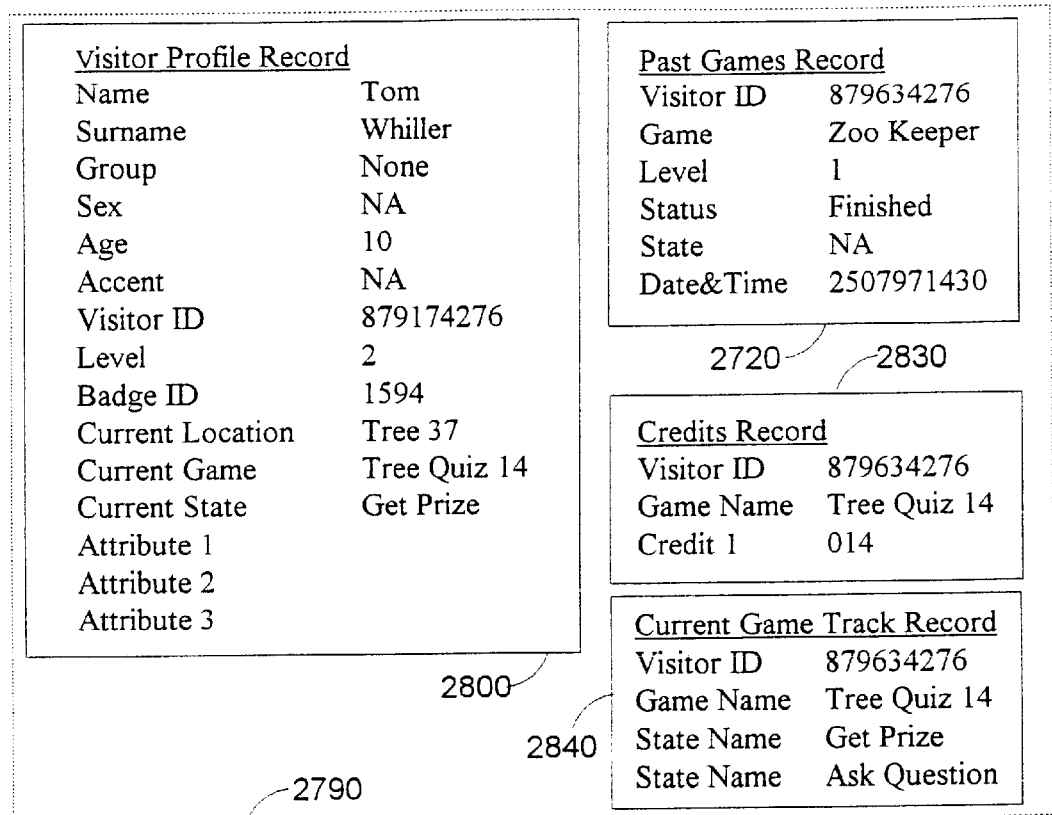
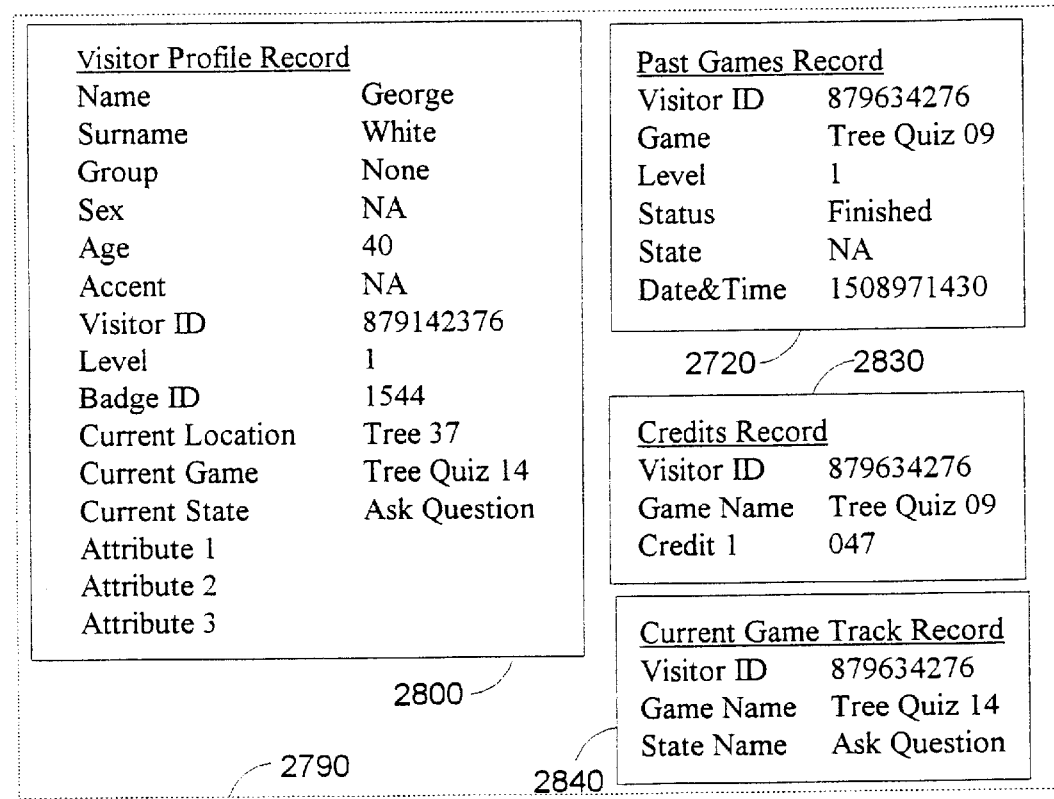

Game State Record

| | |
|---|---|
| Game Name | Common Encounters |
| State Name | Ask Question |
| Node Name | Class All |
| Condition Set 1 | Local-Parameter-1 = Start |
| Condition Set 2 | Local-Parameter-1 = Yes-No |
| Condition Set 3 | Local-Parameter-1 = Refine |
| Condition Set 4 | Local-Parameter-3 = "no keywords spotted" |
| Condition Set 5 | No visitor |
| Condition Set 6 | Default |
| Action Set 1 | Play: "You are playing the <Visitor-Record.Game-Name> game. You are now in the < Visitor-Record. Current State> state. You should approach <Game-Name.Node name>". <br> Play: "How can I help you further?" <br> Set Local-Parameter-2 = 30 <br> Set Local-Parameter-3 = Analyze <br> Set Local-Parameter-4 = blank |
| Action Set 2 | Play: "Does this help you?" <br> Set Local-Parameter-2 = 5 <br> Set Local-Parameter-3 = Analyze <br> Set Local-Parameter-4 = Yes-No |
| Action Set 3 | Play: "How can I help you further?" <br> Set Local-Parameter-2 = 30 <br> Set Local-Parameter-3 = Analyze <br> Set Local-Parameter-4 = blank |
| Action Set 4 | Play: "Please rephrase your question" |
| Action Set 5 | None |
| Action Set 6 | None |
| Transition 1 | Record |
| Transition 2 | Record |
| Transition 3 | Record |
| Transition 4 | Record |
| Transition 5 | End-Game |
| Transition 6 | Alarm Operating Center |

| Game State Record | |
|---|---|
| Game Name | Common Encounters |
| State Name | Analyze |
| Node Name | Class All |
| Condition Set 1 | Local-Parameter-4 = "Yes-No" |
| Condition Set 2 | Local-Parameter-3 = "Yes" |
| Condition Set 3 | Local-Parameter-3 = "No" |
| Condition Set 4 | Local-Parameter-3 = blank |
| Condition Set 5 | Local-Parameter-3 = "no keywords spotted" |
| Condition Set 6 | none |
| Action Set 1 | Set Local-Parameter-3 = "Yes;No"<br>Word-spot(Local-Perameter-2,Local-Parameter-3, Local-Parameter-3) |
| Action Set 2 | None |
| Action Set 3 | Set Local-Parameter-1= Refine |
| Action Set 4 | Local-Parameter-3 = "no keywords spotted"<br>Speech-recognition(Local-Perameter-2,Local-Parameter-3,) |
| Action Set 5 | None |
| Action Set 6 | Append(Local-Parameter-5,Local-Parameter-3)<br>Set Local-Parameter-5 = Local-Parameter-3<br>Compute-weight(Local-Parameter-3,FAQ(all), Local-Parameter-3) |
| Transition 1 | Self |
| Transition 2 | End |
| Transition 3 | Ask Question |
| Transition 4 | Self |
| Transition 5 | Ask Question |
| Transition 6 | Provide-Information |

Figure 63B

Game State Record (2790)

| | |
|---|---|
| Game Name | Common Encounters |
| State Name | Provide-Information |
| Node Name | Class All |
| Condition Set 1 | Local-Parameter-3 = not blank and |
| Condition Set 2 | Local-Parameter-3 = blank |
| Action Set 1 | Local-Parameter-2 = Local-Parameter-3.Number-Expressions |
| | Loop(Local-parameter-2 > 0) |
| | Load-Expression (Local-Parameter-3, Local-Parameter-2) |
| | Decrement (Local-Parameter-2) |
| | End-Loop |
| | Perform Expressions |
| | Play (Local-Parameter-3.Play-File-Pointer) |
| | Set Local-Parameter-1 = refine |
| Action Set 2 | Set Local-Parameter-1 = start |
| Transition 1 | Ask-Question |
| Transition 2 | Ask-Question |

Game State Record (2790)

| | |
|---|---|
| Game Name | Common Encounters |
| State Name | Record |
| Node Name | Class All |
| Condition Set 1 | Local-Parameter-2 > 0 |
| Condition Set 2 | Local-Parameter-2 = 0 |
| Action Set 1 | Record (Local-Parameter-2) |
| Action Set 2 | Set Local-Parameter-2 = Record File Pointer |
| Transition 1 | Self |
| Transition 1 | Local-Parameter-3 |

Figure 65A 2900

| | |
|---|---|
| Play Record | |
| Play Name | Restrooms Direction |
| Pre Play Processing | Calculate-Direction |
| Post Play Processing | none |
| Play List | Play Direction |
| Number Parameters | 6 |
| Parameter-1 | Node-Profile-Record.Location |
| Parameter-2 | Restrooms |
| Parameter-3 | (relative distance) |
| Parameter-4 | (relative angle) |
| Parameter-5 | (relative position front/behind) |
| Parameter-6 | (relative position right/left) |
| Calculate-Direction | |
| Begin | Direction (Parameter-1, Paremeter-2, Paremeter-3, Parameter-4, Paremeter-5, Parameter-6) |
| End Calculate-Direction | |
| Play Direction | |
| Play List type | Assembled Recording |
| Number of Play Elements | 5 |
| Play File Pointer | VR03025.WAV |
| Play File Element | Play Front |
| Play File Element | Play Back |
| Play File Element | Play Right |
| Play File Element | Play Left |
| Play Front | |
| Play file type | Conditional |
| Number of Parameters | 2 |
| Condition | Parameter-5 = 1 |
| Play File Pointer | VR03120.WAV |
| Play Behind | |
| Play file type | Conditional |
| Number of Parameters | 2 |
| Condition | Parameter-5 = -1 |
| Play File Pointer | VR03121.WAV |
| Play Right | |
| Play file type | Conditional |
| Number of Parameters | 2 |
| Condition | Parameter-6 = 1 |
| Play File Pointer | VR03122.WAV |
| Play Left | |
| Play file type | Conditional |
| Number of Parameters | 2 |
| Condition | Parameter-6 = -1 |
| Play File Pointer | VR03123.WAV |

Figure 65B

Play Record (continued)

| | |
|---|---|
| Number of Expressions | 3 |
| Expression type | Play normal |
| Number of Parameters | 3 |
| Intonation | Normal |
| Pitch | 500 |
| Rate | 100 |
| Expression Type | Hand-Right |
| Number of Parameters | 3 |
| Condition | Parameter-5 = 0 and Parameter-6 = 0 or Parameter-5 > -1 and Parameter 6 = 1 |
| Horizontal Angle | Direction (Relative_Angle) |
| Vertical Angle | 0 |
| Expression Type | Hand-Left |
| Number of Parameters | 3 |
| Condition | Parameter6 = -1 |
| Horizontal Angle | Direction (Relative_Angle) |
| Vertical Angle | 0 |

Figure 66

| Frequent Inquiry Record | |
|---|---|
| Answer Phrase Name | bathroom direction |
| Number of Keywords | 4 |
| Keyword 1 | bathroom |
| Weight 1 | 100 |
| Keyword 2 | mensroom |
| Weight 2 | 100 |
| Keyword 3 | ladiesroom |
| Weight 3 | 100 |
| Keyword 3 | Toilet |
| Weight 3 | 100 |

⟵ 2910

| Frequent Inquiry Record | |
|---|---|
| Answer Phrase Name | bathroom cleaning |
| Number of Keywords | 6 |
| Keyword 1 | bathroom |
| Weight 1 | 50 |
| Keyword 2 | mensroom |
| Weight 2 | 50 |
| Keyword 3 | ladiesroom |
| Weight 3 | 50 |
| Keyword 3 | Toilet |
| Weight 3 | 50 |
| Keyword 4 | dirty |
| Weight 4 | 50 |
| Keyword 4 | filthy |
| Weight 4 | 50 |

⟵ 2910

| Temporary Table | |
|---|---|
| Number of Phrases | 2 |
| Phrase 1 | bathroom direction |
| Wheight 1 | 100 |
| Phrase 2 | bathroom cleaning |
| Wheight 2 | 50 |

⟵ 2920

TECHNIQUES AND APPARATUS FOR ENTERTAINMENT SITES, AMUSEMENT PARKS AND OTHER INFORMATION AND/OR ENTERTAINMENT DISPENSING SITES

Attached herewith is a microfiche appendix labeled "1 of 2," "2 of 2," "1 of 5," "2 of 5," "3 of 5," "4 of 5," and "5 of 5" comprising of 7 sheet and 557 frames and comprising appendices A–X wherein:

Appendix A is a computer listing of a preferred software implementation of the method of FIGS. 9A–9N, together with the method of FIGS. 8D–8M;

Appendix B is a computer listing of a preferred software implementation of the method of FIGS. 8A–8T;

Appendix C is a computer listing of a preferred software implementation of an example of a computer game for use in the computer 100 of FIG. 1;

Appendix D is a computer listing of a preferred software implementation of the method of FIGS. 11 and FIGS. 12A–12C;

Appendices E–H, taken together, are computer listings from which a first, DLL-compatible, functions library may be constructed;

Appendices I–O, taken together, are computer listings of a second functions library which may be used to generate a variety of games for any of the computer control systems shown and described herein;

Appendix P is a detailed description of preferred features of and preferred elements of one alternative embodiment of the present invention; and Appendices Q–X, taken together, are computer listings of another preferred software implementation, alternative to the implementation of Appendices A–O.

FIELD OF THE INVENTION

The present invention relates to apparatus and methods for amusement parks and to apparatus and methods for dispensing information and other services.

BACKGROUND OF THE INVENTION

Amusement parks and other crowd-servicing centers typically comprise a plurality of service-providing nodes which are typically manned by human operators.

Locating badges, worn by mobile units of a system such as by medical personnel in a hospital system, or by mobile medical equipment in a hospital system, are known. The badges enable the location of individual medical personnel to be determined at any given time such that, for example, telephone calls may be directed to a particular person at his current location.

Automatic teller machines are interactive automated points of service which are conventionally associated with a central computer via a wired network.

Magnetic cards are conventionally held by members of an organization, such as employees in a company, and are used to provide a number of functions such as access control to access-limited locations, time-stamping, and recordal of utilization of services such as cafeteria services.

Also well known in the art are toys which are remotely controlled by wireless communication and which are not used in conjunction with a computer system. Typically, such toys include vehicles whose motion is controlled by a human user via a remote control device.

U.S. Pat. No. 4,712,184 to Haugerud describes a computer controlled educational toy, the construction of which teaches the user computer terminology and programming and robotic technology. Haugerud describes computer control of a toy via a wired connection, wherein the user of the computer typically writes a simple program to control movement of a robot.

U.S. Pat. No. 4,840,602 to Rose describes a talking doll responsive to an external signal, in which the doll has a vocabulary stored in digital data in a memory which may be accessed to cause a speech synthesizer in the doll to simulate speech.

U.S. Pat. No. 5,021,878 to Lang describes an animated character system with real-time control.

U.S. Pat. No. 5,142,803 to Lang describes an animated character system with real-time control.

U.S. Pat. No. 5,191,615 to Aldava et al. describes an interrelational audio kinetic entertainment system in which movable and audible toys and other animated devices spaced apart from a television screen are provided with program synchronized audio and control data to interact with the program viewer in relationship to the television program.

U.S. Pat. No. 5,195,920 to Collier describes a radio controlled toy vehicle which generates realistic sound effects on board the vehicle. Communications with a remote computer allows an operator to modify and add new sound effects.

U.S. Pat. No. 5,270,480 to Hikawa describes a toy acting in response to a MIDI signal, wherein an instrument-playing toy performs simulated instrument playing movements.

U.S. Pat. No. 5,289,273 to Lang describes a system for remotely controlling an animated character. The system uses radio signals to transfer audio, video and other control signals to the animated character to provide speech, hearing vision and movement in real-time.

U.S. Pat. No. 5,388,493 describes a system for a housing for a vertical dual keyboard WIDI wireless controller for accordionists. The system may be used with either a conventional MIDI wire connection or by a wireless MIDI transmission system.

German Patent DE 3009-040 to Neuhierl describes a device for adding the capability transmit sound from a remote control to a controlled model vehicle. The sound is generated by units of a microphone or a tape recorder and transmitted to the controlled model vehicle by means of radio communications. The model vehicle is equipped with a speaker that emits the received sounds.

The disclosures of all publications mentioned in the specification and of the publications cited therein are hereby incorporated by reference.

SUMMARY OF THE INVENTION

The present invention seeks to provide improved apparatus and methods for dispensing amusement services, information services and other services to crowds.

There is thus provided in accordance with a preferred embodiment of the present invention amusement park apparatus including a first plurality of entertainment providing nodes playing a second plurality of games with a third plurality of players who are simultaneously playing the second plurality of games, a node controller operative to assign each player from among the third plurality of players to an individual game from among the second plurality of games and operative to control each individual node from among the first plurality of nodes such that when the individual node enters into an interaction with an individual player, the node plays, with the individual player, the game assigned to the individual player and a communication network operative to associate each of the first plurality of nodes with the node controller.

There is also provided in accordance with a preferred embodiment of the present invention amusement park apparatus including a first plurality of entertainment providing nodes each operative to sequentially participate in any of a second plurality of games being played, a node controller operative to control the first plurality of nodes, and a communication network operative to associate each of the first plurality of nodes with the node controller.

There is additionally provided in accordance with a preferred embodiment of the present invention amusement park apparatus including a first plurality of entertainment providing nodes, a node controller operative to control the first plurality of nodes to play a second plurality of games such that at least one of the first plurality of nodes participates in each of at least two ongoing ones of the second plurality of games, and a communication network operative to associate each of the first plurality of nodes with the node controller.

Further in accordance with a preferred embodiment of the present invention the node controller is operative to control the first plurality of nodes so as to accommodate a third plurality of players participating in at least two ongoing ones of the second plurality of games.

Still further in accordance with a preferred embodiment of the present invention the second plurality of games includes at least one group game in which at least one encounter between an individual player of the group game and one of the first plurality of nodes is affected by at least one previous encounter between at least one other player of the group game and at least one of the first plurality of nodes.

Also provided, in accordance with a preferred embodiment of the present invention, is a system for dispensation of infotainment, the system including a multiplicity of lifesize fanciful figures distributed in a crowd-accommodating area in which infotainment services are dispensed to a crowd, a central fanciful figure controller operative to provide at least some of the infotainment services to the crowd by controlling said multiplicity of fanciful figures and a communication network operative to associate each of the multiplicity of fanciful figures with the central fanciful figure controller.

Further in accordance with a preferred embodiment of the present invention, the crowd-accommodating area comprises an amusement park and the infotainment services comprise amusement park services.

Still further in accordance with a preferred embodiment of the present invention, at least a portion of the crowd-accommodating area comprises an outdoor area.

Further in accordance with a preferred embodiment of the present invention, a multiplicity of fanciful figures includes a plurality of stationary figures.

Still further in accordance with a preferred embodiment of the present invention, the multiplicity of fanciful figures includes at least one mobile figure.

Moreover in accordance with a preferred embodiment of the present invention at least some of the fanciful figures include a commodity dispenser.

Further in accordance with a preferred embodiment of the present invention the multiplicity of fanciful figures includes at least one talking figure.

Further in accordance with a preferred embodiment of the present invention a central fanciful figure controller is operative to continuously control the mobile figure even as it roams from one cell to another.

There is additionally provided in accordance with a preferred embodiment of the present invention an information providing system including a multiplicity of information providing nodes each including at least one sensor, other than an alphanumeric input device, for sensing events in its vicinity, an interactive central node controller operative to receive an indication of an event from an individual one of the information providing nodes and to control another one of the multiplicity of information providing nodes in accordance with the indication of the event, and a communication network operative to provide communication between each of the multiplicity of nodes and the central node controller.

Further in accordance with a preferred embodiment of the present invention the nodes are distributed in a crowd-accommodating area.

Still further in accordance with a preferred embodiment of the present invention at least one sensor includes an artificial vision system for sensing visual information in its vicinity.

Additionally in accordance with a preferred embodiment of the present invention at least one sensor includes an audio reception system for sensing audio information in its vicinity.

Moreover in accordance with a preferred embodiment of the present invention the audio reception system includes a speech recognition unit.

Still further in accordance with a preferred embodiment of the present invention at least one talking figure generates pre-recorded speech specimens.

Additionally in accordance with a preferred embodiment of the present invention at least one talking figure generates synthesized speech.

Moreover in accordance with a preferred embodiment of the present invention at least one talking figure assembles pre-recorded speech segments, thereby to generate speech.

Further in accordance with a preferred embodiment of the present invention at least one talking figure assembles synthesized speech segments, thereby to generate speech.

Still further in accordance with a preferred embodiment of the present invention the infotainment providing nodes include moving parts which are visible to a user.

Additionally in accordance with a preferred embodiment of the present invention the central node controller is operative to cause the infotainment providing nodes to take actions having known significance.

Moreover in accordance with a preferred embodiment of the present invention the actions having known significance include smiling, pointing and illuminating.

Further in accordance with a preferred embodiment of the present invention the sensor is capable of identifying an individual in its vicinity and the central node controller is operative to record the nodes which each individual has encountered.

Still further in accordance with a preferred embodiment of the present invention at least some of the infotainment providing nodes are operative to provide an individual with infotainment whose contents take into account the individual's past encounters with nodes of the system.

Additionally in accordance with a preferred embodiment of the present invention at least some of the infotainment providing nodes are operative to provide an individual with infotainment whose contents take into account other individuals' past encounters with nodes of the system.

Further in accordance with a preferred embodiment of the present invention the commodity dispenser is operative to dispense at least one of the following articles: gifts, prizes, coupons, maps, souvenirs, change, tokens.

Still further in accordance with a preferred embodiment of the present invention at least some of the infotainment providing nodes are operative to provide an individual with infotainment whose contents take into account at least one characteristic of the individual, e.g. language, age, preferences, disabilities.

There is additionally provided in accordance with a preferred embodiment of the present invention a two-way user servicing system including a multiplicity of game-playing nodes each including a user identity receiving device for identifying presence of an individual user, an interactive central node controller operative to receive from a particular node an indication of the presence of a particular user at the particular node and to control participation of at least one of the multiplicity of game-playing nodes in at least one game in accordance with the indication, and a communication network operative to provide communication between each of the multiplicity of nodes and the central node controller.

Further in accordance with a preferred embodiment of the present invention the node controller is operative to maintain, for at least one particular user, a record of nodes the particular user has visited and to control at least one node currently visited by the user in accordance with the record.

Still further in accordance with a preferred embodiment of the present invention the user identity receiving device includes a user identity input device.

Additionally in accordance with a preferred embodiment of the present invention the user identity receiving device includes a user identity sensing device.

Moreover in accordance with a preferred embodiment of the present invention the user identity sensing device includes a receiver for sensing a user-identifying transmission sent by a wearable tag.

There is additionally provided in accordance with a preferred embodiment of the present invention a two-way game system including a multiplicity of game participant nodes each including a user identity receiving device for identifying presence of an individual user, an interactive central node controller operative to receive from a particular node an indication of the presence of first and second users at the particular node and to instruct the particular node to play a first game with the first user, to play a second game with the second user, and a communication network operative to provide communication between each of the multiplicity of nodes and the central node controller.

There is additionally provided in accordance with a preferred embodiment of the present invention a method of providing entertainment, the method including providing a first plurality of entertainment providing nodes playing a second plurality of games with a third plurality of players who are simultaneously playing the second plurality of games, providing a node controller operative to assign each player from among the third plurality of players to an individual game from among the second plurality of games and operative to control each individual node from among the first plurality of nodes such that when the individual node enters into an interaction with an individual player, the node plays, with the individual player, the game assigned to the individual player, and networking each of the first plurality of nodes with the node.

There is additionally provided in accordance with a preferred embodiment of the present invention a method of providing entertainment, the method including providing a first plurality of entertainment providing nodes each operative to sequentially participate in any of a second plurality of games being played simultaneously with any of a third plurality of players who are simultaneously playing the second plurality of games, controlling the first plurality of nodes, and networking each of the first plurality of nodes with the node controller.

There is additionally provided in accordance with a preferred embodiment of the present invention a method of providing entertainment, the method including providing a first plurality of entertainment providing nodes, controlling the first plurality of nodes to play a second plurality of games such that at least one of the first plurality of nodes participates in each of at least two ongoing ones of the second plurality of games, and networking each of the first plurality of nodes with the node controller.

There is additionally provided in accordance with a preferred embodiment of the present invention a method of providing entertainment, the method including distributing a multiplicity of fanciful lifesize figures in a crowd-accommodating area, controlling the multiplicity of fanciful figures centrally, and networking each of the multiplicity of fanciful figures with the central fanciful figure controller.

There is additionally provided in accordance with a preferred embodiment of the present invention a method of providing information, the method including providing a multiplicity of information providing nodes each including at least one sensor other than an input device for sensing events in its vicinity, interactively and centrally receiving indications of the events from the information providing nodes and controlling the multiplicity of information providing nodes in accordance with the indications of the events, and providing networked communication between each of the multiplicity of nodes and the central node controller.

There is additionally provided in accordance with a preferred embodiment of the present invention a method of providing two-way user servicing, the method including providing a multiplicity of game-playing nodes each including a user identity receiving device for identifying presence of an individual user, interactively and centrally receiving from a particular node an indication of the presence of a particular user at the particular node and controlling participation of at least one of the multiplicity of game-playing nodes in at least one game in accordance with the indication, and providing networked communication between each of the multiplicity of nodes and the central node controller.

There is additionally provided in accordance with a preferred embodiment of the present invention a method of providing two-way gaming, the method including providing a multiplicity of game participant nodes each including a user identity receiving device for identifying presence of an individual user, interactively and centrally receiving from a particular node an indication of the presence of first and second users at the particular node and instructing the particular node to play a first game with the first user, to play a second game with the second user, and providing networked communication between each of the multiplicity of nodes and the central node controller.

Advantages of some of the preferred embodiments of the present invention, in which a record is maintained of the visitor's experiences in the amusement park, include:

a. Visitors can be directed to attractions and/or games and/or nodes which they have not yet experience.

b. Stimuli such as explanations provided to visitors can be adjusted to take into account what the visitor has already seen e.g. information already provided to a visitor may be omitted and information now being provided to the visitor may include an explanation of the relationship between the information now being provided to the user and information previously provided to the user.

According to a preferred embodiment of the present invention, questions posed by visitors to the nodes are recorded and analyzed off-line, typically by a human operator, in order to identify questions for which a more satisfactory or different answer should be provided. The database is then updated, typically manually, so as to provide a more satisfactory or different answer.

There is also provided in accordance with a preferred embodiment of the present invention a wireless computer controlled toy system including a computer system operative to transmit a first transmission via a first wireless transmitter and at least one toy including a first wireless receiver, the toy receiving the first transmission via the first wireless receiver and operative to carry out at least one action based on the first transmission.

The computer system may include a computer game. The toy may include a plurality of toys, and the at least one action may include a plurality of actions.

The first transmission may include a digital signal. The first transmission includes an analog signal and the analog signal may include sound.

Additionally in accordance with a preferred embodiment of the present invention the computer system includes a computer having a MIDI port and wherein the computer may be operative to transmit the digital signal by way of the MIDI port.

Additionally in accordance with a preferred embodiment of the present invention the sound includes music, a pre-recorded sound and/or speech. The speech may include recorded speech and synthesized speech.

Further in accordance with a preferred embodiment of the present invention the at least one toy has a plurality of states including at least a sleep state and an awake state, and the first transmission includes a state transition command, and the at least one action includes transitioning between the sleep state and the awake state.

A sleep state may typically include a state in which the toy consumes a reduced amount of energy and/or in which the toy is largely inactive, while an awake state is typically a state of normal operation.

Still further in accordance with a preferred embodiment of the present invention the first transmission includes a control command chosen from a plurality of available control commands based, at least in part, on a result of operation of the computer game.

Additionally in accordance with a preferred embodiment of the present invention the computer system includes a plurality of computers.

Additionally in accordance with a preferred embodiment of the present invention the first transmission includes computer identification data and the second transmission includes computer identification data.

Additionally in accordance with a preferred embodiment of the present invention the at least one toy is operative to transmit a second transmission via a second wireless transmitter and the computer system is operative to receive the second transmission via a second wireless receiver.

Moreover in accordance with a preferred embodiment of the present invention the system includes at least one input device and the second transmission includes a status of the at least one input device.

Additionally in accordance with a preferred embodiment of the invention the at least one toy includes at least a first toy and a second toy, and wherein the first toy is operative to transmit a toy-to-toy transmission to the second toy via the second wireless transmitter, and wherein the second toy is operative to carry out at least one action based on the toy-to-toy transmission.

Further in accordance with a preferred embodiment of the present invention operation of the computer system is controlled, at least in part, by the second transmission.

Moreover in accordance with a preferred embodiment of the present invention the computer system includes a computer game, and wherein operation of the game is controlled, at least in part, by the second transmission.

The second transmission may include a digital signal and/or an analog signal.

Still further in accordance with a preferred embodiment of the present invention the computer system has a plurality of states including at least a sleep state and an awake state, and the second transmission include a state transition command, and the computer is operative, upon receiving the second transmission, to transition between the sleep state and the awake state.

Still further in accordance with a preferred embodiment of the present invention at least one toy includes sound input apparatus, and the second transmission includes a sound signal which represents a sound input via the sound input apparatus.

Additionally in accordance with a preferred embodiment of the present invention the computer system is also operative to perform at least one of the following actions: manipulate the sound signal; and play the sound signal.

Additionally in accordance with a preferred embodiment of the present invention the sound includes speech, and the computer system is operative to perform a speech recognition operation on the speech.

Further in accordance with a preferred embodiment of the present invention the second transmission includes toy identification data, and the computer system is operative to identify the at least one toy based, at least in part, on the toy identification data.

Still further in accordance with a preferred embodiment of the present invention the first transmission includes toy identification data. The computer system may adapt a mode of operation thereof based, at least in part, on the toy identification data.

Still further in accordance with a preferred embodiment of the present invention the at least one action may include movement of the toy, movement of a part of the toy and/or an output of a sound. The sound may be transmitted using a MIDI protocol.

There is also provided in accordance with another preferred embodiment of the present invention a game system including a computer system operative to control a computer game and having a display operative to display at least one display object, and at least one toy in wireless communication with the computer system, the computer game including a plurality of game objects, and the plurality of game objects includes the at least one display object and the at least one toy.

Further in accordance with a preferred embodiment of the present invention the at least one toy is operative to transmit toy identification data to the computer system, and the computer system is operative to adapt a mode of operation of the computer game based, at least in part, on the toy identification data.

The computer system may include a plurality of computers.

Additionally in accordance with a preferred embodiment of the present invention the first transmission includes computer identification data and the second transmission includes computer identification data.

There is also provided in accordance with a preferred embodiment of the present invention a data transmission apparatus including first wireless apparatus including musical instrument data interface (MIDI) apparatus operative to receive and transmit MIDI data between a first wireless and a first MIDI device and second wireless apparatus including MIDI apparatus operative to receive and transmit MIDI data between a second wireless and a second MIDI device, the first wireless apparatus is operative to transmit MIDI data including data received from the first MIDI device to the second wireless apparatus, and to transmit MIDI data including data received from the second wireless apparatus to the first MIDI device, and the second wireless apparatus is operative to transmit MIDI data including data received from the second MIDI device to the first wireless apparatus, and to transmit MIDI data including data received from the first wireless apparatus to the second MIDI device.

Further in accordance with a preferred embodiment of the present invention the second wireless apparatus includes a plurality of wirelesses each respectively associated with one of the plurality of MIDI devices, and each of the second plurality of wirelesses is operative to transmit MIDI data including data received from the associated MIDI device to the first wireless apparatus, and to transmit MIDI data including data received from the first wireless apparatus to the associated MIDI device.

The first MIDI device may include a computer, while the second MIDI device may include a toy.

Additionally in accordance with a preferred embodiment of the present invention the first wireless apparatus also includes analog interface apparatus operative to receive and transmit analog signals between the first wireless and a first analog device, and the second wireless apparatus also includes analog interface apparatus operative to receive and transmit analog signals between the second wireless and a second analog device, and the first wireless apparatus is also operative to transmit analog signals including signals received from the first analog device to the second wireless apparatus, and to transmit analog signal including signals received from the second wireless apparatus to the first analog device, and the second wireless apparatus is also operative to transmit analog signals including signals received from the second analog device to the first wireless apparatus, and to transmit analog signals including data received from the first wireless apparatus to the second analog device.

There is also provided in accordance with another preferred embodiment of the present invention a method for generating control instructions for a computer controlled toy system, the method includes selecting a toy, selecting at least one command from among a plurality of commands associated with the toy, and generating control instructions for the toy including the at least one command.

Further in accordance with a preferred embodiment of the present invention the step of selecting at least one command includes choosing a command, and specifying at least one control parameter associated with the chosen command.

Still further in accordance with a preferred embodiment of the present invention the at least one control parameter includes at least one condition depending on a result of a previous command.

Additionally in accordance with a preferred embodiment of the present invention at least one of the steps of selecting a toy and the step of selecting at least one command includes utilizing a graphical user interface.

Still further in accordance with a preferred embodiment of the present invention the previous command includes a previous command associated with a second toy.

Additionally in accordance with a preferred embodiment of the present invention the at least one control parameter includes an execution condition controlling execution of the command.

The execution condition may include a time at which to perform the command and/or a time at which to cease performing the command. The execution condition may also include a status of the toy.

Additionally in accordance with a preferred embodiment of the present invention the at least one control parameter includes a command modifier modifying execution of the command.

Still further in accordance with a preferred embodiment of the present invention the at least one control parameter includes a condition dependent on a future event.

Additionally in accordance with a preferred embodiment of the present invention the at least one command includes a command to cancel a previous command.

There is also provided for in accordance with a preferred embodiment of the present invention a signal transmission apparatus for use in conjunction with a computer, the apparatus including wireless transmission apparatus; and signal processing apparatus including at least one of the following analog/digital sound conversion apparatus operative to convert analog sound signals to digital sound signals, to convert digital sound signals to analog sound signals, and to transmit the signals between the computer and a sound device using the wireless transmission apparatus; a peripheral control interface operative to transmit control signals between the computer and a peripheral device using the wireless transmission apparatus; and a MIDI interface operative to transmit MIDI signals between the computer and a MIDI device using the wireless transmission apparatus.

There is also provided in accordance with another preferred embodiment of the present invention a computer system including a computer, and a sound card operatively attached to the computer and having a MIDI connector and at least one analog connector, wherein the computer is operative to transmit digital signals by means of the MIDI connector and to transmit analog signals by means of the at least one analog connector.

Further in accordance with a preferred embodiment of the present invention the computer is also operative to receive digital signals by means of the MIDI connector and to receive analog signals by means of the at least one analog connector.

It is also noted that throughout the specification and claims the term "radio" includes all forms of "wireless" communication.

The term "fanciful figure" and the like, as used herein, is intended to include figures which may or may not be based on fact and which are made or designed in a curious, intricate or imaginative way.

The term "simultaneous play" and the like indicates that several players are playing a game or games at a given moment although the players may or may not have started playing the game or games at the same time and may or may not finish playing the game or games at the same time.

The term "crowd-accommodating area" is intended to include areas capable of accommodating hundreds and preferably thousands or even tens of thousands of visitors.

BRIEF DESCRIPTION OF THE DRAWINGS

The present invention will be understood and appreciated from the following detailed description, taken in conjunction with the drawings in which:

FIGS. 1–32C illustrate a toy system for use in conjunction with a computer system wherein:

FIG. 1A is a partly pictorial, partly block diagram illustration of a computer control system including a toy, constructed and operative in accordance with a preferred embodiment of the present invention;

FIGS. 2A–2C are simplified pictorial illustrations of a portion of the system of FIG. 1A in use;

FIG. 3 is a simplified block diagram of a preferred implementation of the computer radio interface 110 of FIG. 1A;

FIG. 4 is a more detailed block diagram of the computer radio interface 110 of FIG. 3;

FIGS. 5A–5D taken together comprise a schematic diagram of the apparatus of FIG. 4;

FIG. 6 is a simplified block diagram of a preferred implementation of the toy control device 130 of FIG. 1A;

FIGS. 7A–7F, taken together with either FIG. 5D or FIG. 5E, comprise a schematic diagram of the apparatus of FIG. 6;

FIGS. 8B–8T, taken together, comprise a simplified flowchart illustration of a preferred implementation of the method of FIG. 8A;

FIG. 11 is a simplified flowchart illustration of a preferred method for generating control instructions for the apparatus of FIG. 1A;

FIG. 13 is a block diagram of a first sub-unit of a multi-port multi-channel implementation of the computer radio interface 110 of FIG. 1A, which sub-unit resides within computer 100 of FIG. 1A;

FIG. 14 is a block diagram of a second sub-unit of a multi-port multi-channel implementation of the computer radio interface 110 of FIG. 1A, which sub-unit complements the apparatus of FIG. 13 and resides exteriorly to computer 100 of FIG. 1A;

FIG. 16 is a simplified flowchart illustration of a preferred method by which a computer selects a control channel pair in anticipation of a toy becoming available and starts a game-defining communication over the control channel each time both a toy and a transceiver of the computer radio interface are available;

FIG. 17 is a simplified flowchart illustration of a preferred method for implementing the "select control channel pair" step of FIG. 16;

FIG. 18B is a simplified flowchart illustration of a preferred method for performing the "locate computer" step of FIG. 18A;

FIG. 19 is a simplified flowchart illustration of a preferred method of operation of the toy control device 130;

FIG. 20 is a simplified illustration of a remote game server in association with a wireless computer controlled toy system which may include a network computer;

FIG. 21 is a simplified flowchart illustration of the operation of the computer or of the network computer of FIG. 20, when operating in conjunction with the remote server;

FIG. 22 is a simplified flowchart illustration of the operation of the remote game server of FIG. 20;

FIG. 23 is a semi-pictorial semi-block diagram illustration of a wireless computer controlled toy system including a proximity detection subsystem operative to detect proximity between the toy and the computer;

FIGS. 28A–28K, taken together, form a detailed electronic schematic diagram of the multi-port multi-channel computer radio interface sub-unit of FIG. 13;

FIG. 30 is a partly pictorial, partly block diagram illustration of a computer control system including a toy, constructed and operative in accordance with a further preferred embodiment of the present invention;

FIG. 31 is a block diagram is a simplified block diagram illustrating the combination of the computer radio interface and the toy control device as used in the embodiment of FIG. 30; and FIGS. 32A, 32B and 32C taken together form a simplified block diagram of the EPLD chip of FIG. 28H; and FIGS. 33–81 illustrates embodiments of the toy system of FIGS. 1–32C wherein:

FIGS. 33A–33C, taken together, form a simplified pictorial illustration of an amusement park system constructed and operative in accordance with a preferred embodiment of the present invention;

FIG. 34 is a simplified pictorial illustration of a first state of some of the elements of an amusement park system constructed and operative in accordance with another preferred embodiment of the present invention;

FIG. 35 is a simplified pictorial illustration of a second state of the amusement park system of FIG. 34;

FIG. 36 is a simplified pictorial illustration of one of the elements of the amusement park system of FIGS. 34–35;

FIG. 37 is a simplified flowchart illustration of a preferred method of operation by which the central amusement park controller of FIG. 33 performs each of a multiplicity of node control tasks for each of a corresponding multiplicity of nodes;

FIG. 38 is a simplified flowchart illustration of a preferred method for performing the "visitor localization" step of FIG. 37;

FIG. 39 is a simplified flowchart illustration of a preferred method for performing the "new visitor welcoming" step of FIG. 37;

FIG. 40 is a simplified flowchart illustration of a preferred method for performing the "launch execution of next script item" step of FIG. 37;

FIG. 41 is a simplified flowchart illustration of a preferred method for performing the "analyze conditions" step of FIG. 40;

FIG. 42 is a simplified flowchart illustration of a preferred method for performing the "perform action set" step of FIG. 40;

FIGS. 43A–43C, taken together, form a diagram of a data structure typically residing in the central amusement park controller 2010 and suitable for storing information regarding visitors to the amusement park;

FIG. 44 is a bubble diagram of a "find lost person" game;

FIG. 45 is a diagram of two "Visitor Record" data structures of FIG. 43A storing information regarding two respective visitors playing the "find lost person" game of FIG. 44, of which one is the lost person and the other is the seeker;

FIG. 46A is a diagram of three "Game State Record" data structures of FIGS. 43A–43C storing information regarding three of the four respective game states within the "find lost person" game of FIG. 44;

FIG. 46B is a diagram of the fourth "Game State Record" data structure of FIGS. 43A–43C which stores information regarding the fourth of the four respective game states within the "find lost person" game of FIG. 44;

FIG. 47 is a diagram of a "Node Record" data structure of FIGS. 43A–43C storing information regarding a node which is operating within the "find lost person" game of FIG. 44;

FIG. 48 is a simplified flowchart illustration of a preferred chain of events which typically occur in setting up for and playing the "find lost person" game of FIGS. 44–47;

FIG. 49 is a bubble diagram of a game for groups, "zoo-keeper", in which powers or credits are accumulated;

FIGS. 50A–50E, taken together, form a diagram of 2010 "Visitor Record" data structures of FIGS. 43A–43C storing information regarding seven visitors playing the group game of FIG. 48, the visit being arranged into two sub-groups, the two sub-groups defining a "main group" or "parent group" comprising both of them, wherein:

FIG. 50A comprises two "Visitor Record" data structures representing the main group and one of the sub-groups respectively;

FIG. 50B comprises two "Visitor Record" data structures representing the other of the sub-groups and one of the visitors respectively;

FIGS. 50C–50E each comprise two "Visitor Record" data structures representing two of the visitors, respectively;

FIG. 51 is a diagram of a "Node Record" data structure of FIGS. 43A–43C storing information regarding a node, "deer", which is operating within the group game of FIG. 48;

FIG. 52 is a diagram of a "Game State Record" data structure of FIGS. 43A–43C storing information regarding one of the game states, "feed bear", within the group game of FIGS. 49–51;

FIG. 53 is a diagram of another "Game State Record" data structure of FIGS. 43A–43C storing information regarding another of the game states, "feed deer", within the group game of FIGS. 49–51;

FIG. 55 is a bubble diagram of a game for an individual, "tree-quiz", in which a prize or other token is dispensed to the individual player by one of the nodes in the amusement park;

FIGS. 56A–56B, taken together, form a diagram of one alternative "Game State Record" data structure of FIGS. 43A–43C, storing information regarding one of the game states, "ask question", within the individual game of FIG. 55;

FIGS. 56A and 56C, taken together, form a diagram of another alternative "Game State Record" data structure of FIGS. 43A–43C, storing information regarding one of the game states, "ask question", within the individual game of FIG. 55;

FIG. 57 is a diagram of two "Game State Record" data structures of FIGS. 43A–43C storing information regarding two additional game states, "record answer" and "give present", within the individual game of FIG. 55;

FIG. 58 is a diagram of a "Visitor Record" data structure of FIGS. 43A–43C storing information regarding an individual visitor playing the individual game of FIGS. 55–57;

FIG. 59 is a diagram of a "Node Record" data structure of FIGS. 43A–43C storing information regarding two nodes, "tree" and "clown", which are operating within the individual game of FIGS. 55–58;

FIG. 61 is a bubble diagram of a game for an individual, "common encounters", in which a player makes a common comment or complaint or asks a common question such as "where are the restrooms" of one of the nodes in the amusement park and a suitable answer is provided to the individual player by that node;

FIG. 62 is a diagram of a "Game State Record" data structure element of FIGS. 43A–43C storing information regarding a game state, "ask question", of the "common encounters" game of FIG. 61;

FIG. 63A is a diagram of a "Game State Record" data structure element of FIGS. 43A–43C storing information regarding a game state, "analyze", of the "common encounters" game of FIG. 61;

FIG. 63B is a diagram of two "Game State Record" data structure elements of FIGS. 43A–43C storing information regarding two respective game states, "provide information" and "record", of the "common encounters" game of FIG. 61;

FIG. 64 is a diagram of a "Node Record" data structure of FIGS. 43A–43C storing information regarding a node, "moving dog" 2140, which is operating within the game of FIGS. 61–66;

FIGS. 65A–65B, taken together, form a play record data structure of an example of a play record operative to store oral and/or textual information to be played (i.e. orally presented) to a user who has asked for directions to the restrooms;

FIG. 66 is a diagram of 2 "Frequent inquiry record" data structures of FIGS. 43A–43C storing information regarding two frequently posed inquiries: "where is the bathroom" and "please clean the bathroom";

FIG. 69 is a simplified flowchart illustration of a second preferred chain of events including all operations performed by the central node controller 2010, on behalf of a node approached by a player in the course of playing a "common encounters" game of FIGS. 62–66 provided in accordance with a second preferred embodiment of the present invention;

FIG. 70 is a simplified flowchart illustration of a preferred method for playing speech and simultaneously appropriately moving at least one body part so as to provide an appropriate physical expression or demeanor;

FIG. 71 is a simplified block diagram of a preferred hardware implementation of node control device 2214 of FIG. 36 which is suitable for a node whose connection to the central node controller comprises a wireless connection;

FIG. 72 is a simplified block diagram of a first computer board which, in conjunction with the computer board of FIG. 73, comprises a preferred implementation of the computer-node interface of the central node controller of FIG. 33B, for wireless applications;

FIG. 73 is a simplified block diagram of a second computer board which, in conjunction with the computer board of FIG. 72, comprises a preferred implementation of the computer-node interface of the central node controller of FIG. 33B, for wireless applications;

FIG. 74 is a simplified block diagram of a preferred hardware implementation of node control device 2214 of FIG. 36 which is suitable for a node whose connection to the central node controller comprises a cable connection;

FIG. 75 is a simplified block diagram of circuitry which comprises a preferred implementation of the computer-node interface of the central node controller of FIG. 33B, for cable applications in which nodes are connected via cables to the central node controller;

FIG. 76 is a pictorial illustration of a node which is operative to dispense an item of value to a player and specifically to print coupons and dispense them to players in accordance with control instructions, arriving from the central node controller, which determine differential entitlement of different players;

FIG. 77 is a pictorial illustration of a node which is operative to interact physically with a player and specifically to sense at least one physical, non-verbal aspect of a player's performance of a task which typically forms part of a game and to provide an evaluation thereof to the central node controller; and FIG. 78 is a pictorial illustration of a plurality of nodes participating in various games played by a plurality of visitors wherein at least some of the nodes participate in more than one simultaneously ongoing games, and wherein, for at least some nodes, there is a queue of visitors including a first visitor playing a first game and a second visitor playing a second game;

FIG. 79 is a simplified flowchart illustration of a preferred method for computing the Direction function stored in the Begin field of the Play Record of FIG. 65A, as a function of a pointing node (Parameter 1) and a target node (Parameter 2), wherein Direction represents the direction in which a visitor must proceed in order to move from the pointing node to the target node;

FIG. 81 is a simplified flowchart illustration of a preferred procedure followed by a human attendant servicing an entrance to the park and for registering new visitors to the park.

DETAILED DESCRIPTION OF PREFERRED EMBODIMENTS

Figure 1B:
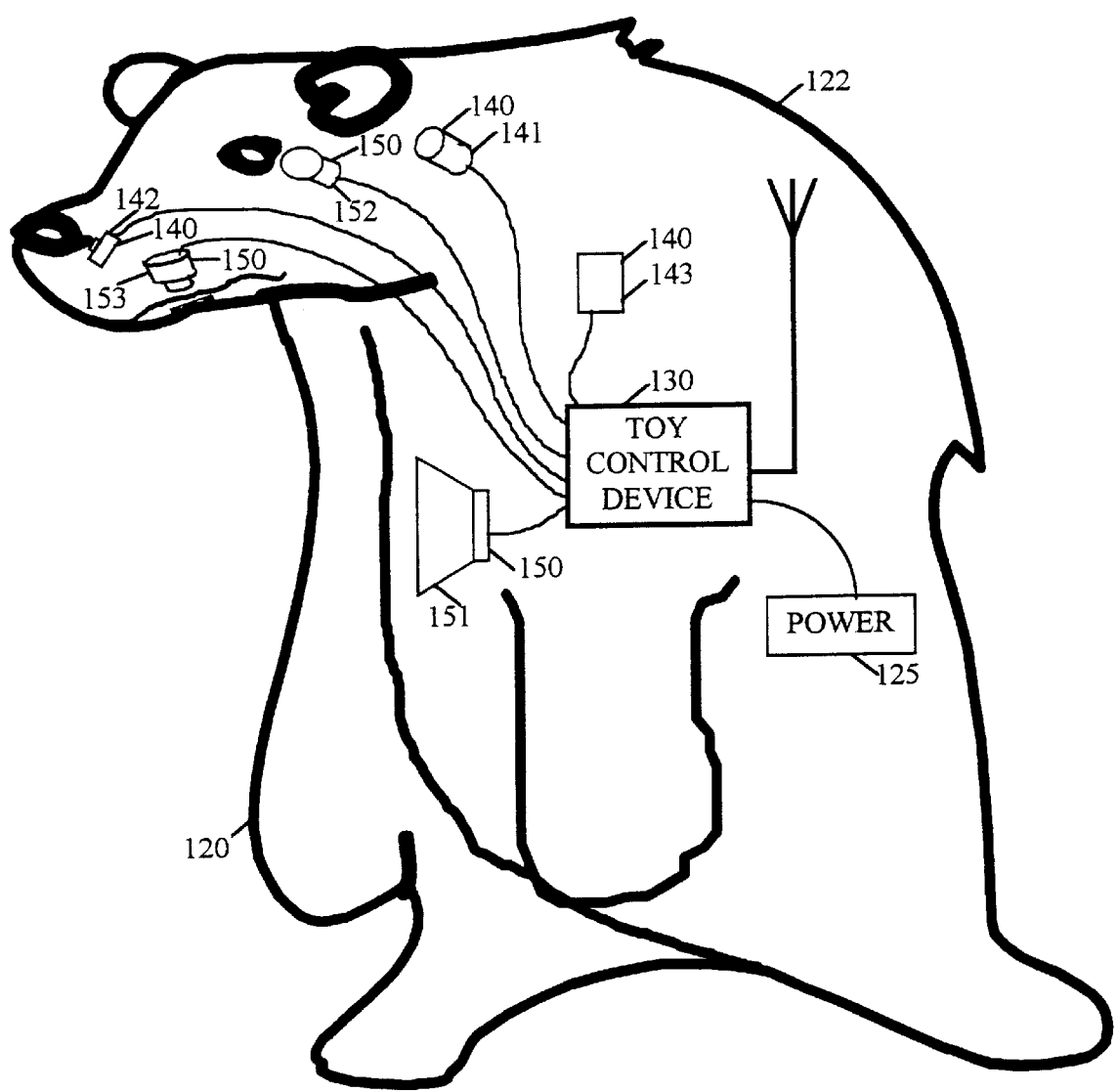
FIG. 1B is a partly pictorial, partly block diagram illustration a preferred implementation of the toy 122 of FIG. 1A.

Reference is now made to FIG. 1A which is a partly pictorial, partly block diagram illustration of a computer control system including a toy, constructed and operative in accordance with a preferred embodiment of the present invention. The system of FIG. 1A comprises a computer 100, which may be any suitable computer such as, for example, an IBM-compatible personal computer. The computer 100 is equipped with a screen 105. The computer 100 is preferably equipped with a sound card such as, for example, a Sound Blaster Pro card commercially available from Creative Labs, Inc., 1901 McCarthy Boulevard, Milpitas Calif. 95035 from Creative Technology Ltd., 67 Ayer Rajah Crescent #03-18, Singapore, 0513; a hard disk; and, optionally, a CD-ROM drive.

The computer 100 is equipped with a computer radio interface 110 operative to transmit signals via wireless transmission based on commands received from the computer 100 and, in a preferred embodiment of the present invention, also to receive signals transmitted elsewhere via wireless transmission and to deliver the signals to the computer 100. Typically, commands transmitted from the computer 100 to the computer radio interface 110 are transmitted via both analog signals and digital signals, with the digital signals typically being transmitted by way of a MIDI port. Transmission of the analog and digital signals is described below with reference to FIG. 3.

The transmitted signal may be an analog signal or a digital signal. The received signal may also be an analog signal or a digital signal. Each signal typically comprises a message. A preferred implementation of the computer radio interface 110 is described below with reference to FIG. 3.

The system of FIG. 1A also comprises one or more toys 120. The system of FIG. 1A comprises a plurality of toys, namely three toys 122, 124, and 126 but it is appreciated that, alternatively, either one toy only or a large plurality of toys may be used.

Reference is now additionally made to FIG. 1B, which is a partly pictorial, partly block diagram illustration of the toy 122 of FIG. 1A.

Each toy 120 comprises a power source 125, such as a battery or a connection to line power. Each toy 120 also comprises a toy control device 130, operative to receive a wireless signal transmitted by the computer 100 and to cause each toy 120 to perform an action based on the received signal. The received signal may be, as explained above, an analog signal or a digital signal. A preferred implementation of the toy control device 130 is described below with reference to FIG. 6.

Each toy 120 preferably comprises a plurality of input devices 140 and output devices 150, as seen in FIG. 1B. The input devices 140 may comprise, for example on or more of the following: a microphone 141; a microswitch sensor 142; a touch sensor (not shown in FIG. 1B); a light sensor (not shown in FIG. 1B); a movement sensor 143, which may be, for example, a tilt sensor or an acceleration sensor. Appropriate commercially available input devices include the following: position sensors available from Hamlin Inc., 612 East Lake Street, Lake Mills, Wis. 53551, USA; motion and vibration sensors available from Comus International, 263 Hillside Avenue, Nutley, N.J. 07110, USA; temperature, shock, and magnetic sensors available from Murata Electronics Ltd., Hampshire, England; and switches available from C & K Components Inc., 15 Riverdale Avenue, Newton, Mass. 02058-1082, USA or from Micro Switch Inc., a division of Honeywell, USA. The output devices 150 may comprise, for example, one or more of the following: a speaker 151; a light 152; a solenoid 153 which may be operative to move a portion of the toy; a motor, such as a stepping motor, operative to move a portion of the toy or all of the toy (not shown in FIG. 1B). Appropriate commercially available output devices include the following: DC motors available from Alkatel (dunkermotoren), Postfach 1240, D-7823, Bonndorf/Schwarzald, Germany; stepping motors and miniature motors available from Haydon Switch and Instruments, Inc. (HSI), 1500 Meriden Road, Waterbury, Conn., USA; and DC solenoids available from Communications Instruments, Inc., P.O. Box 520, Fairview, N.C. 28730, USA.

Examples of actions which the toy may perform include the following: move a portion of the toy; move the entire toy; or produce a sound, which may comprise one or more of the following: a recorded sound, a synthesized sound, music including recorded music or synthesized music, speech including recorded speech or synthesized speech.

The received signal may comprise a condition governing the action as, for example, the duration of the action, or the number of repetitions of the action.

Typically, the portion of the received signal comprising a message comprising a command to perform a specific action as, for example, to produce a sound with a given duration, comprises a digital signal. The portion of the received signal comprising a sound, for example, typically comprises an analog signal. Alternatively, in a preferred embodiment of the present invention, the portion of the received signal comprising a sound, including music, may comprise a digital signal, typically a signal comprising MIDI data.

The action the toy may perform also includes reacting to signals transmitted by another toy, such as, for example, playing sound that the other toy is monitoring and transmitting.

In a preferred embodiment of the present invention, the toy control device 130 is also operative to transmit a signal intended for the computer 100, to be received by the computer radio interface 110. In this embodiment, the computer radio interface 110 is preferably also operative to poll the toy control device 130, that is, transmit a signal comprising a request that the toy control device 130 transmit a signal to the computer radio interface 110. It is appreciated that polling is particularly preferred in the case where there are a plurality of toys having a plurality of toy control devices 130.

The signal transmitted by the toy control device 130 may comprise one or more of the following: sound, typically sound captured by a microphone input device 141; status of sensor input devices 140 as, for example, light sensors or micro switch; an indication of low power in the power source 125; or information identifying the toy.

It is appreciated that a sound signal transmitted by the device 130 may also include speech. The computer system is operative to perform a speech recognition operation on the speech signals.

Appropriate commercially available software for speech recognition is available from companies such as: Stylus Innovation Inc., One Kendall Square, Building 300, Cambridge, Mass. 02139, USA; A&G Graphics Interface, USA, Telephone No. (617) 492-0120, Telefax No. (617) 427-3625; "Dragon Dictate For Windows", available from Dragon Systems Inc., 320 Nevada Street, Mass. 02160, USA, and "SDK" available from Lernout & Hausple Speech Products, Sint-Krispijnstraat 7, 8900 Leper, Belgium.

The signal from the radio control interface 110 may also comprise, for example, one or more of the following: a request to ignore input from one or more input devices 140; a request to activate one or more input devices 140 or to stop ignoring input from one or more input devices 140; a request to report the status of one or more input devices 140; a request to store data received from one or more input devices 140, typically by latching a transition in the state of one or more input devices 140, until a future time when another signal from the radio control interface 110 requests the toy control device 130 to transmit a signal comprising the stored data received from the one or more input devices 140; or a request to transmit analog data, typically comprising sound, typically for a specified period of time.

Typically, all signals transmitted in both directions between the computer radio interface 110 and the toy control device 130 include information identifying the toy.

Figure 1C:
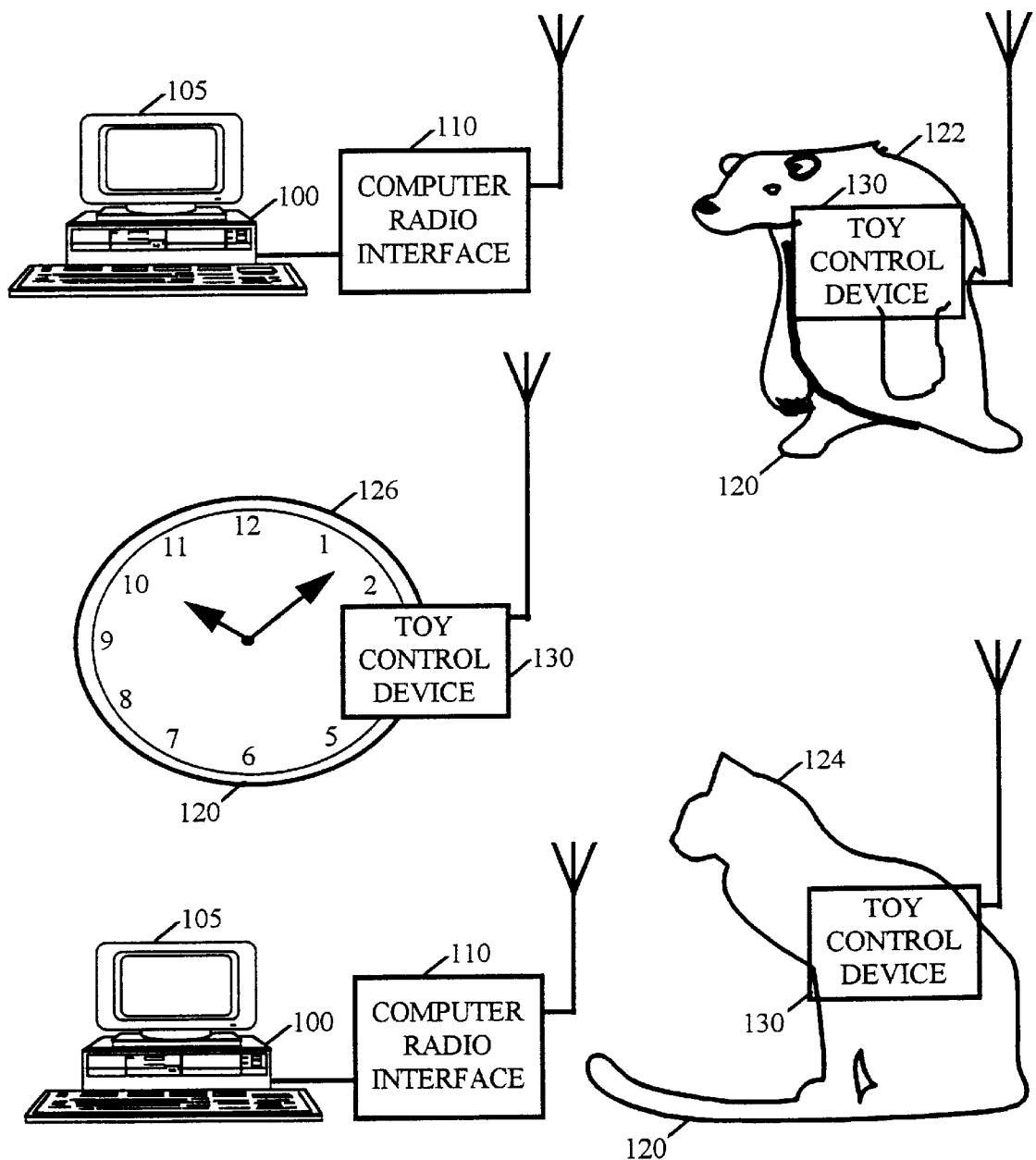
FIG. 1C is a partly pictorial, partly block diagram illustration of a computer control system including a toy, constructed and operative in accordance with an alternative preferred embodiment of the present invention.

Reference is now made to FIG. 1C, which is a partly pictorial, partly block diagram illustration of a computer control system including a toy, constructed and operative in accordance with an alternative preferred embodiment of the present invention. The system of FIG. 1C comprises two computers 100. It is appreciated that, in general, a plurality of computers 100 may be used. In the implementation of FIG. 1C, all signals transmitted in both directions between the computer radio interface 110 and the toy control device 130 typically include information identifying the computer.

The operation of the system of FIG. 1A is now briefly described. Typically, the computer 100 runs software comprising a computer game, typically a game including at least one animated character. Alternatively, the software may comprise educational software or any other interactive software including at least one animated object. As used herein, the term "animated object" includes any object which may be depicted on the computer screen 105 and which interacts with the user of the computer via input to and output from the computer. An animated object may be any object depicted on the screen such as, for example: a doll; an action figure; a toy, such as, for example, an activity toy, a vehicle, or a ride-on vehicle; a drawing board or sketch board; or a household object such as, for example, a clock, a lamp, a chamber pot, or an item of furniture.

Figure 2A:
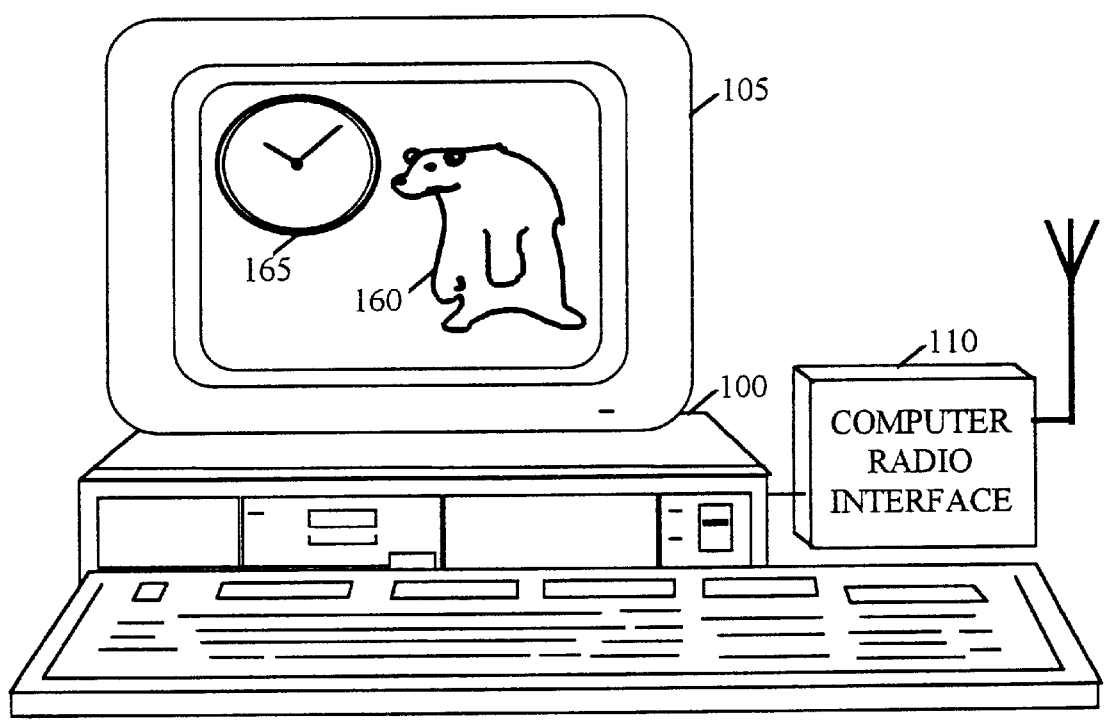

Reference is now additionally made to FIGS. 2A–2C, which depict a portion of the system of FIG. 1A in use. The apparatus of FIG. 2A comprises the computer screen 105 of FIG. 1A. On the computer screen are depicted animated objects 160 and 165.

FIG. 2B depicts the situation after the toy 122 has been brought into range of the computer radio interface 110 of FIG. 1A, typically into the same room therewith. Preferably, the toy 122 corresponds to the animated object 160. For example, in FIG. 2B the toy 122 and the animated object 160, shown in FIG. 2A, are both a teddy bear. The apparatus of FIG. 2B comprises the computer screen 105, on which is depicted the animated object 165. The apparatus of FIG. 2B also comprises the toy 122. The computer 100, having received a message via the computer radio interface 110, from the toy 122, no longer displays the animated object 160 corresponding to the toy 122. The functions of the animated object 160 are now performed through the toy 122, under control of the computer 100 through the computer radio interface 110 and the toy control device 130.

FIG. 2C depicts the situation after the toy 126 has also been brought into range of the computer radio interface 110 of FIG. 1A, typically into the same room therewith. Preferably, the toy 126 corresponds to the animated object 165. For example, in FIG. 2C the toy 126 and the animated object 165, shown in FIGS. 2A and 2B, are both a clock. The apparatus of FIG. 2C comprises the computer screen 105, on which no animated objects are depicted.

The apparatus of FIG. 2C also comprises the toy 126. The computer 100, having received a message via the computer radio interface 110 from the toy 126, no longer displays the animated object 165 corresponding to the toy 126. The functions of the animated object 165 are now performed through the toy 126, under control of the computer 100 through the computer radio interface 110 and the toy control device 130.

In FIG. 2A, the user interacts with the animated objects 160 and 165 on the computer screen, typically using conventional methods. In FIG. 2B the user also interacts with the toy 122, and in FIG. 2C typically with the toys 122 and 126, instead of interacting with the animated objects 160 and 165 respectively. It is appreciated that the user may interact with the toys 122 and 126 by moving the toys or parts of the toys; by speaking to the toys; by responding to movement of the toys which movement occurs in response to a signal received from the computer 100; by responding to a sound produced by the toys, which sound is produced in response to a signal received from the computer 100 and which may comprise music, speech, or another sound; or otherwise.

Figure 3:
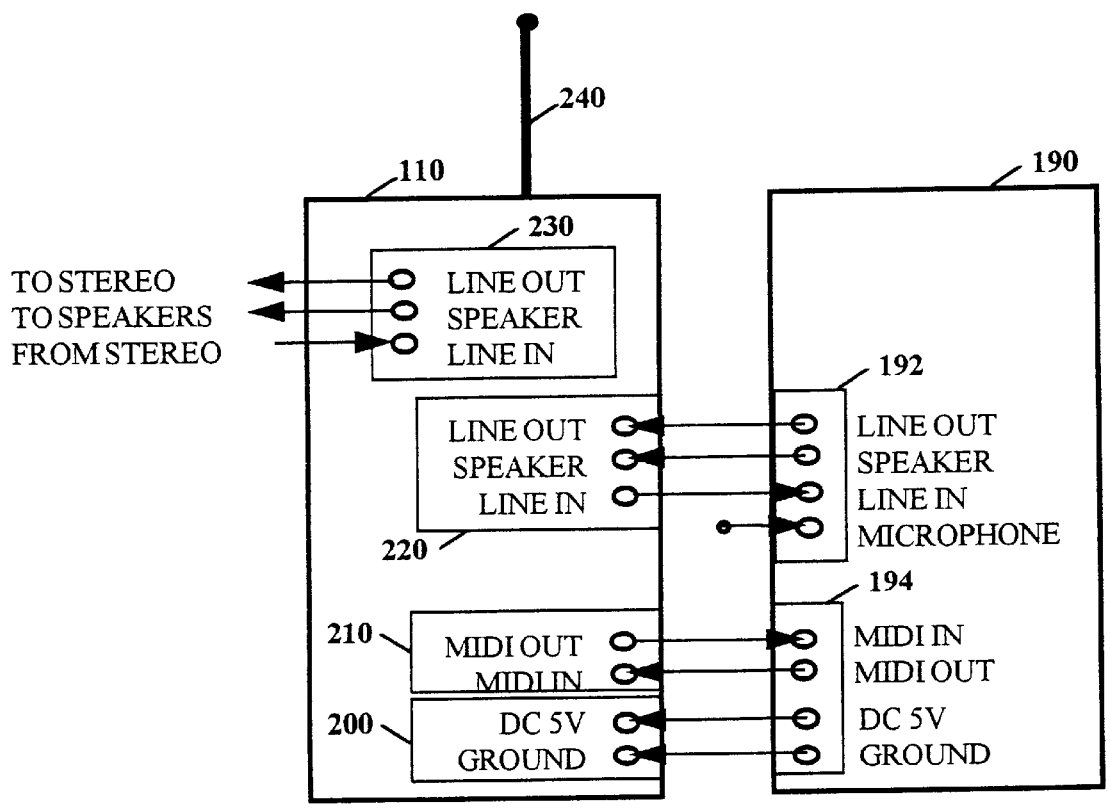

Reference is now made to FIG. 3 which is a simplified block diagram of a preferred embodiment of the computer radio interface 110 of FIG. 1A. The apparatus of FIG. 3 comprises the computer radio interface 110. The apparatus of FIG. 3 also comprises a sound card 190, as described above with reference to FIG. 1A. In FIG. 3, the connections between the computer radio interface 110 and the sound card 190 are shown.

The computer radio interface 110 comprises a DC unit 200 which is fed with power through a MIDI interface 210 from a sound card MIDI interface 194, and the following interfaces: a MIDI interface 210 which connects to the sound card MIDI interface 194; an audio interface 220 which connects to an audio interface 192 of the sound card 190; and a secondary audio interface 230 which preferably connects to a stereo sound system for producing high quality sound under control of software running on the computer 100 (not shown).

The apparatus of FIG. 3 also comprises an antenna 240, which is operative to send and receive signals between the computer radio interface 110 and one or more toy control devices 130.

Figure 4:
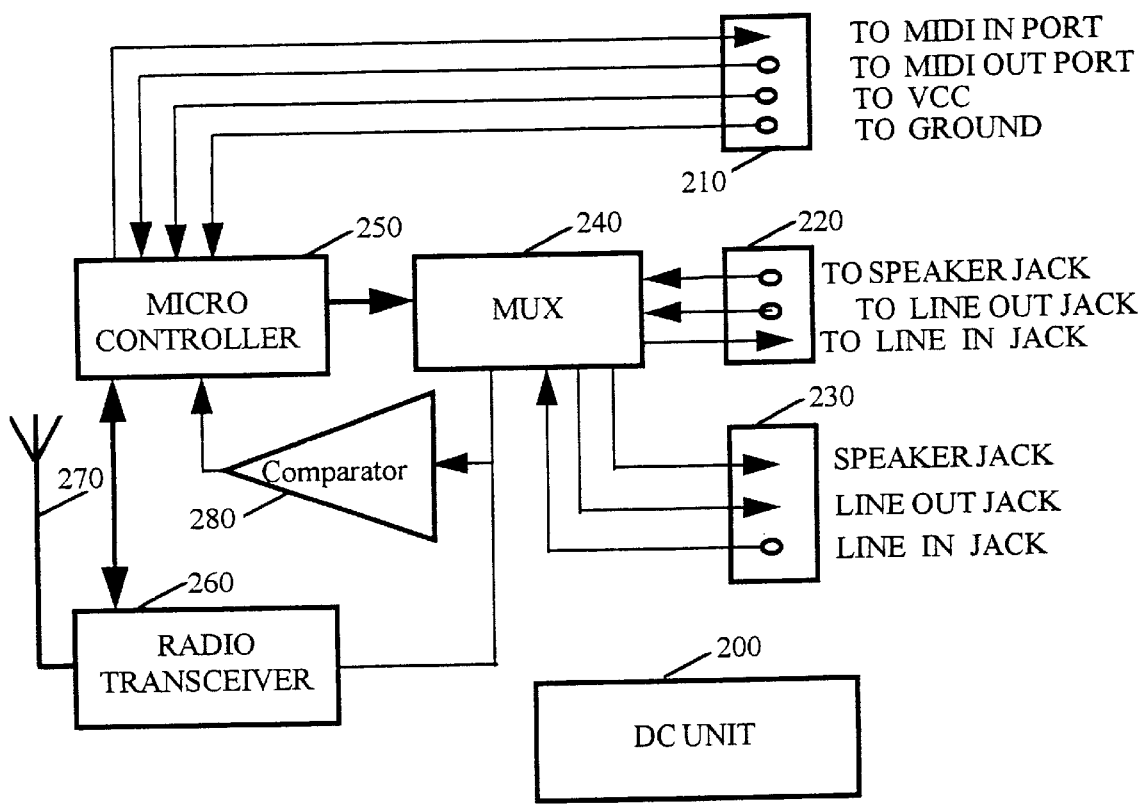

FIG. 4 is a more detailed block diagram of the computer radio interface 110 of FIG. 3. The apparatus of FIG. 4 comprises the DC unit 200, the MIDI interface 210, the audio interface 220, and the secondary audio interface 230. The apparatus of FIG. 4 also comprises a multiplexer 240, a micro controller 250, a radio transceiver 260, a connection unit 270 connecting the radio transceiver 260 to the micro controller 250, and a comparator 280.

Reference is now made to FIGS. 5A–5D, which taken together comprise a schematic diagram of the apparatus of FIG. 4.

Figure 5A:
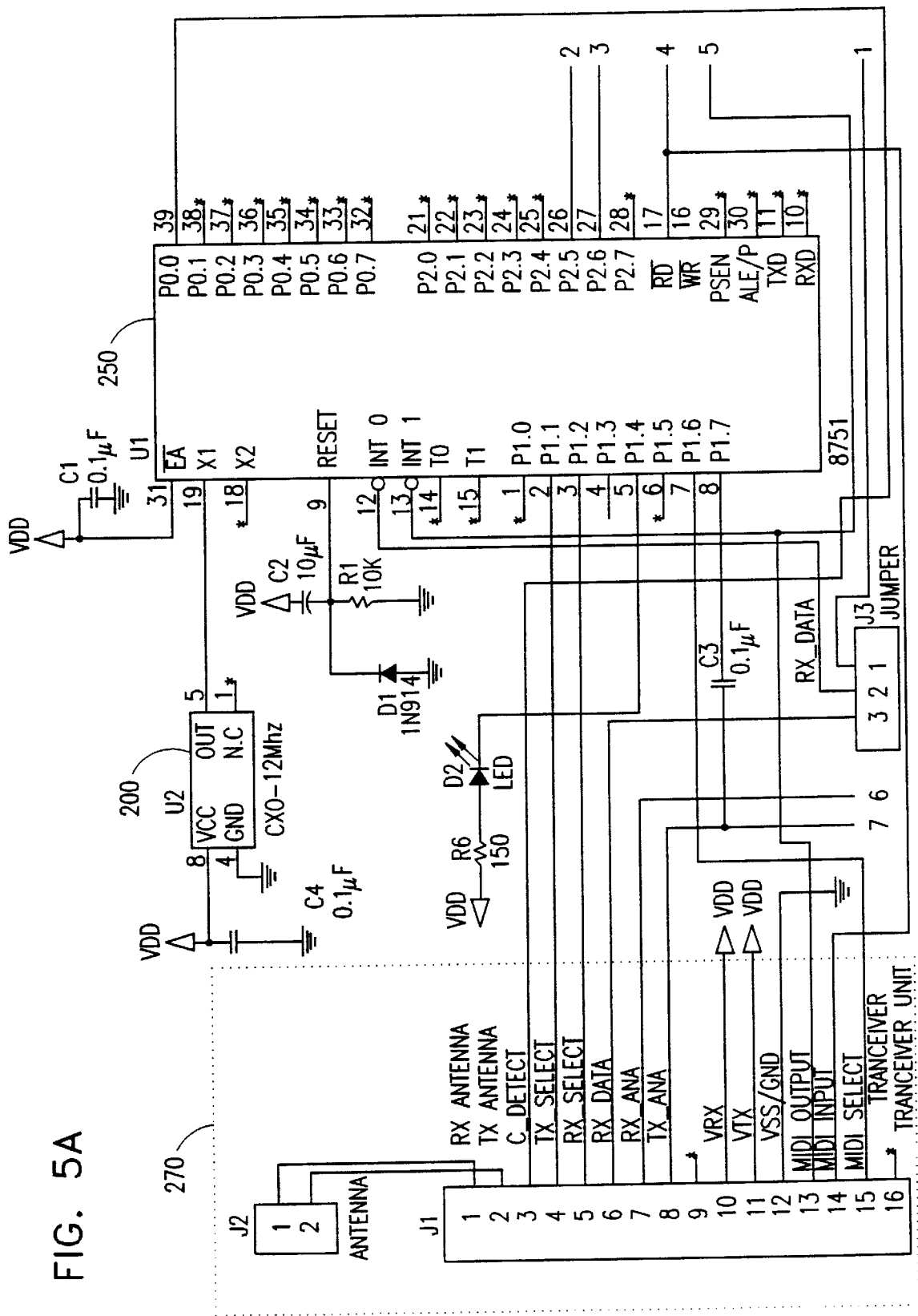
Figure 5B:
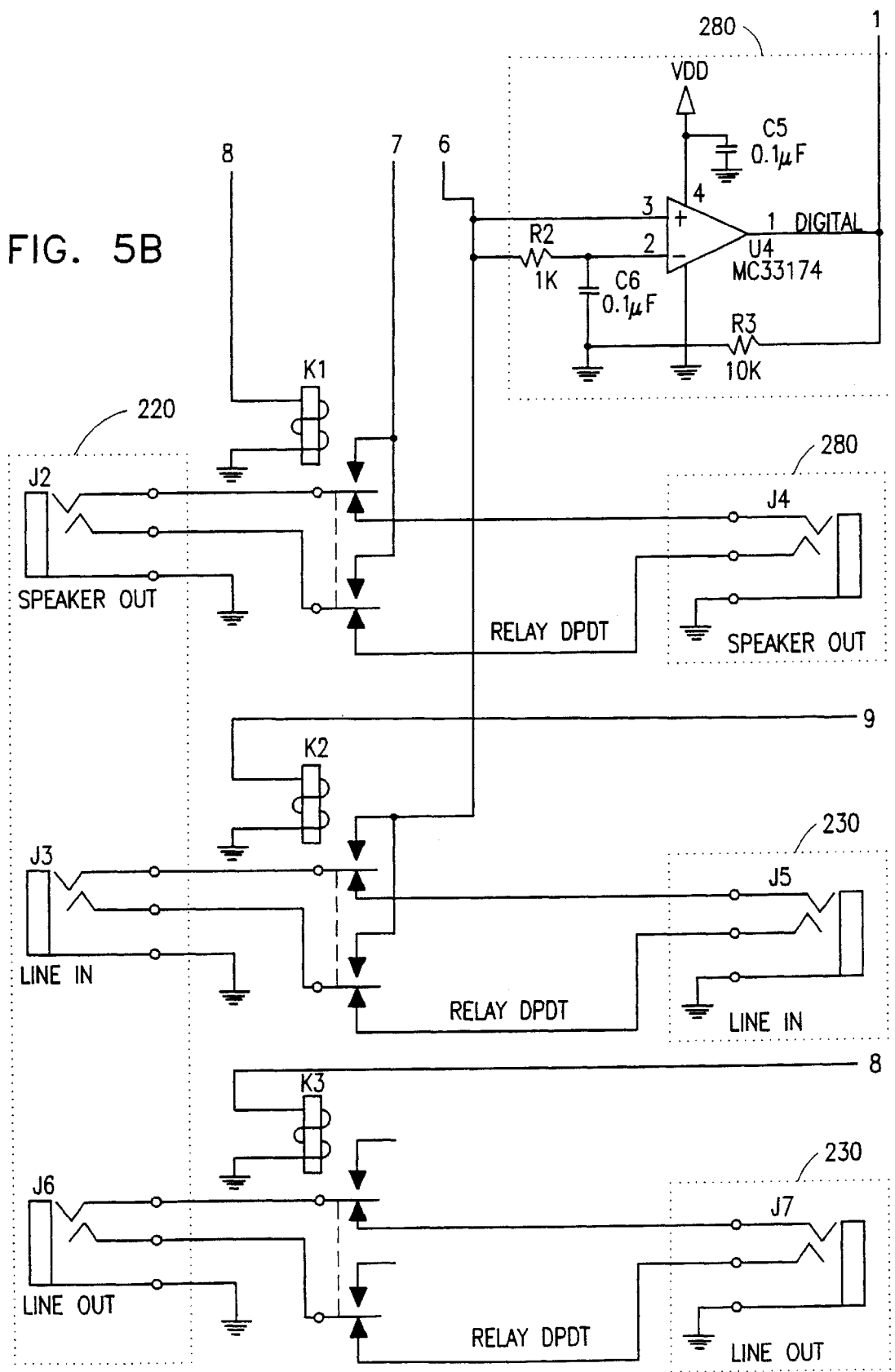

The following is a preferred parts list for the apparatus of FIGS. 5A–5C:

1. K1 Relay Dept, Idec, 1213 Elco Drive, Sunnyvale, Calif. 94089-2211, USA.
2. U1 8751 microcontroller, Intel Corporation, San Tomas 4, 2700 San Tomas Expressway, 2nd Floor, Santa Clara 95051, Calif. USA.
3. U2 CXO—12 MHZ (crystal oscillator),Raltron, 2315 N.W. 107th Avenue, Miami Fla. 33172, USA.
4. U4 MC33174, Motorola, Phoenix, Ariz., USA., Tel. No. (602) 897-5056.
5. Diodes 1N914, Motorola, Phoenix, Ariz., USA. Tel. No. (602)897-5056.
6. Transistors 2N2222 and MPSA14, Motorola, Phoenix, Ariz., USA. Tel. No.(602)897-5056.

Figure 5D:
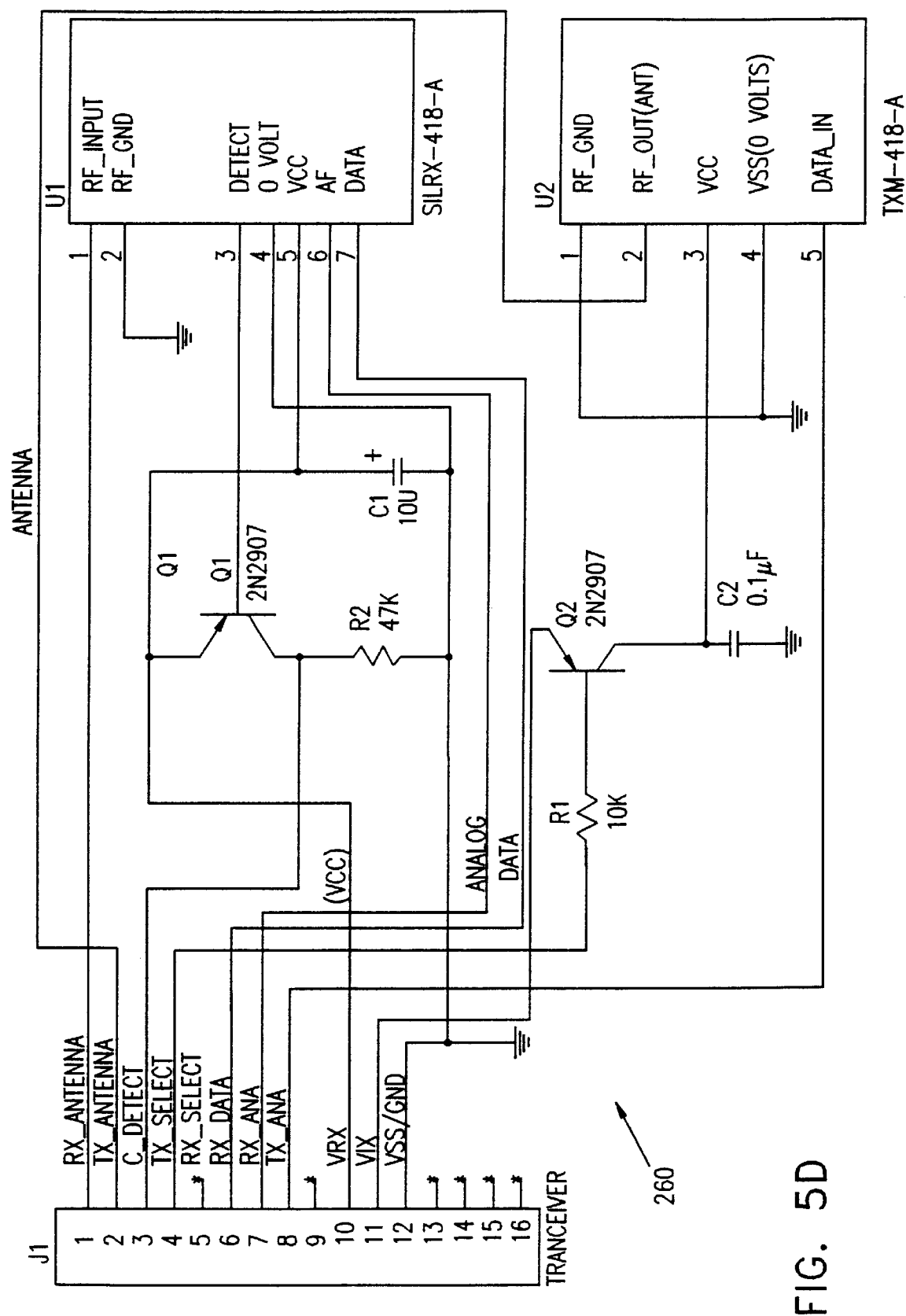

The following is a preferred parts list for the apparatus of FIG. 5D:

1. U1 SILRAX-418-A UHF radio telemetry receive module, Ginsburg Electronic GmbH, Am Moosfeld 85, D-81829, Munchen, Germany.
   Alternatively, U1 of FIG. 5D may be replaced by:
   U1 433.92 MHz Receive Module Part No. 0927, available from CEL SALES LTD., Cel House, Unit 2, Block 6, Shenstone Trading Estate, Bromsgrove, Halesowen, West Midlands B36 3XB, UK.
2. U2 TXM-418-A low power UHF radio telemetry transmit module, Ginsburg Electronic GmbH, Am Moosfeld 85, D-1829, Munchen, Germany.
   Alternatively, U2 of FIG. 5D may be replaced by:
   U2 433.92 SIL FM Transmitter Module Part No, 5229, available from CEL SALES LTD., Cel House, Unit 2, Block 6, Shenstone Trading Estate, Bromsgrove, Halesowen, West Midlands B36 3XB UK.

Figure 5E:
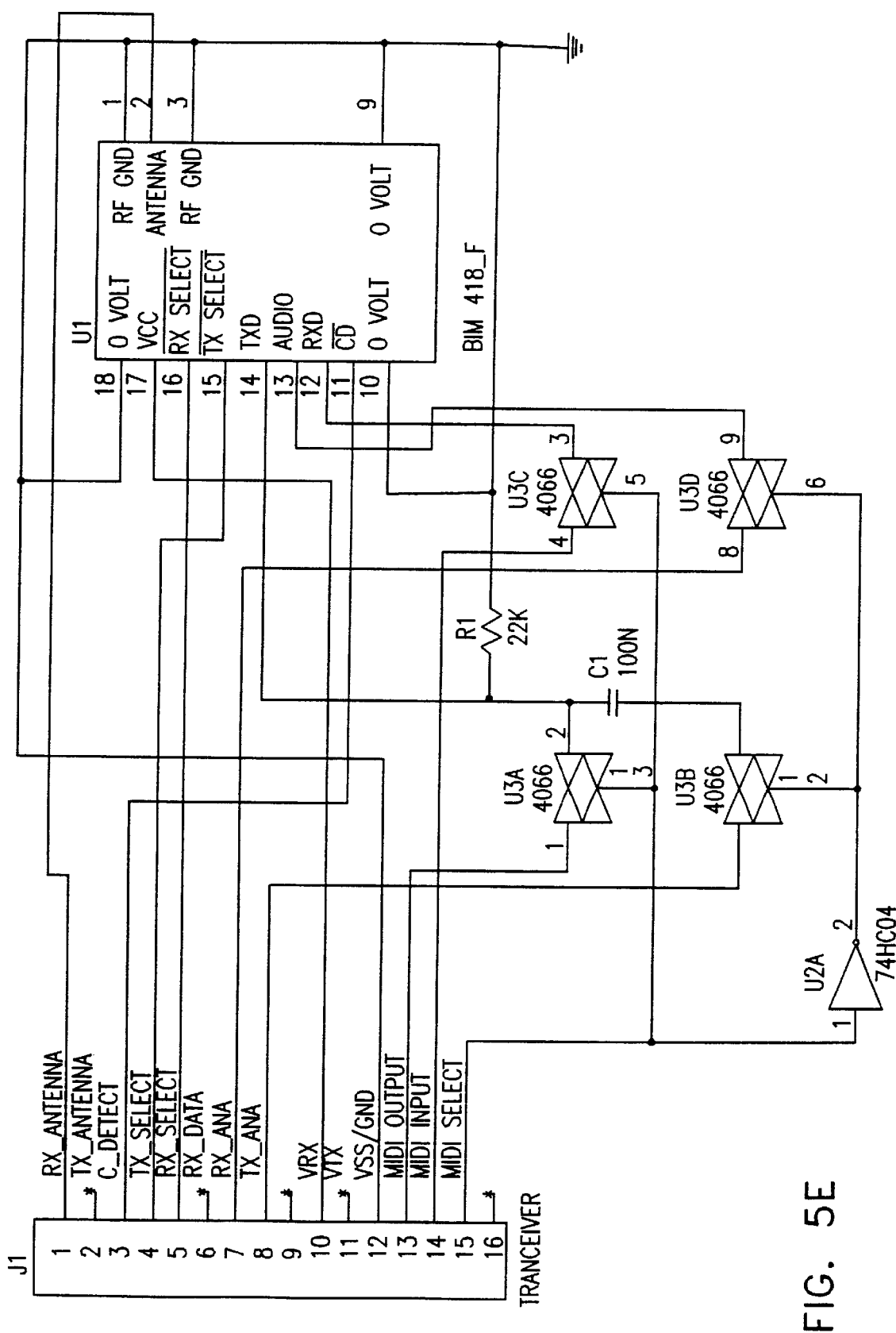
FIG. 5E is an schematic diagram of an alternative implementation of the apparatus of FIG. 5D.

Reference is now additionally made to FIG. 5E, which is a schematic diagram of an alternative implementation of the apparatus of FIG. 5D. The following is a preferred parts list for the apparatus of FIG. 5E:

1. U1 BIM-418-F low power UHF data transceiver module, Ginsburg Electronic GmbH, Am Moosfeld 85, D-81829, Munchen, Germany.

Alternate 1. U1 S20043 spread spectrum full duplex transceiver, AMI Semiconductors—American Microsystems, Inc., Idaho, USA.

Alternate 1. U1 SDT-300 synthesized transceiver, Circuit Design, Inc., Japan.

Alternatively, U1 may be replaced by:

U1 RY3GB021 RF 900 Mhz units, available from SHARP ELECTRONIC COMPONENTS GROUP, 5700 Northwest, Pacific Rim Boulevard #20, Camas, Wash., USA.

U1 RY3GB100 RF Units For DECT, available from SHARP ELECTRONIC COMPONENTS GROUP 5700 Northwest, Pacific Rim Boulevard #20, Camas, Wash., USA.

In the parts list for FIG. 5E, one of item 1 or either of the alternate items 1 may be used for U1.

It is appreciated that the appropriate changes will have to be made to all the circuit boards for alternate embodiments of the apparatus.

The apparatus of FIG. 5E has similar functionality to the apparatus of FIG. 5D, but has higher bit rate transmission and reception capacity and is, for example, preferred when MIDI data is transmitted and received.

FIGS. 5A–5E are self-explanatory with regard to the above parts lists.

Figure 6:
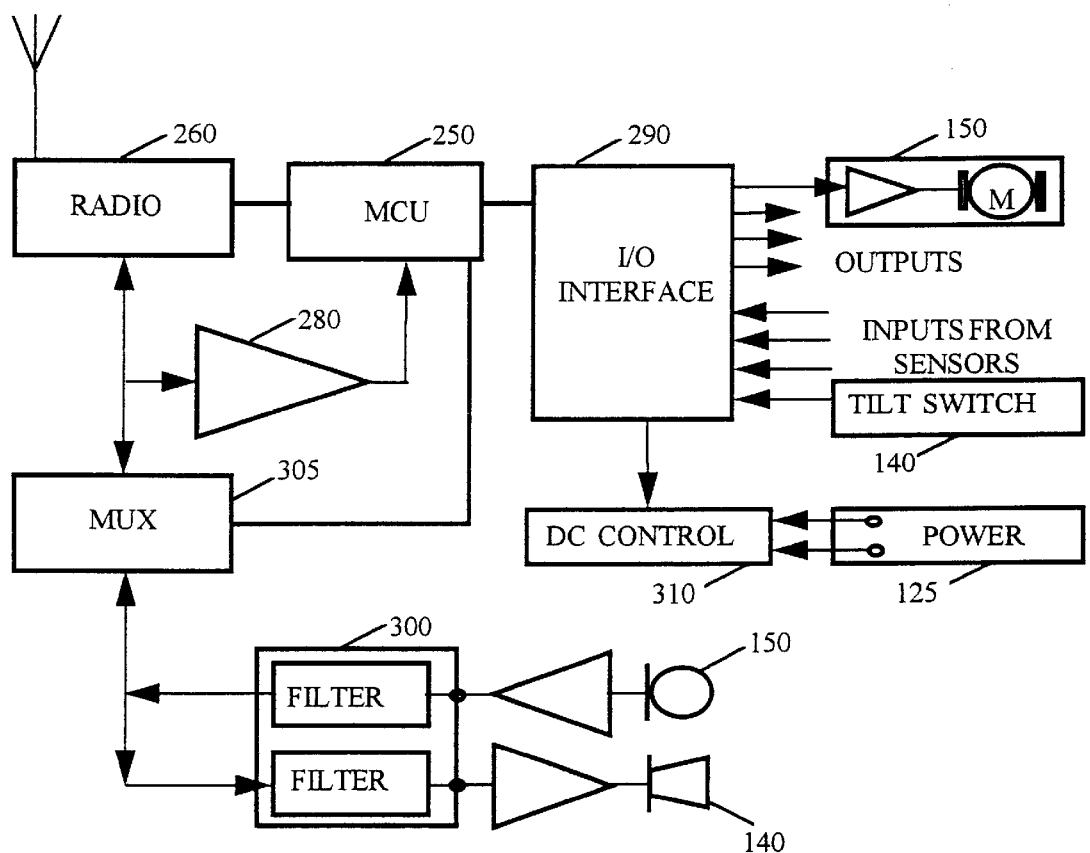
Figure 7A:
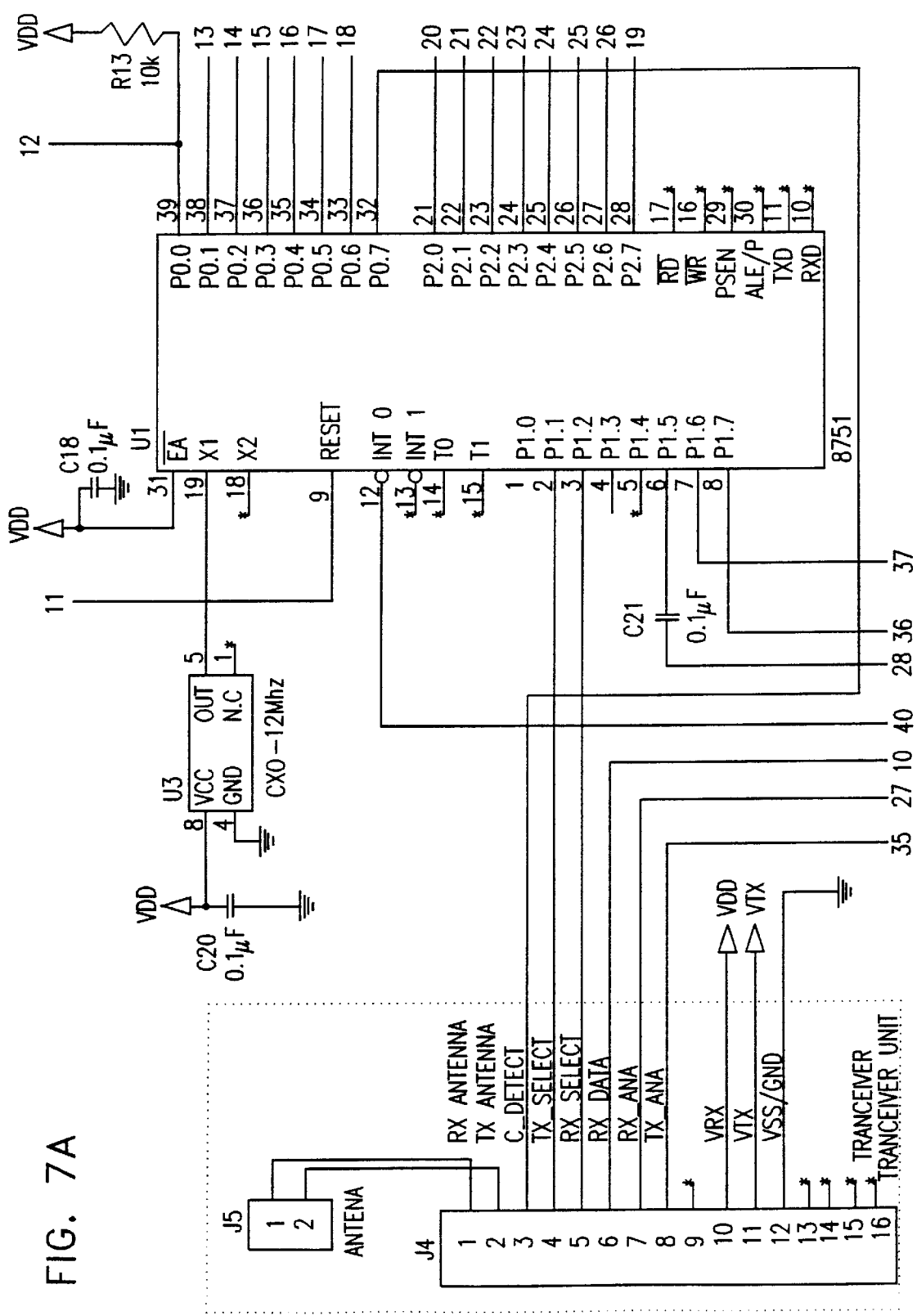
Figure 7B:
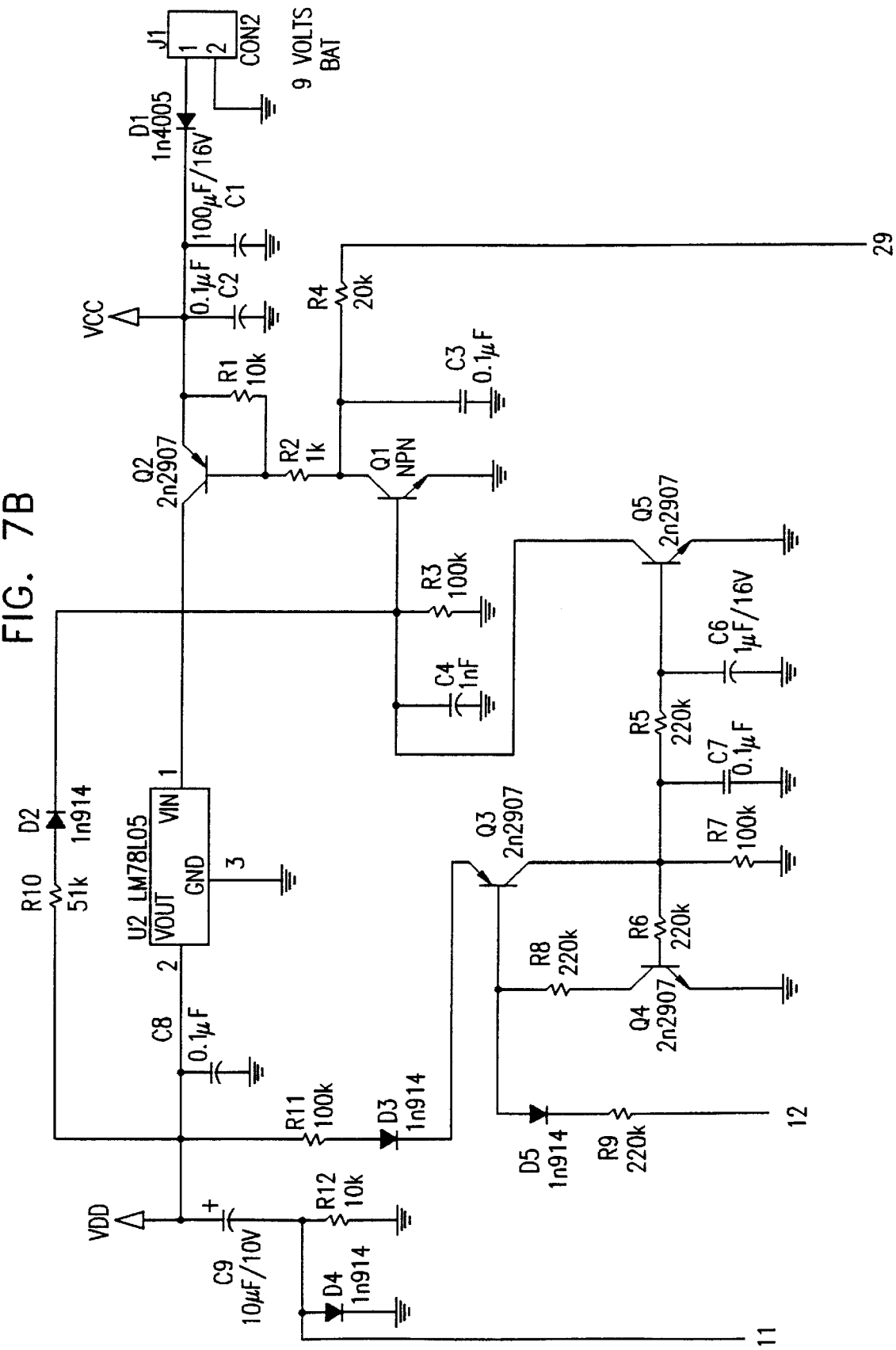
Figure 7C:
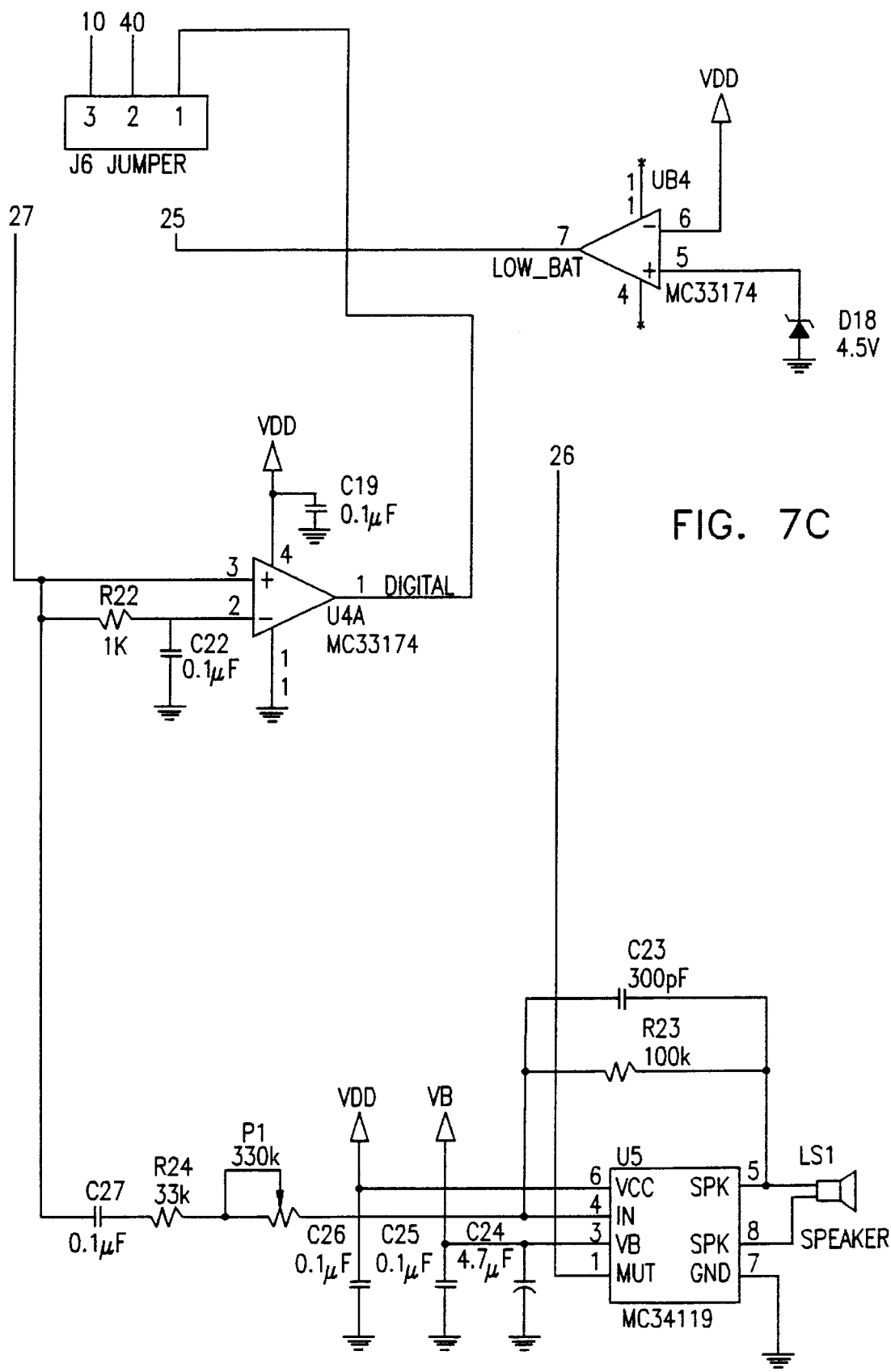
Figure 7D:
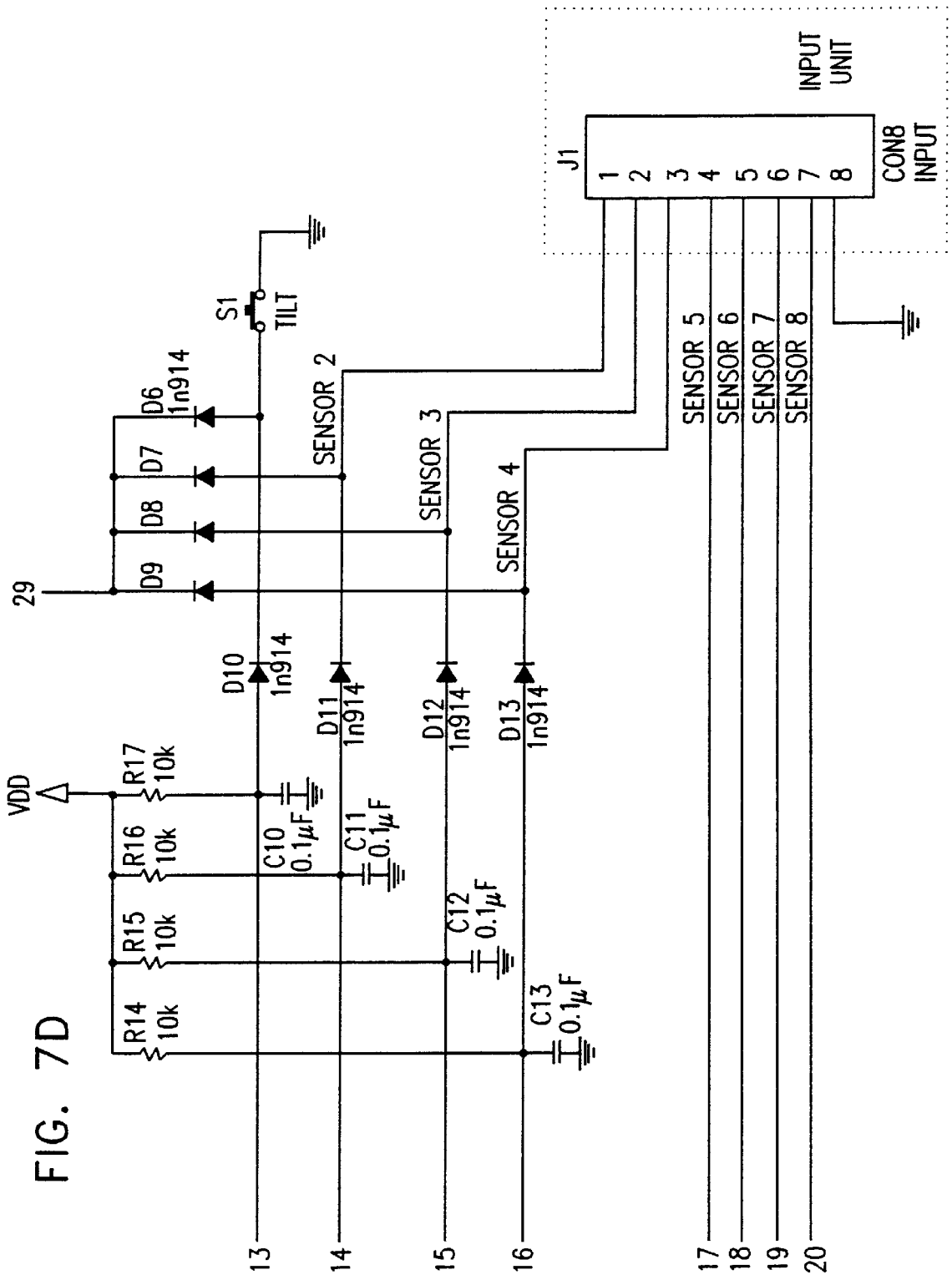
Figure 7F:
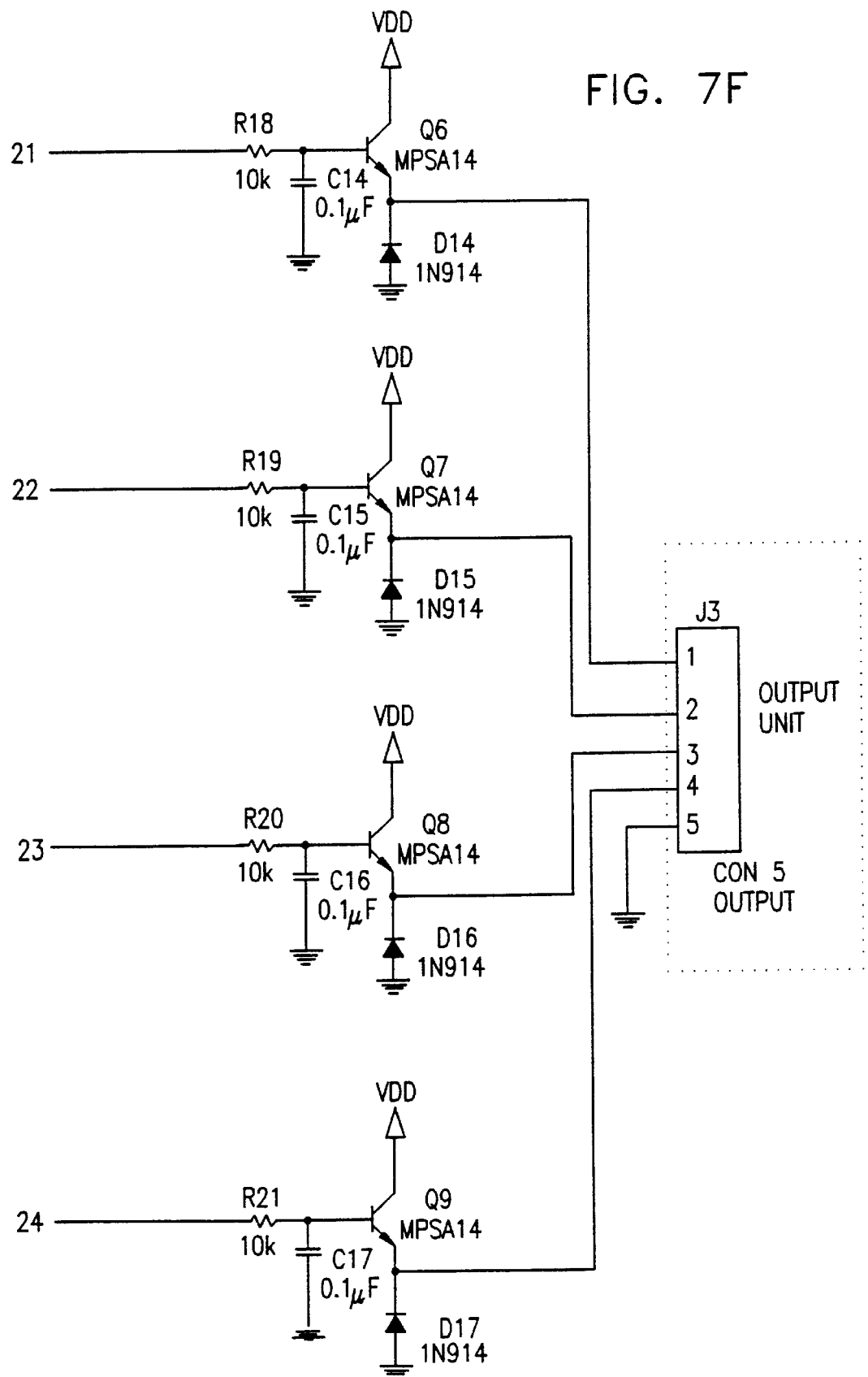

Reference is now made to FIG. 6 which is a simplified block diagram of a preferred embodiment of the toy control device 130 of FIG. 1A. The apparatus of FIG. 6 comprises a radio transceiver 260, similar to the radio transceiver 260 of FIG. 4. The apparatus of FIG. 6 also comprises a microcontroller 250 similar to the microcontroller 250 of FIG. 4.

The apparatus of FIG. 6 also comprises a digital input/output interface (digital I/O interface) 290, which is operative to provide an interface between the microcontroller 250 and a plurality of input and output devices which may be connected thereto such as, for example, four input device and four output devices. A preferred implementation of the digital I/O interface 290 is described in more detail below with reference to FIGS. 7A–7F.

The apparatus of FIG. 6 also comprises an analog input/output interface (analog I/O interface) 300 operatively connected to the radio transceiver 260, and operative to receive signals therefrom and to send signals thereto.

The apparatus of FIG. 6 also comprises a multiplexer 305 which is operative, in response to a signal from the microcontroller 250, to provide output to the analog I/O interface 300 only when analog signals are being transmitted by the radio transceiver 260, and to pass input from the analog I/O interface 300 only when such input is desired.

The apparatus of FIG. 6 also comprises input devices 140 and output devices 150. In FIG. 6, the input devices 140 comprise, by way of example, a tilt switch operatively connected to the digital I/O interface 290, and a microphone operatively connected to the analog I/O interface 300. It is appreciated that a wide variety of input devices 140 may be used.

In FIG. 6, the output devices 150 comprise, by way of example, a DC motor operatively connected to the digital I/O interface 290, and a speaker operatively connected to the analog I/O interface 300. It is appreciated that a wide variety of output devices 150 may be used.

The apparatus of FIG. 6 also comprises a DC control 310, a preferred implementation of which is described in more detail below with reference to FIGS. 7A–7F.

The apparatus of FIG. 6 also comprises a comparator 280, similar to the comparator 280 of FIG. 4.

The apparatus of FIG. 6 also comprises a power source 125, shown in FIG. 6 by way of example as batteries, operative to provide electrical power to the apparatus of FIG. 6 via the DC control 310.

Reference is now made to FIGS. 7A–7F which, taken together with either FIG. 5D or 5E, comprise a schematic diagram of the toy control device of FIG. 6. If the schematics of FIG. 5E is employed to implement the computer radio interface of FIG. 4, using RY3GB021 as U1 of FIG. 5E, then the same schematics of FIG. 5E are preferably employed to implement the toy control device of FIG. 6 except that RY3GH021 is used to implement U1 rather than RY3GB021.

The following is a preferred parts list for the apparatus of FIGS. 7A–7F:

1. U1 8751 microcontroller, Intel Corporation, San Tomas 4, 2700 San Tomas Expressway, 2nd Floor, Santa Clara 95051, Calif. USA.

2. U2 LM78L05, National Semiconductor, 2900 Semiconductor Drive, Santa Clara, Calif. 95052, USA.

3. U3 CXO—12 MHz (crystal oscillator), Raltron, 2315 N.W. 107th Avenue, Miami, Fla. 33172, USA.

4. U4 MC33174, Motorola, Phoenix, Ariz., USA. Tel. No. (602) 897-5056.

5. U5 MC34119, Motorola, Phoenix, Ariz., USA. Tel. No. (602) 897-5056.

6. U6 4066, Motorola, Phoenix, Ariz., USA. Tel. No. (602) 897-5056.

7. Diode 1N914, 1N4005, Motorola, Phoenix, Ariz., USA. Tel. No. (602) 897-5056.

8. Transistor 2N2222, 2N3906, Motorola, Phoenix, Ariz., USA. Tel. No. (602) 897-5056.

9. Transistors 2N2907 and MPSA14, Motorola, Phoenix, Ariz., USA. Tel. No. (602) 897-5056.

FIGS. 7A–7F are self-explanatory with reference to the above parts list.

As stated above with reference to FIG. 1A, the signals transmitted between the computer radio interface 110 and the toy control device 130 may be either analog signals or digital signals. It the case of digital signals, the digital signals preferably comprise a plurality of predefined messages, known to both the computer 100 and to the toy control device 130.

Each message sent by the computer radio interface 110 to the toy control device 130 comprises an indication of the intended recipient of the message. Each message sent by the toy control device 130 to the computer radio interface 110 comprises an indication of the sender of the message.

In the embodiment of FIG. 1C described above, messages also comprise the following:

each message sent by the computer radio interface 110 to the toy control device 130 comprises an indication of the sender of the message; and each message sent by the toy control device 130 to the computer radio interface 110 comprises an indication of the intended recipient of the message.

A preferred set of predefined messages is as follows:

COMMAND STRUCTURE

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | - 8 bits - | - 8 bits - | - 8 bits - | CRC |
|  |  |  |  |  |  |  | Dat1 msb / Dat1 lsb | Dat2 msb / Dat2 lsb | Dat3 msb / Dat3 lsb |  |
| 8 bit | 2 bit | 6 bit | 8 bit | 8 bit | 8 bit | 8 bit | 4 bit / 4 bit | 4 bit / 4 bit | 4 bit / 4 bit | 8 bits |

COMMANDS LIST

From the Computer to the Toy control device.
A. OUTPUT COMMANDS

SET_IO_TO_DATA

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | - 8 bits - | - 8 bits - | - 8 bits - | CRC |
|  |  |  |  |  |  |  | Dat1 msb / Dat1 lsb | Dat2 msb / Dat2 lsb | Dat3 msb / Dat3 lsb |  |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 00 | 01 | 00 / IO | 00 / D | x / x |  |

Set Toy control device output pin to a digital level D.
P:         Computer address         00–03   H
A:         unit address -          00–FF   H
IO:        i/o number -            00–03   H
D:         Data -                  00–01   H
Example
1.         01 00 0005 00 01 03 01 00 00    set io 3 to "1"
2.         01 00 0005 00 01 03 00 00 00    set io 3 to "0"

CHANGE_IO_FOR_TIME

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | - 8 bits - | - 8 bits - | - 8 bits - | CRC |
|  |  |  |  |  |  |  | Dat1 msb / Dat1 lsb | Dat2 msb / Dat2 lsb | Dat3 msb / Dat3 lsb |  |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 00 | 02 | 00 / IO | 00 / D | T1 / T2 |  |

Change Toy control device output pin to D for a period of time and then return to previous state.
P:         Computer address         00–03   H
A:         unit address -          00–FF   H
IO:        i/o number -            00–03   H
T1, T2:    time -                  00–FF   H
D:         Data -                  00–01   H
example:
1.         01 00 0005 00 02 03 05 00 00    set io 3 to "1" for 5 seconds

B. INPUT COMMANDS

SEND_STATUS_OF_SENSORS

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | - 8 bits - | - 8 bits - | - 8 bits - | CRC |
|  |  |  |  |  |  |  | Dat1 msb / Dat1 lsb | Dat2 msb / Dat2 lsb | Dat3 msb / Dat3 lsb |  |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 01 | 00 | x / x | x / x | x / x |  | send the Toy control device status of all sensors.
P:         Computer address         00–03   H
A:         unit address -          00–FF   H
example:
1.         01 00 0005 01 00 00 00 00    send current status of sensors

SENSORS_SCAN_MODE_ON

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | - 8 bits - | - 8 bits - | - 8 bits - | CRC |
|  |  |  |  |  |  |  | Dat1 msb / Dat1 lsb | Dat2 msb / Dat2 lsb | Dat3 msb / Dat3 lsb |  |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 01 | 01 | x / x | x / x | x / x |  |

Start scanning the Toy control device sensors, and if one of them is closed (pressed to '0'), send back an ack.
P:         Computer address         00–03   H
A:         unit address -          00–FF   H
example:
1.         01 00 0005 01 01 00 00 00    scan mode of sensors ON

SENSORS_SCAN_MODE_ON_ONCE

-continued

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>02</u> | x | x | x | x | x | x | |

Start scanning the Toy control device sensors, and if one of them is closed (pressed to '0'), send back an ack, then disable scanning the sensors.
P:  Computer address  00–03  H
A:  unit address -  00–FF  H
1.  01 00 <u>0005</u> 01 02 00 00 00 00  scan mode of sensors ON once

SENSORS_SCAN_MODE_OFF

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>03</u> | x | x | x | x | x | x | |

Stop scanning the Toy control device sensors.
P:  Computer address  00–03  H
A:  unit address -  00–FF  H
example:
1.  01 00 <u>0005</u> 01 03 00 00 00 00  scan mode of sensors OFF

C. AUDIO OUT COMMANDS

START_AUDIO_PLAY

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>02</u> | <u>00</u> | x | x | x | x | xx | xx | |

Start playing an audio in a speaker of the Toy control device The Audio is sent to the Toy control device by the computer sound card and the Computer radio interface.
P:  Computer address  00–03  H
A:  unit address -  00–FF  H
1.  01 00 <u>0005</u> 02 00 00 00 00 00  Start audio-play

STOP_AUDIO_PLAY

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>02</u> | <u>01</u> | x | x | x | x | x | x | |

Stop playing an audio in a speaker of the Toy control device.
P:  Computer address  00–03  H
A:  unit address -  00–FF  H
1.  01 00 <u>0005</u> 02 01 00 00 00 00  Stop audio-play

START_AUDIO_AND_IO_PLAY_FOR_TIME

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>02</u> | <u>04</u> | T1 | T2 | T0 | td | SC | IO | |

Start playing an audio in a speaker of the Toy control device and set an io pin to '1'. After time T, stop audio and set IO to '0'. start this command after a delay td*100ms. if SC = "1" then after the execution of this command, start the input command SCAN_SENSORS_ON_ONCE (if any sensor is pressed, even during the audio play, send a message to the computer).
P:  Computer address  00–03  H
A:  unit address -  00–FF  H
IO:  i/o number -  0–3  H  (if IO>3 then don't set IO)
T0, T1, T2:  TIME  000–FFF  H  (*100ms) (T0=MMSB, T1=MSB T0=LSB)
td:  delay time befor execute  0–F  H  (*100ms)
1.  01 00 <u>0005</u> 02 04 80 2A 03 00  Start audio-play and IO #3 for 6.4 second
   640=280H
   delay before execution = 10*100ms=1 sec -continued

| 2. | 01 00 0005 02 04 80 2A 13 00 | Start audio-play and IO #3 for 6.4 second and set scan sensors on once mode. delay before execution = 10*100ms=1 sec |

D. AUDIO IN COMMANDS

TRANSMIT_MIC_FOR_TIME

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 03 | 00 | T1 | T2 | x | x | x | x |

Requests the Toy control device to Transmit microphone audio from the Toy control device to the Computer radio interface and to the sound card of the computer for time T.
P:        Computer address            00–03    H
A:        unit address -              00–FF    H
T1, T2:   TIME                        00–FF    H   (SEC)
example:
1.        01 00 0005 03 00 0A 00 00 00   start mic mode for 10 seconds

E. GENERAL TOY COMMANDS

GOTO_SLEEP_MODE

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 01 | x | x | x | x | x | x |

Request the Toy control device to go into power save mode (sleep).
P:        Compute address             00–03    H
A:        unit address -              00–FF    H
1.        01 00 0005 04 01 00 00 00 00   switch the Toy control device into sleep mode.

GOTO_AWAKE_MODE

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 02 | x | x | x | x | x | x |

Requests the Toy control device to go into an awake mode.
P:        Computer address            00–03    H
A:        unit address -              00–FF    H
1.        01 00 0005 04 02 00 00 00 00   switch the Toy control device into awake mode.

TOY_RESET

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 0F | x | x | x | x | x | x |

Requests the Toy control device to perform RESET
P:        Computer address            00–03    H
A:        unit address -              00–FF    H
1.        01 00 0005 04 0F 00 00 00 00   Toy reset

TOY_USE_NEW_RF_CHANNELS

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 0A | CH1 | CH2 | x | x | x | x |

Requests the Toy control device to switch to new RF transmit and receive channels.
P:        Computer address            00–03    H
A:        unit address -              00–FF    H
CH1:      Transmit RF channel number  0–F      H
CH2:      Receive RF Channel number   0–F      H
1.        01 00 0005 04 0A 12 00 00 00   Switch to new RX and TX RF channels
Note: This command is available only with enhanced radio modules (alternate U1 of FIG. 5E) or with the modules described if FIG. 15A–15E and 24A–24E.

-continued

F. TELEMETRY

Information sent by the Toy control device, as an ACK to the command received from the Computer radio interface.
OK_ACK

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | CRC |
| | | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | | 4 bit | 4 bit | 4 bit | 4 bit | 4 bit | 4 bit | 8 bits |
| 01 | P | 00 | 00 | A | <u>0A</u> | <u>00</u> | | cmd1 | cmd2 | cmd3 | cmd4 | sen1 | sen2 | |

Send back an ACK about the command that was received ok.
| P: | Computer address | 00–03 | H |
|---|---|---|---|
| A: | unit address - | 00–FF | H |
| cmd 1, 2: | Received command MSB ok ack. | 00–FF | H |
| cmd 3, 4: | Received command LSB ok ack. | 00–FF | H |
| sen 1, 2 | Sensors 0–7 status | 00–FF | H |
| 1. | 01 60 <u>0005</u> 0A 00 01 01 FF 00 | OK ack for 0101 command (sensors scan mode on command). status: all sensors are not pressed (FF). the computer_radio_interface number is 6. | |
| 2. | 01 60 <u>0005</u> 0A 00 01 01 FE 00 | OK ack for 0101 command (sensors scan mode on command). status: sensor #8 is pressed (FE) the computer_radio_interface number is 6. | |

G. REQUESTS

Requests sent by the Toy control device, after an event.
TOY_IS_AWAKE_REQ

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | CRC |
| | | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | | 4 bit | 4 bit | 4 bit | 4 bit | 4 bit | 4 bit | 8 bits |
| 01 | P | 00 | 00 | A | <u>0A</u> | <u>00</u> | | c1 | c2 | x | x | x | x | |

Send a message to the Computer radio interface if the Toy control device goes from sleep mode to awake mode.
| P: | Computer address | 00–03 | H |
|---|---|---|---|
| A: | unit address - | 00–FF | H |
| c1, c2: | status command | AB | H |
| 1. | 01 60 <u>0005</u> 0A 00 AB 00 FF 00 | Toy is awake message. | |

H. CRI (Computer Radio Interface) - commands

Commands that are sent only to the Computer radio interface.
SWITCH_AUDIO_OUT_TO_RADIO_&_TRANSMIT

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | CRC |
| | | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | | 4 bit | 4 bit | 4 bit | 4 bit | 4 bit | 4 bit | 8 bits |
| 01 | P | 00 | 00 | x | <u>0C</u> | <u>00</u> | | x | x | x | x | x | x | |

Requests the Computer radio interface to switch audio_out from the computer sound card to the radio wireless transceiver and transmit.
| P: | Computer address | 00–03 | H |
|---|---|---|---|

SWITCH_AUDIO_OUT_TO_JACK_&_STOP_TRANSMIT

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | CRC |
| | | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | | 4 bit | 4 bit | 4 bit | 4 bit | 4 bit | 4 bit | 8 bits |
| 01 | P | 00 | 00 | x | <u>0C</u> | <u>01</u> | | x | x | x | x | x | x | |

Requests the Computer radio interface to switch audio_out from the radio RF wireless transceiver to the speakers jack and to stop transmit.
| P: | Computer address | 00–03 | H |
|---|---|---|---|

MUTE_RADIO

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | CRC |
| | | | | | | | | Dat1 | Dat1 | Dat2 | Dat2 | Dat3 | Dat3 |

-continued

| 8 bit | 2 bit | 6 bit | 8 bit | 8 bit | 8 bit | 8 bit | msb 4 bit | lsb 4 bit | msb 4 bit | lsb 4 bit | msb 4 bit | lsb 4 bit | 8 bits |
|---|---|---|---|---|---|---|---|---|---|---|---|---|---|
| 01 | P | 00 | 00 | x | 0C | 02 | x | x | x | x | x | x | |

Mute the radio transmit.
P:   Computer address   00–03   H

UN-MUTE_RADIO

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | 00 | 00 | 00 | x | 0C | 03 | x | x | x | x | x | x | |

UN-Mute the radio transmit.

CRI_RESET

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | x | 0C | 0F | x | x | x | x | x | x | |

Perform software reset on the Computer radio interface unit.
P:   Computer address   00–03   H

I. CRI - ACK

ACK sent only to the Computer by the Computer radio interface, only after CRI commands.

CRI_COMMAND_ACK

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | x | 0D | 00 | cmd1 | cmd2 | cmd3 | cmd4 | x | x | |

This is an ACK for a CRI command. this ACK is sent to the computer by the computer-radio-interface, after executing a command successfully.

P:        Computer address                      00–03     H
cmd 1, 2:  Received CRI command MSB ok ack.   00–FF     H
cmd 3, 4:  Received CRI command LSB ok ack.   00–FF     H
1.        01 60 0000 0D 00 0C 01 00 00   OK ack for 0C01 CRI command (SWITCH AUDIO OUT TO JACK)
                                         the computer_radio_interface number is 6.
2.        01 60 0000 0D 00 0C 0F 00 00   OK ack for 0C0F CRI command (CRI reset)
                                         the computer_radio_interface number is 6.
                                         This ack is also sent on POWER UP RESET Reference is now made to FIG. 8A, which is a simplified flowchart illustration of a preferred method for receiving radio signals, executing commands comprised therein, and sending radio signals, within the toy control device 130 of FIG. 1A. Typically, each message as described above comprises a command, which may include a command to process information also comprised in the message. The method of FIG. 8A preferably comprises the following steps:

A synchronization signal or preamble is detected (step 400). A header is detected (step 403).

A command contained in the signal is received (step 405).

The command contained in the signal is executed (step 410). Executing the command may be as described above with reference to FIG. 1A.

A signal comprising a command intended for the computer radio interface 110 is sent (step 420).

Figure 8A:
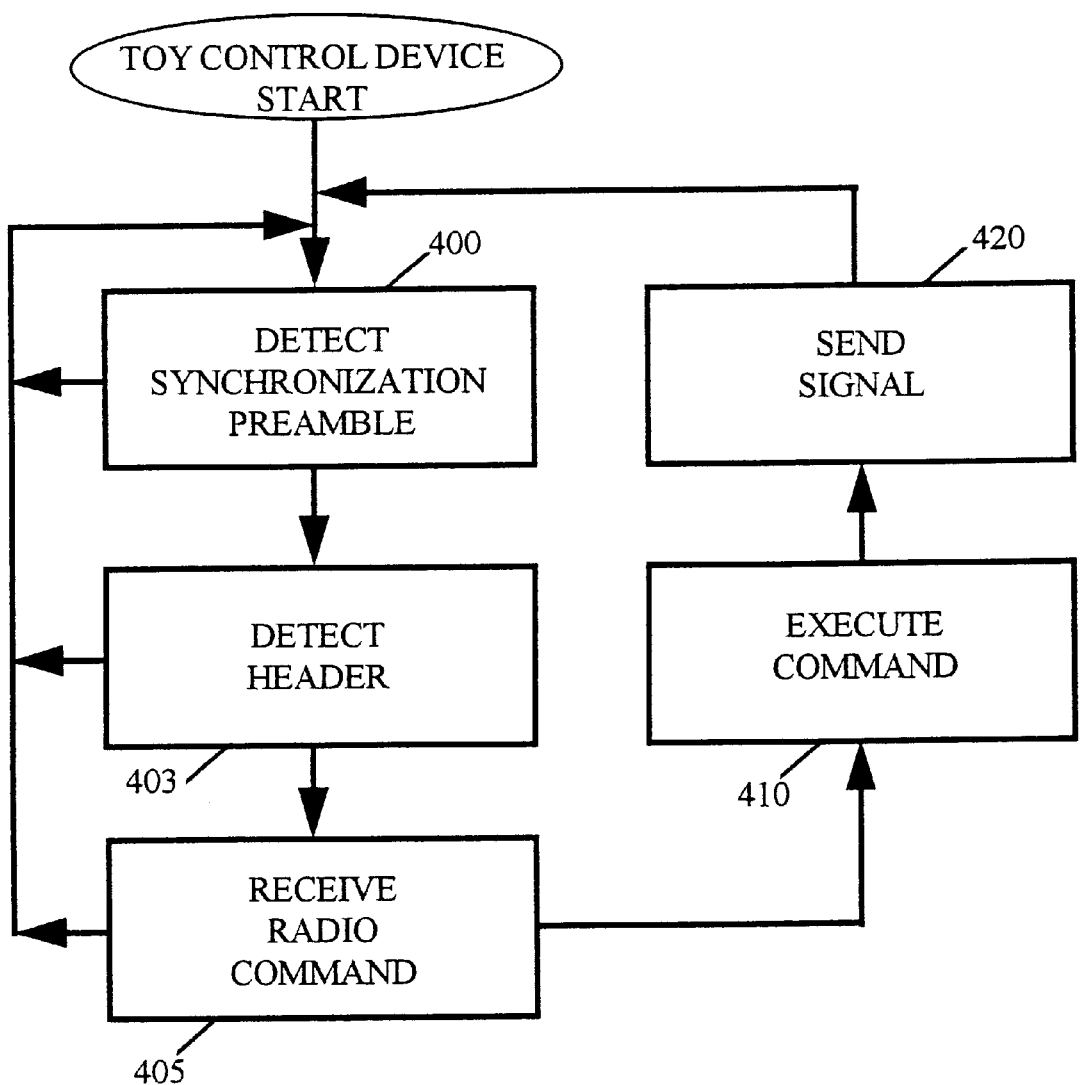
FIG. 8A is a simplified flowchart illustration of a preferred method for receiving radio signals, executing commands comprised therein, and sending radio signals, within the toy control device 130 of FIG. 1A.
Figure 8C:
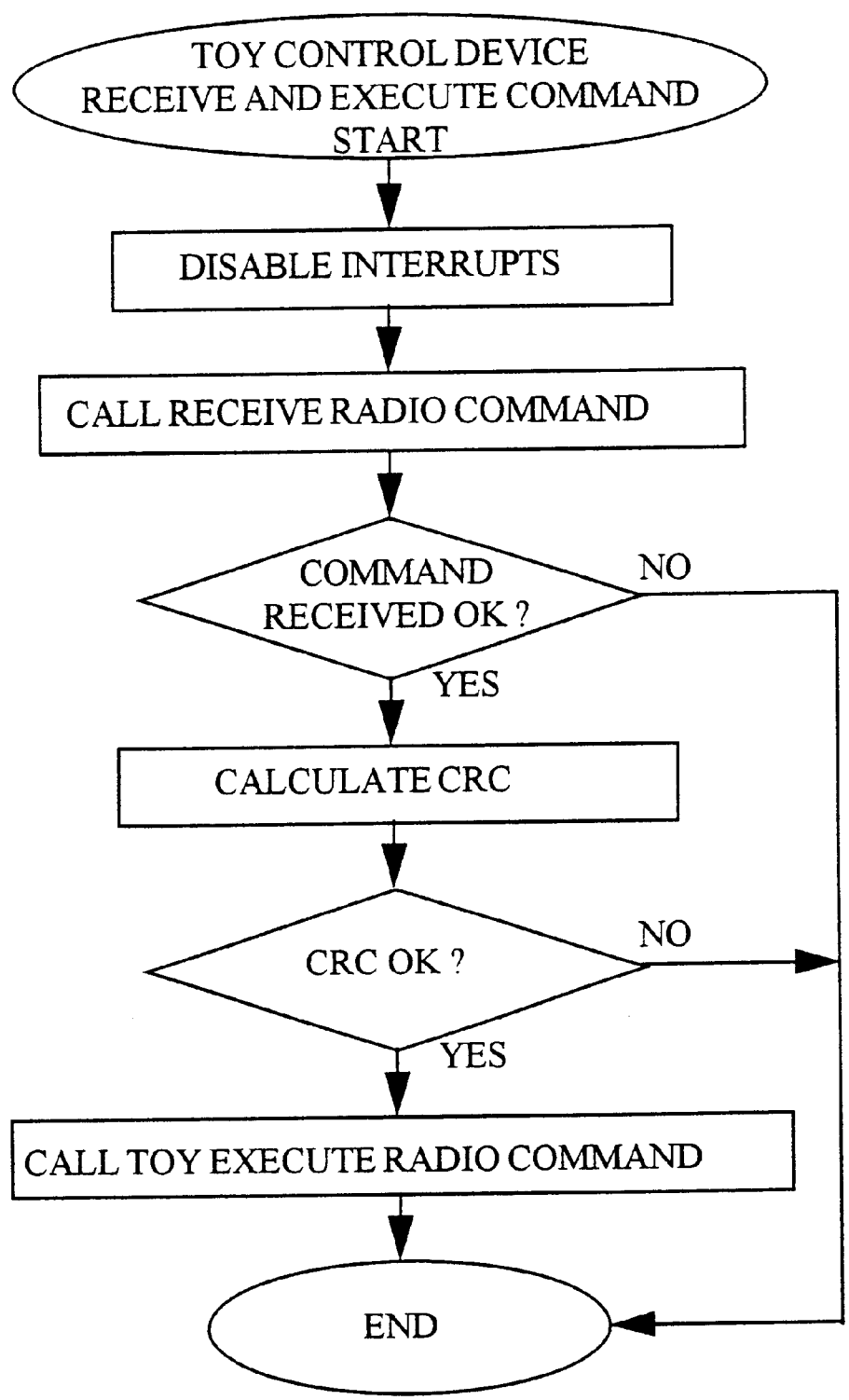
Figure 8D:
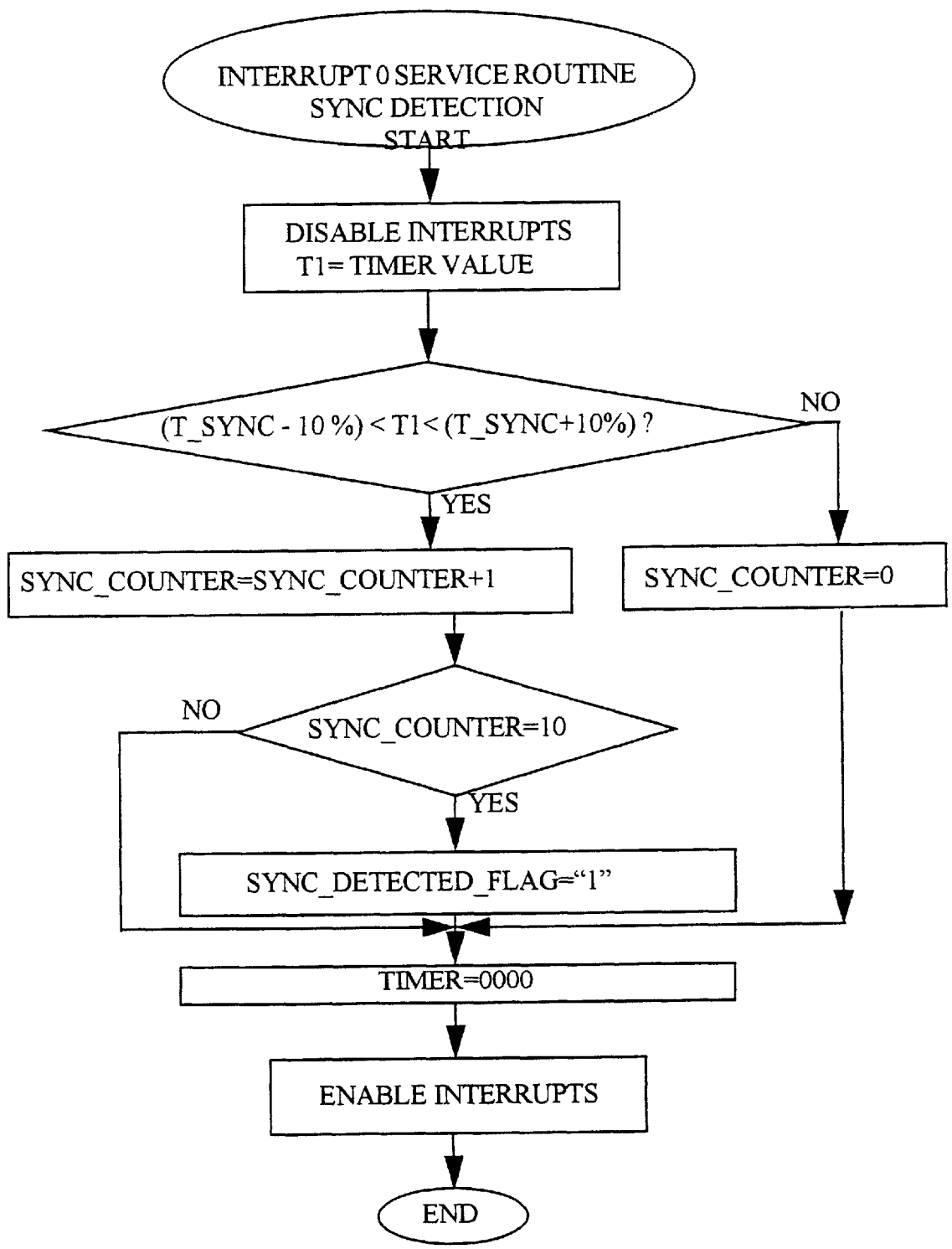
Figure 8E:
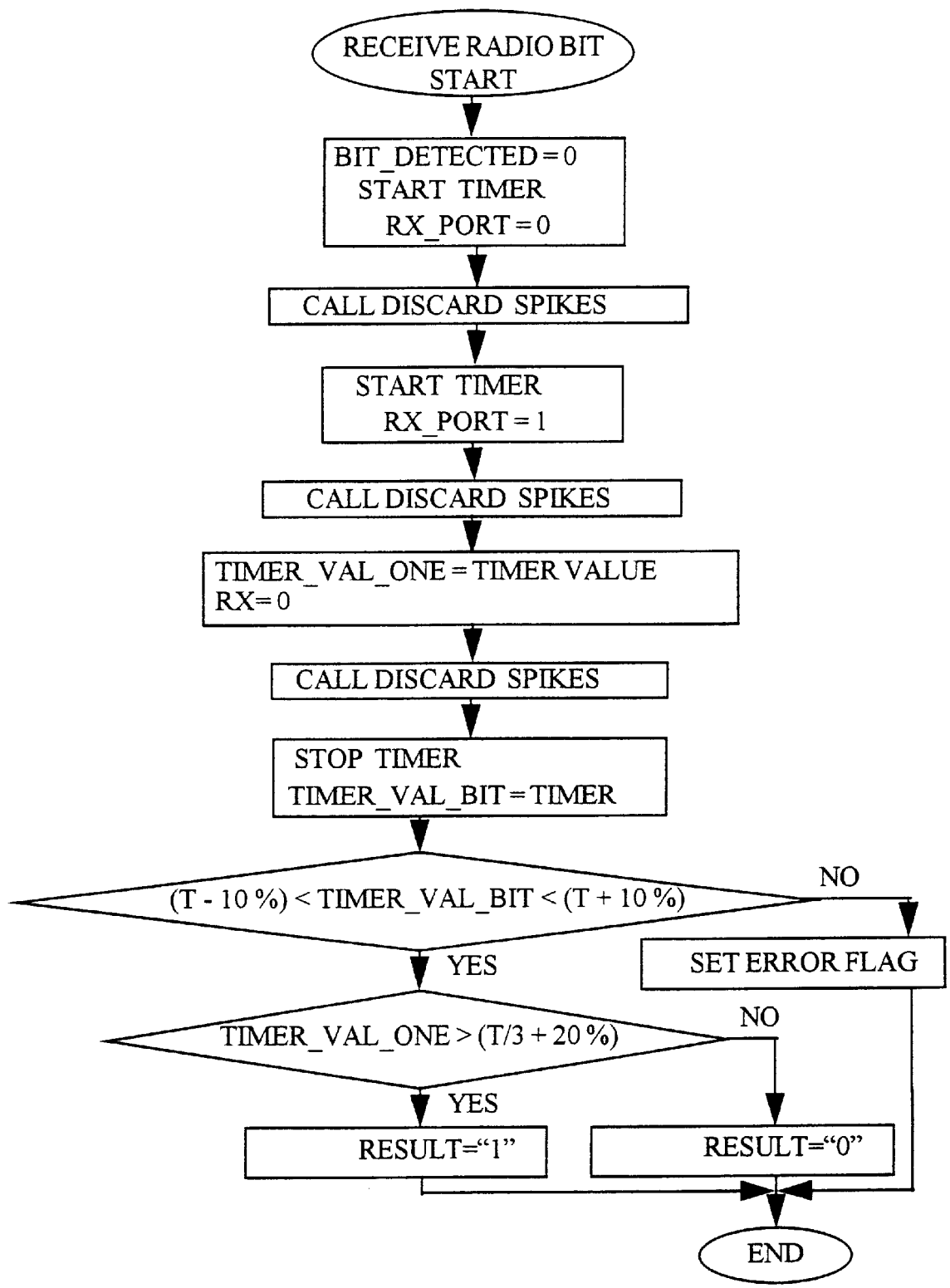
Figure 8F:
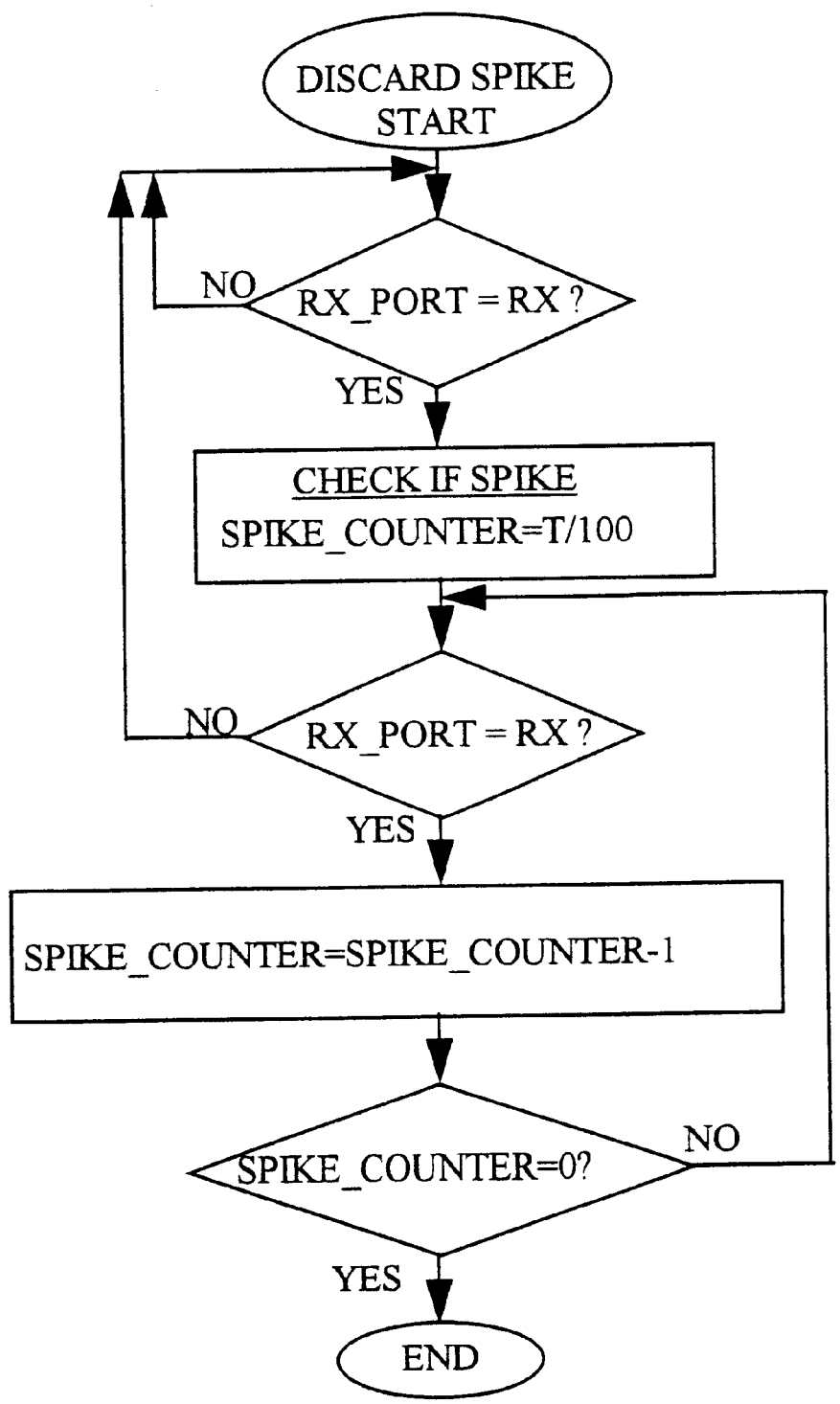
Figure 8G:
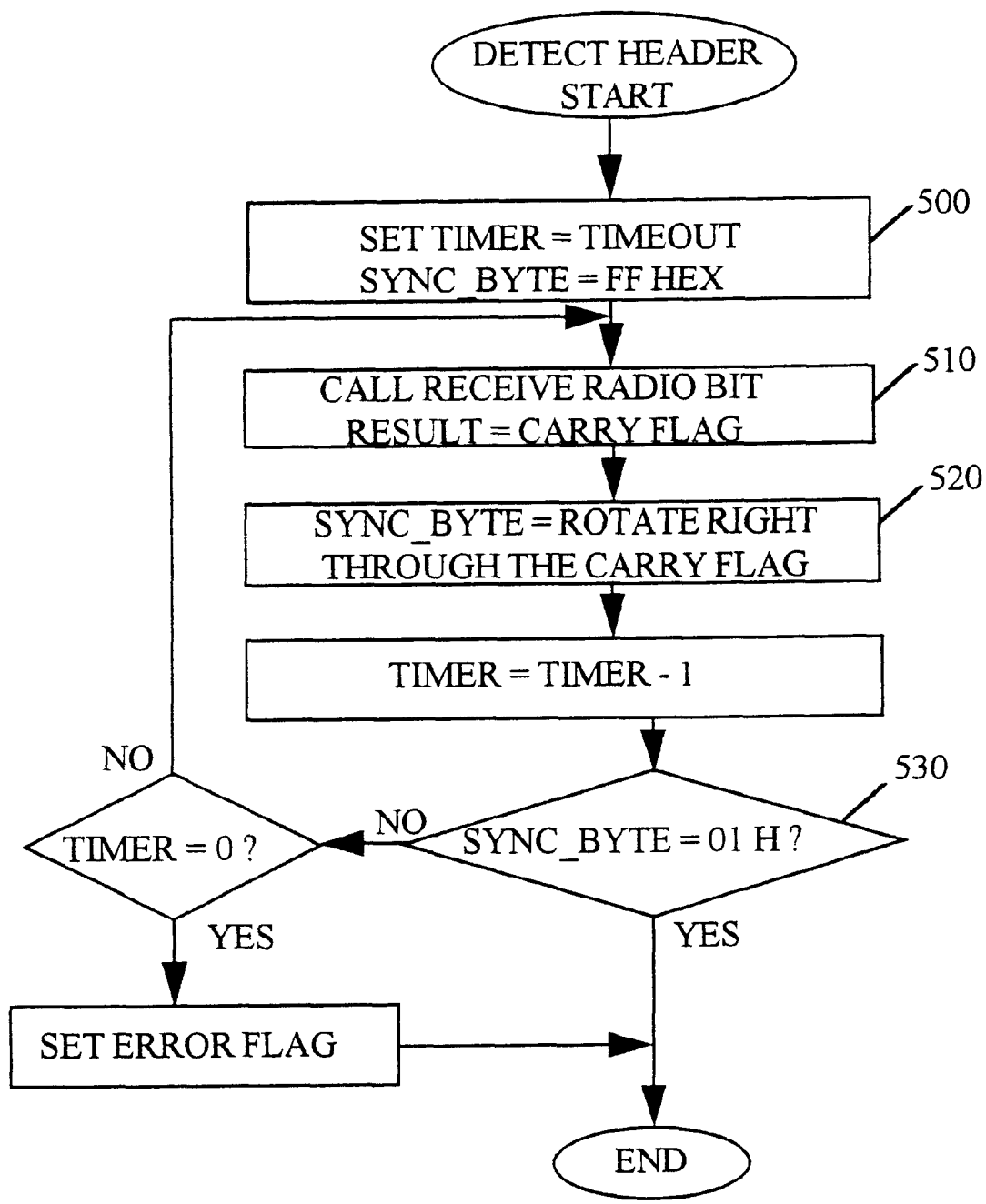
Figure 8H:
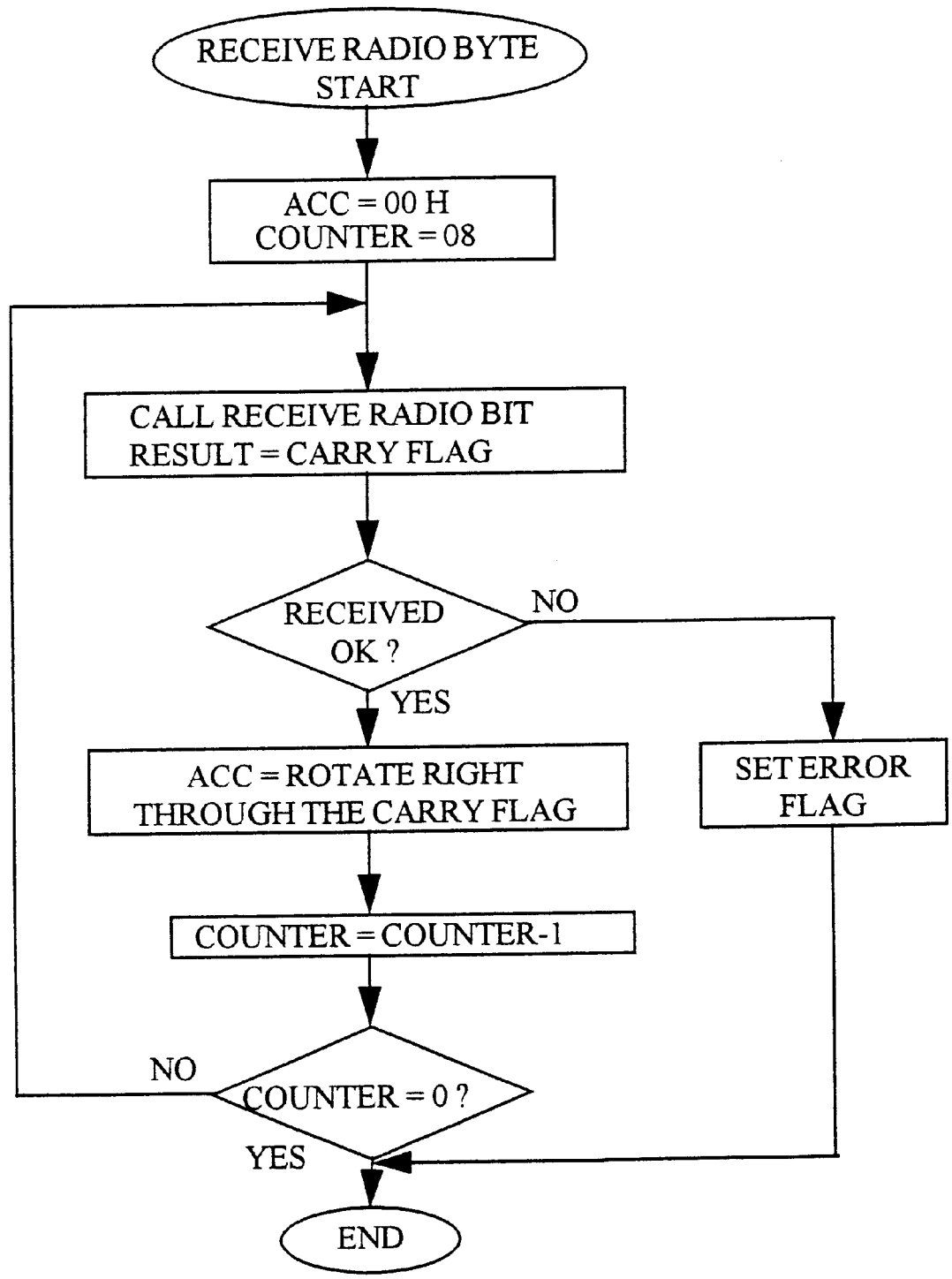
Figure 8I:
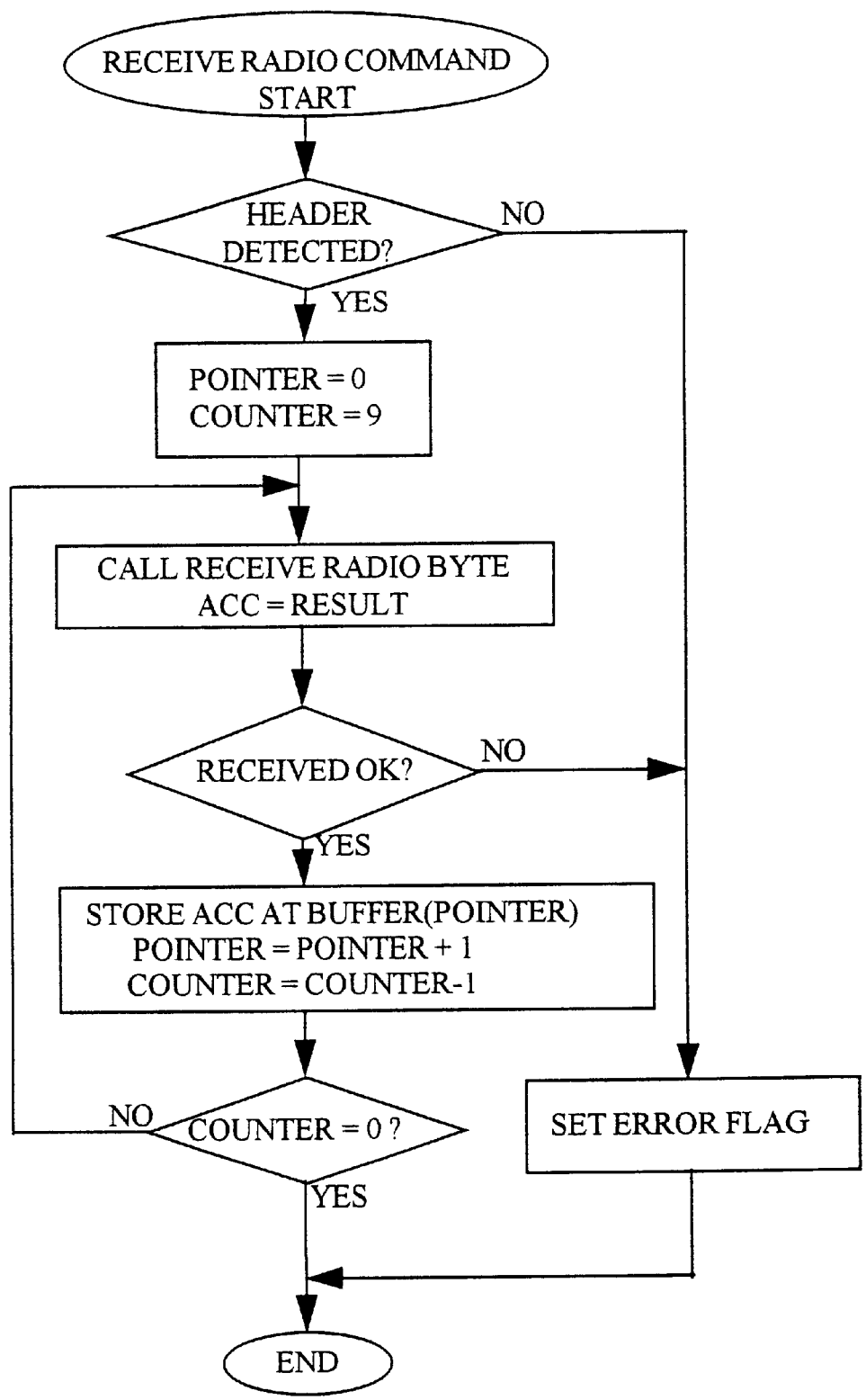
Figure 8J:
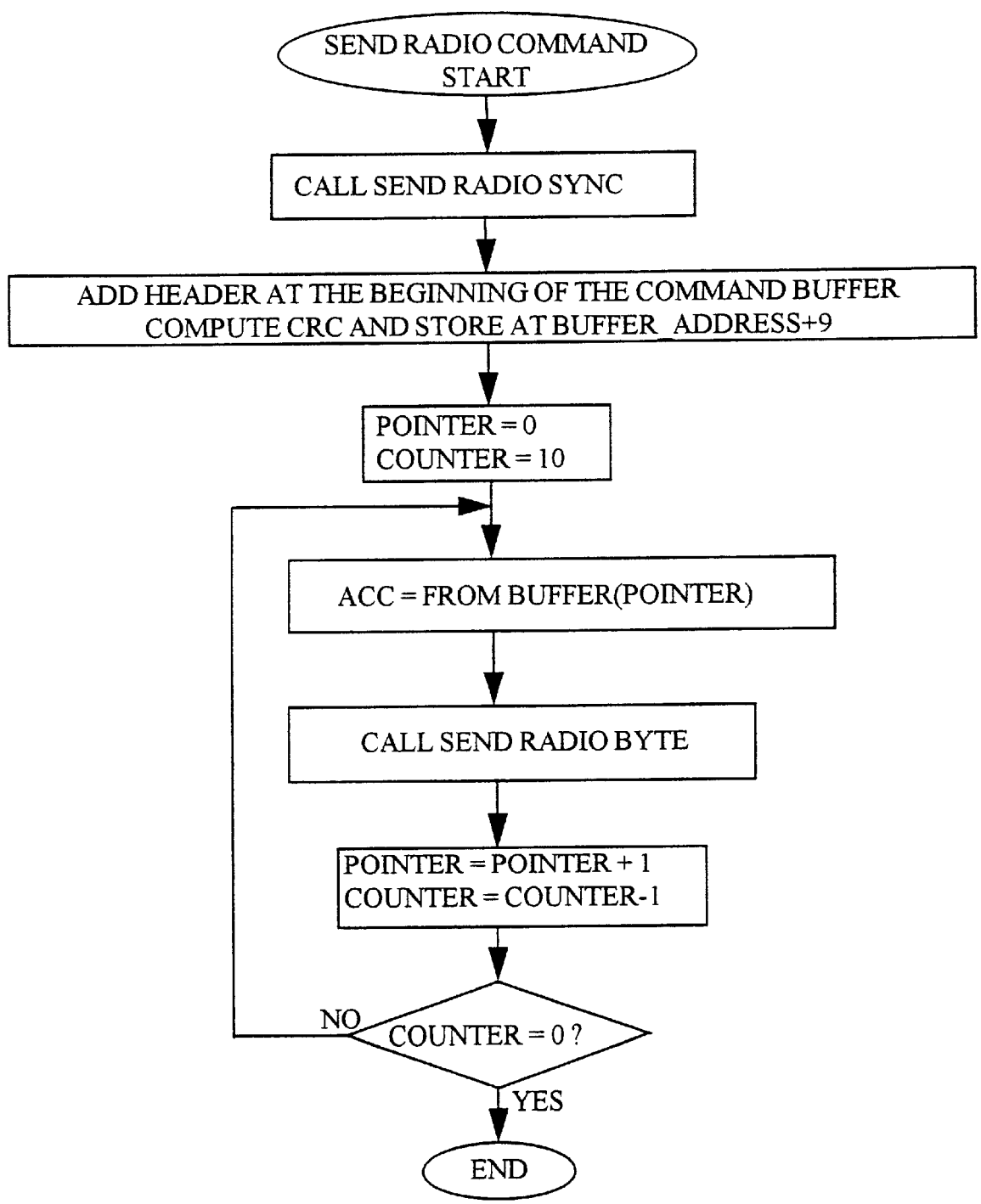
Figure 8K:
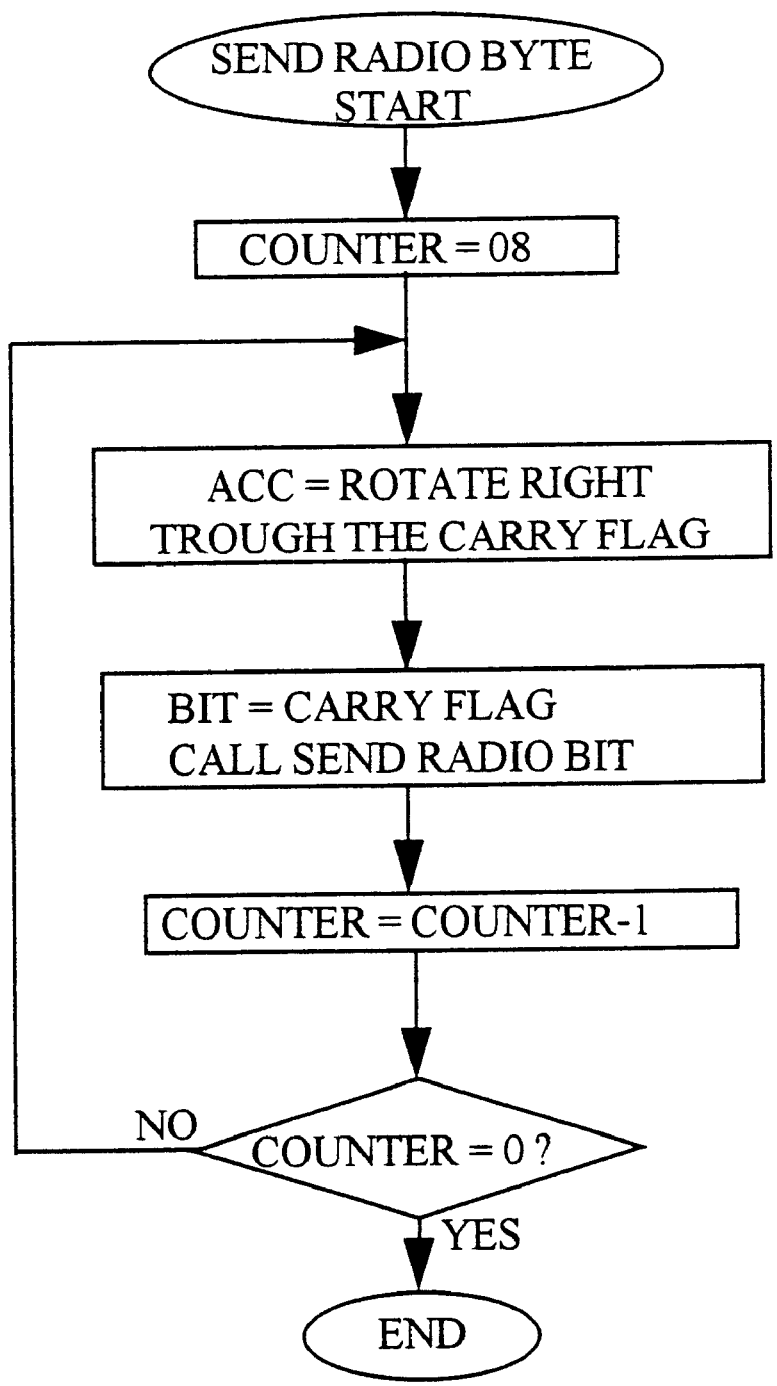
Figure 8L:
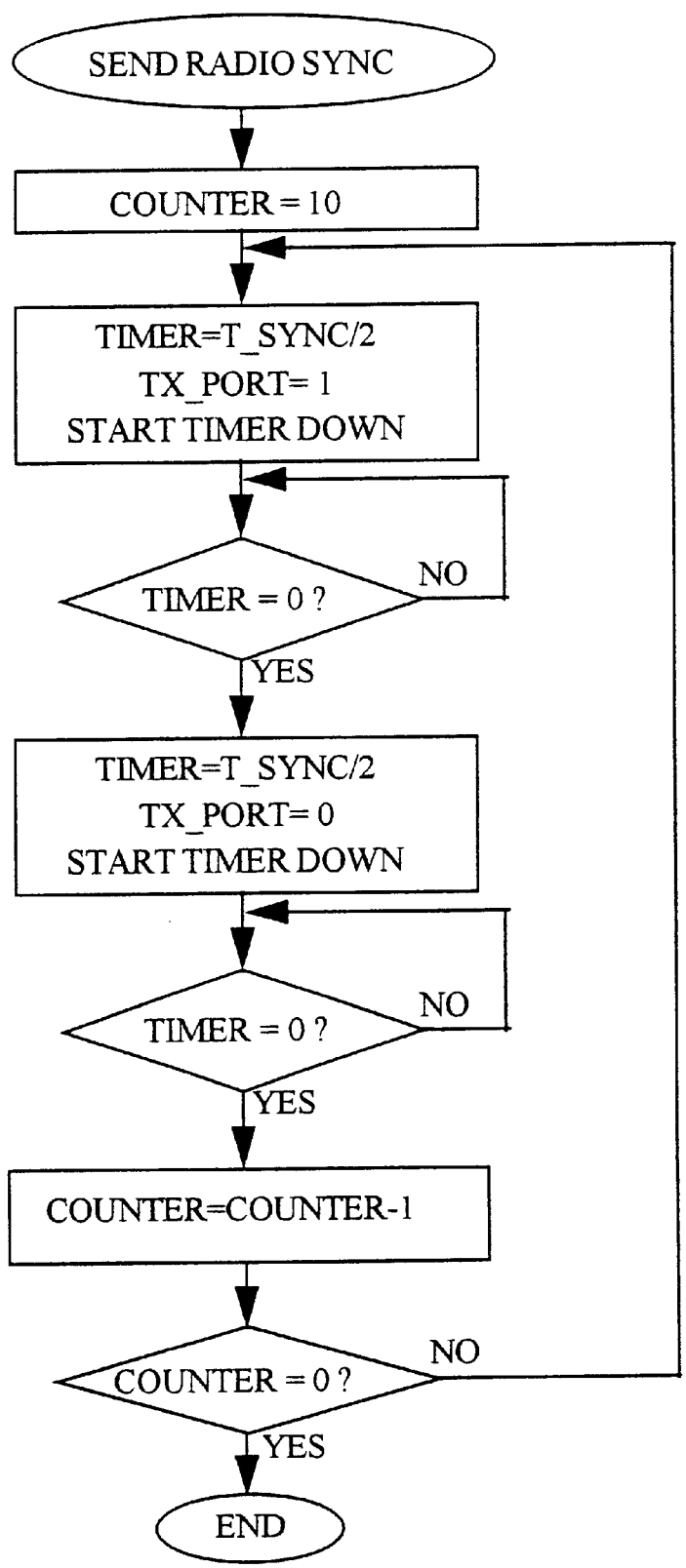
Figure 8M:
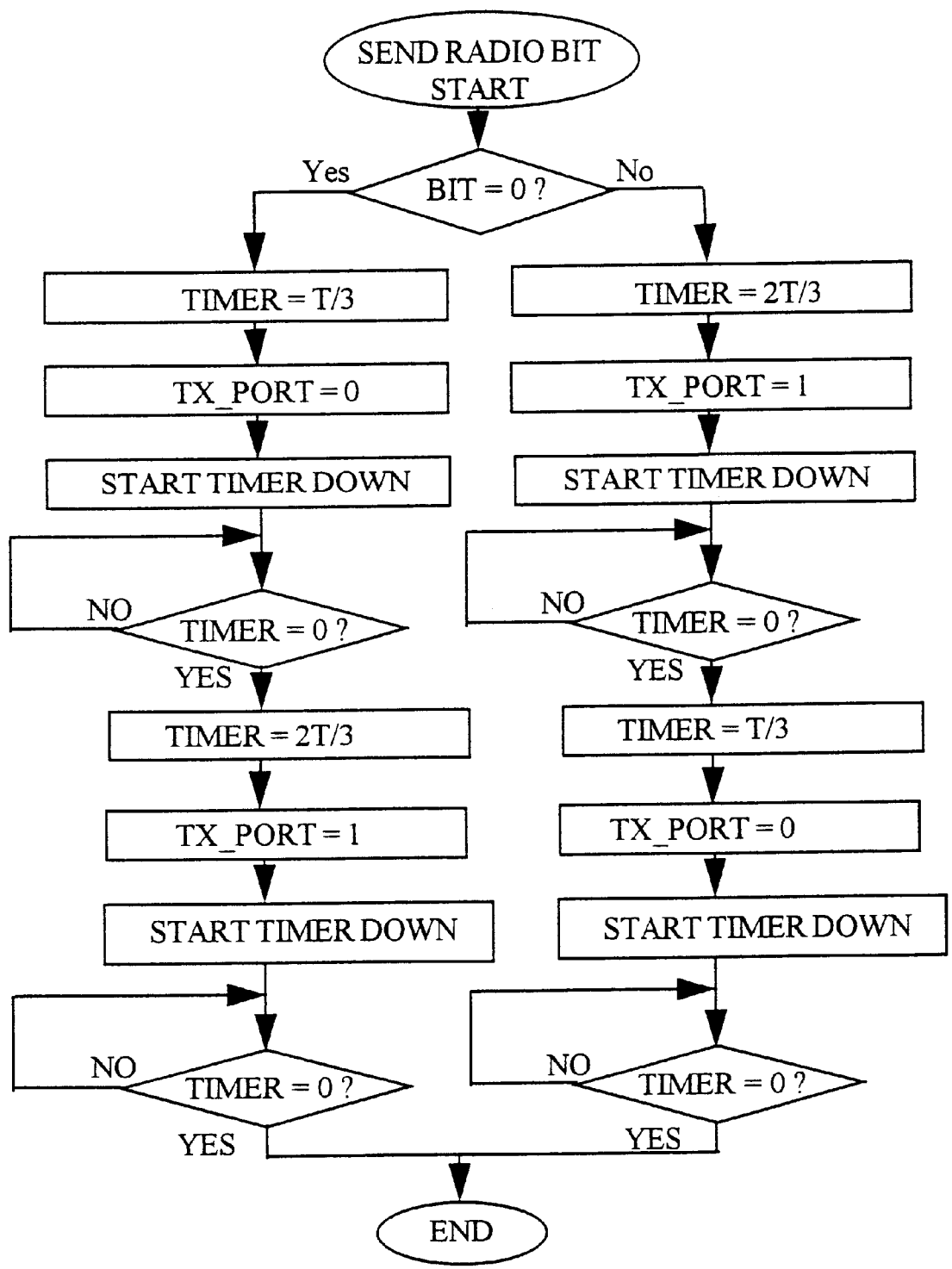
Figure 8N:
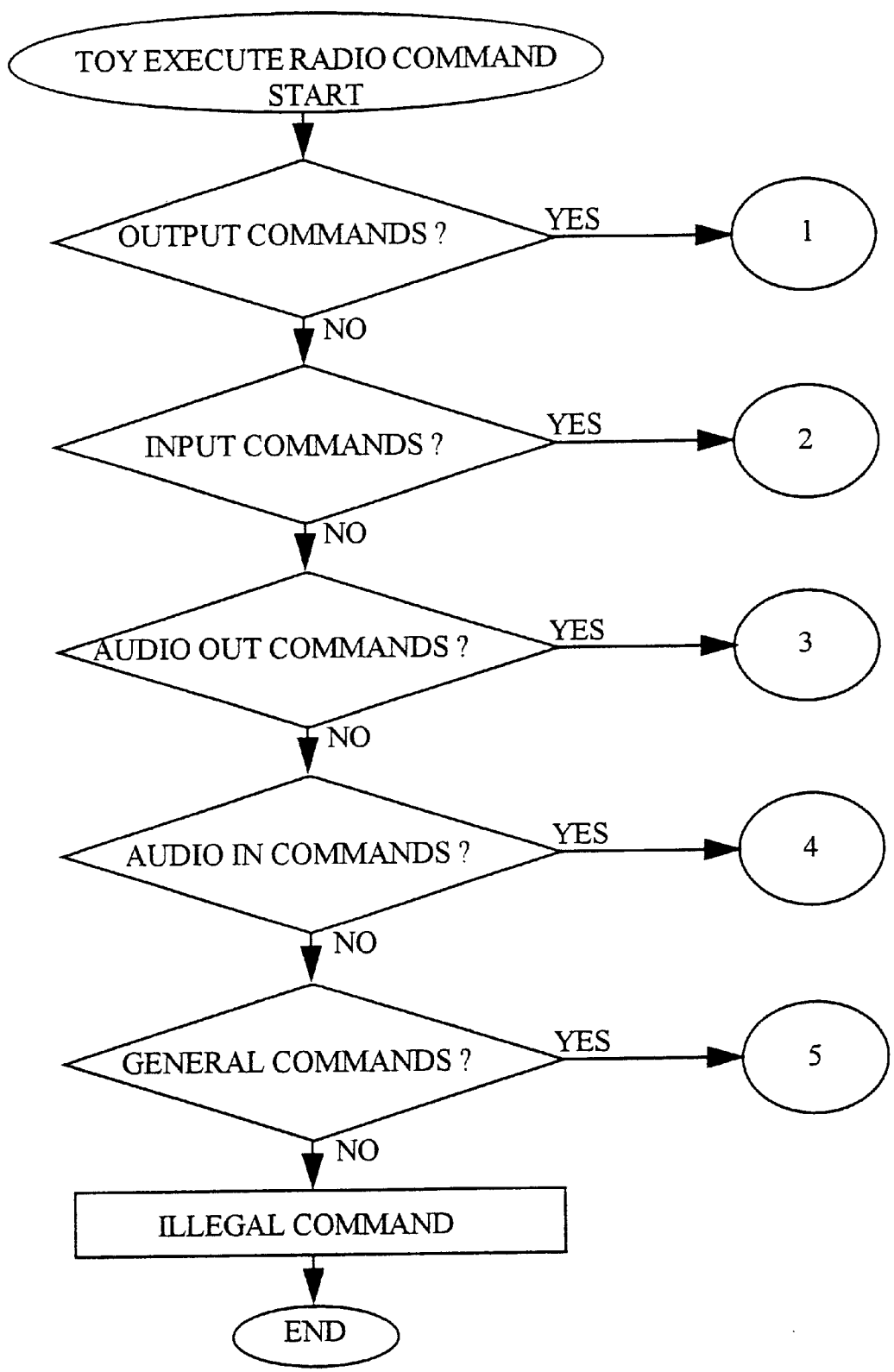
Figure 8O:
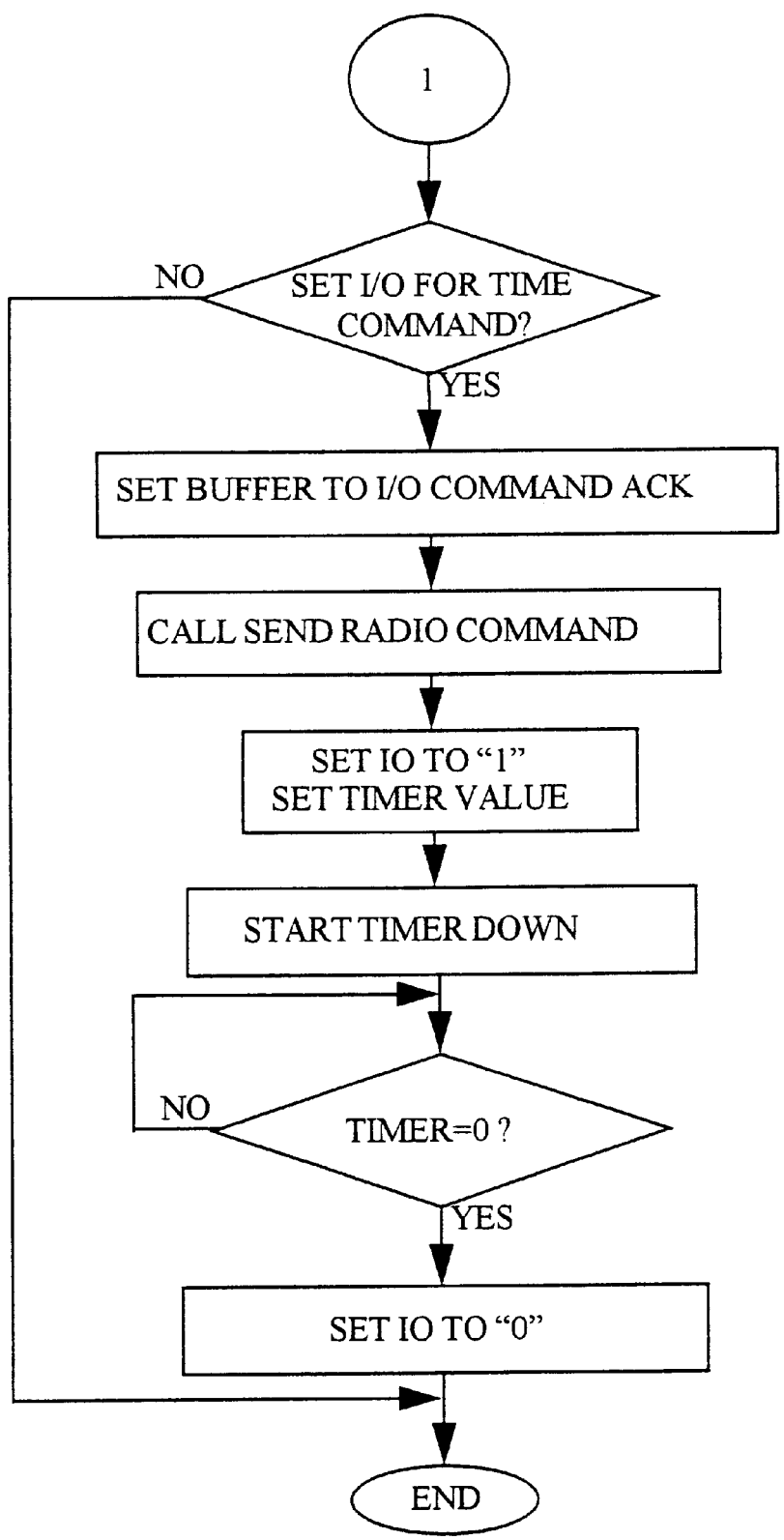
Figure 8P:
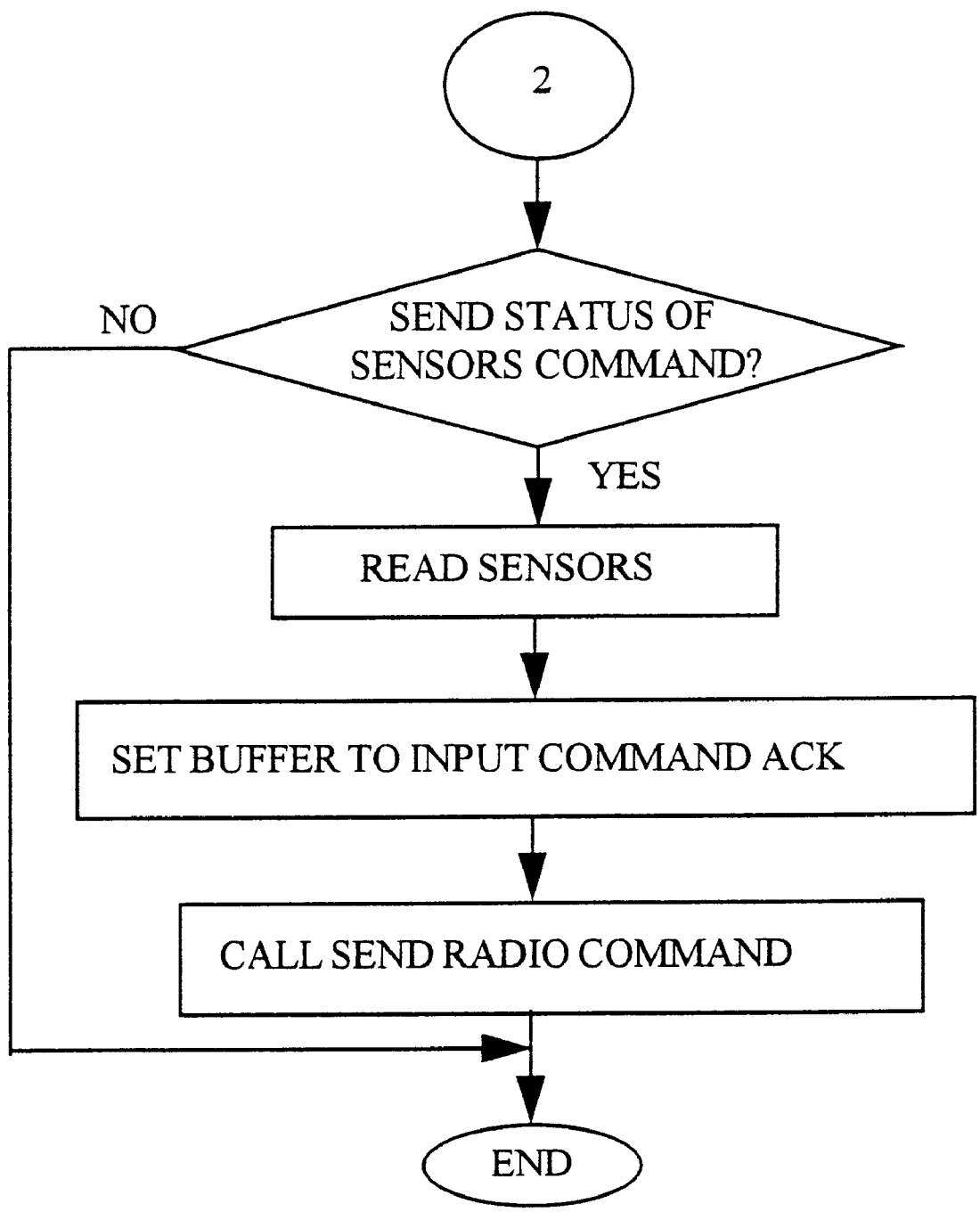
Figure 8Q:
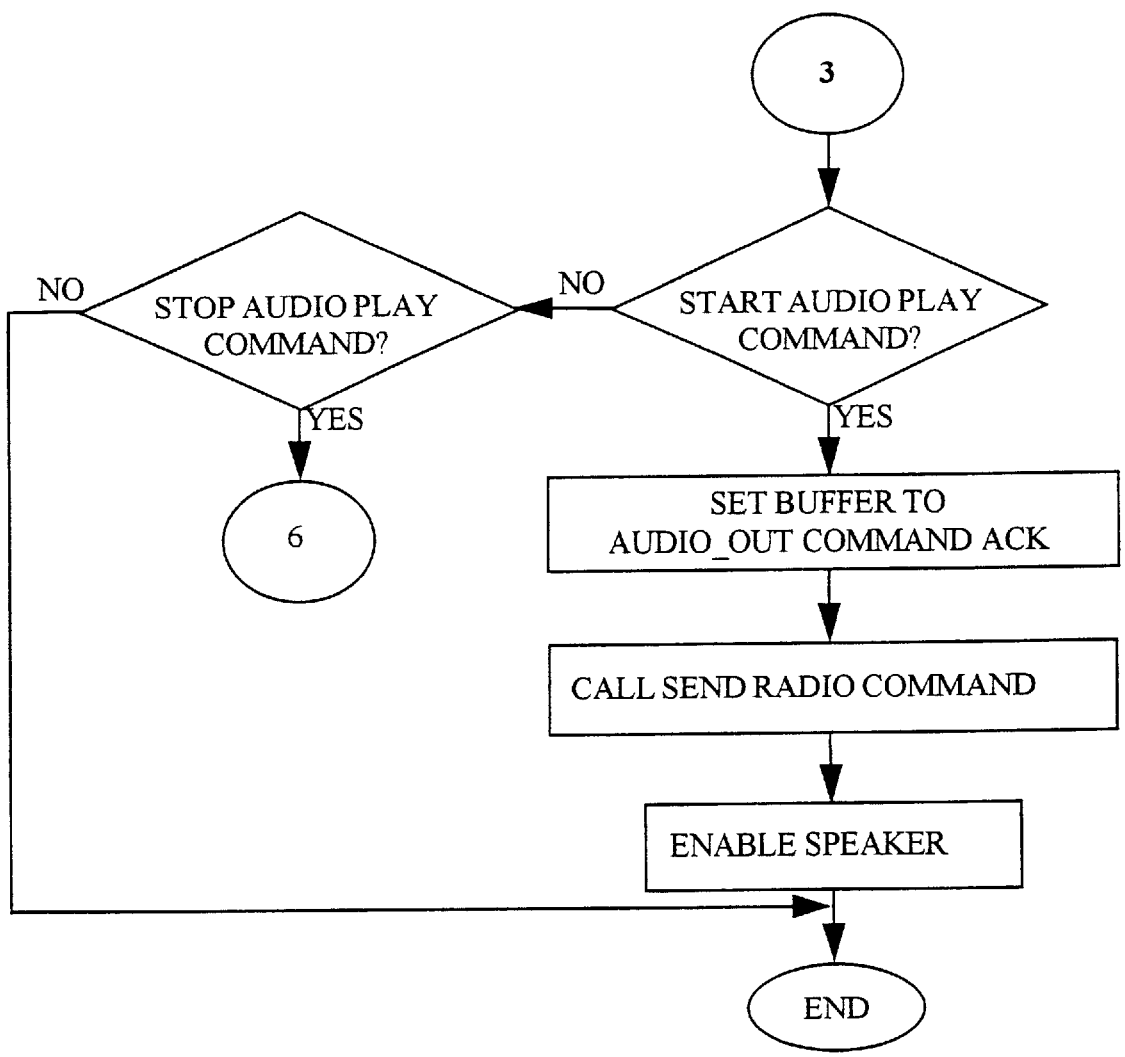
Figure 8R:
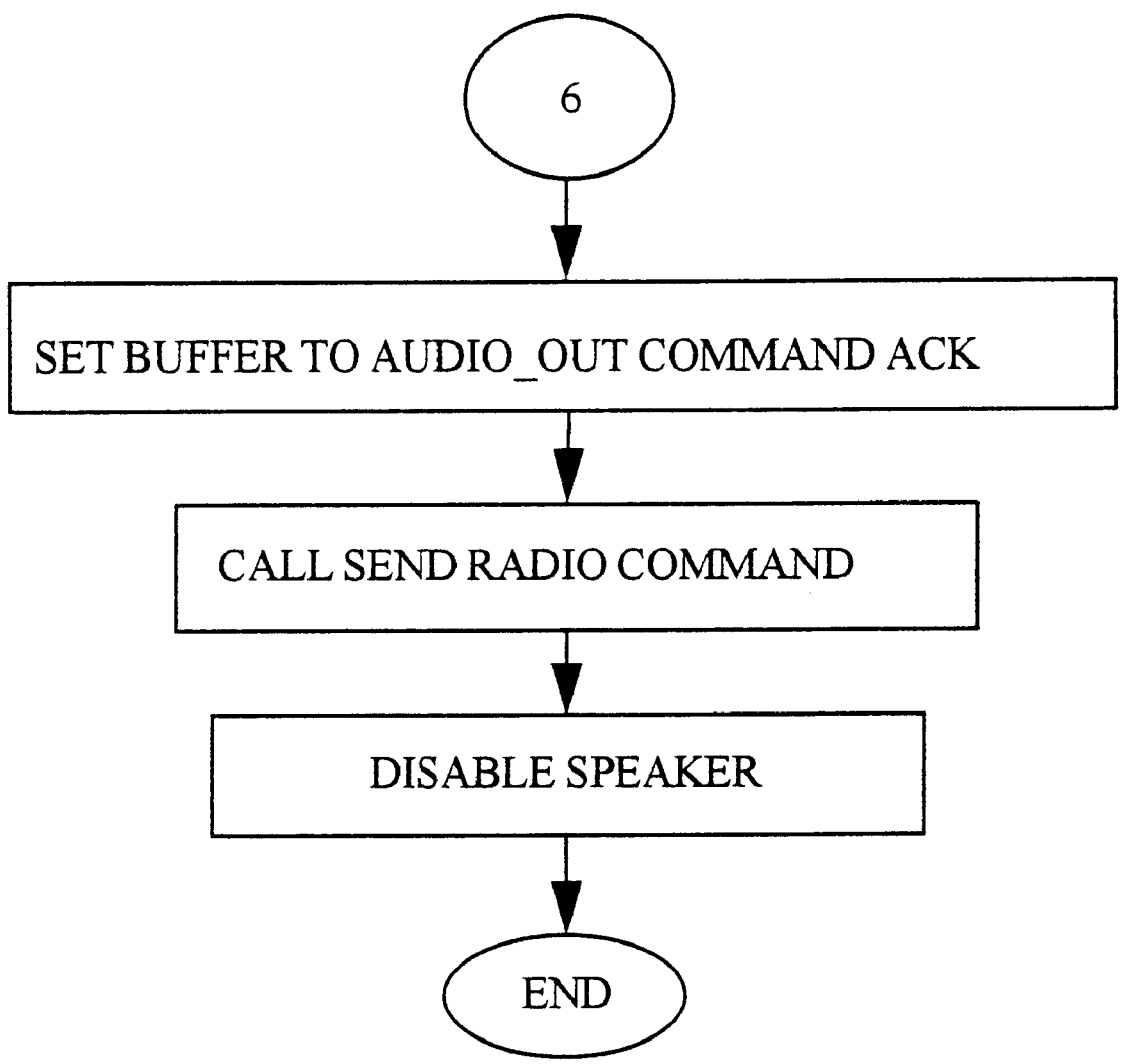
Figure 8S:
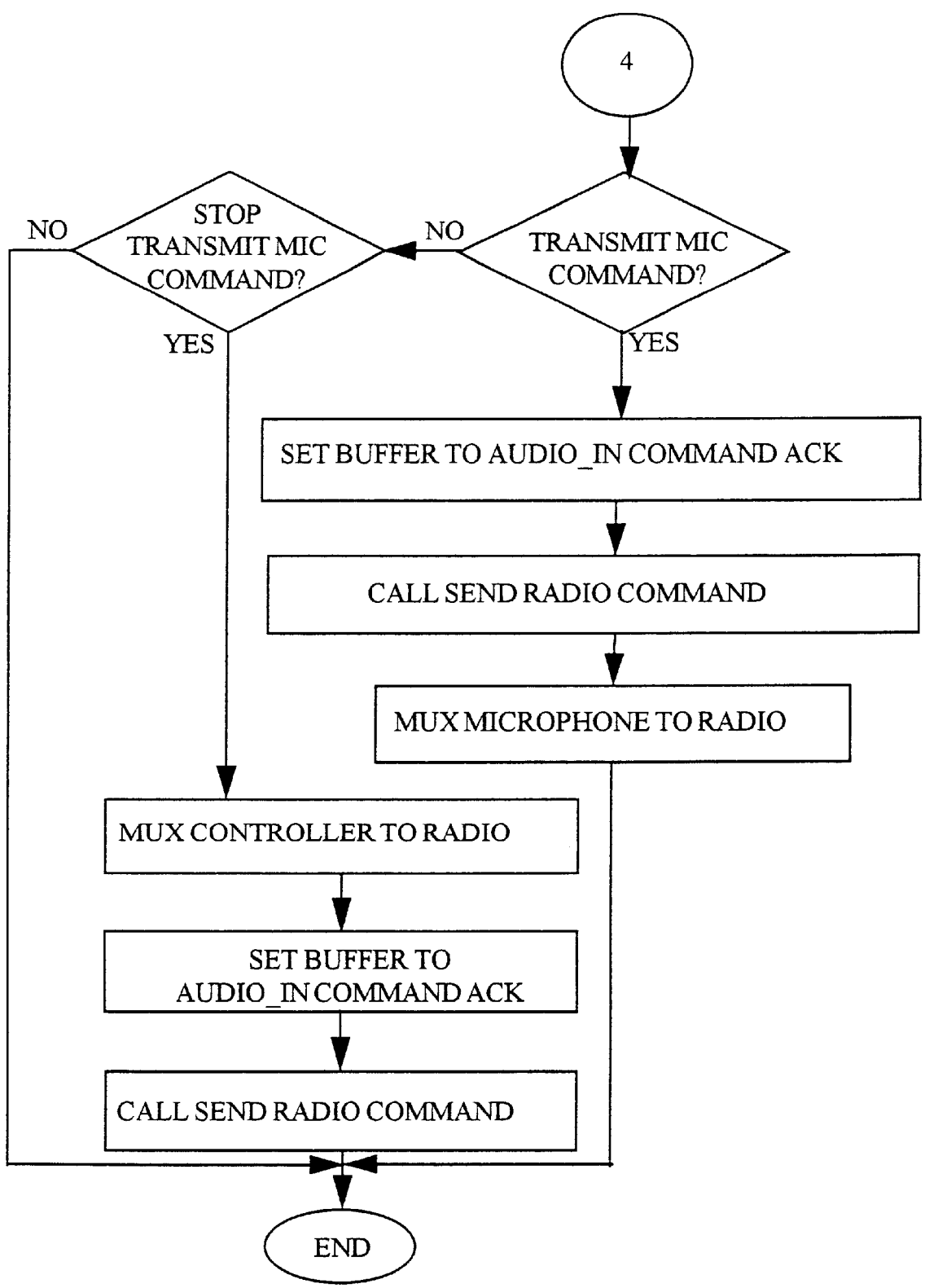
Figure 8T:
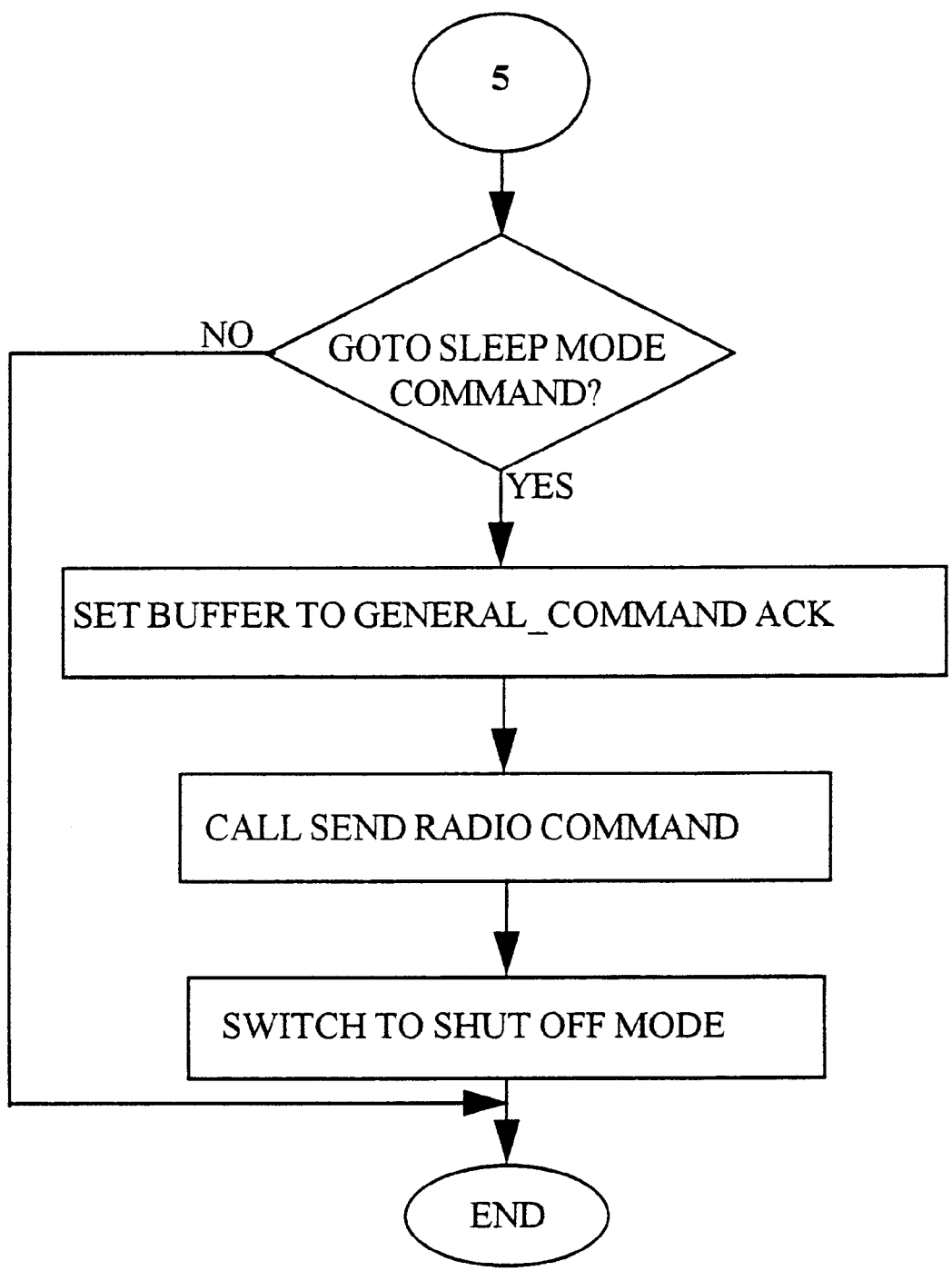

Reference is now made to FIGS. 8B–8T which, taken together, comprise a simplified flowchart illustration of a preferred implementation of the method of FIG. 8A. The method of FIGS. 8B–8T is self-explanatory.

Figure 9A:
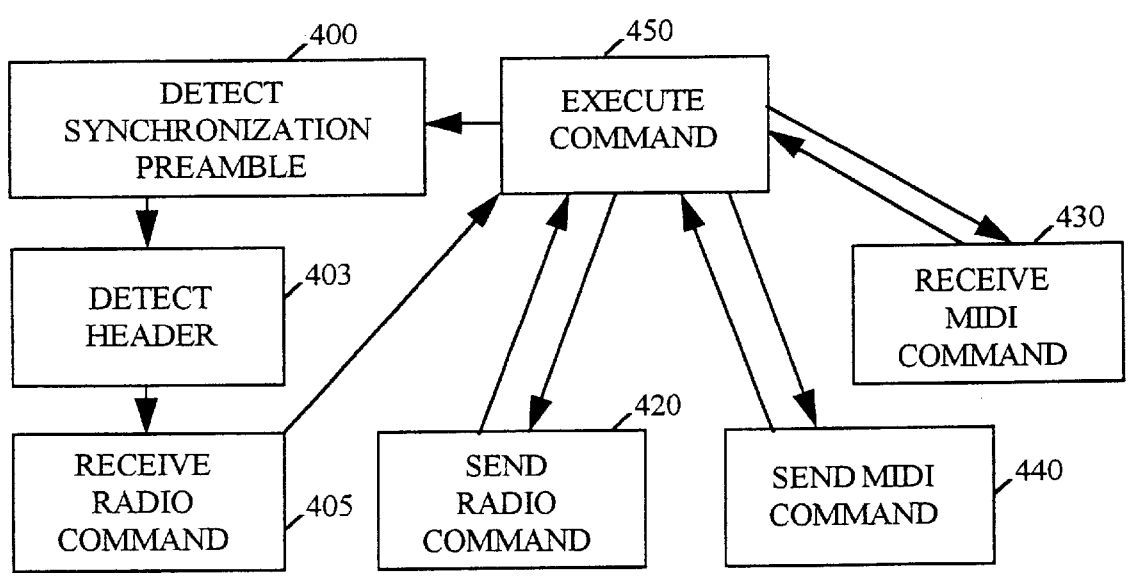
FIG. 9A is a simplified flowchart illustration of a preferred method for receiving MIDI signals, receiving radio signals, executing commands comprised therein, sending radio signals, and sending MIDI signals, within the computer radio interface 110 of FIG. 1A.
Figure 9B:
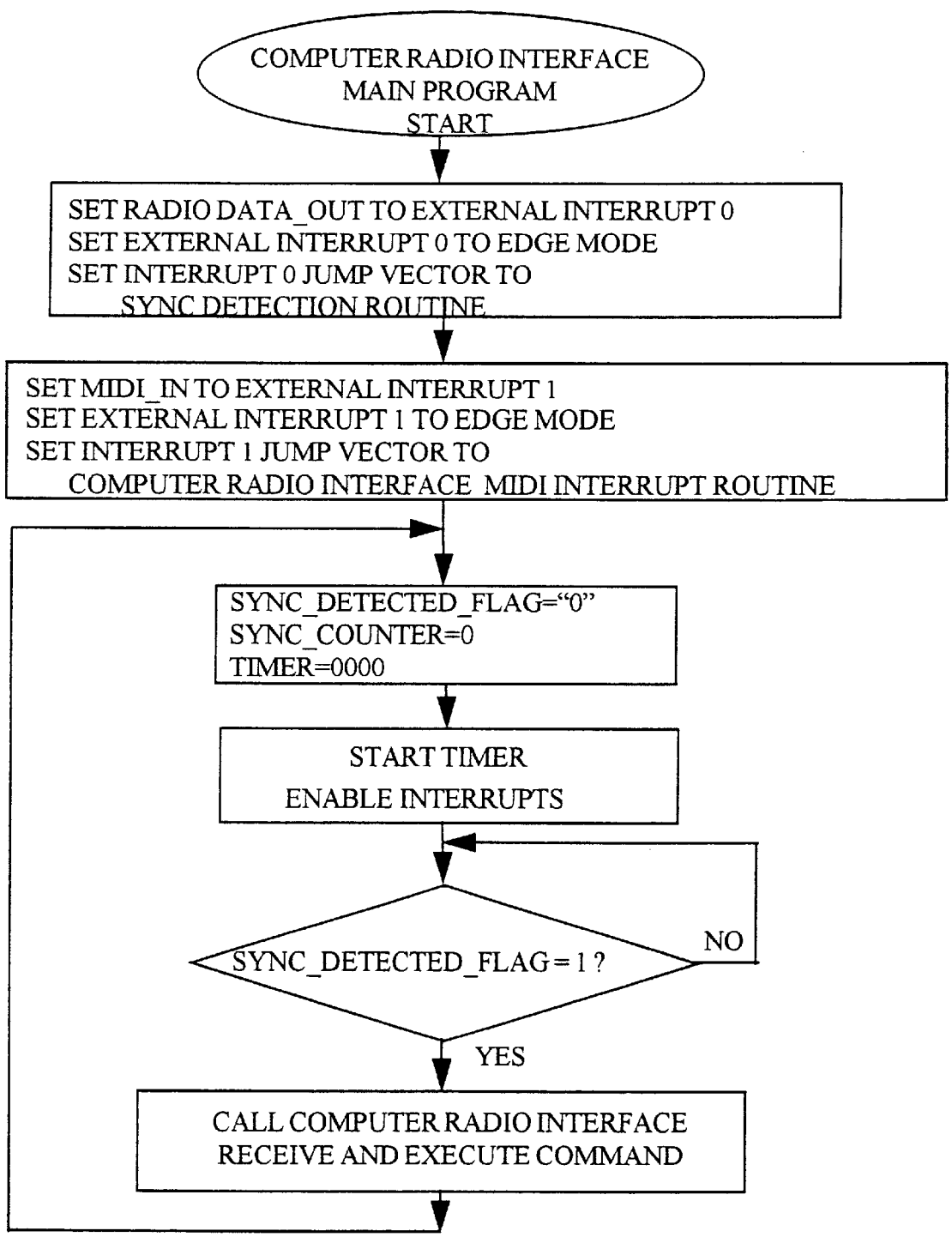
FIGS. 9B–9N, taken together with FIGS. 8D–8M, comprise a simplified flowchart illustration of a preferred implementation of the method of FIG. 9A.
Figure 9C:
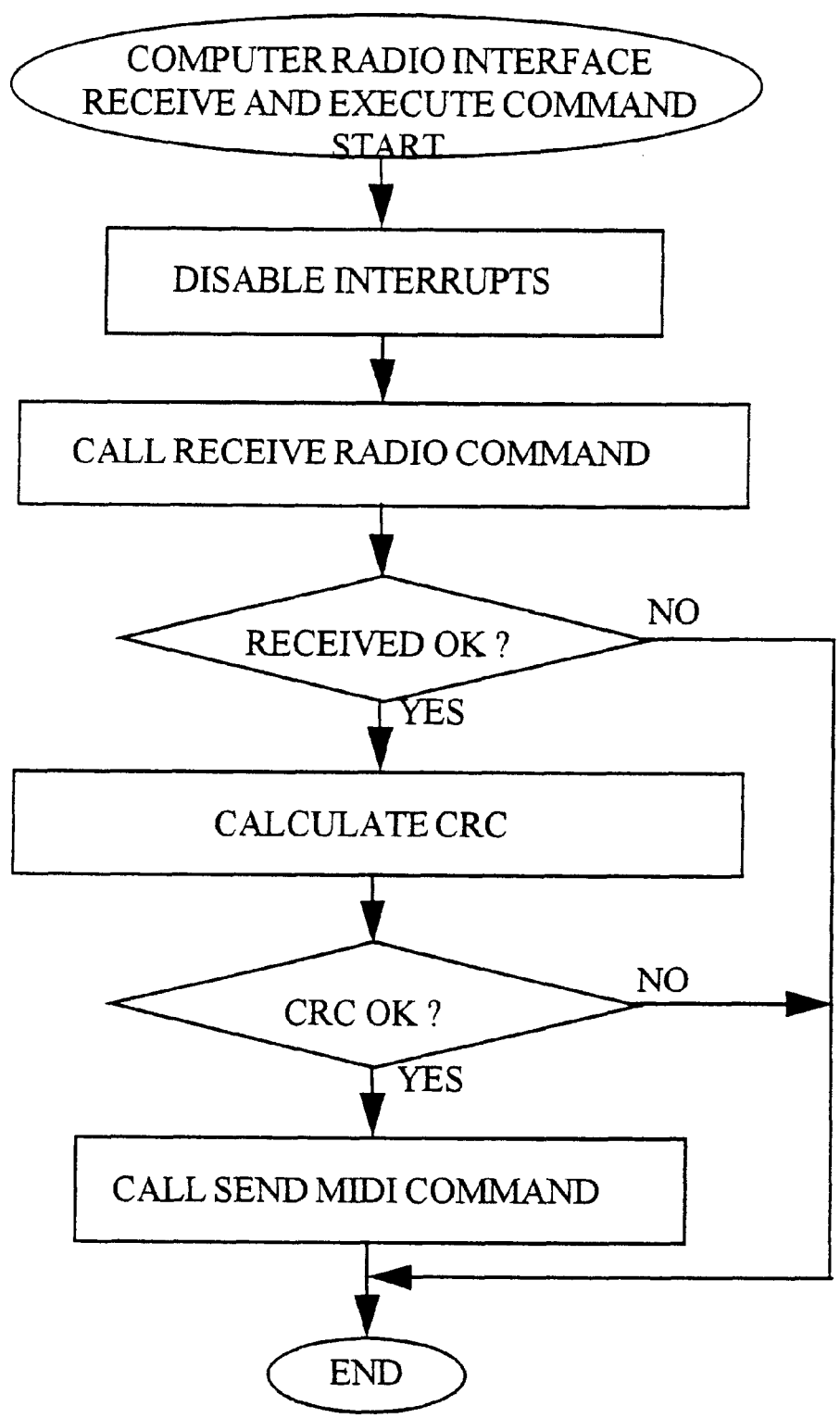
Figure 9D:
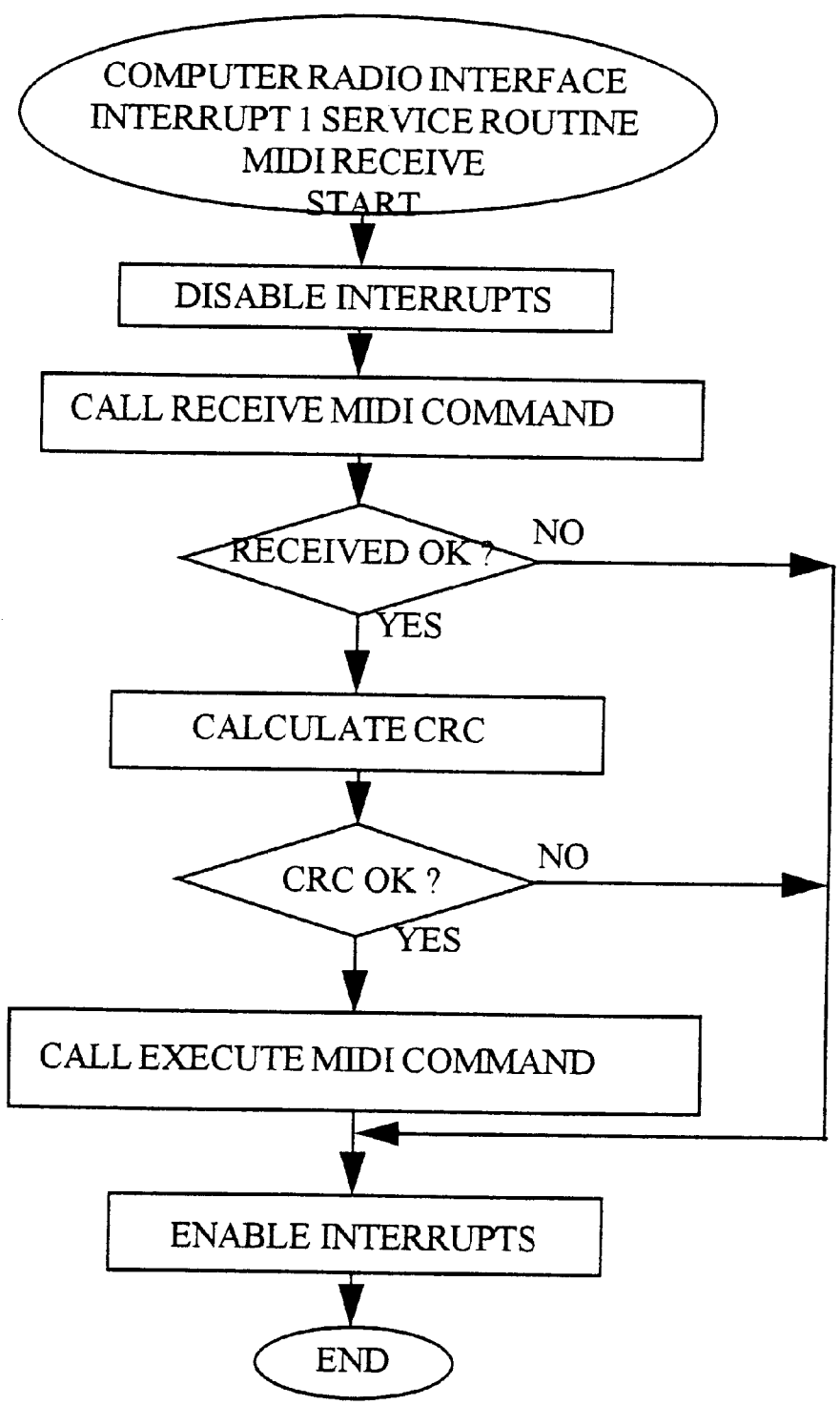
Figure 9E:
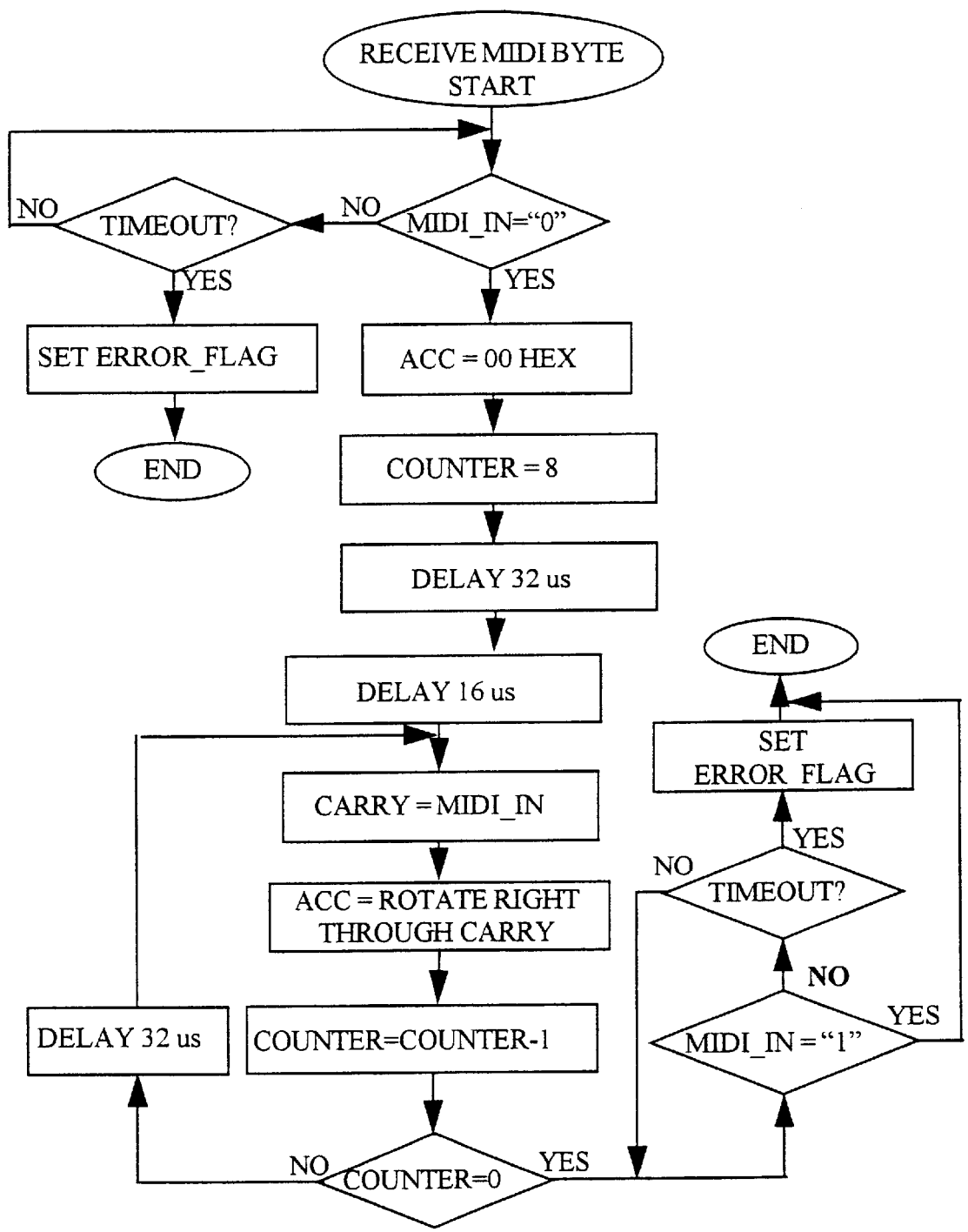
Figure 9F:
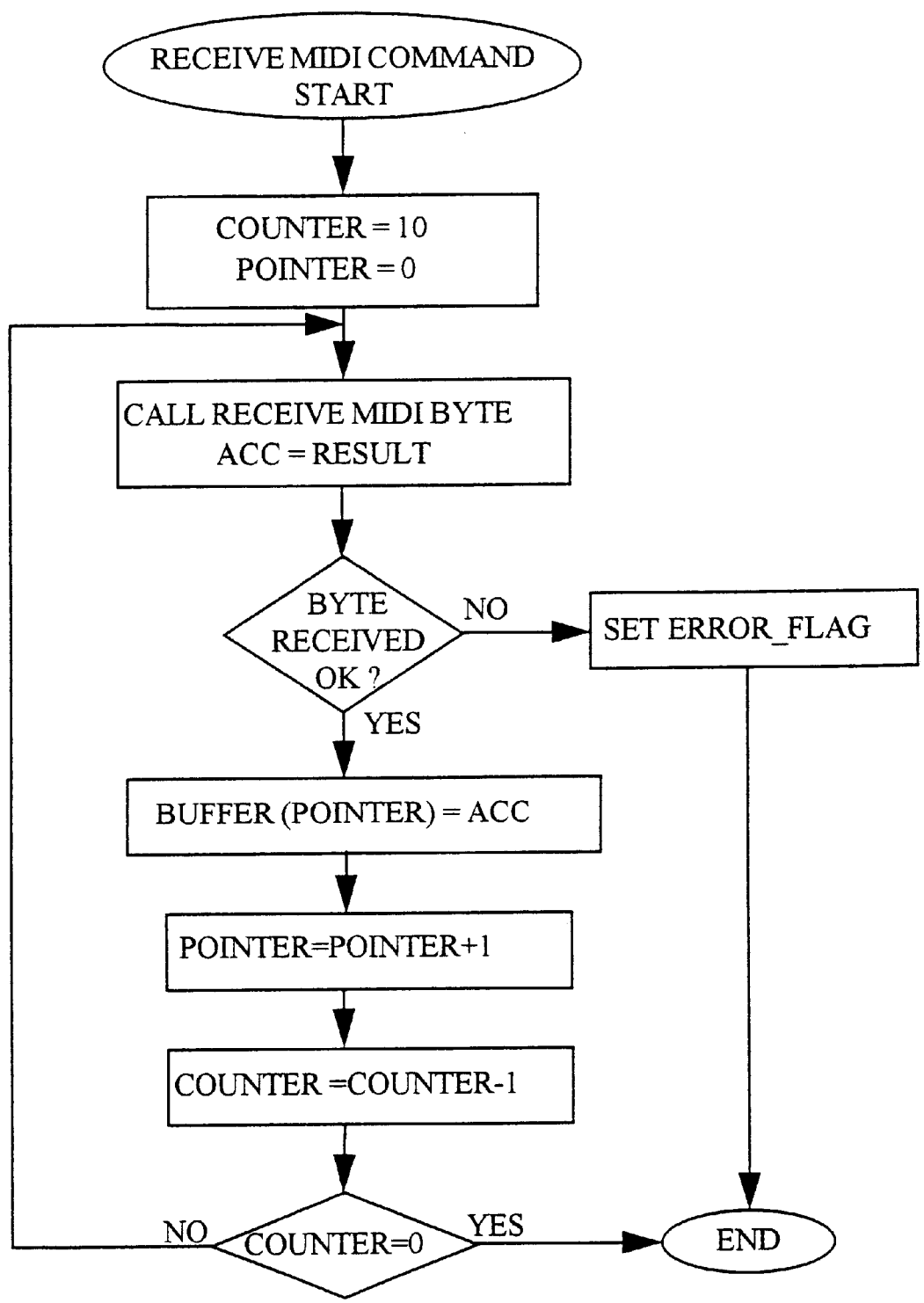
Figure 9G:
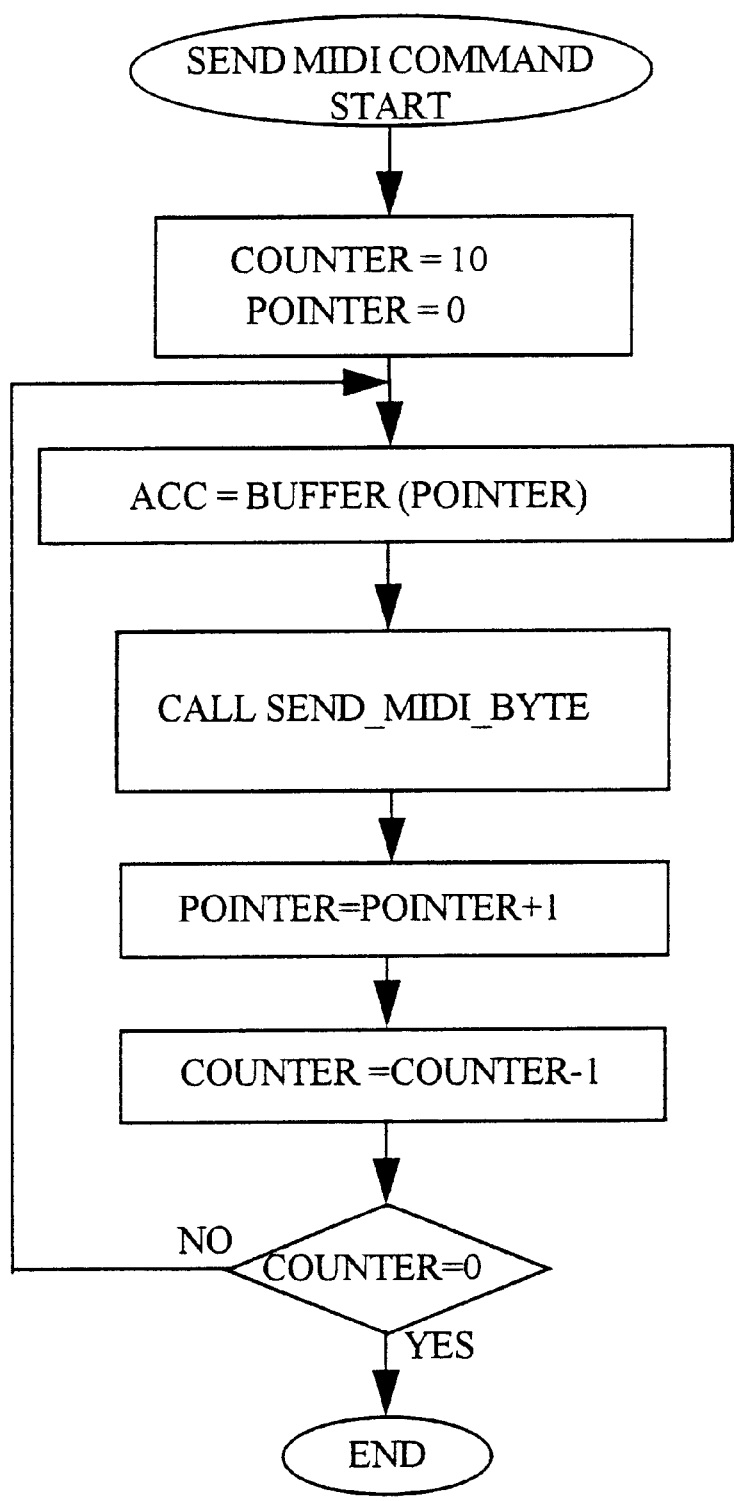
Figure 9H:
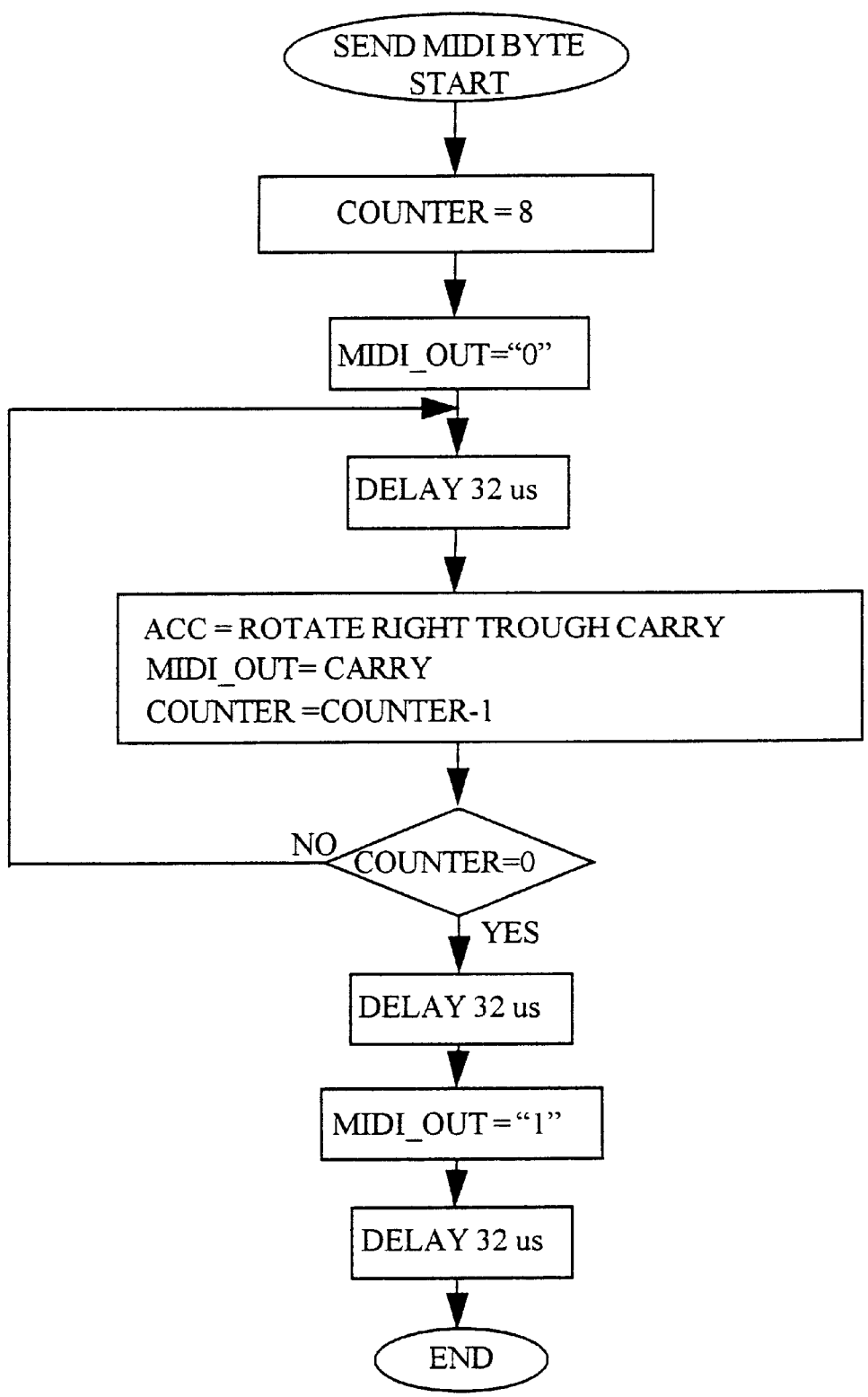
Figure 9I:
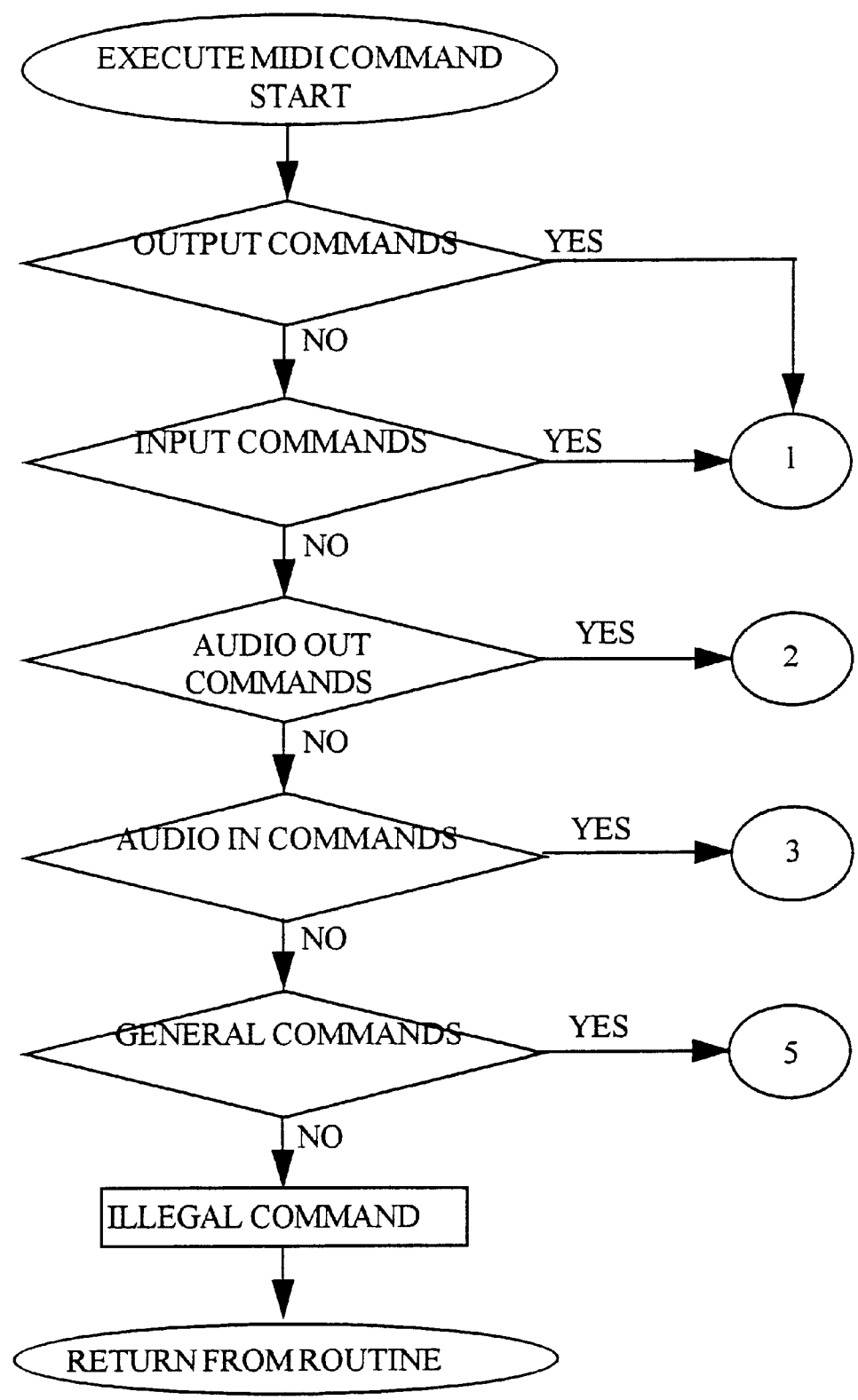
Figure 9J:
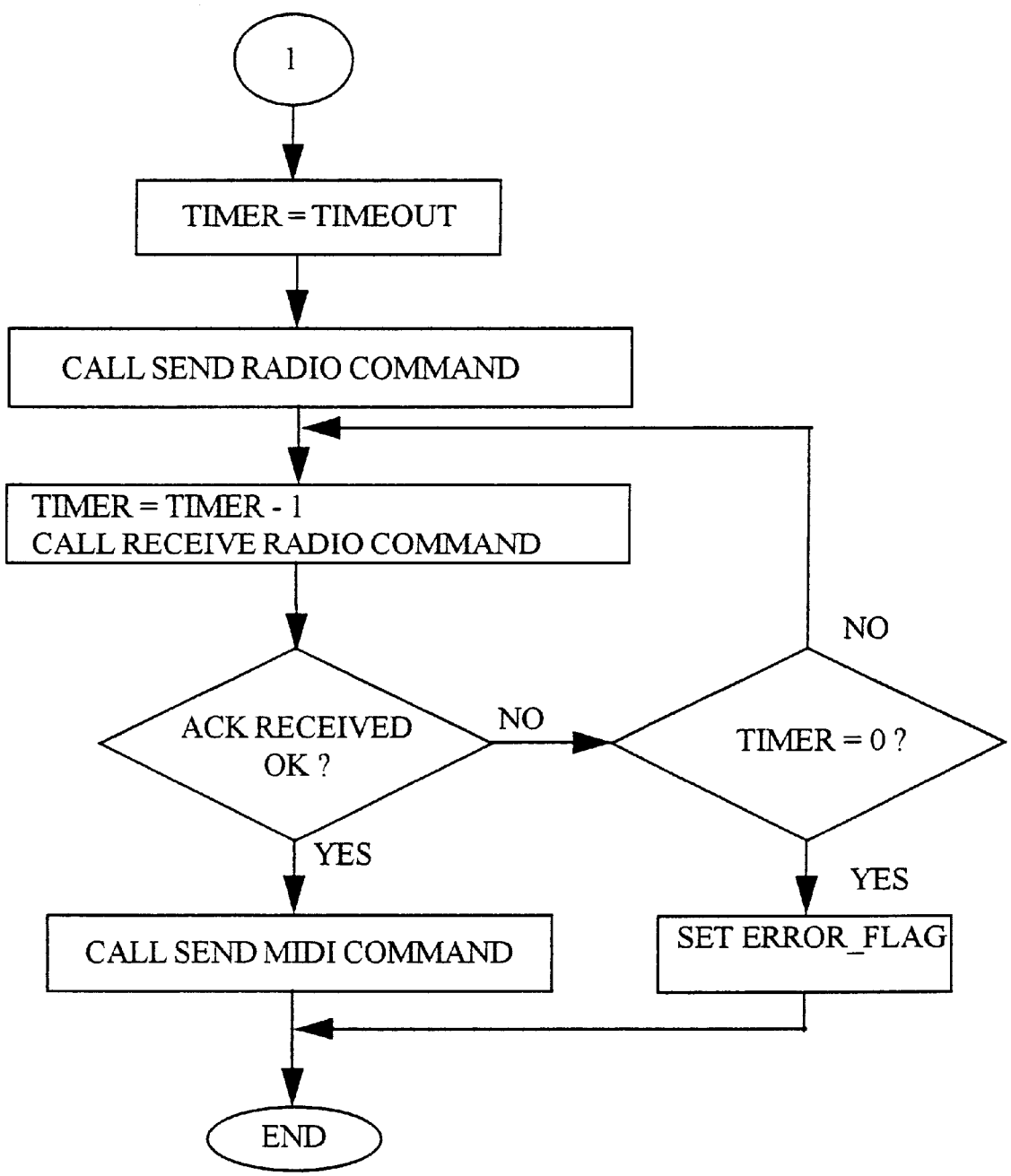
Figure 9K:
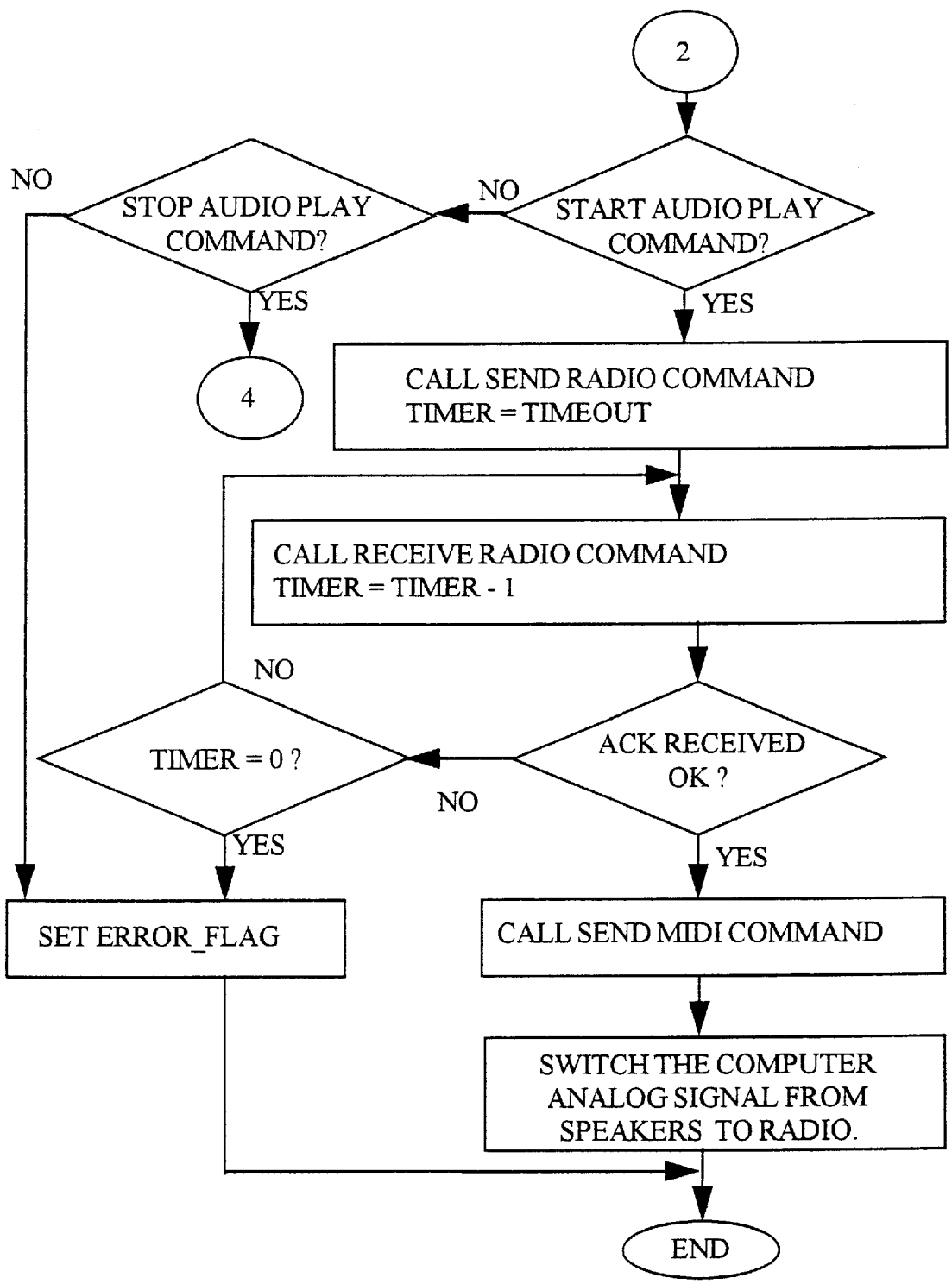
Figure 9L:
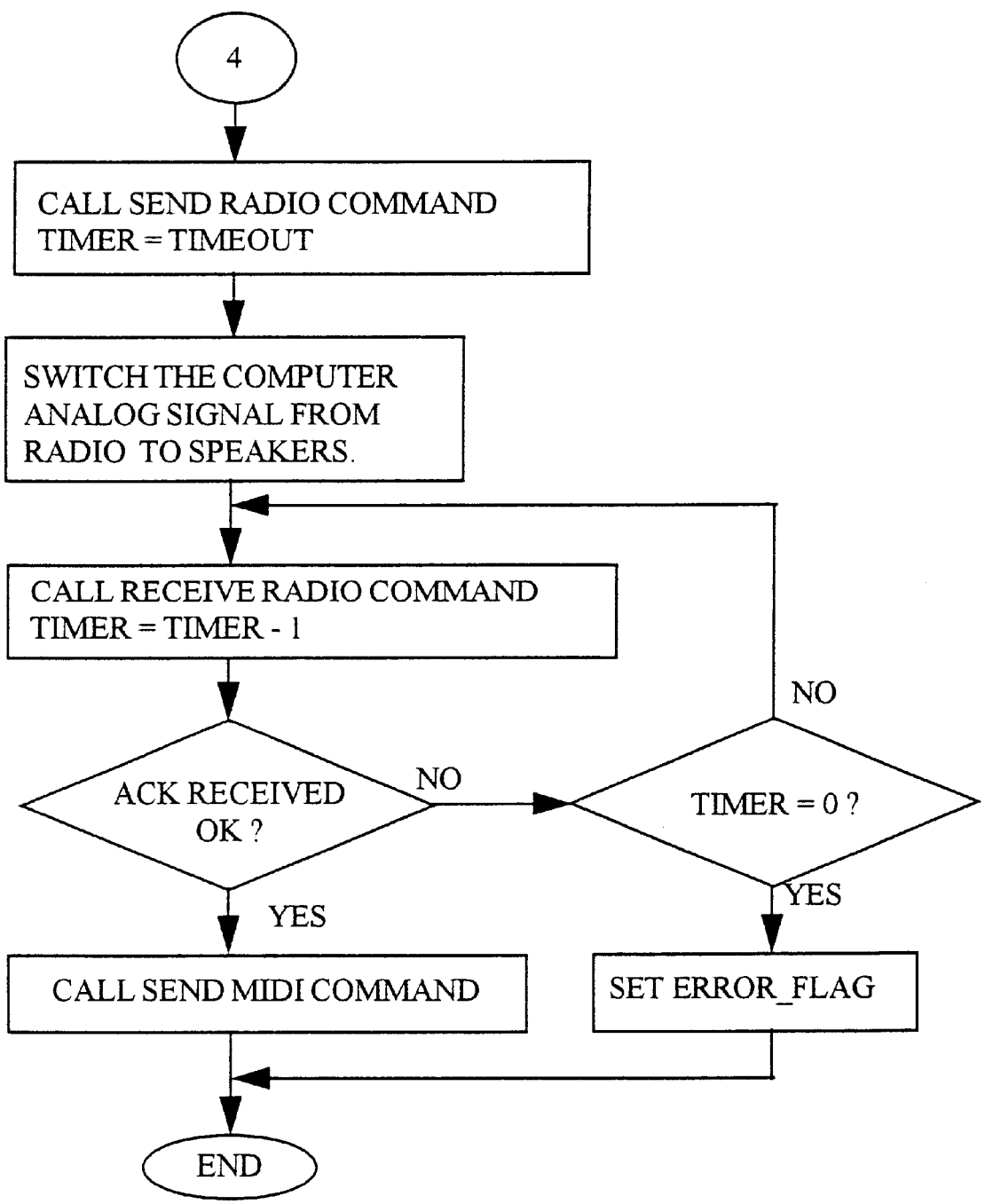
Figure 9M:
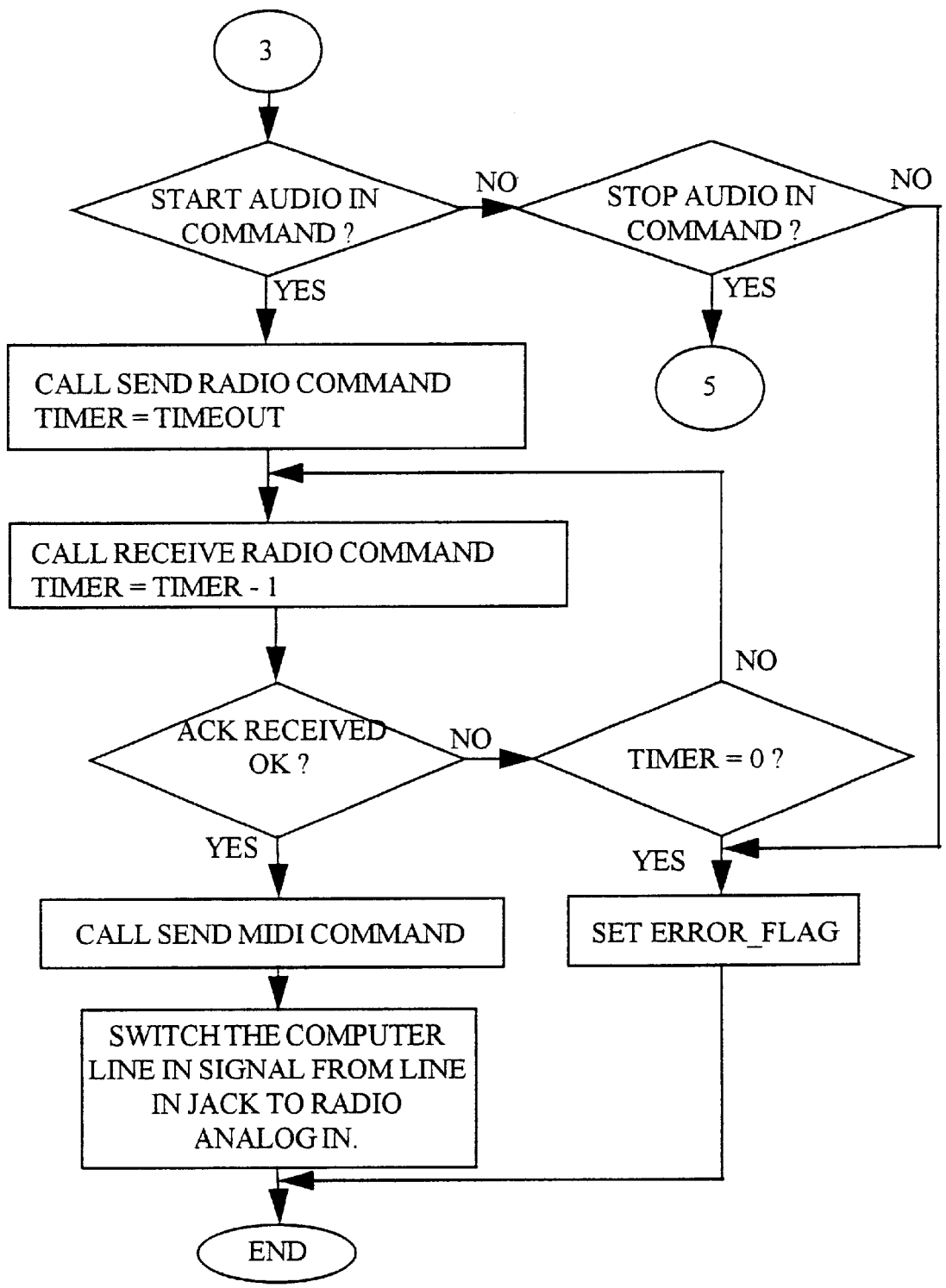

Reference is now made to FIG. 9A, which is a simplified flowchart illustration of a preferred method for receiving MIDI signals, receiving radio signals, executing commands comprised therein, sending radio signals, and sending MIDI signals, within the computer radio interface 110 of FIG. 1A. Some of the steps of FIG. 9A are identical to steps of FIG. 8A, described above. FIG. 9A also preferably comprises the following steps:

A MIDI command is received from the computer 100 (step 430). The MIDI command may comprise a command intended to be transmitted to the toy control device 130, may comprise an audio in or audio out command, or may comprise a general command.

A MIDI command is sent to the computer 100 (step 440). The MIDI command may comprise a signal received from the toy control device 130, may comprise a response to a MIDI command previously received by the computer radio interface 110 from the computer 100, or may comprise a general command.

The command contained in the MIDI command or in the received signal is executed (step 450). Executing the command may comprise, in the case of a received signal, reporting the command to the computer 100, whereupon the computer 100 may typically carry out any appropriate action under program control as, for example, changing a screen display or taking any other appropriate action in response to the received command. In the case of a MIDI command received from the computer 100, executing the command may comprise transmitting the command to the toy control device 130. Executing a MDI command may also comprise switching audio output of the computer control device 110 between the secondary audio interface 230 and the radio transceiver 260. Normally the secondary audio interface 230 is directly connected to the audio interface 220 preserving the connection between the computer sound board and the peripheral audio devices such as speakers, microphone and stereo system.

Reference is now made to FIGS. 9B–9N, and additionally reference is made back to FIGS. 8D–8M, all of which, taken together, comprise a simplified flowchart illustration of a preferred implementation of the method of FIG. 9A. The method of FIGS. 9B–9M, taken together with FIGS. 8D–8M, is self-explanatory.

Figure 10A:
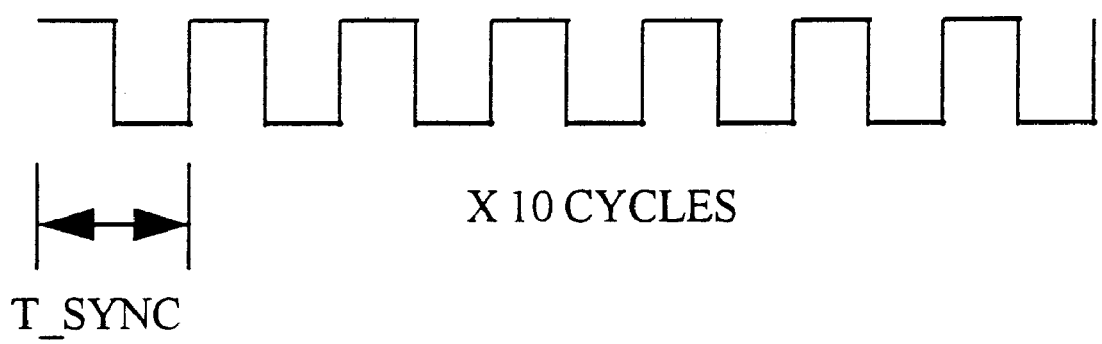
FIGS. 10A–10C are simplified pictorial illustrations of a signal transmitted between the computer radio interface 110 and the toy control device 130 of FIG. 1A.
Figure 10B:
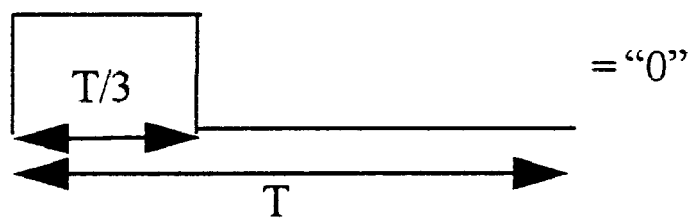
Figure 10C:
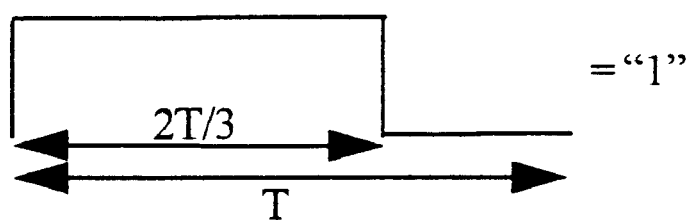

Reference is now additionally made to FIGS. 10A–10C, which are simplified pictorial illustrations of a signal transmitted between the computer radio interface 110 and the toy control device 130 of FIG. 1A. FIG. 10A comprises a synchronization preamble. The duration T_SYNC of the synchronization preamble is preferably 0.500 millisecond, being preferably substantially equally divided into on and off components.

FIG. 10B comprises a signal representing a bit with value 0, while FIG. 10C comprises a signal representing a bit with value 1.

It is appreciated that FIGS. 10B and 10C refer to the case where the apparatus of FIG. 5D is used. In the case of the apparatus of FIG. 5E, functionality corresponding to that depicted in FIGS. 10B and 10C is provided within the apparatus of FIG. 5E.

Preferably, each bit is assigned a predetermined duration T, which is the same for every bit. A frequency modulated carrier is transmitted, using the method of frequency modulation keying as is well known in the art. An "off" signal (typically less than 0.7 Volts) presented at termination 5 of U2 in FIG. 5D causes a transmission at a frequency below the median channel frequency. An "on" signal (typically over 2.3 Volts) presented at pin 5 of U2 in FIG. 5D causes a transmission at a frequency above the median frequency. These signals are received by the corresponding receiver U1. Output signal from pin 6 of U1 is fed to the comparator 280 of FIGS. 4 and 6 that is operative to determine whether the received signal is "off" or "on", respectively.

It is also possible to use the comparator that is contained within U1 by connecting pin 7 of U1 of FIG. 5D, through pin 6 of the connector J1 of FIG. 5D, pin 6 of connector J1 of FIG. 5A, through the jumper to pin 12 of U1 of FIG. 5A.

Preferably, receipt of an on signal or spike of duration less than 0.01 * T is ignored. Receipt of an on signal as shown in FIG. 10B, of duration between 0.01*T and 0.40*T is preferably taken to be a bit with value 0. Receipt of an on signal as shown in FIG. 10C, of duration greater than 0.40*T is preferably taken to be a bit with value 1. Typically, T has a value of 1.0 millisecond.

Furthermore, after receipt of an on signal, the duration of the subsequent off signal is measured. The sum of the durations of the on signal and the off signal must be between 0.90 T and 1.10 T for the bit to be considered valid. Otherwise, the bit is considered invalid and is ignored.

Figure 11:
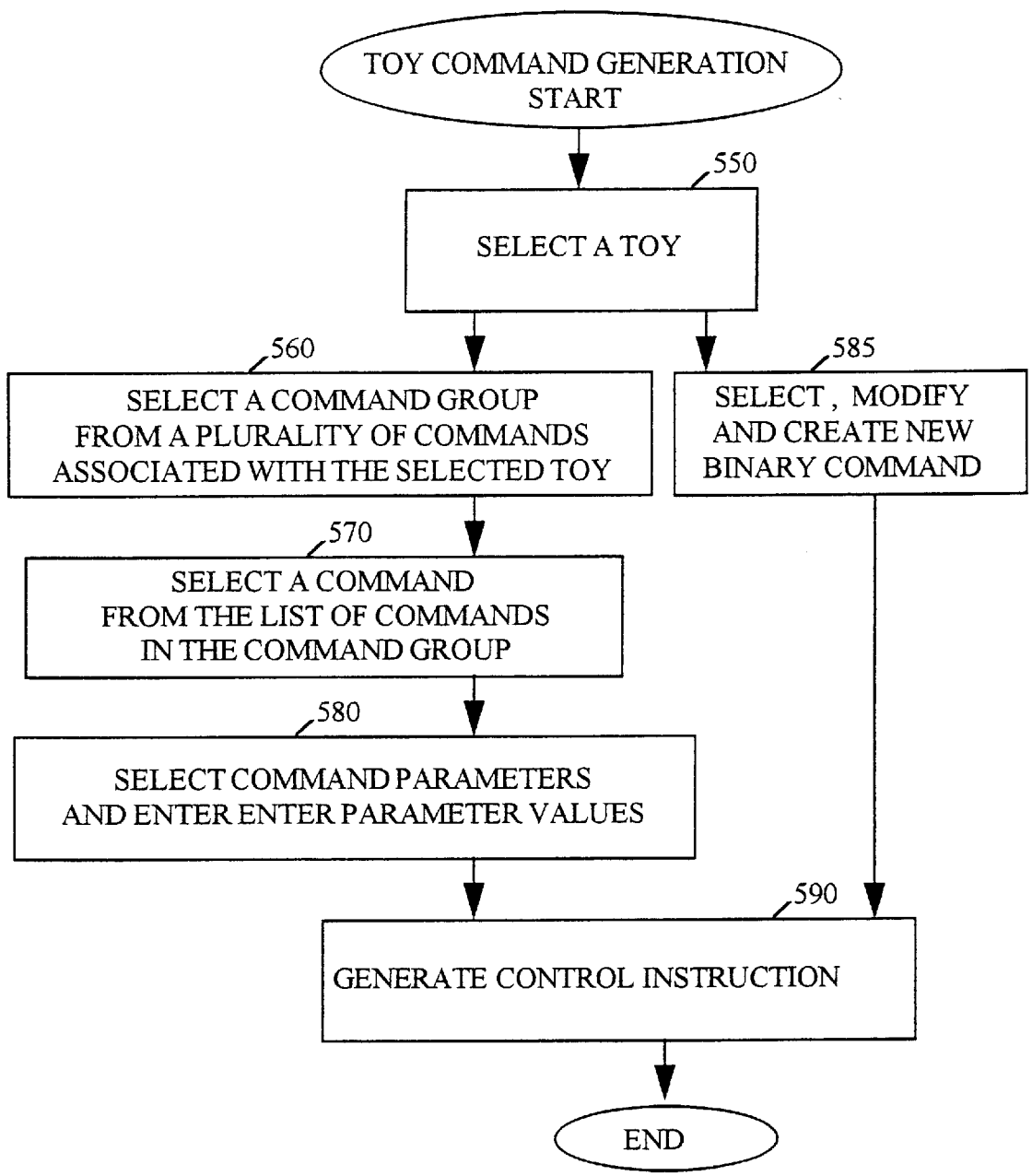

Reference is now made to FIG. 11, which is a simplified flowchart illustration of a method for generating control instructions for the apparatus of FIG. 1A. The method of FIG. 11 preferably includes the following steps:

A toy is selected (step 550). At least one command is selected, preferably from a plurality of commands associated with the selected toy (steps 560–580). Alternatively, a command may be entered by selecting, modifying, and creating a new binary command (step 585).

Typically, selecting a command in steps 560–580 may include choosing a command and specifying one or more control parameters associated with the command. A control parameter may include, for example, a condition depending on a result of a previous command, the previous command being associated either with the selected toy or with another toy. A control parameter may also include an execution condition governing execution of a command such as, for example: a condition stating that a specified output is to occur based on a status of the toy, that is, if and only if a specified input is received; a condition stating that the command is to be performed at a specified time; a condition stating that performance of the command is to cease at a specified time; a condition comprising a command modifier modifying execution of the command, such as, for example, to terminate execution of the command in a case where execution of the command continues over a period of time; a condition dependent on the occurrence of a future event; or another condition.

The command may comprise a command to cancel a previous command.

The output of the method of FIG. 11 typically comprises one or more control instructions implementing the specified command, generated in step 590. Typically, the one or more control instructions are comprised in a command file. Typically, the command file is called from a driver program which typically determines which command is to be executed at a given point in time and then calls the command file associated with the given command.

Figure 12A:
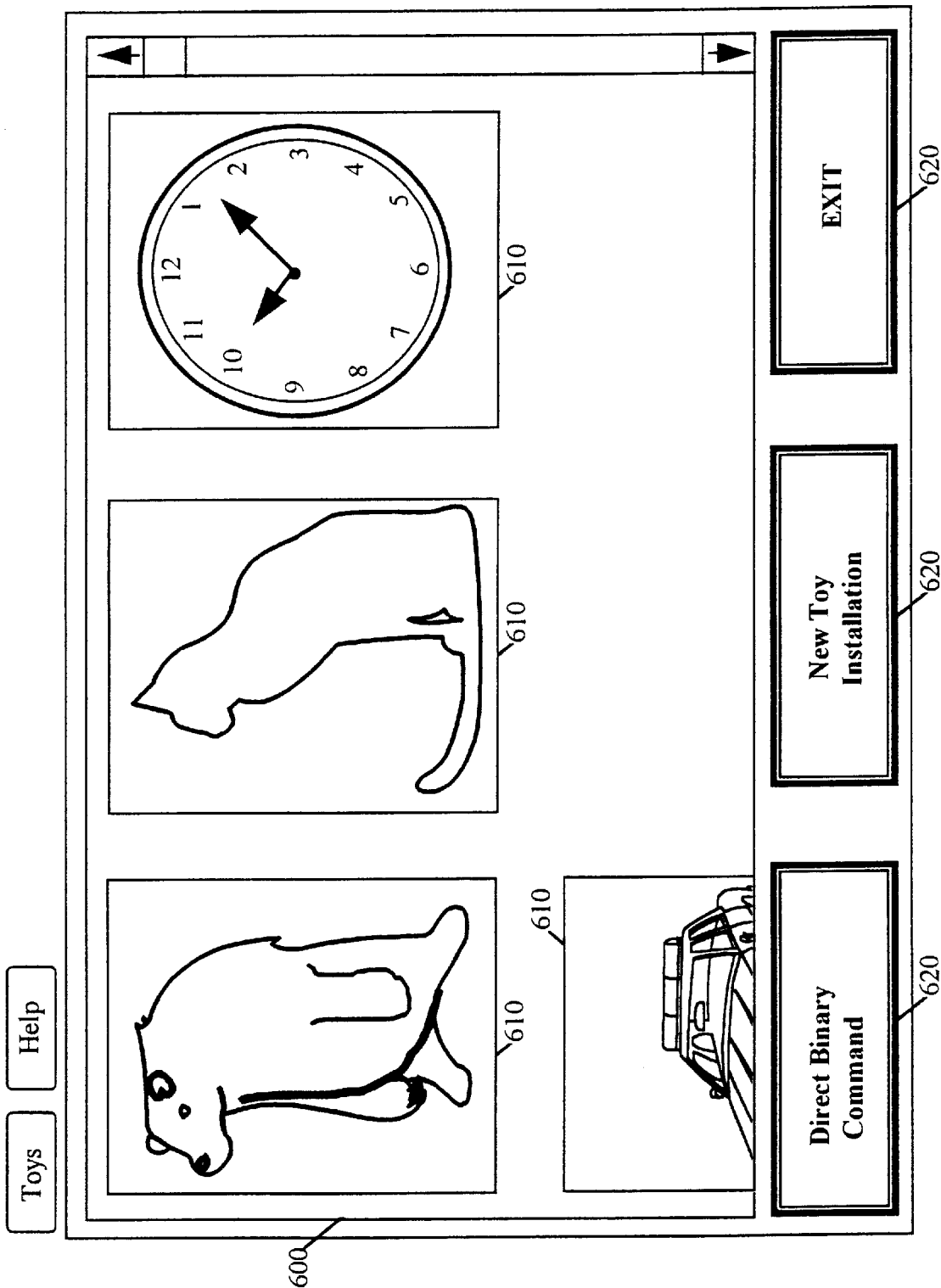
FIGS. 12A–12C are pictorial illustrations of a preferred implementation of a graphical user interface implementation of the method of FIG. 11.
Figure 12B:
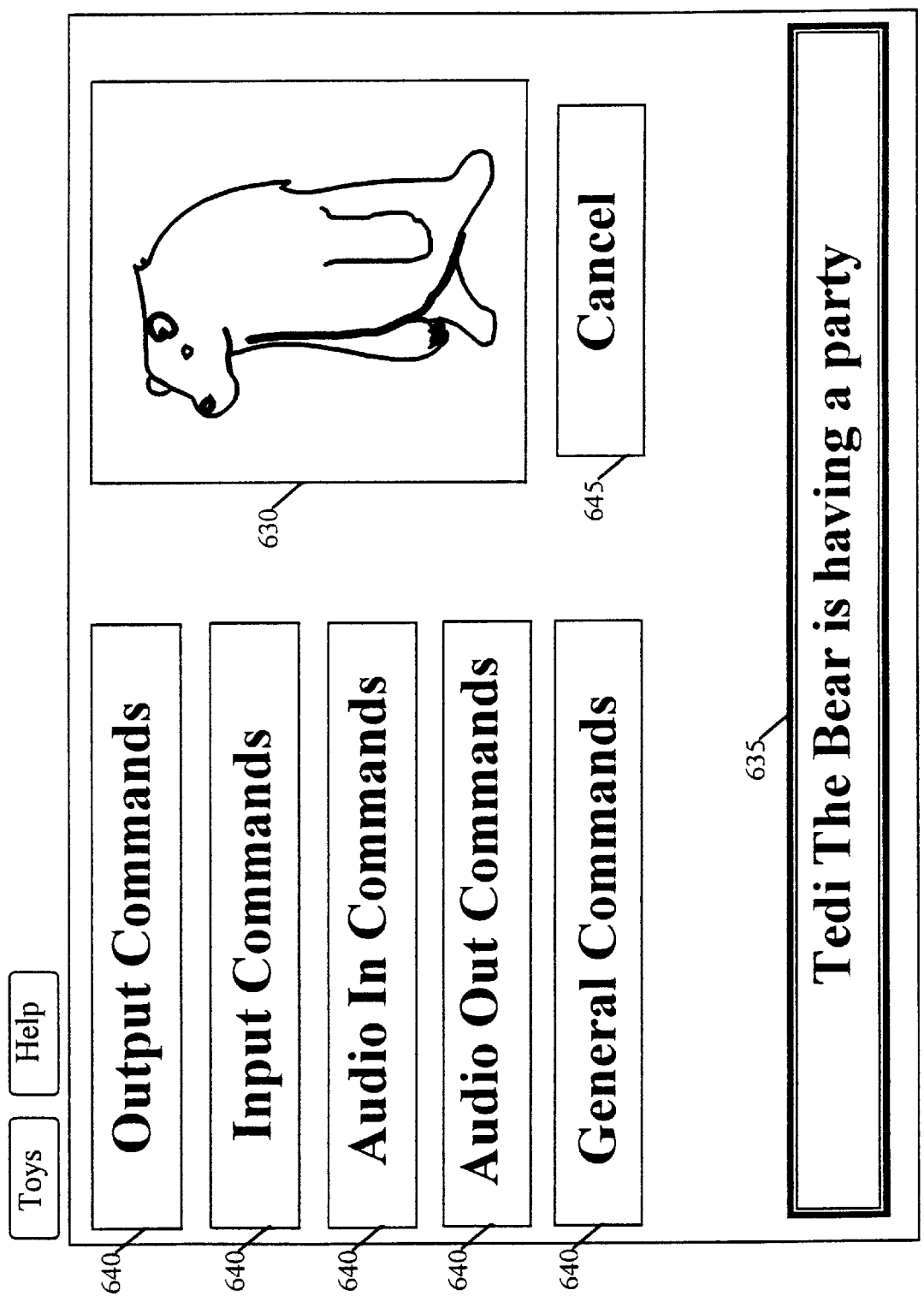
Figure 12C:
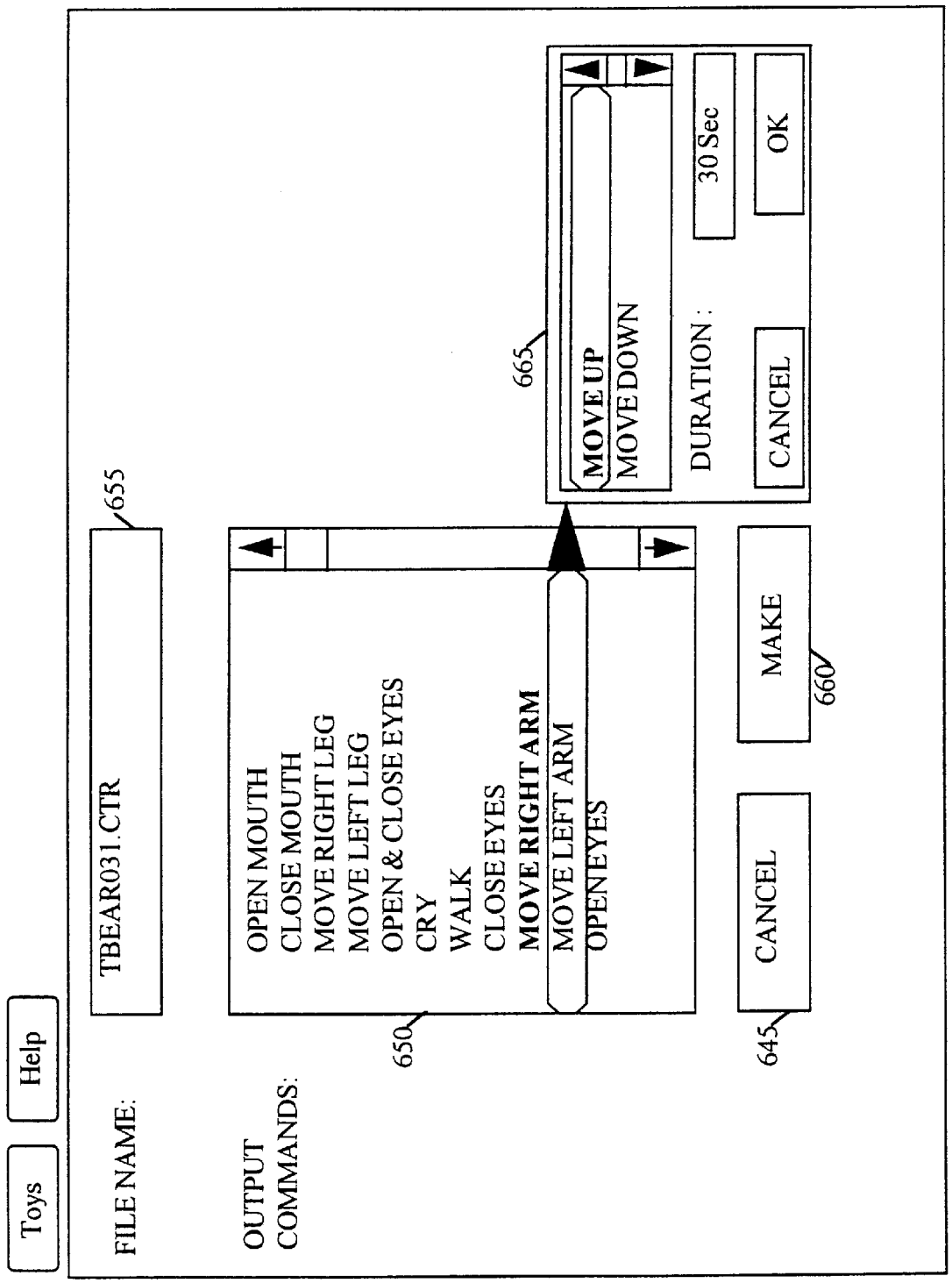

Preferably, a user of the method of FIG. 11 performs steps 550 and 560 using a computer having a graphical user interface. Reference is now made to FIGS. 12A–12C, which are pictorial illustrations of a preferred embodiment of a graphical user interface implementation of the method of FIG. 11.

FIG. 12A comprises a toy selection area 600, comprising a plurality of toy selection icons 610, each depicting a toy. The user of the graphical user interface of FIGS. 12A–12C typically selects one of the toy selection icons 610, indicating that a command is to be specified for the selected toy.

FIG. 12A also typically comprises action buttons 620, typically comprising one or more of the following:

a button allowing the user, typically an expert user, to enter a direct binary command implementing an advanced or particularly complex command not otherwise available through the graphical user interface of FIGS. 12A–12C;

a button allowing the user to install a new toy, thus adding a new toy selection icon 610; and a button allowing the user to exit the graphical user interface of FIGS. 12A–12C.

FIG. 12B depicts a command generator screen typically displayed after the user has selected one of the toy selection icons 610 of FIG. 12A. FIG. 12B comprises an animation area 630, preferably comprising a depiction of the selected toy selection icon 610, and a text area 635 comprising text describing the selected toy.

FIG. 12B also comprises a plurality of command category buttons 640, each of which allow the user to select a category of commands such as, for example: output commands; input commands; audio in commands; audio out commands; and general commands.

FIG. 12B also comprises a cancel button 645 to cancel command selection and return to the screen of FIG. 12A.

FIG. 12C comprises a command selection area 650, allowing the user to specify a specific command. A wide variety of commands may be specified, and the commands shown in FIG. 12C are shown by way of example only.

FIG. 12C also comprises a file name area 655, in which the user may specify the name of the file which is to receive the generated control instructions. FIG. 12C also comprises a cancel button 645, similar to the cancel button 645 of FIG. 12B. FIG. 12C also comprises a make button 660. When the user actuates the make button 660, the control instruction generator of FIG. 11 generates control instructions implementing the chosen command for the chosen toy, and writes the control instructions to the specified file.

FIG. 12C also comprises a parameter selection area 665, in which the user may specify a parameter associated with the chosen command.

Reference is now made to Appendix A, which is a computer listing of a preferred software implementation of the method of FIGS. 8A–8T.

Appendix A is an INTEL hex format file. The data bytes start from character number 9 in each line. Each byte is represented by 2 characters. The last byte (2 characters) in each line, should be ignored.

For example, for a sample line:

| | |
|---|---|
| The original line reads: | 070000000201000020320329F |
| The data bytes: | 02010002032032 (02,01,00,02,03,20,32) |
| Starting address of the data bytes: | 0000 (00,00) |

Appendix A may be programmed into the memory of microcontroller 250 of FIG. 6.

Figure 9N:
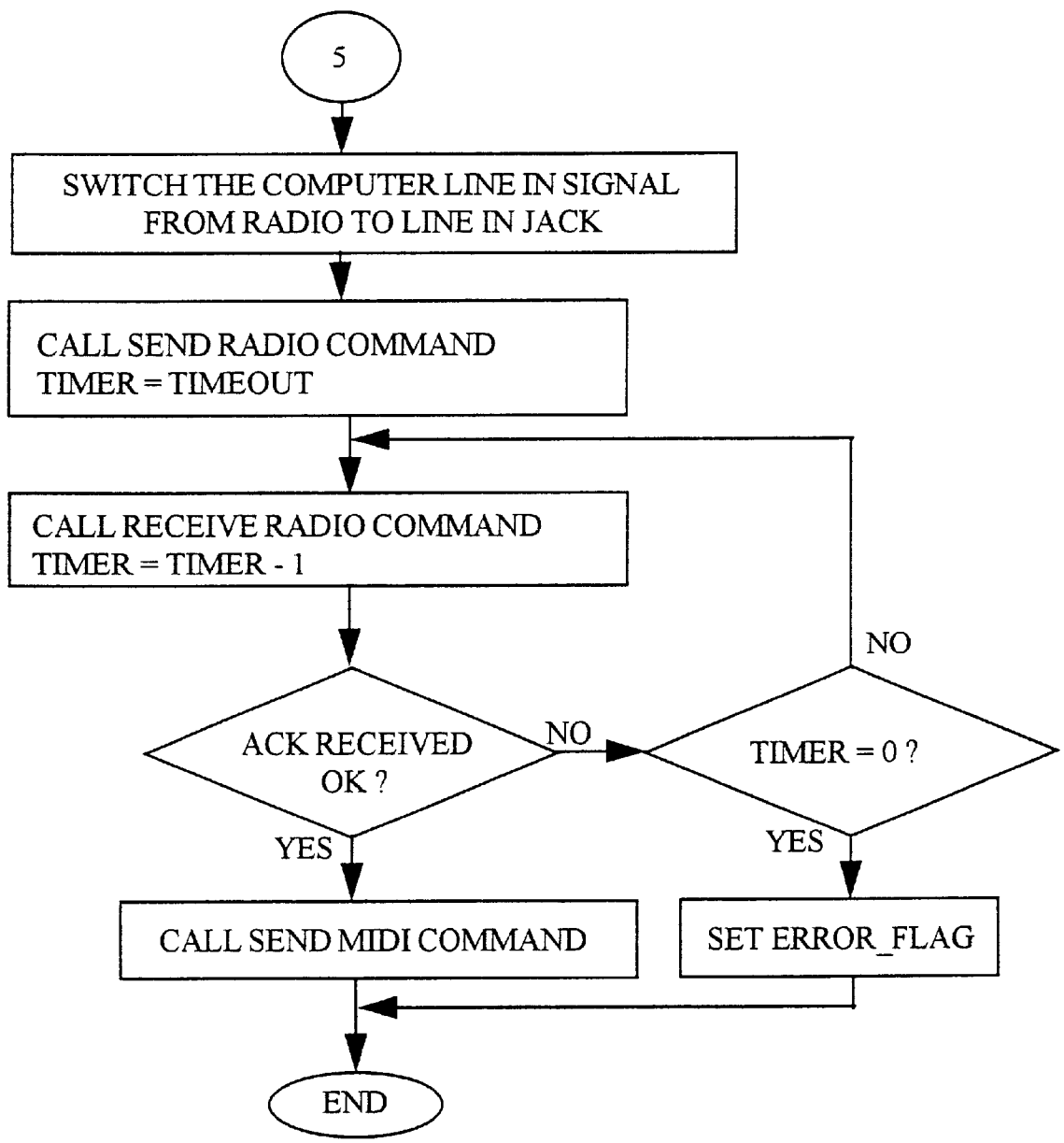

Appendix B is a computer listing of a preferred software implementation of the method of FIGS. 9A–9N, together with the method of FIGS. 8D–8M.

Appendix B is an INTEL hex format file. The data bytes start from character number 9 in each line. Each byte is represented by 2 characters. The last byte (2 characters) in each line, should be ignored.

For example, for a sample line:

| | |
|---|---|
| The original line reads: | 070000000201000205A73216 |
| The data bytes: | 0201000205A732 (02,01,00,02,05,A7,32) |
| Starting address of the data bytes: | 0000 (00,00) |

Appendix B may be programmed into the memory of microcontroller 250 of FIG. 4.

Appendix C is a computer listing of a preferred software implementation of an example of a computer game for use in the computer 100 of FIG. 1.

Appendix D is a computer listing of a preferred software implementation of the method of FIGS. 11 and FIGS. 12A–12C.

For Appendices C and D, these programs were developed using VISUAL BASIC. To run the programs you need to install the VISUAL BASIC environment first. The application needs a Visual Basic custom control for performing MIDI I/O similar to the one called MIDIVBX. VBX. VISUAL BASIC is manufactured by Microsoft Corporation, One Microsoft Way, Redmond, Wash. 98052-6399, USA. MIDIVBX.VBX is available from Wayne Radinsky, electronic mail address a-wayner@microsoft.com.

The steps for programming the microcontrollers of the present invention include the use of a universal programmer, such as the Universal Programmer, type EXPRO 60/80, manufactured by Sunshine Electronics Co. Ltd., Taipei, Japan.

The method for programming the microcontrollers with the data of Appendices A and B, includes the following steps:

1. Run the program EXPRO.EXE, which is provided with the EXPRO 60/80".
2. Choose from the main menu the EDIT/VIEW option.
3. Choose the EDIT BUFFER option.
4. Enter the string E 0000.
5. Enter the relevant data (given in Appendices A or B), byte after byte, starting from the address 0000. In each line there is a new starting address for each data byte which appears in this line.
6. Press ESC.
7. Enter the letter Q.
8. Choose from the main menu the DEVICE option.
9. Choose the MPU/MCU option.
10. Choose the INTEL option.
11. Choose the 87C51.
12. Choose from the main menu the RUNFUNC option.
13. Choose the PROGRAM option. 14. Place the 87C51 chip in the programmer's socket.
15. Enter Y and wait until the OK message.
16. The chip is now ready to be installed in the board.

The method for creating the relevant files for the computer 100, with the data of Appendices C and D, includes using a HEX EDITOR which is able to edit DOS formatted files. A typical HEX and ASCII editor is manufactured by Martin Doppelbauer, Am Spoerkel 17, 44227 Dortmund, Germany, UET401 at electronic mail address hrz.unidozr.uni-dortmund.de.

The steps necessary for creating the files by means of a HEX editor, such as by the Martin Doppelbauer editor include the following:

1. Copy any DOS file to a new file with the desired name and with the extension .EXE. (For example, write COPY AUTOEXEC.BAT TOY1.EXE).
2. Run the program ME.EXE.
3. From the main menu press the letter L (load file).
4. Write the main menu of the new file (for example TOY1.EXE).
5. From the main menu, press the letter (insert).
6. Enter the relevant data (written in Appendices C or D), byte after byte, starting from the address 0000.
7. Press ESC.
8. From the main menu, enter the letter W(write file).
9. Press the RETURN key and exit from the editor by pressing the letter Q.

The above-described embodiment of FIG. 1C includes a description of a preferred set of predefined messages including a category termed "General commands". Other General Commands are defined by the following description:

| MULTIPORT COMMANDS | | | | | | | | | |
|---|---|---|---|---|---|---|---|---|---|
| AVAILABILITY_INTERROGATION_COMMAND | | | | | | | | | |
| byte 0 | byte 1 | byte 2 | byte 3 | byte 4 | byte 5 | byte 6 | byte 7 | byte 8 | byte 9 |
| Head | PC add | Unit # A-sb | Unit # B-sb | Unit # C-sb | CMD msb | CMD lsb | 8 bits | 8 bits | 8 bits | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 04 | 05 | 00 / 00 | 00 / 00 | x / x | |

A computer transmits this command to verify that the radio channel is vacant. If another computer is already using this channel it will respond with the Availability Response Command. If no response is received within 250 msec the channel is deemed vacant.
P:     Computer address     00–03 H
A:     unit address -     00–FF H

| AVAILABILITY_RESPONSE_COMMAND | | | | | | | | | |
|---|---|---|---|---|---|---|---|---|---|
| byte 0 | byte 1 | byte 2 | byte 3 | byte 4 | byte 5 | byte 6 | byte 7 | byte 8 | byte 9 |
| Head | PC add | Unit # A-sb | Unit # B-sb | Unit # C-sb | CMD msb | CMD lsb | 8 bits | 8 bits | 8 bits | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 04 | 06 | 00 / 00 | 00 / 00 | x / x | |

A computer transmits this command in response to an Availability Interrogation Command to announce that the radio channel is in use.
P:     Computer address     00–03 H
A:     unit address -     00–FF H

| TOY_AVAILABILITY_COMMAND | | | | | | | | | |
|---|---|---|---|---|---|---|---|---|---|
| byte 0 | byte 1 | byte 2 | byte 3 | byte 4 | byte 5 | byte 6 | byte 7 | byte 8 | byte 9 |
| Head | PC add | Unit # A-sb | Unit # B-sb | Unit # C-sb | CMD msb | CMD lsb | 8 bits | 8 bits | 8 bits | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 04 | 07 | 00 / 00 | 00 / 00 | x / x | |

A Toy transmits this command to declare its existence and receive in response a Channel Pair Selection Command designating the computer that will control it and the radio channels to use.
P:     Computer address     00–03 H
A:     unit address -     00–FF H

| CHANNEL_PAIR_SELECTION_COMMAND | | | | | | | | | |
|---|---|---|---|---|---|---|---|---|---|
| byte 0 | byte 1 | byte 2 | byte 3 | byte 4 | byte 5 | byte 6 | byte 7 | byte 8 | byte 9 |
| Head | PC add | Unit # A-sb | Unit # B-sb | Unit # C-sb | CMD msb | CMD lsb | 8 bits | 8 bits | 8 bits | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 04 | 08 | 00 / 00 | 00 / 00 | x / x | |

Figure 13:
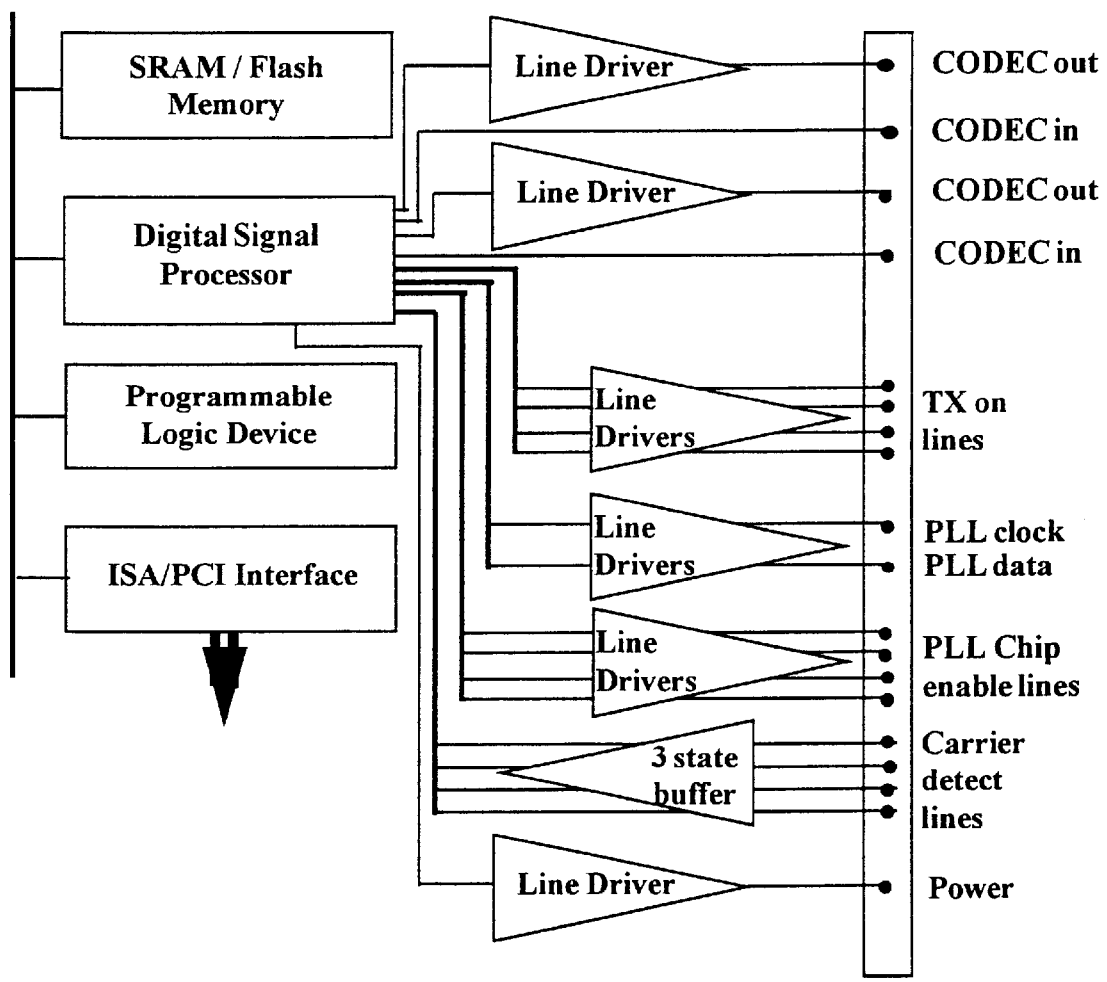
Figure 14:
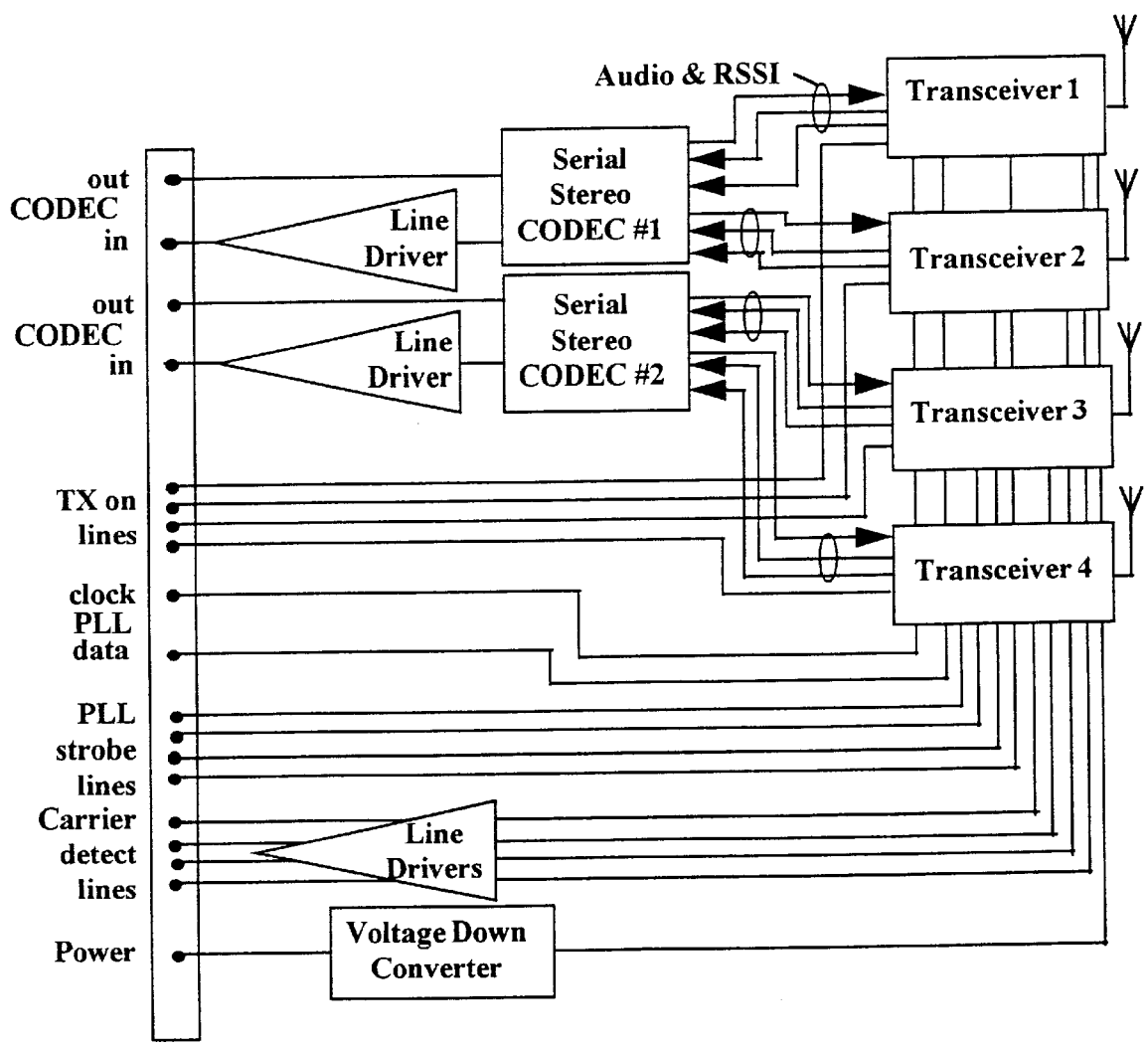
Figure 15A:
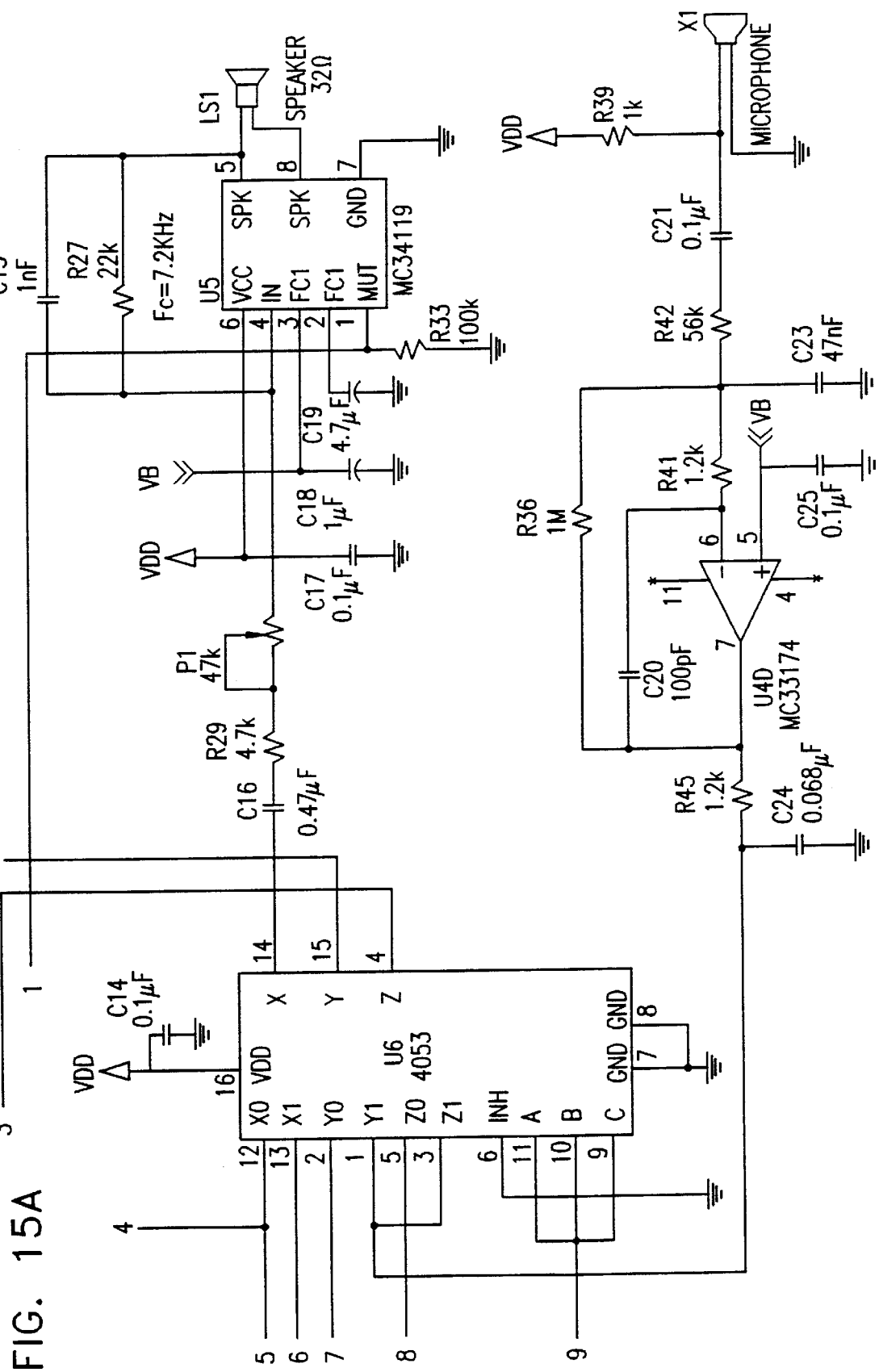
FIGS. 15A–15E, taken together, form a detailed electronic schematic diagram of the toy control device of FIG. 6, suitable for the multi-channel implementation of FIGS. 13 and 14.
Figure 15B:
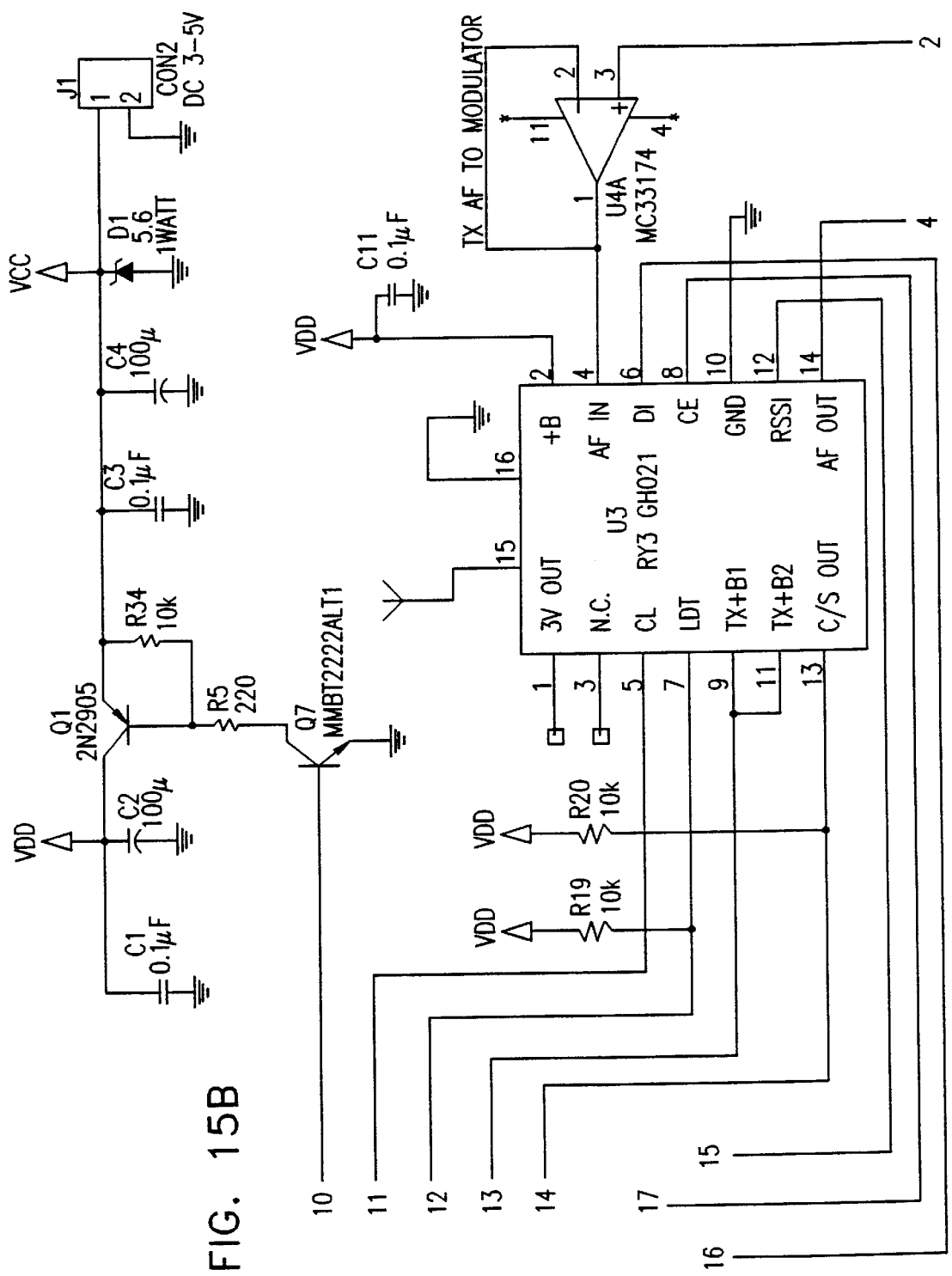
Figure 15C:
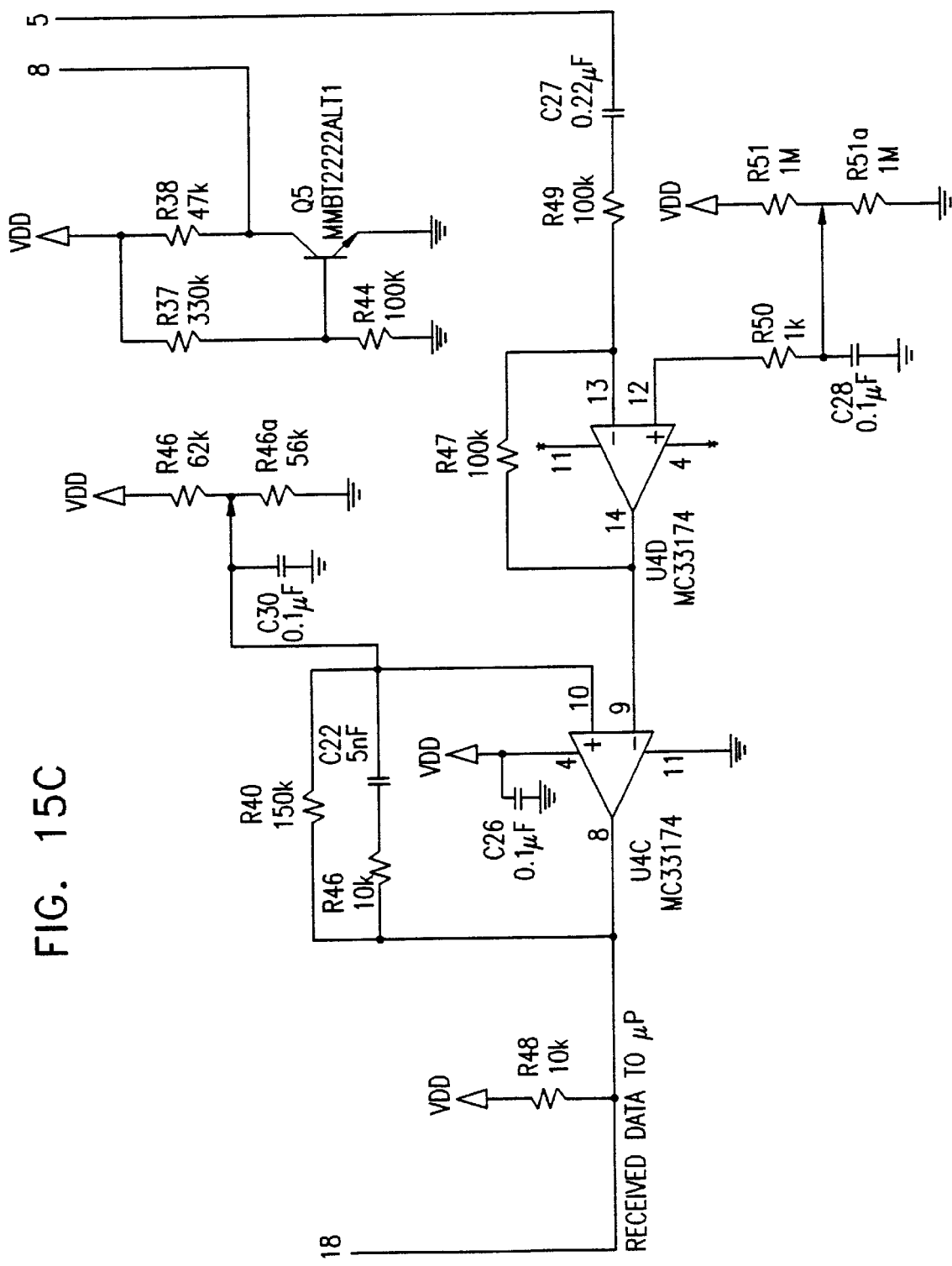
Figure 15D:
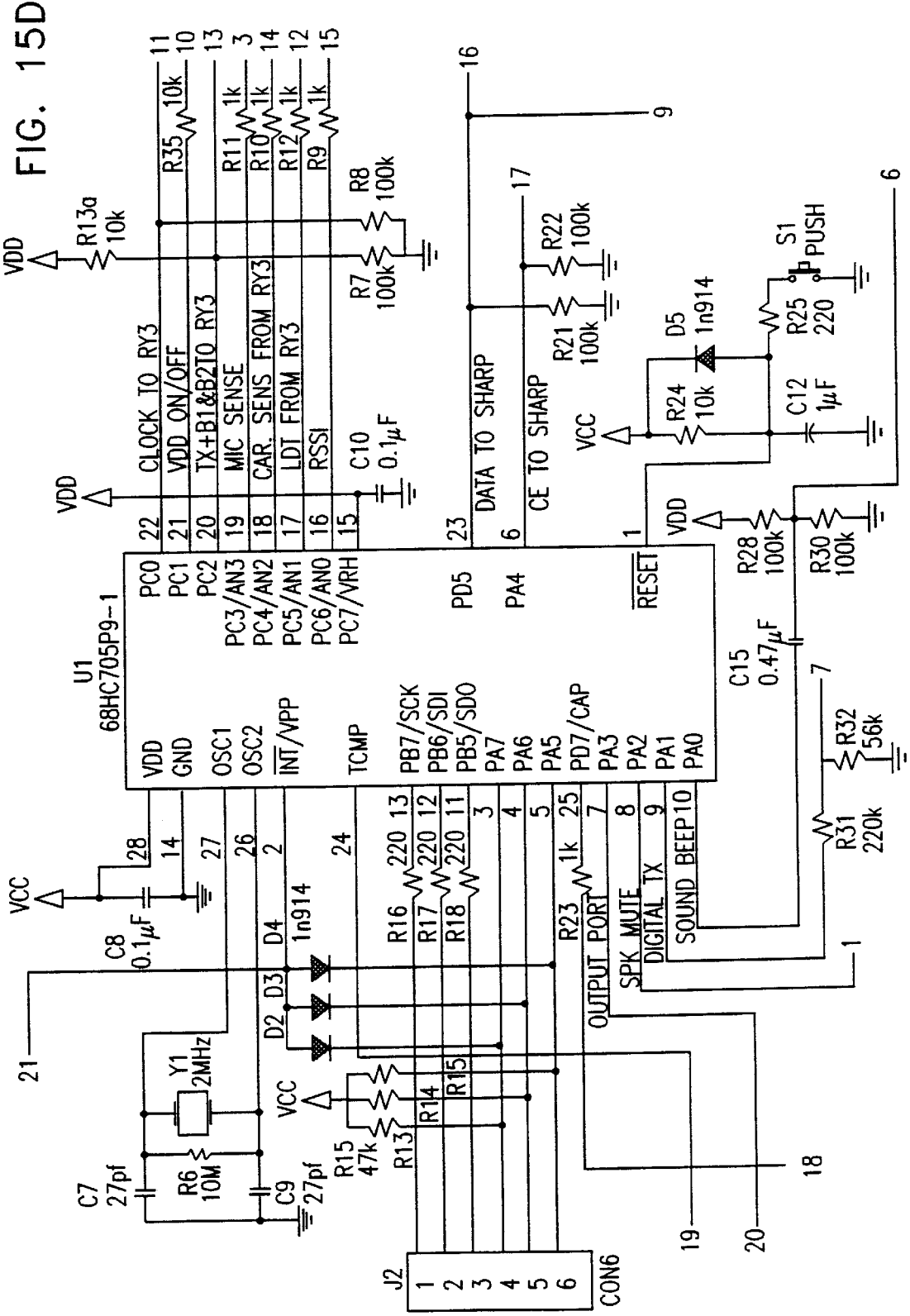
Figure 15E:
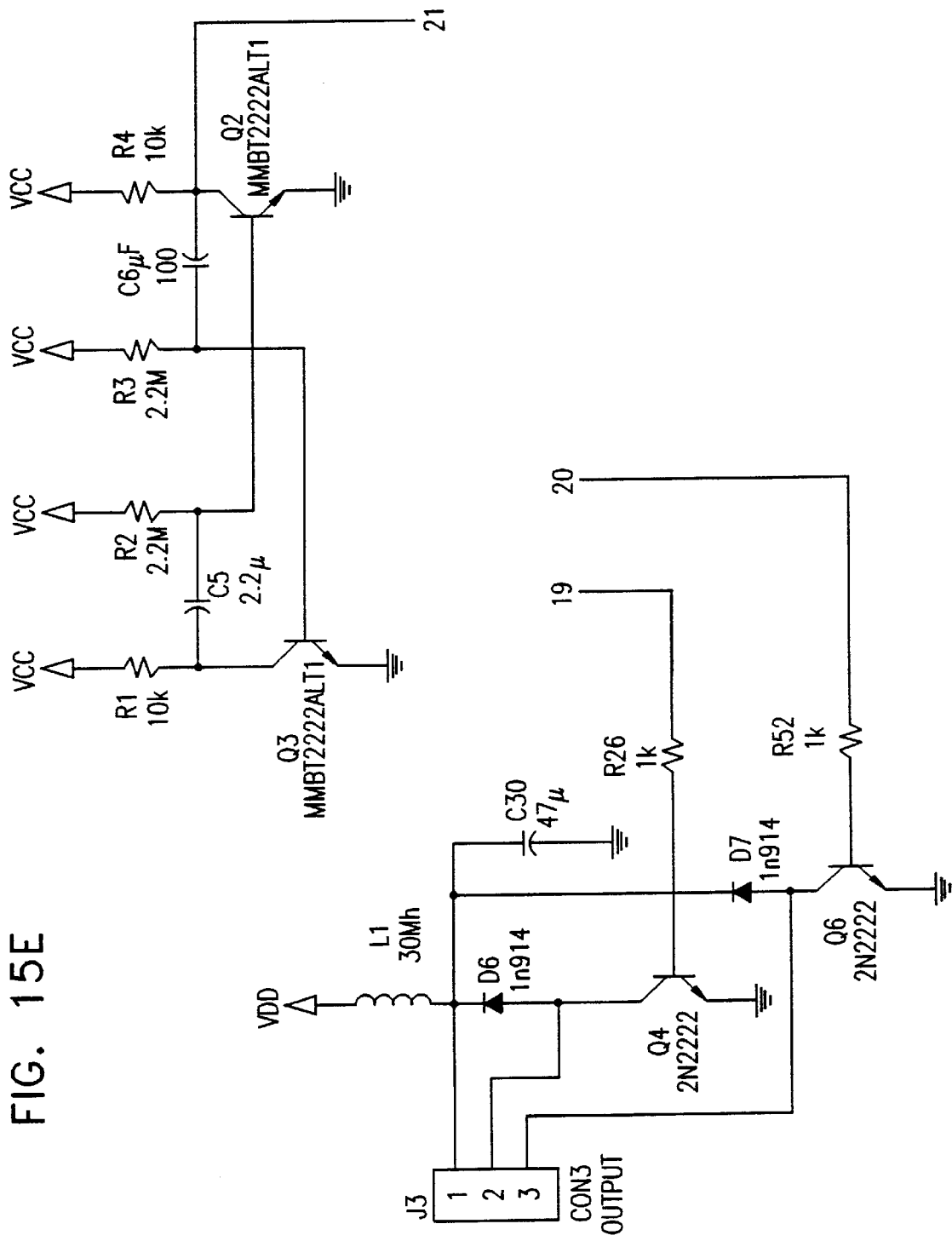

A computer transmits this command in response to a Toy Availability Command to inform the toy the radio channels to be used.
P:     Computer address     00–03 H
A:     unit address -     00–FF H
CR1:     Toy transmit channel     0–F H
CH1:     Toy receive channel     0–F H In FIGS. 13 and 14 there are illustrated block diagrams of multiport multi-channel implementation of the computer radio interface 110 of FIG. 1A. FIG. 13 illustrates the processing subunit of the computer interface that is implemented as an add-in board installed inside a PC. FIG. 14 is the RF transceiver which is a device external to the computer and connects to the processing subunit by means of a cable.

In the present application of the RF unit there are 4 transceivers each capable of utilizing two radio channels simultaneously.

Referring briefly to FIG. 3, it is appreciated that, optionally, both sound and control commands may be transmitted via the MIDI connector 210 rather than transmitting sound commands via the analog connector 220. It is additionally appreciated that the functions of the interfaces 210 and 220 between the computer radio interface 110 and the sound card 190 may, alternatively, be implemented as connections between the computer radio interface 110 to the serial and/or parallel ports of the computer 100, as shown in FIGS. 25A–25F.

If it is desired to provide full duplex communication, each transceiver 260 which forms part of the computer radio interface 110 of FIG. 1A preferably is operative to transmit on a first channel pair and to receive on a different, second channel pair. The transceiver 260 (FIG. 4) which forms part of the toy control device 130 of FIG. 1A preferably is operative to transmit on the second channel and to receive on the first channel.

Any suitable technology may be employed to define at least two channel pairs such as narrow band technology or spread spectrum technologies such as frequency hopping technology or direct sequence technology, as illustrated in FIGS. 15A–15E, showing a Multi-Channel Computer Radio Interface, and in FIGS. 24A–24E showing a Multi-Channel Toy Control Device.

Appendices E–H, taken together, are computer listings from which a first, DLL-compatible, functions library may be constructed. The DLL-compatible functions library may be subsequently used by a suitable computer system such as an IBM PC to generate a variety of games for any of the computer control systems shown and described herein. Alternatively, games may be generated using the applications generator of FIGS. 11–12C.

To generate a DLL (dynamic loading and linking) function library based on Appendices E–H, the following operations are performed:
1) Open Visual C++ 4.0
2) Go to File Menu
3) Choose New from File Menu
4) Choose Project Workspace
5) Choose Dynamic-Link Library
6) The Project Name is: DLL32.MDP
7) Press Create button
8) Go to File Menu
9) Choose New from File Menu
10) Choose Text File
11) Now write the Source
12) Write on the current page a file containing the contents of Appendix E
13) Press the mouse right button and choose: Insert File Into Project
14) Click on DLL32 project
15) On the save dialog write CREATOR.C
16) Press the OK button
17) Go to File Menu
18) Choose New from File Menu
19) Choose Text File
20) Write on this page a file containing the contents of Appendix F; 21) Go to File Menu
22) Press Save
23) On the save dialog write CRMIDI.H
24) Press the OK button
25) Go to File Menu
26) Choose New from File Menu
27) Choose Text File
28) Write on this page a file containing the contents of Appendix G;
29) Go to File Menu
30) Press Save
31) On the save dialog write a file CREATOR.H
32) Press the OK button
33) Go to File Menu
34) Choose New from File Menu
35) Choose Text File
36) Write on this page a file containing the contents of Appendix H;
37) Press the mouse right button and choose: Insert File Into Project
38) Click on DLL32 project
39) On the save dialog write CREATOR.DEF
40) Press the OK button
41) Go to Insert Menu
42) Press File Into Project...
43) On the List Files of Type: Choose Library Files (*.lib)
44) Go to the Visual C++ library directory and choose WINMM.LIB
45) Press the OK button
46) Go to the Build menu
47) Press Rebuild ALL A description of the commands included in the DLL function library based on Appendices E–H now follows:
A. MIDI input functions 1–2:
1. Open MIDI input device
Syntax: long MIDIInOpen(long Device)
This function opens the MIDI device for input.
Return 0 for success, −1 otherwise.
Delphi Example:
Device:=0;
if MIDIInOpen(Device) < > 0 Then
MessageDlg('Error opening MIDI input device', mtError, mbOk, 0);
2. Reset MIDI input device
Syntax: long MIDIInReset(void)
this function resets MIDI input device.
Return 0 for success, −1 otherwise.
Delphi Example:
if MIDIInRest < > 0 Then
MessageDlg('Error resetting MIDI input device', mtError, mbOk, 0);
B. MIDI output functions 3–6:
3. Close MIDI input device
Syntax: long MIDIInClose(void)
This function close MIDI input device.
Return 0 for success, −1 otherwise.
Delphi Example:
if MIDIInClose < > 0 Then
MessageDlg('Error closing MIDI input device', mtError, mbOk, 0);
4. Open MIDI output device
Syntax: long MIDIOutOpen(long Device)
This function opens MIDI output device.
Return 0 if success, −1 otherwise.
Delphi Example:
Device:=0;
if MIDIOutOpen(Device) < > 0 Then
MessageDlg('Error opening MIDI output device', mtError, mbOk, 0);
5. Reset MIDI Output device
Syntax: long MIDIOutReset(void)
This function resets MIDI output device.
Return 0 if success, −1 otherwise.
Delphi Example:
if MIDIOutReset < > 0 Then
MessageDlg('Error resetting MIDI output device', mtError, mbOk, 0);
6. Close MIDI output device
Syntax: long MIDIOutClose(void)
This function close MIDI output device.
Return 0 if success, −1 otherwise.

Delphi Example:
Device:=0;
if MIDIOutClose <> Then
MessageDlg('Error opening MIDI output device', mtError, mbOk, 0);
C. General functions 7–10:
7. Send Data
Syntax: long SendData(long Data)
This function sends 4 bytes to toy card.
Currently used to send 144 for init toy card.
Return 0 if successful, −1 otherwise.
Delphi Example:
If SendData(144) < > 0 Then
MessageDlg('Error sending data to toy', mtError, mbOk, 0);
8. Send Message
Syntax: long SendMessage(char *Mess)
This function sends string to toy card.
Return 1 if successful, or errorcode otherwise.
Delphi Example:
Mess:='00 01 00 00 00 00 00 05 00 00 00 01 00 03 00 01 00 00 00';
If SendMessage(Mess) < > 1 Then
MessageDlg('Error opening MIDI output device', mtError, mbOk, 0);
9. Check message
Syntax: long CheckMessage(void)
This function returns 0 if no message found from toy card.
Delphi Example:
If CheckMessage Then
Mess:=GetMessage;
10. Get Message
Syntax: char * GetMessage(char *Mess)
This function returns 20 chars toy message if present, or "Time Out" otherwise.
Delphi Example:
If GetMessage="Time Out" Then
MessageDlg('No message received', mtError, mbOk, 0);
D. Toy control functions 11–16:
11. Get Toy Number
Syntax: char * GetToyNumber(void)
This function returns Toy Number of last receiving message, or "00 00 00 00" if no message was received.
12. Get Sensor Number
Syntax: long GetSensorNumber(void)
This function returns Sensor Number of last receiving message, or 255 if no message was received.
13. Toy Reset
Syntax: long ToyReset(char *ToyNumber)
This function sends a reset string to toy.
Return 0 if successful, or −1 otherwise.
14. Toy Transceive
Syntax: char *ToyTranceive(char *ToyNumber,char *Mess)
This function sends message to toy and waits 3 sec to acknowledge.
Return "Ack. Ok" if received, or "Time Out" if not.
15. Prepare Toy Talk
Syntax: char *PrepareToyTalk(char *ToyNumber, char *WaveFile)
This function prepares toy card to generate sound using toy speaker.
After calling this function, WaveFile may be played and heard at toy speaker.
Return "Ack. Ok" if successful, or "Time Out" otherwise.
16. Go To Sleep Mode
Syntax: char *GoSleep(char *ToyNumber)
This function sends to toy the sleep command.
Return "Ack. Ok" if successful, or "Time Out" otherwise.

Appendices I–O, taken together, are computer listings of a second finctions library which may be used to generate a variety of games for any of the computer control systems shown and described herein in conjunction with a Director 5.0 software package, marketed by Macromedia Inc., 600 Townsend St., San Francisco, Calif., 94103.

To generate an XObject function library based on Appendices I–O, the following operations are performed:
1) Create a new directory: C:\XOBJECT\ by writing (MD C:\XOBJECT\)
2) Open Visual C++ 1.5
3) On the File menu choose NEW
4) Generate a file which contains the contents of Appendix I;
5) Choose Save As from the File Menu
6) Give the file generated in step (4) a name by punching C:\XOBJECT\CREATOR.MAK
7) Press the OK button
8) On the File menu choose NEW
9) Generate a file which contains the contents of Appendix J;
10) On the File menu choose Save As.
11) In the File Name: dialog, write C:\XOBJECT\CREATOR.C
12) Press the OK button
13) On the File menu choose NEW
14) Generate a file which contains the contents of Appendix K;
15) On the File menu choose Save As.
16) In the File Name: dialog write C:\XOBJECT\CREATOR.H
17) Press the OK button
18) On the File menu choose NEW
19) Generate a file which contains the contents of Appendix L;
20) On the File menu choose Save As.
21) In the File Name: dialog write C:\XOBJECT\CRMIDI.H
22) Press the OK button
23) On the File menu choose NEW
24) Generate a file which contains the contents of Appendix M;
25) On the File menu choose Save As.
26) In the File Name: dialog write C:\XOBJECT\XOBJECT.H
27) Press the OK button
28) On the File menu choose NEW
29) Generate a file which contains the contents of Appendix N;
30) On the File menu choose Save As.
31) In the File Name: dialog write C:\XOBJECT\CREATOR.DEF
32) Press the OK button
33) On the File menu choose NEW
34) Generate a file which contains the contents of Appendix O;
35) On the File menu choose Save As.
36) In the File Name: dialog write C:\XOBJECT\CREATOR.RC
37) Press the OK button
38) On the Project Menu choose Open
39) In the File Name dialog write C:\XOBJECT\CREATOR.MAK
40) Press Rebuild All from the Project Menu A description of the commands included in the XObject function library based on Appendices I–O now follows:
A. MIDI input functions 1–3:

1. Open MIDI input device
Syntax: long MIDIInOpen(long Device)
This function opens the MIDI device for input.
Return 0 for success, −1 otherwise.
Delphi Example:
Device:=0;
if MIDIInOpen(Device) < > 0 Then
MessageDlg('Error opening MIDI input device', mtError, mbOk, 0);
2. Reset MIDI input device
Syntax: long MIDIInReset(void)
This function resets MIDI input device.
Return 0 for success, −1 otherwise.
Delphi Example:
if MIDIInRest < > 0 Then
MessageDlg('Error resetting MIDI input device', mtError, mbOk, 0);
3. Close MIDI input device
Syntax: long MIDIInClose(void)
This function turns off MIDI input device.
Return 0 for success, −1 otherwise.
Delphi Example:
if MIDInClose < > 0 Then
MessageDlg('Error closing MIDI input device', mtError, mbOk, 0);
B. MIDI output functions 4–6:
4. Open MIDI output device
Syntax: long MIDIOutOpen(long Device)
This function opens MIDI output device.
Return 0 if success, −1 otherwise.
Delphi Example:
Device:=0;
if MDIOutOpen(Device) < > 0 Then
MessageDlg('Error opening MIDI output device', mtError, mbOk, 0);
5. Reset MIDI Output device
Syntax: long MIDIOutReset(void)
This function resets MIDI output device.
Return 0 if success, −1 otherwise.
Delphi Example:
if MIDIOutReset < > 0 Then
MessageDlg('Error resetting MIDI output device', mtError, mbOk, 0);
6. Close MIDI output device
Syntax: long MIDIOutClose(void)
This function close MIDI output device.
Return 0 if success, −1 otherwise.
Delphi Example:
Device:=0;
if MIDIOutClose < > 0 Then
MessageDlg('Error opening MIDI output device',
mtError, mbOk, 0);
C. General functions 7–11:
7. New
Syntax: Creator(mNew)
This function creates a new instance of the XObject
The result is 1 if successful, or error code otherwise.
Example:
openxlib "Creator.Dll"
Creator(mNew)
...
Creator(mDispose)
See also: Dispose
8. Dispose
Syntax: Creator(mNew)
This function disposes of XObject instance.
The result is 1 if successful, or error code otherwise.

Example:
openxlib "Creator.Dll"
Creator(mNew)
Creator(mDispose)
See also: New
9. Send Message
Syntax: long SendMessage(char *Mess)
This function sends string to toy card.
Return 1 if successful, or error code otherwise.
Delphi Example:
Mess:='00 01 00 00 00 00 00 05 00 00 00 01 00 03 00 01 00 00 00';
If SendMessage(Mess) < > 1 Then
MessageDlg('Error opening MIDI output device', mtError, mbOk, 0);
10. Check message
Syntax: long CheckMessage(void)
This function returns 0 if no message found from toy card.
Delphi Example:
If CheckMessage Then
Mess:=GetMessage;
11. Get Toy Message
Syntax: GetToyMessage
This function receives message from toy.
The result is a message.
If during 3 sec there is no message, the result is "Time Out".
Example:
set message GetToyMessage
If message="Time Out" Then
put "No message receiving"
End If
See also: Check for Message
D. Toy control functions 12–17:
12. Get Toy Number
Syntax: char * GetToyNumber(void)
This function returns Toy Number of last receiving message, or "00 00 00 00" if no message was received.
13. Get Sensor Number
Syntax: long GetSensorNumber(void)
This function returns Sensor Number of last receiving message, or 255 if no message was received.
14. Toy Reset
Syntax: long ToyReset(char *ToyNumber)
This function sends a reset string to toy.
Return 0 if successful, or −1 otherwise.
15. Toy Tranceive
Syntax: char *ToyTranceive(char *ToyNumber,char *Mess)
This function sends to toy message and waits 3 sec to acknowledge.
Return "Ack. Ok" if received, or "Time Out" if not.
16. Prepare Toy Talk
Syntax: char *PrepareToyTalk(char *ToyNumber, char *WaveFile)
This function prepares toy card to generate sound using from toy speaker.
After calling this function, WaveFile may be played and heard at toy speaker.
Return "Ack. Ok" if successful, or "Time Out" otherwise.
17. Go To Sleep Mode
Syntax: char *GoSleep(char *ToyNumber)
This function sends to toy the sleep command.
Return "Ack. Ok" if successful, or "Time Out" otherwise.
To use the XObject function library in conjunction with the Director, the following method may be employed:
1) Open Director Version 5.0 program
2) From File Menu, choose New
3) Press the Movie Option 4) Go to Windows menu and press Cast
5) Go to the first Script on the cast
6) On the Window menu choose Script
7) Write the script of the desired game.
8) Repeat from step 5 until all desired script(s) have been written. Press (Ctrl+Alt+P) to run the Application.

Appendix P is a detailed description of preferred features of and preferred elements of one alternative embodiment of the present invention.

Appendices Q–X, taken together, are computer listings of another preferred software implementation, alternative to the implementation of Appendices A–O.

To construct and operate the implementation of Appendices Q–X, the following operations are performed:
1) Provide a computer capable of running the WINDOWS 95 operating system;
2) Prepare computer files for each of the files contained in Appendix Q and place the computer files in a directory named "ocx";
3) Prepare a computer file for the file contained in Appendix R, extract the compressed contents of the file using Winzip version 6.2 available from Nico Mak Computing, Inc. of Bristol, Conn. 06011 USA, and place the extracted computer files in the directory named "ocx";
4) Prepare computer files for each of the files contained in Appendix S and place the computer files in a directory named "player";
5) Prepare a computer file for the file contained in Appendix T, extract the compressed contents of the file using Winzip version 6.2, and place the extracted computer files in a subdirectory naraed "res" contained in the directory named "player";
6) Prepare computer files for each of the files contained in Appendices U and V and place the computer files in a directory named "xmidi5";
7) Prepare a computer file for the file contained in Appendix W, extract the compressed contents of the file using Winzip version 6.2, and place the extracted computer files in the directory named "xmidi5";
8) Prepare a computer file named NEWDEMO.CS the file contained in Appendix X and place the files in the directory named "player";
9) Install the Microsoft Development Studio Version 5.0 available from Microsoft Corporation, One Microsoft Way, Redmond, Wash. USA;
10) Run the Microsoft Development Studio, select FILE/OPEN WORKSPACE from the menu, select the file \OCX\NEWSR.DSW, select BUILD from the menu, select BUILD NEWDEMO.OCX, select FILE/OPEN WORKSPACE from the menu, select the file \PLAYER\PLAYER.DSW, select BUILD from the menu, select BUILD PLAYER.EXE;
11) Compile \XMIDI5\XMIDI.DSW using Visual C++ Version 5.0 and run the OCX registration program REGSVR32.EXE with XMIDI5.OCX on the command line;
12) Install the "American English Text To Speech Software Development Kit" for WINDOWS 95/WINDOWS NT from Lernout & Hauspie Speech Products, Sint-Krispisnstraat 7, 8900 Leper, Belgium;
13) Run PLAYER.EXE in DOS mode from the \PLAYER directory by invoking "player newdemo.cs".

Reference is now made to FIG. 16 which is a simplified flowchart illustration of a preferred method of operation of a computer radio interface (CRI) 110 operative to service an individual computer 100 of FIG. 1A without interfering with other computers or being interfered with by the other computers, each of which is similarly serviced by a similar CRI. Typically, the method of FIG. 16 is implemented in software on the computer 100 of FIG. 1A.

The CRI includes a conventional radio transceiver (260 of FIG. 4) which may, for example, comprise an RY3 GB021 having 40 channels which are divided into 20 pairs of channels. Typically, 16 of the channel pairs are assigned to information communication and the remaining 4 channel pairs are designated as control channels.

In the method of FIG. 16, one of the 4 control channel pairs is selected by the radio interface (step 810) as described in detail below in FIG. 17. The selected control channel pair i is monitored by a first transceiver (step 820) to detect the appearance of a new toy which is signaled by arrival of a toy availability command from the new toy (step 816). When the new toy is detected, an information communication channel pair is selected (step 830) from among the 16 such channel pairs provided over which game program information will be transmitted to the new toy. A preferred method for implementing step 830 is illustrated in self-explanatory flowchart FIG. 18A. The "Locate Computer" command in FIG. 18A (step 1004) is illustrated in the flowchart of FIG. 18B.

The identity of the selected information communication channel pair, also termed herein a "channel pair selection command", is sent over the control channel pair to the new toy (step 840). A game program is then begun (step 850), using the selected information communication channel pair. The control channel pair is then free to receive and act upon a toy availability command received from another toy. Therefore, it is desirable to assign another transceiver to that control channel pair since the current transceiver is now being used to provide communication between the game and the toy.

To assign a further transceiver to the now un-monitored control channel, the transceiver which was formerly monitoring that control channel is marked as busy in a transceiver availability table (step 852). The transceiver availability table is then scanned until an available transceiver, i.e. a transceiver which is not marked as busy, is identified (step 854). This transceiver is then assigned to the control channel i (step 858).

Figure 17:
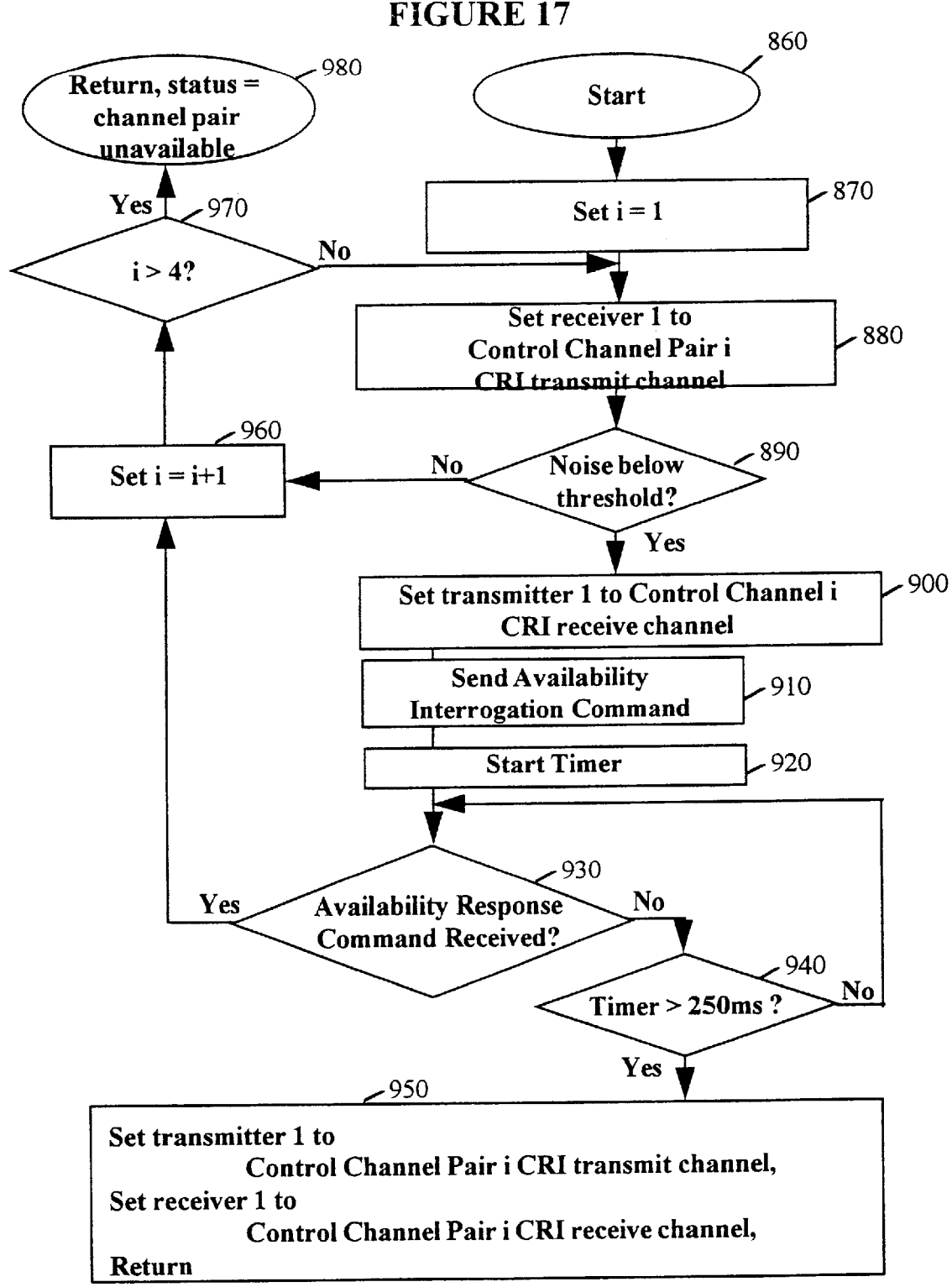
Figure 18A:
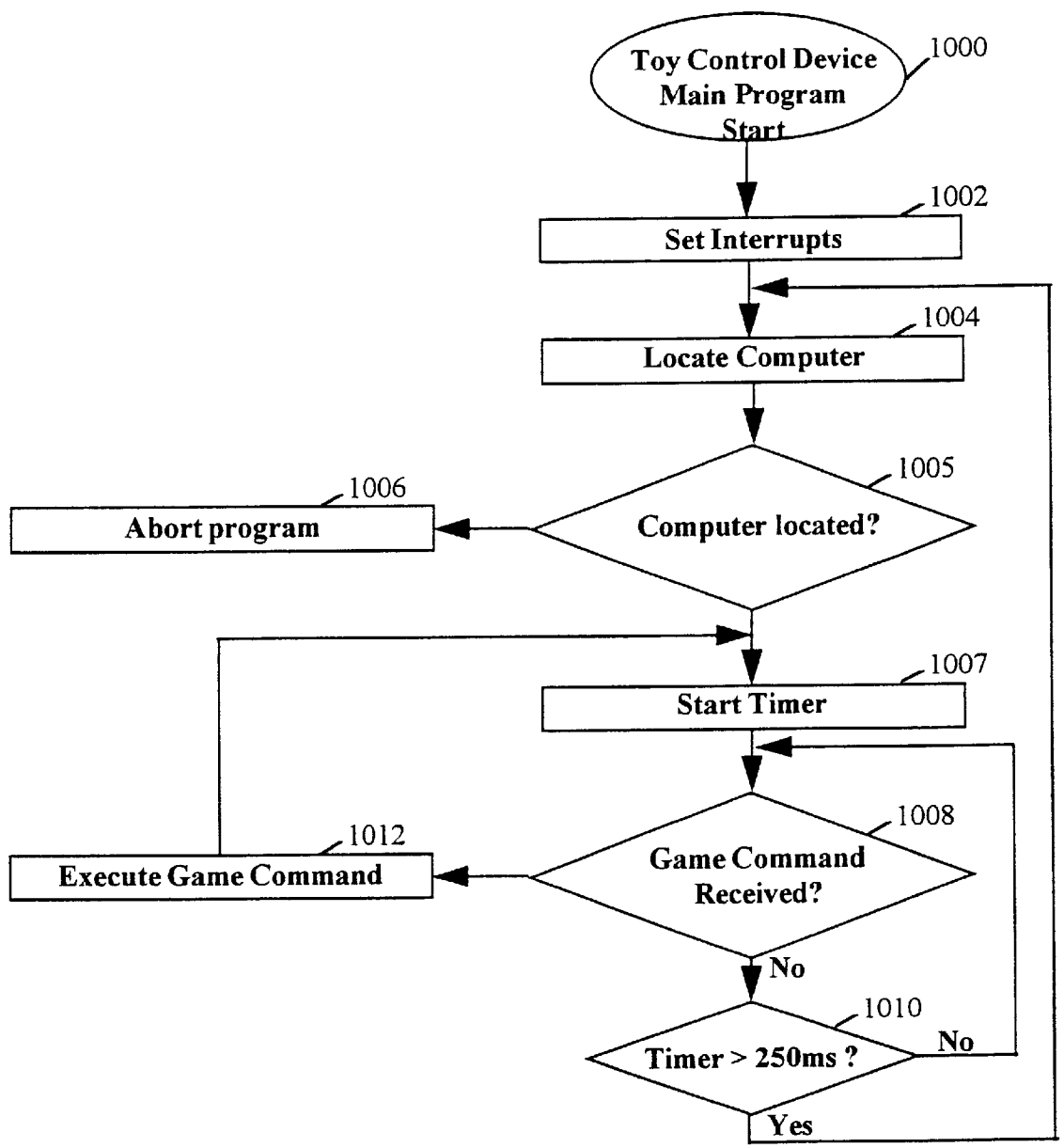
FIG. 18A is a simplified flowchart illustration of a preferred method for implementing the "select information communication channel pair" step of FIG. 16.

FIG. 17 is a simplified flowchart illustration of a preferred method for implementing "select control channel pair" step 810 of FIG. 16. In FIG. 17, the four control channels are scanned. For each channel pair in which the noise level falls below a certain threshold (step 895), the computer sends an availability interrogation command (step 910) and waits for a predetermined time period, such as 250 ms, for a response (steps 930 and 940). If no other computer responds, i.e. sends back an "availability response command", then the channel pair is deemed vacant. If the channel pair is found to be occupied the next channel is scanned. If none of the four channel pairs are found to be vacant, a "no control channel available" message is returned.

Figure 19:
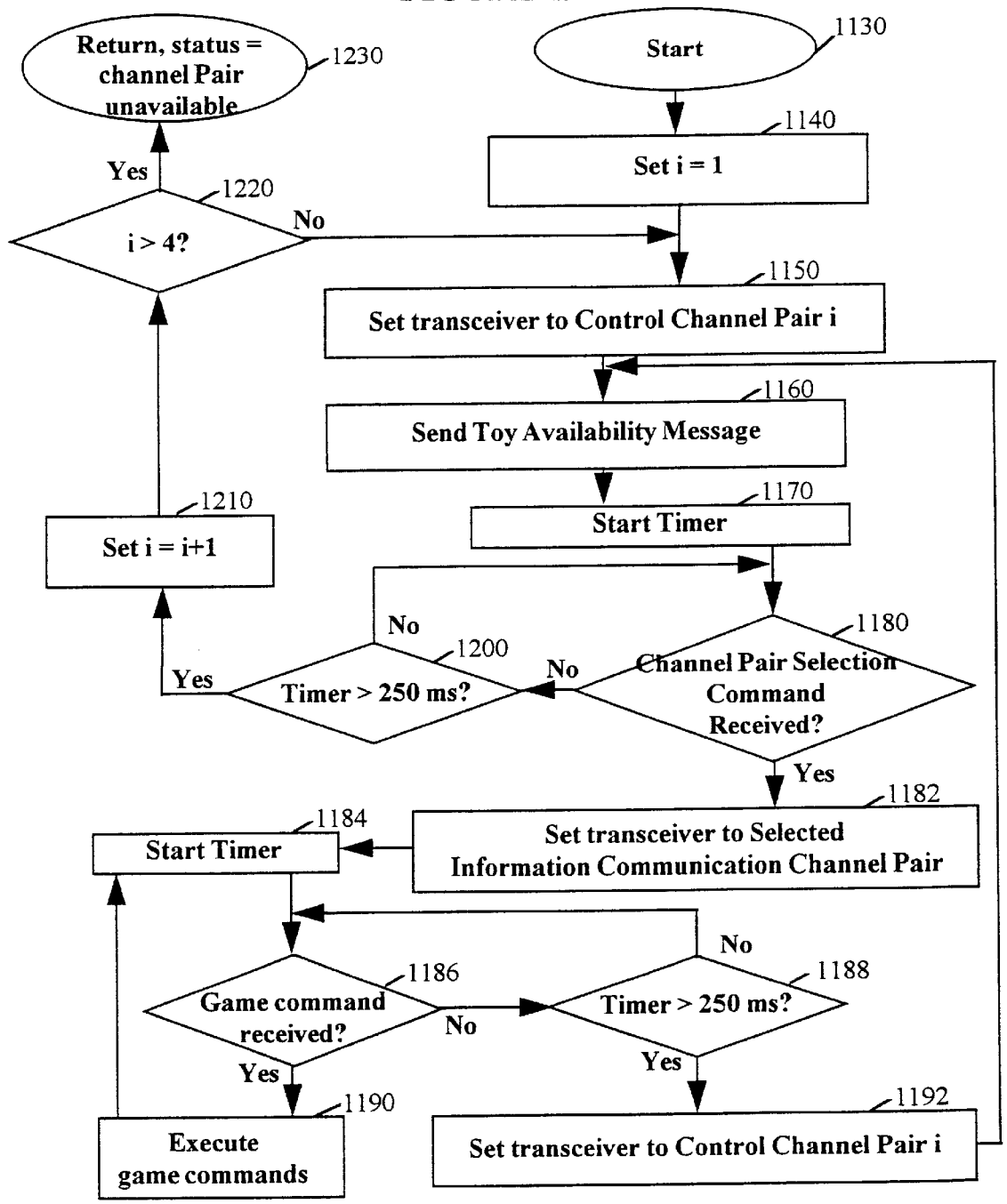

FIG. 19 is a self-explanatory flowchart illustration of a preferred method of operation of the toy control device 130 which is useful in conjunction with the "multi-channel" embodiment of FIGS. 16–18B. i=1, ..., 4 is an index of the control channels of the system. The toy control device sends a "toy availability command" (step 1160) which is a message advertising the toy's availability, on each control channel i in turn (steps 1140, 1150, 1210), until a control channel is reached which is being monitored by a computer. This becomes apparent when the computer responds (step 1180) by transmitting a "channel pair selection command" which is a message designating the information channel pair over which the toy control device may communicate with the game running on the computer. At this point (step 1190), the toy control device may begin receiving and executing game commands which the computer transmits over the information channel pair designated in the control channel i.

Figure 20:
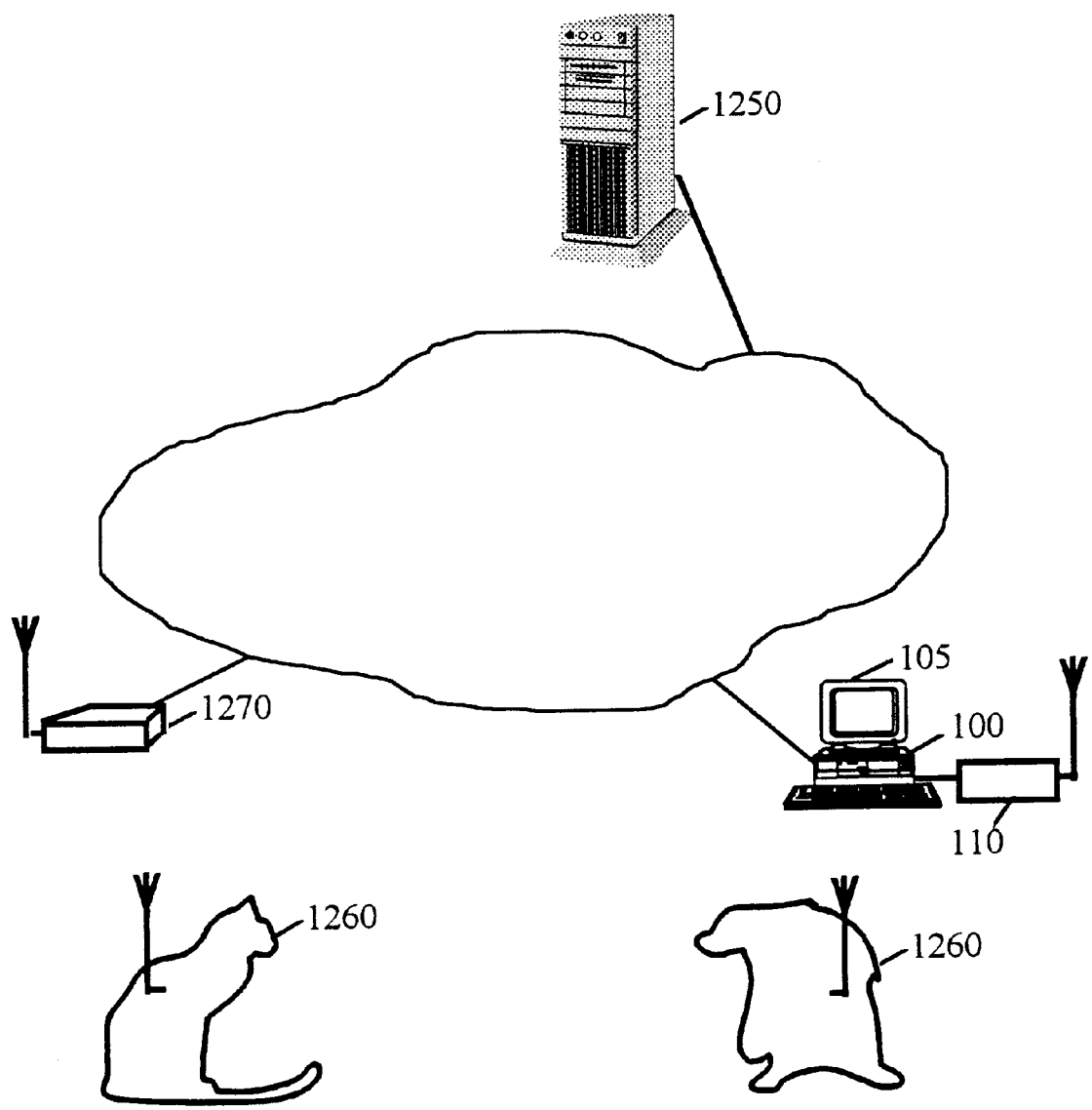

According to a preferred embodiment of the present invention, a computer system is provided, in communication with a remote game server, as shown in FIG. 20. The remote game server 1250 is operative to serve to the computer 100 at least a portion of at least one toy-operating game, which operates one or more toys 1260. Optionally, an entire game may be downloaded from the remote game server 1250. However, alternatively, a new toy action script or new text files may be downloaded from the remote game server 1250 whereas the remaining components of a particular game may already be present in the memory of computer 100.

Downloading from the remote game server 1250 to the computer 100 may take place either off-line, before the game begins, or on-line, in the course of the game. Alternatively, a first portion of the game may be received off-line whereas an additional portion of the game is received on-line.

The communication between the remote game server 1250 and the computer 100 may be based on any suitable technology such as but not limited to ISDN; X.25; Frame-Relay; and Internet.

An advantage of the embodiment of FIG. 20 is that a very simple computerized device may be provided locally, i.e. adjacent to the toy, because all "intelligence" may be provided from a remote source. In particular, the computerized device may be less sophisticated than a personal computer, may lack a display monitor of its own, and may, for example, comprise a network computer 1270.

Figure 21:
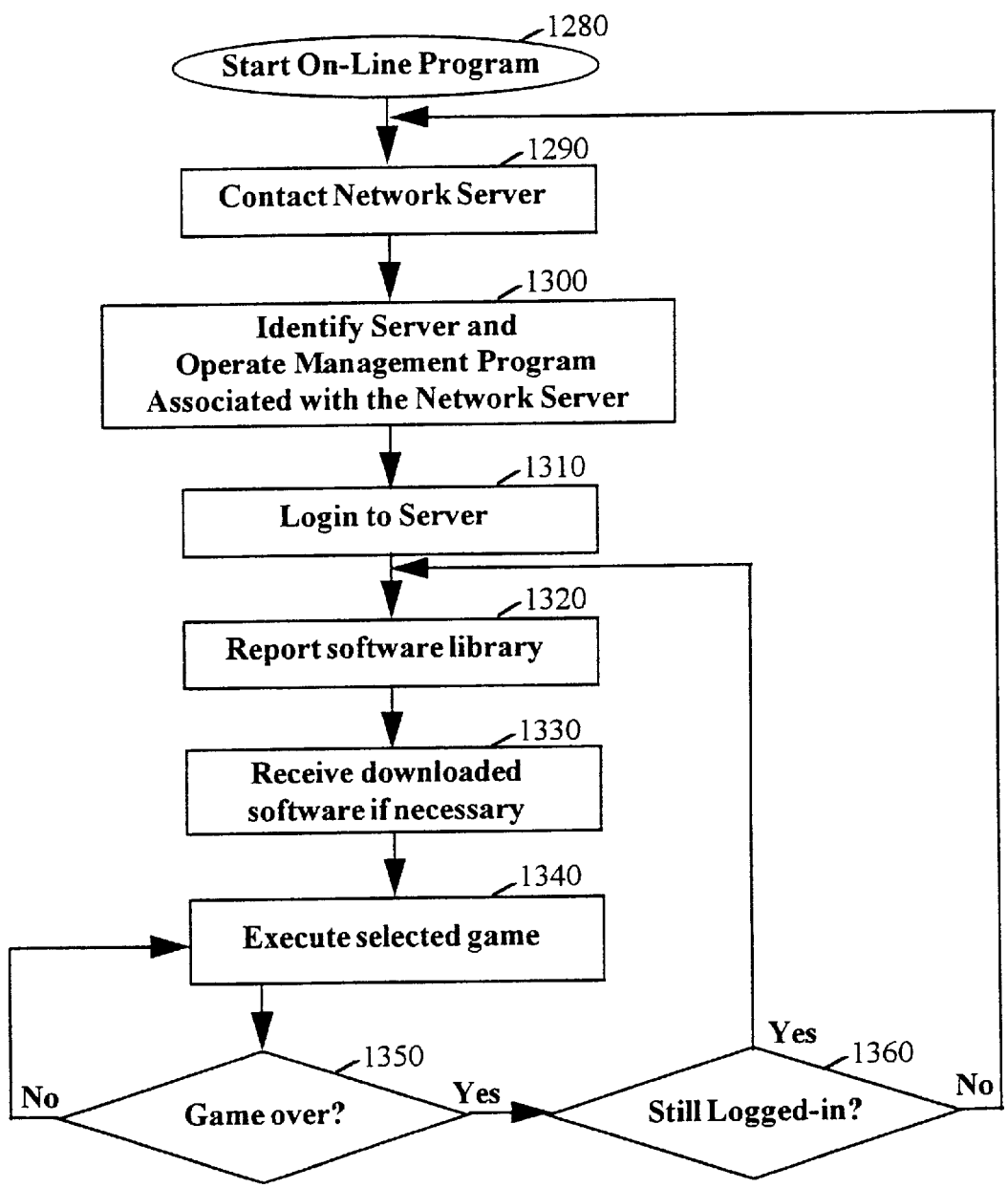

FIG. 21 is a simplified flowchart illustration of the operation of the computer 100 or of the network computer 1260 of FIG. 20, when operating in conjunction with the remote server 1250.

Figure 22:
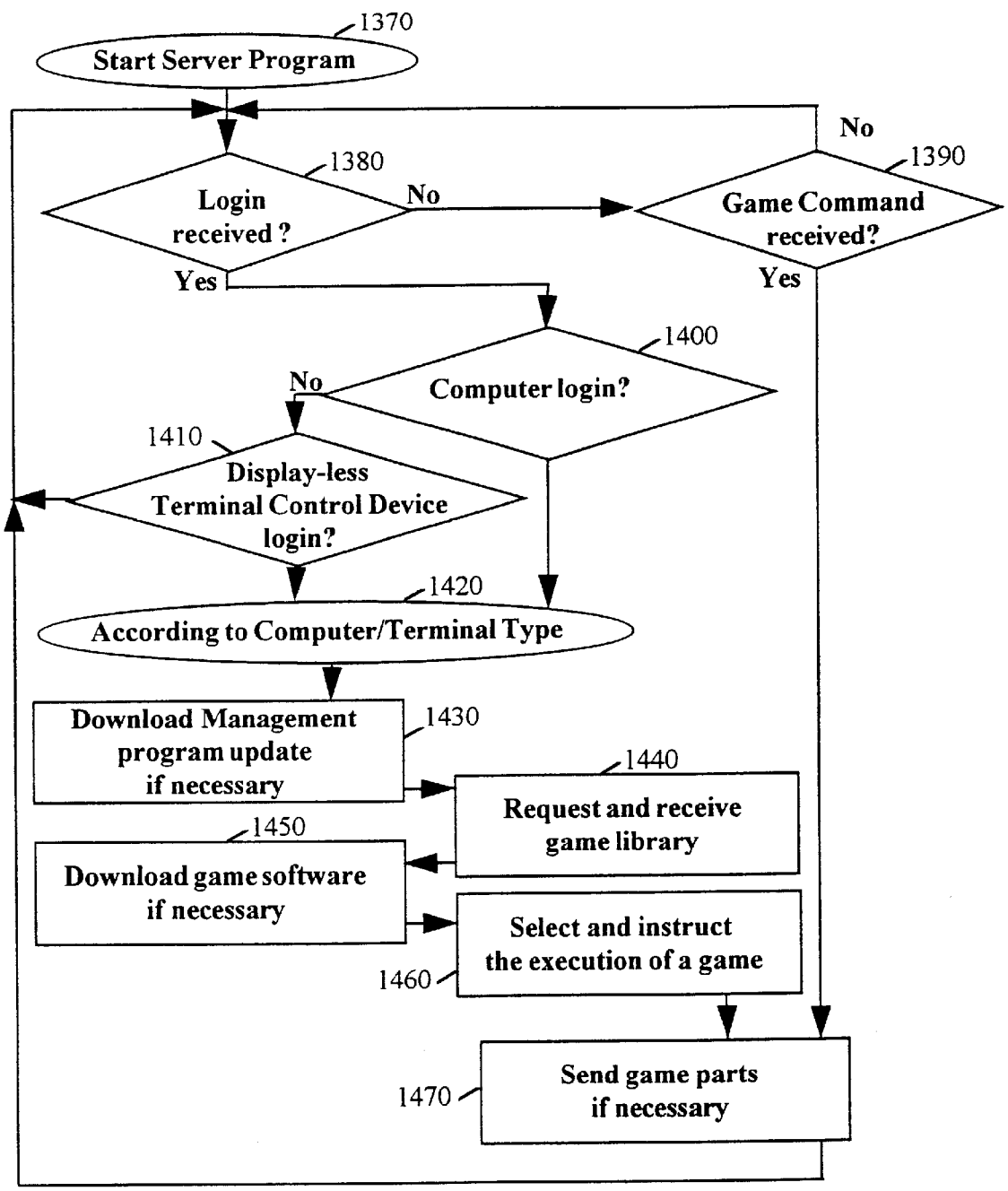

FIG. 22 is a simplified flowchart illustration of the operation of the remote game server 1250 of FIG. 20.

Figure 23:
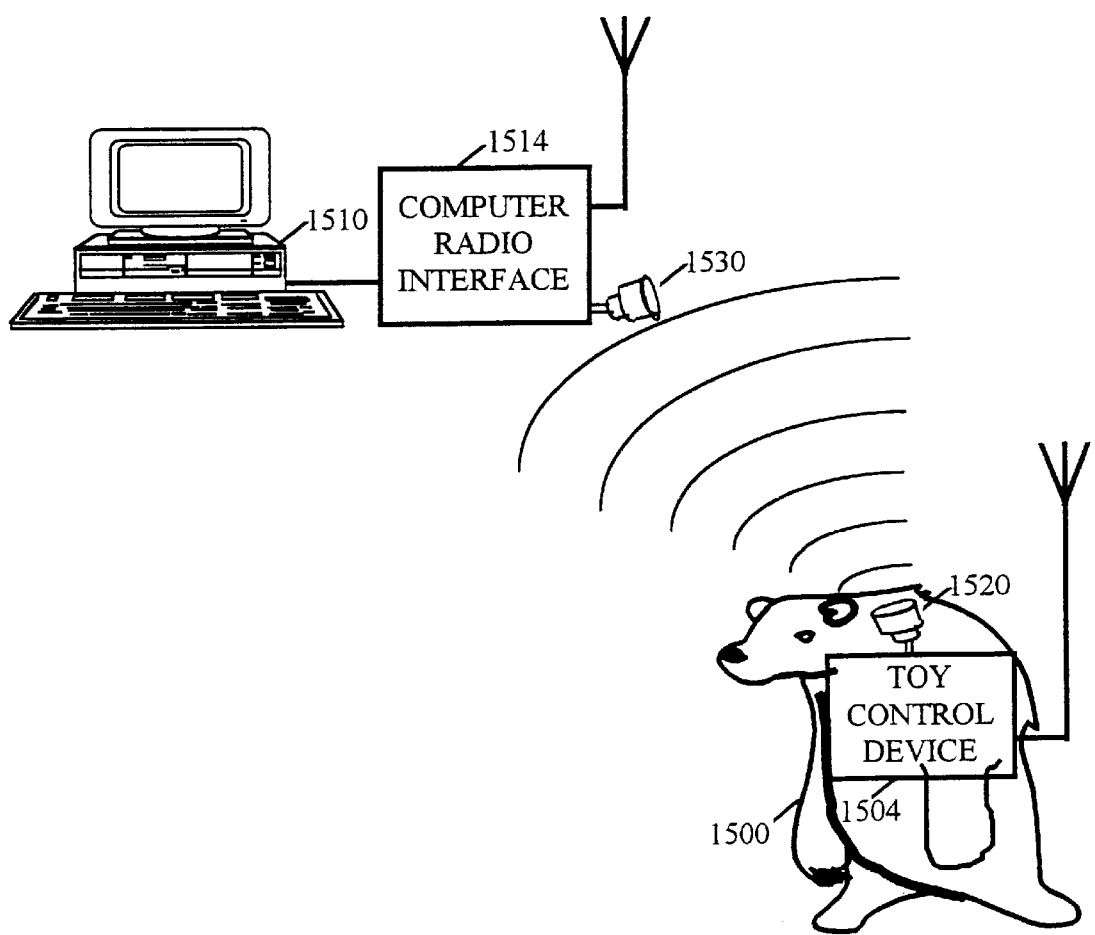
Figure 24A:
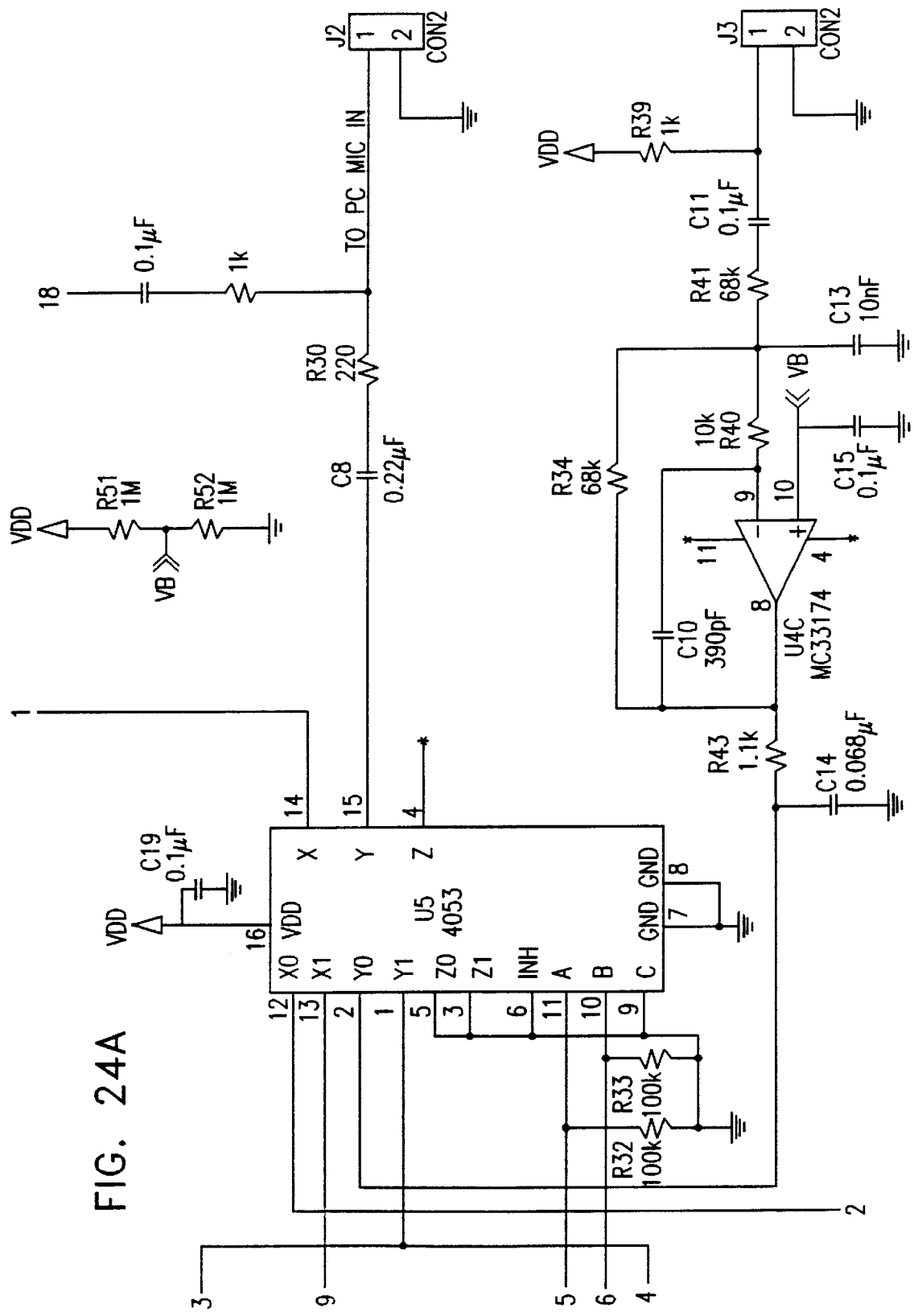
FIGS. 24A–24E, taken together, form a detailed electronic schematic diagram of a multi-channel implementation of the computer radio interface 110 of FIG. 3 which is similar to the detailed electronic schematic diagrams of FIGS. 5A–5D except for being multi-channel, therefore capable of supporting full duplex applications, rather than single-channel.
Figure 24B:
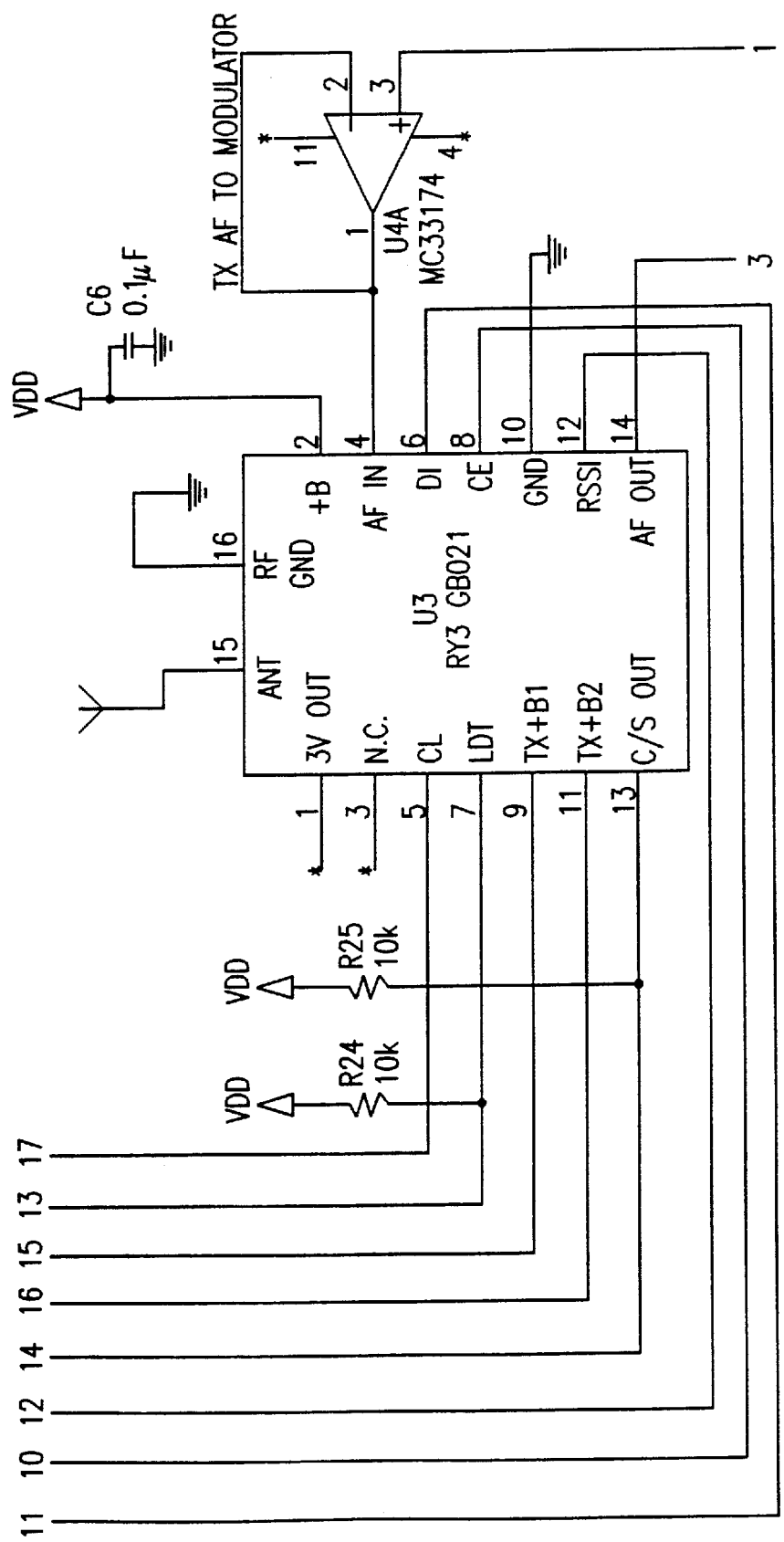
Figure 24C:
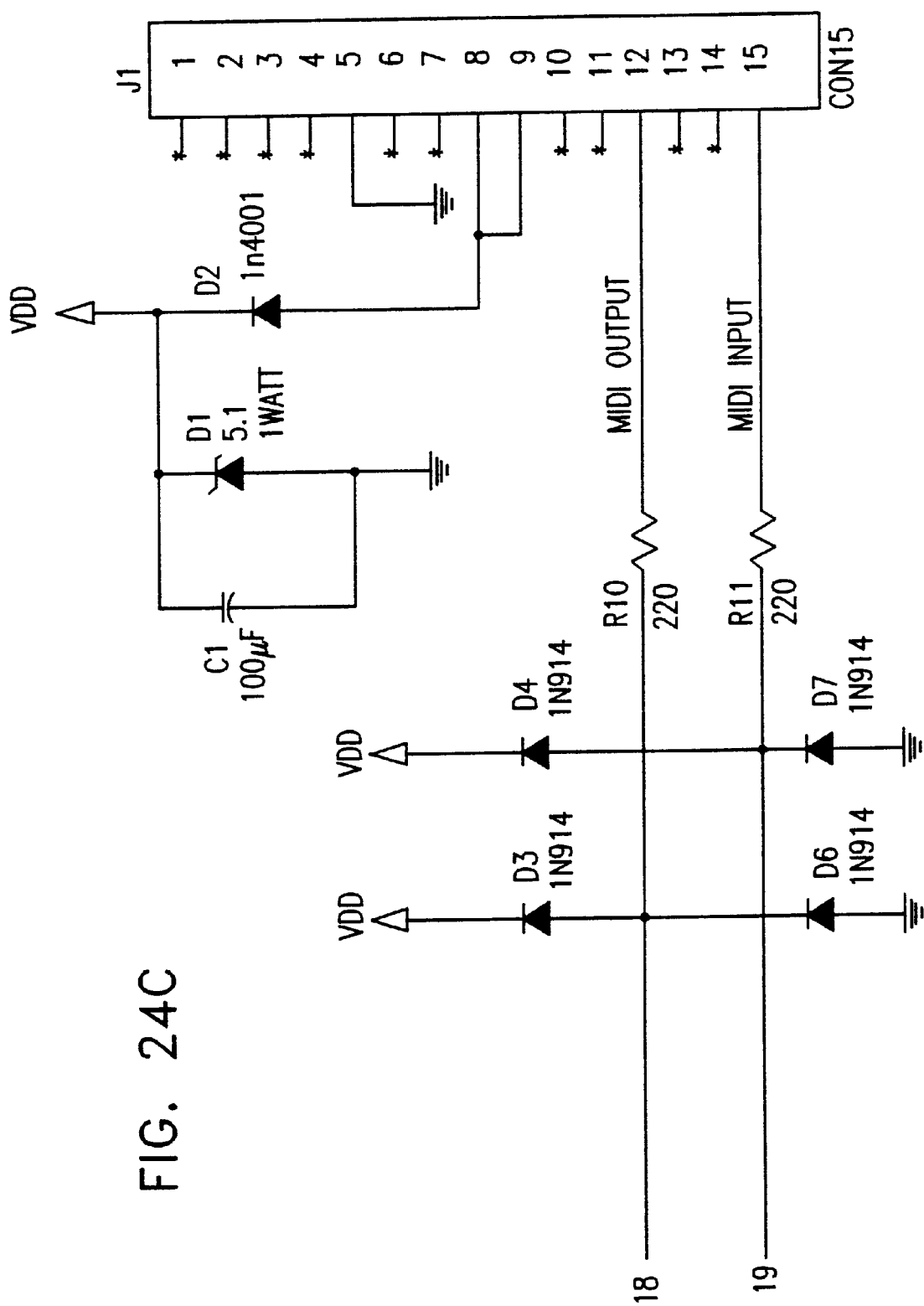
Figure 24D:
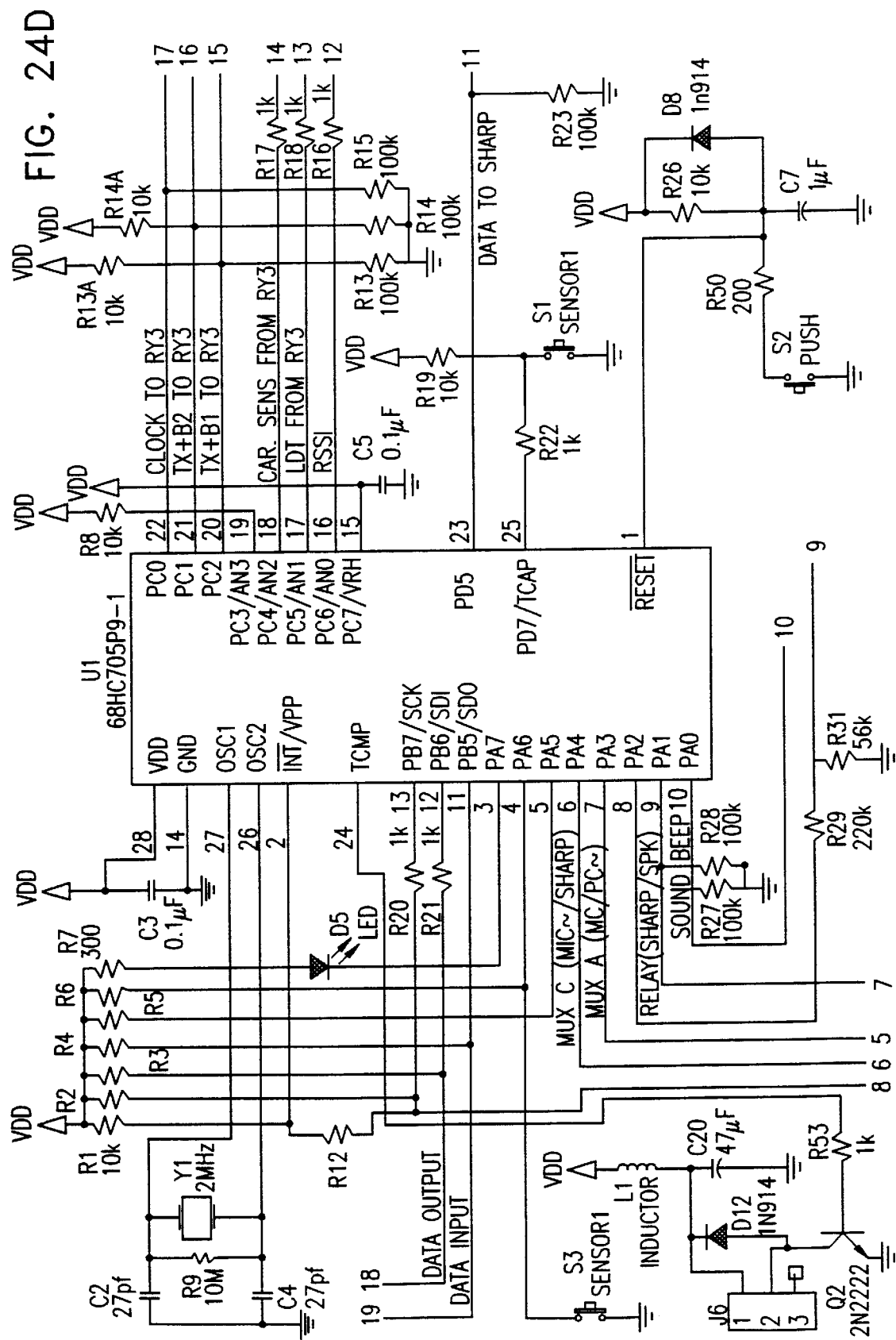
Figure 24E:
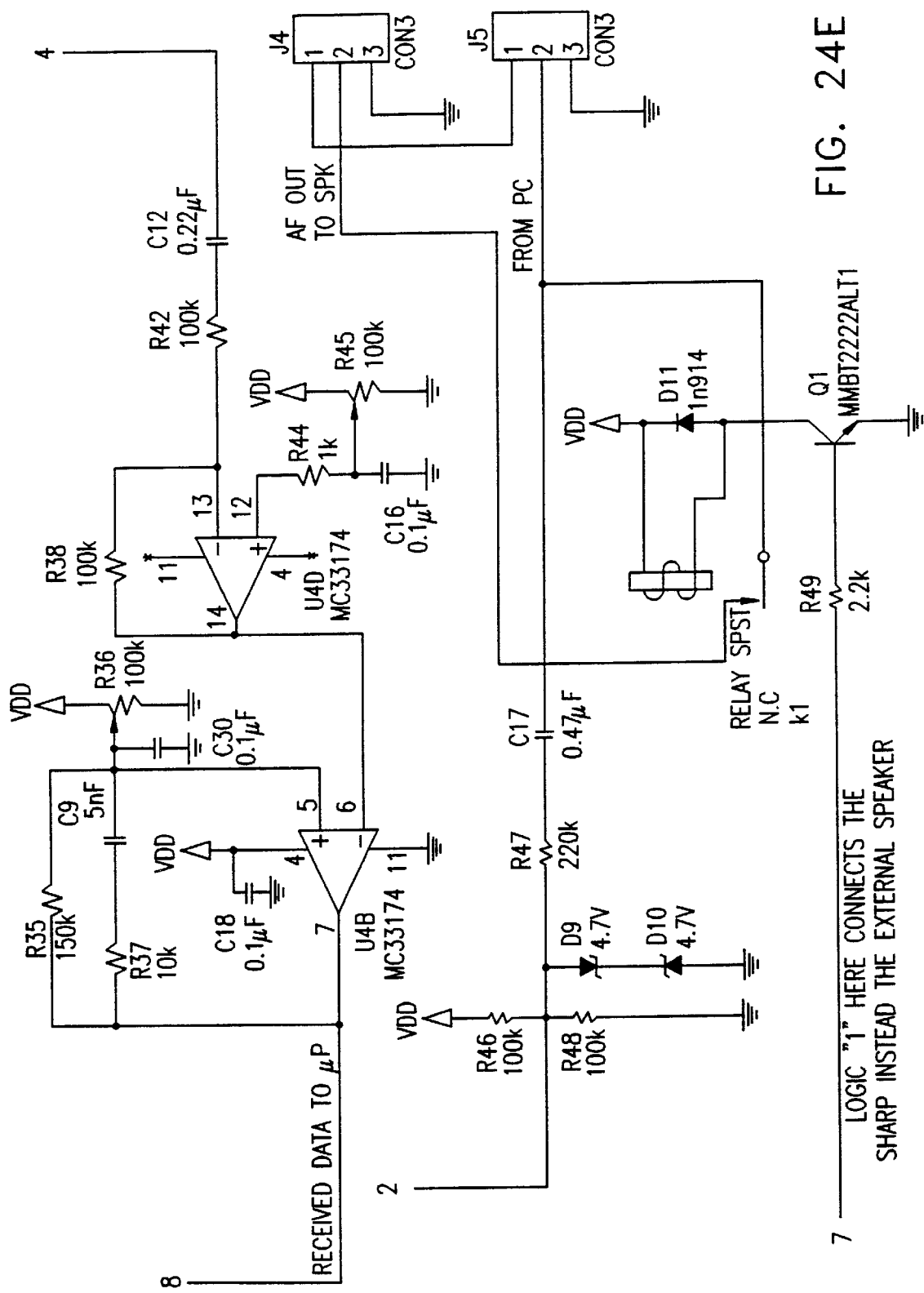
Figure 25A:
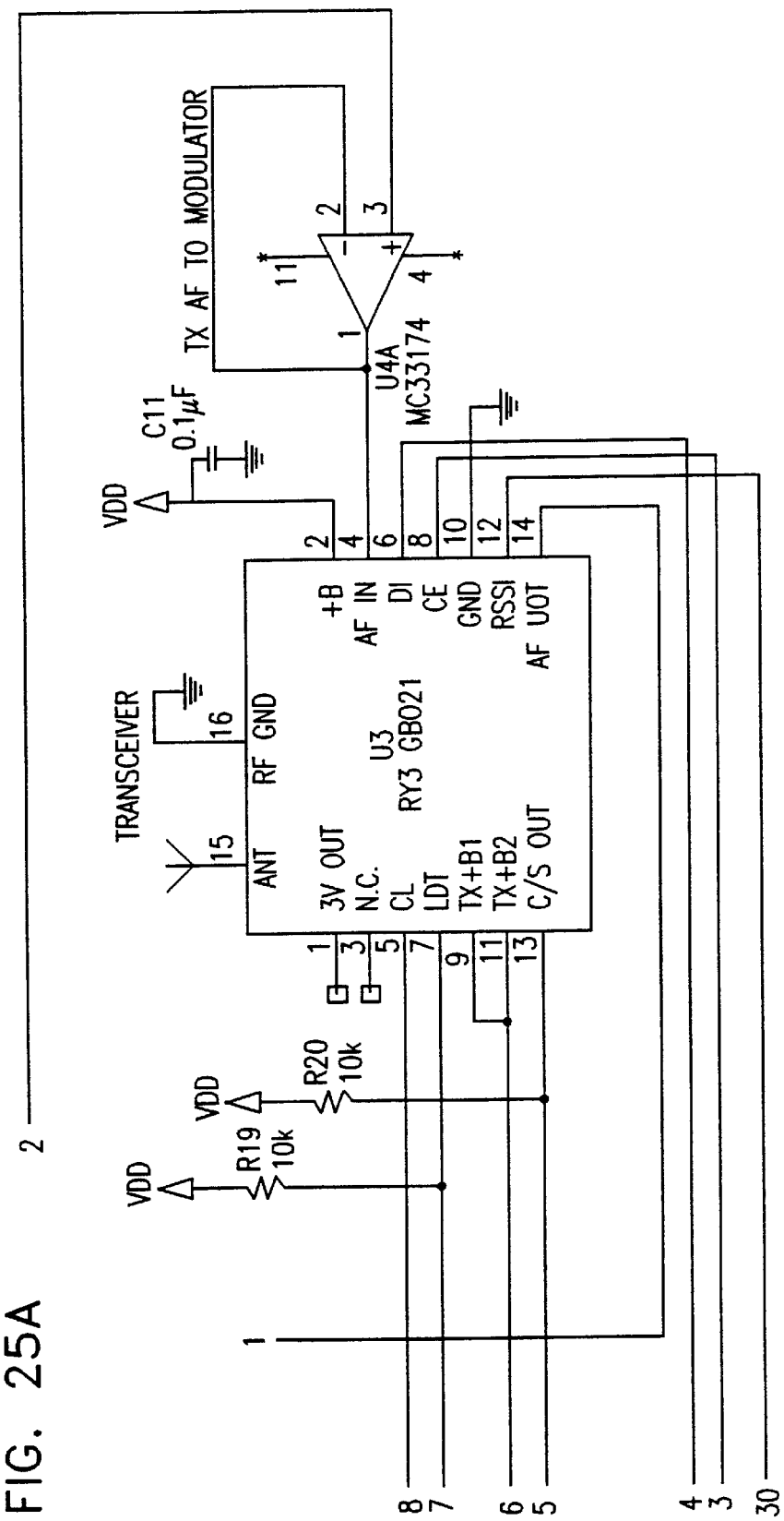
FIGS. 25A–25E, taken together, form a detailed schematic illustration of a computer radio interface which connects to a serial port of a computer rather than to the sound board of the computer.
Figure 25B:
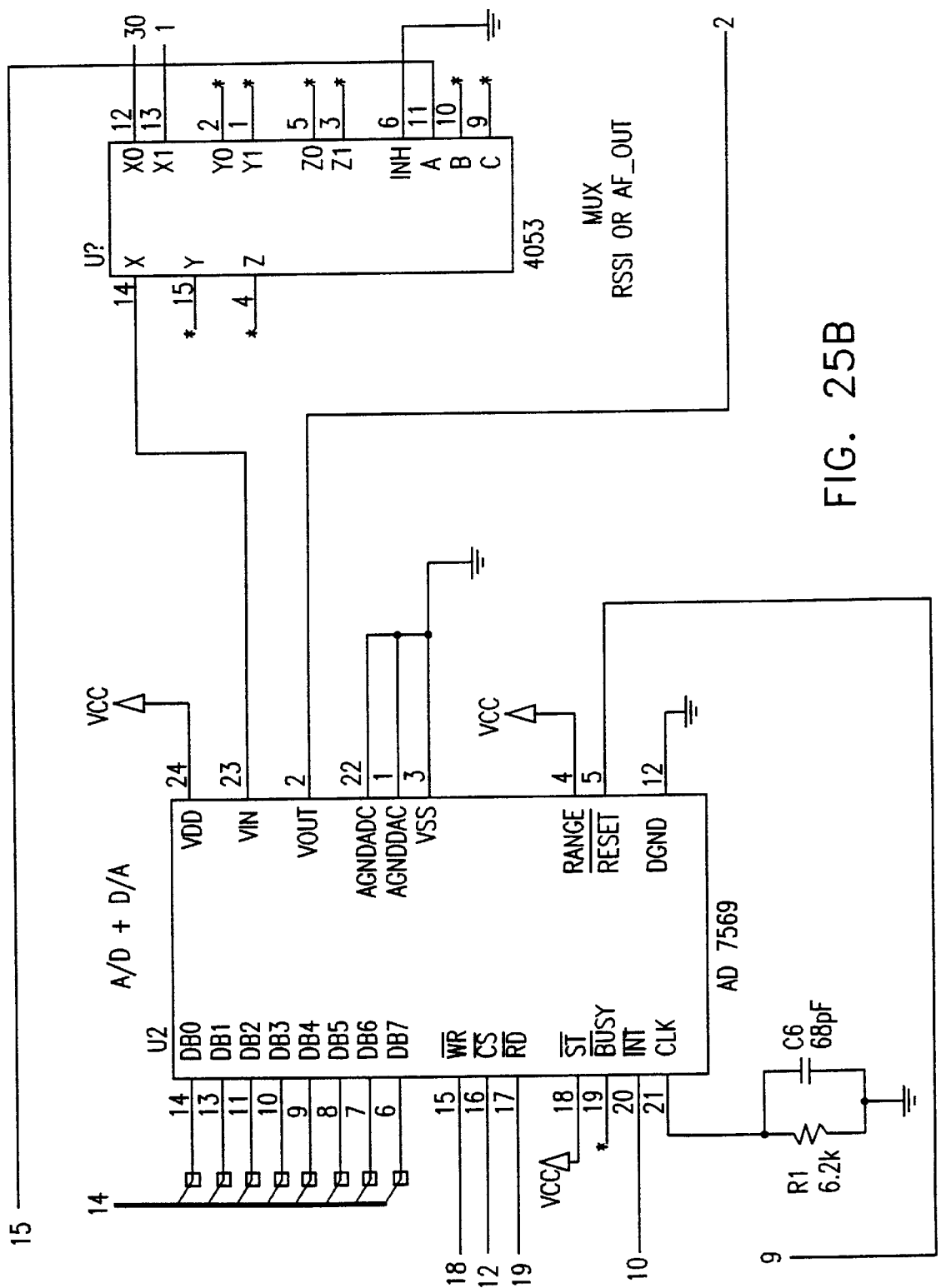
Figure 25C:
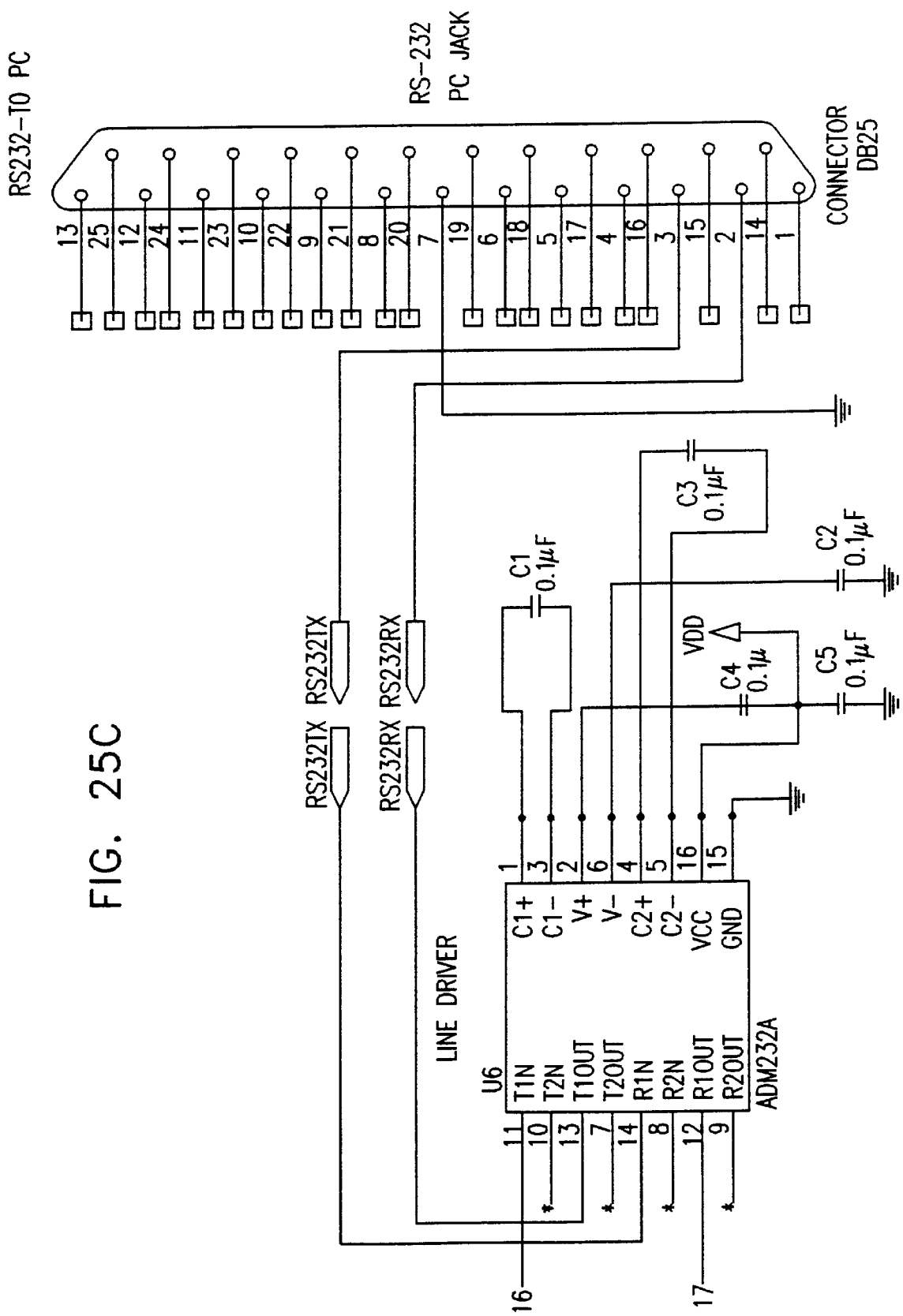
Figure 25D:
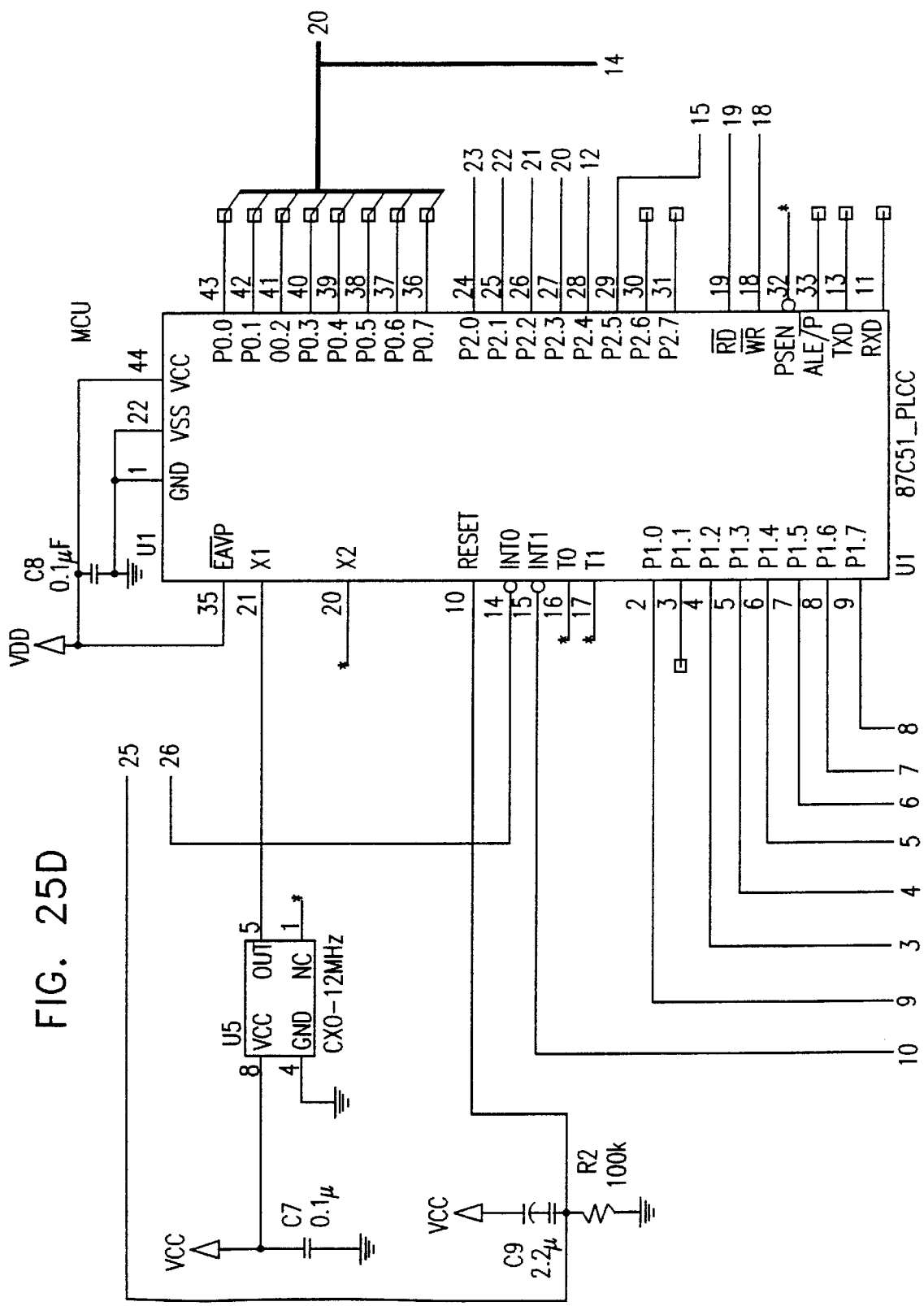
Figure 25E:
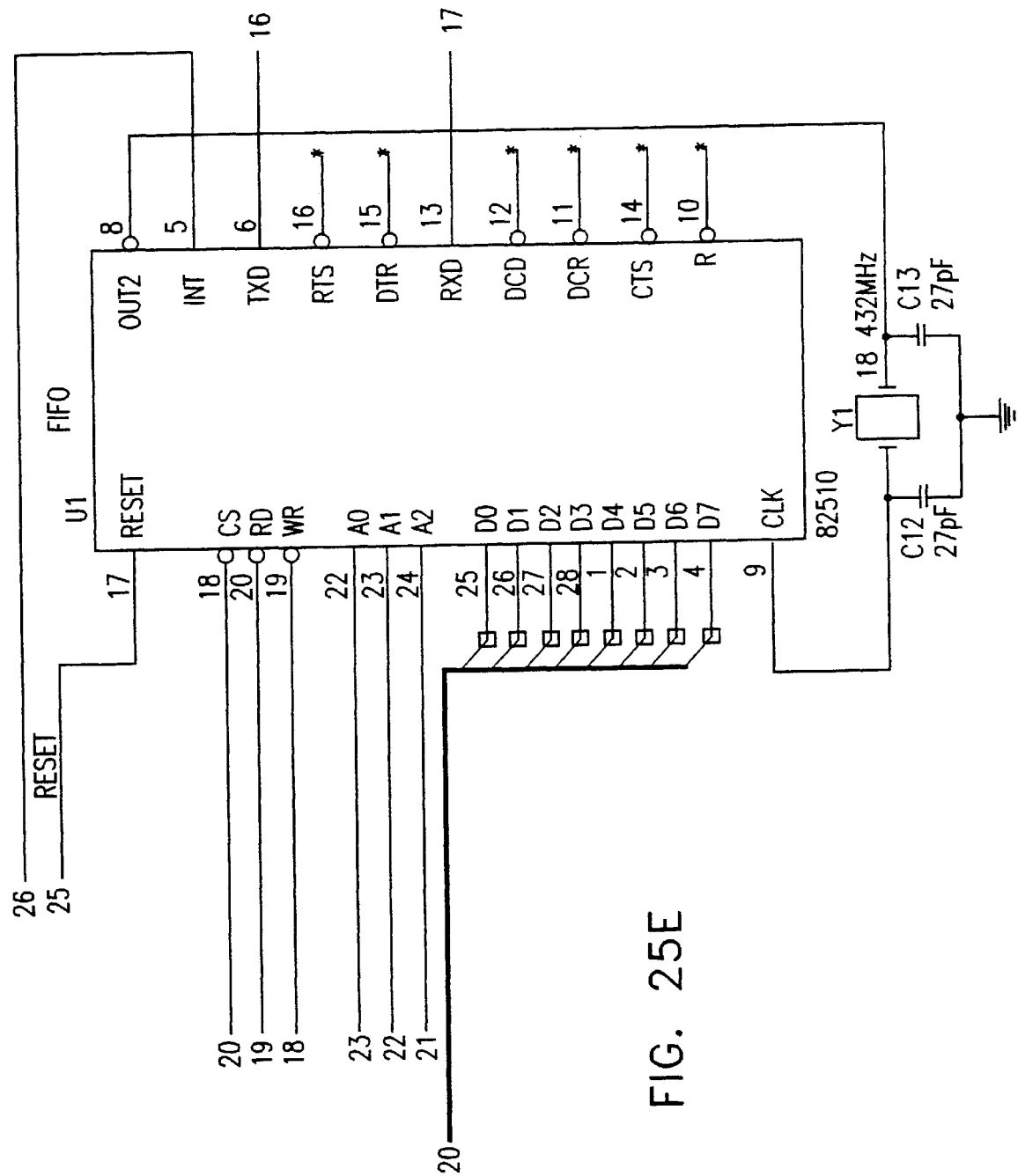
Figure 26A:
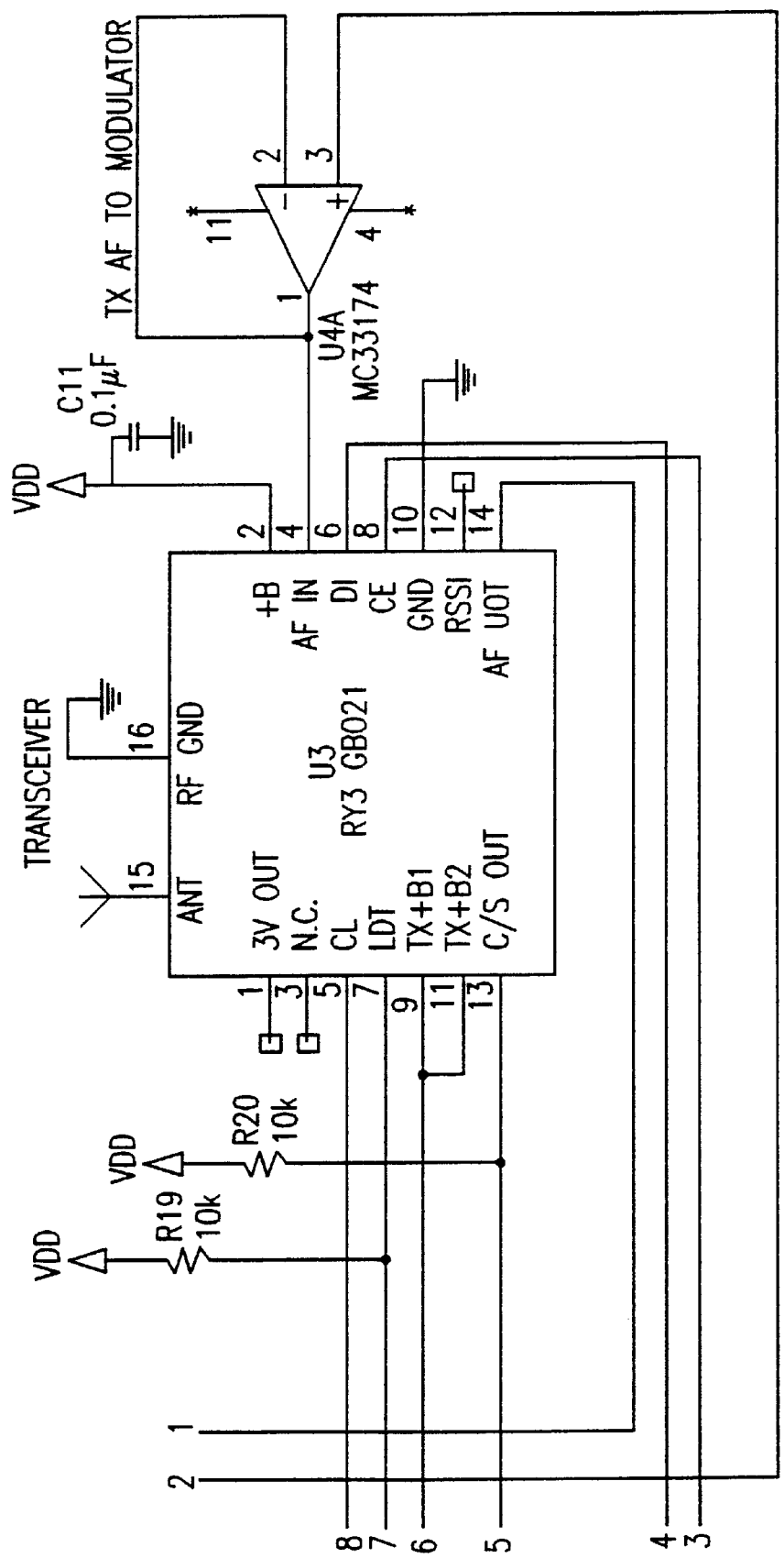
FIGS. 26A–26D, taken together, form a detailed schematic illustration of a computer radio interface which connects to a parallel port of a computer rather than to the sound board of the computer.
Figure 26B:
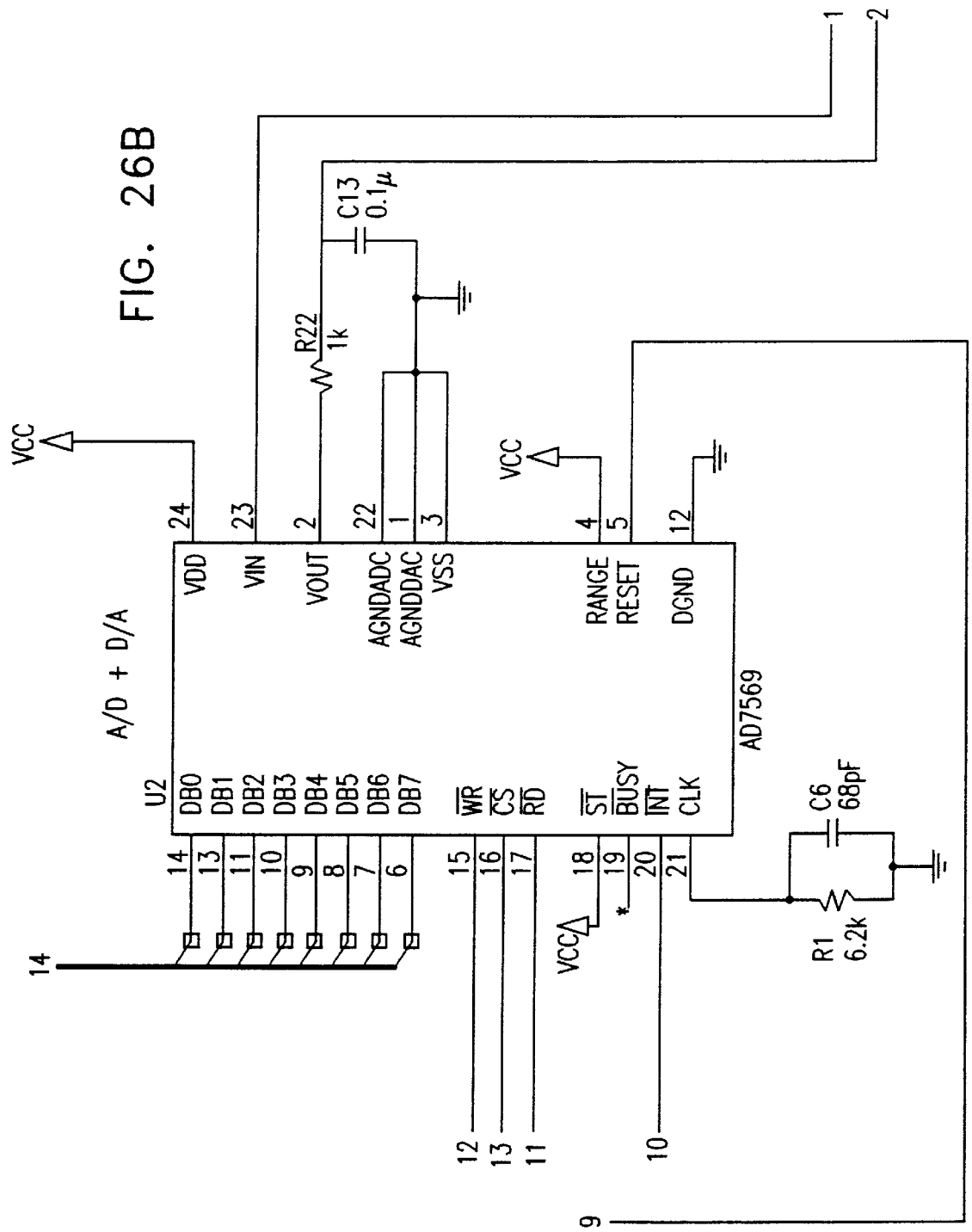
Figure 26C:
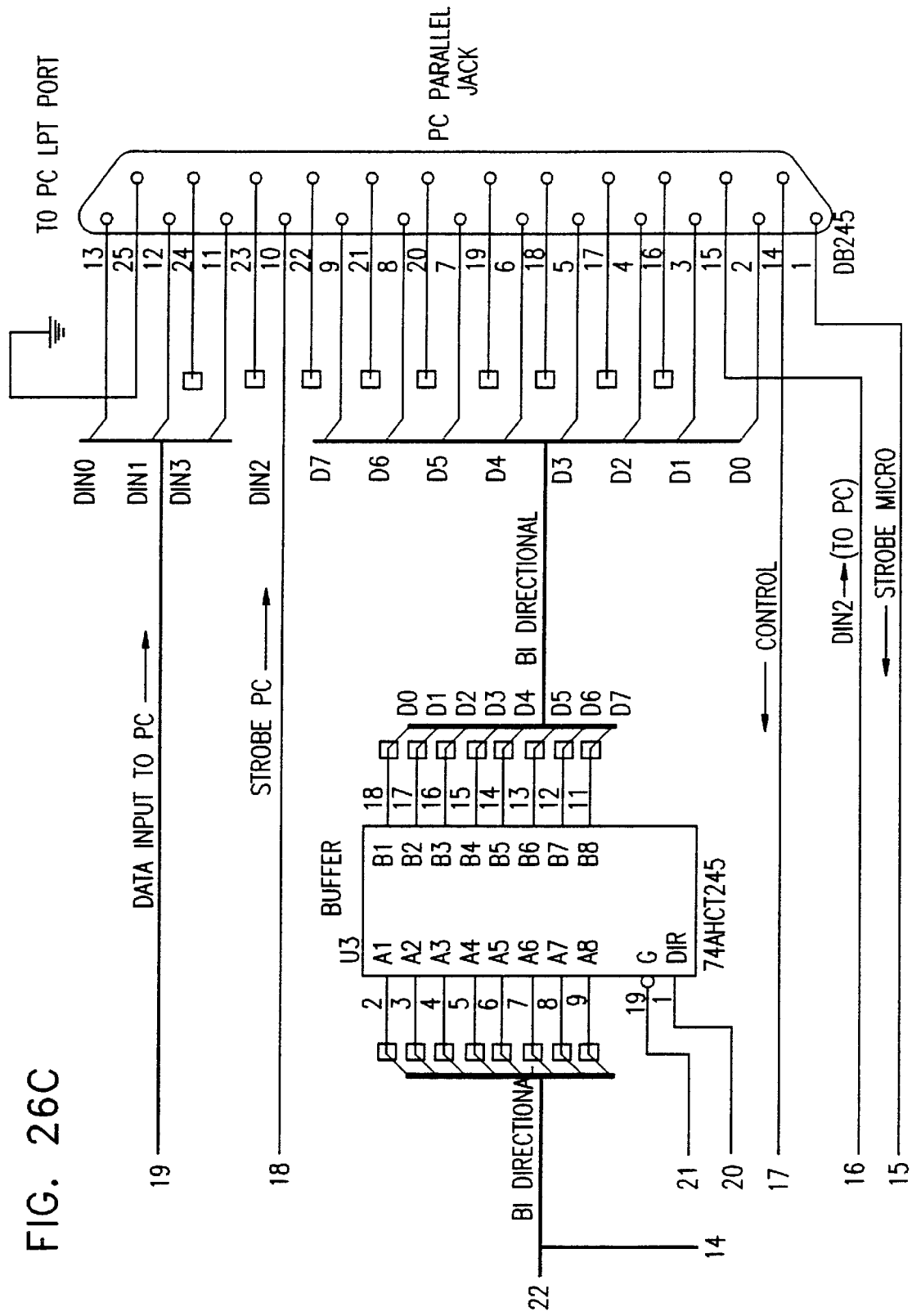
Figure 26D:
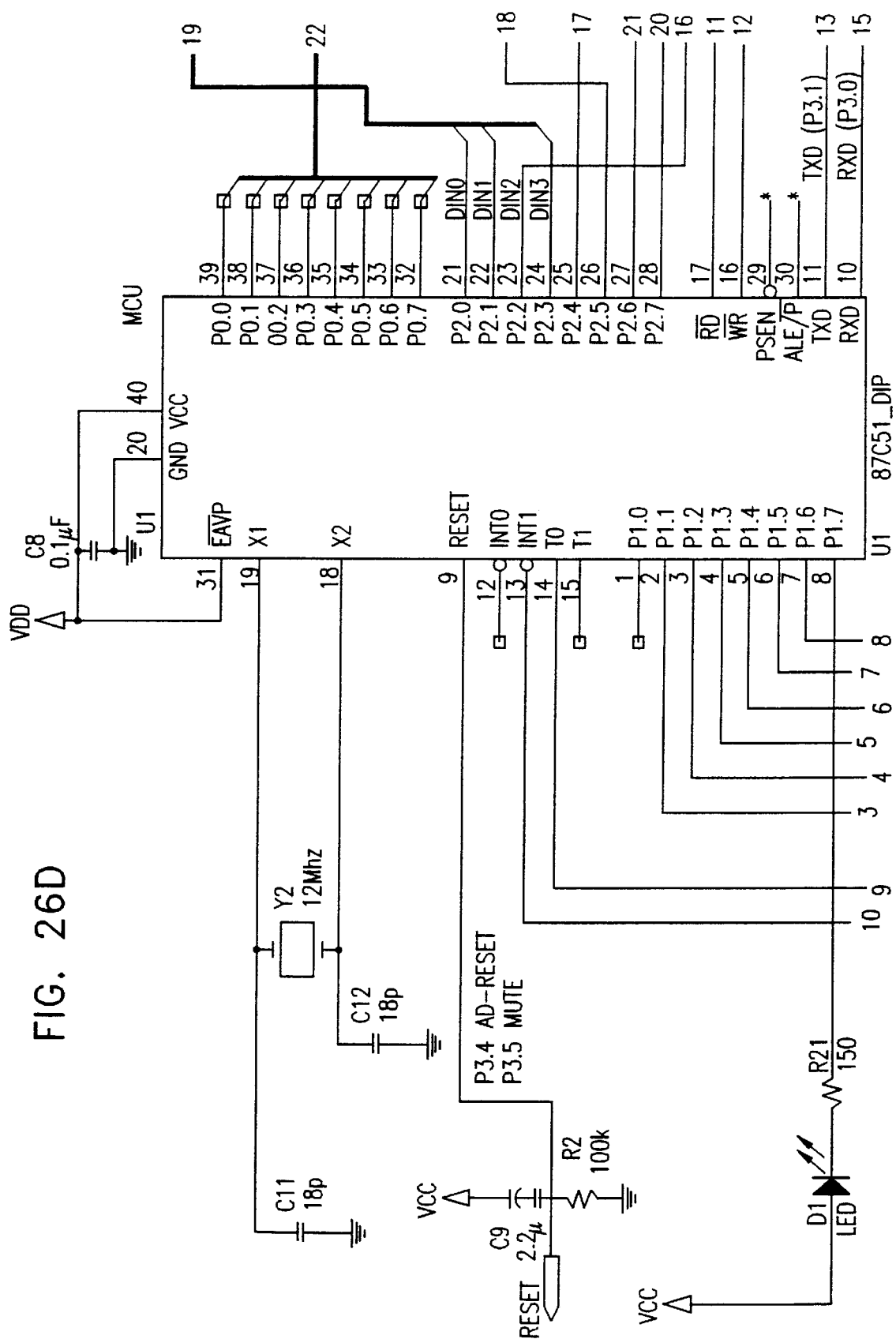
Figure 27A:
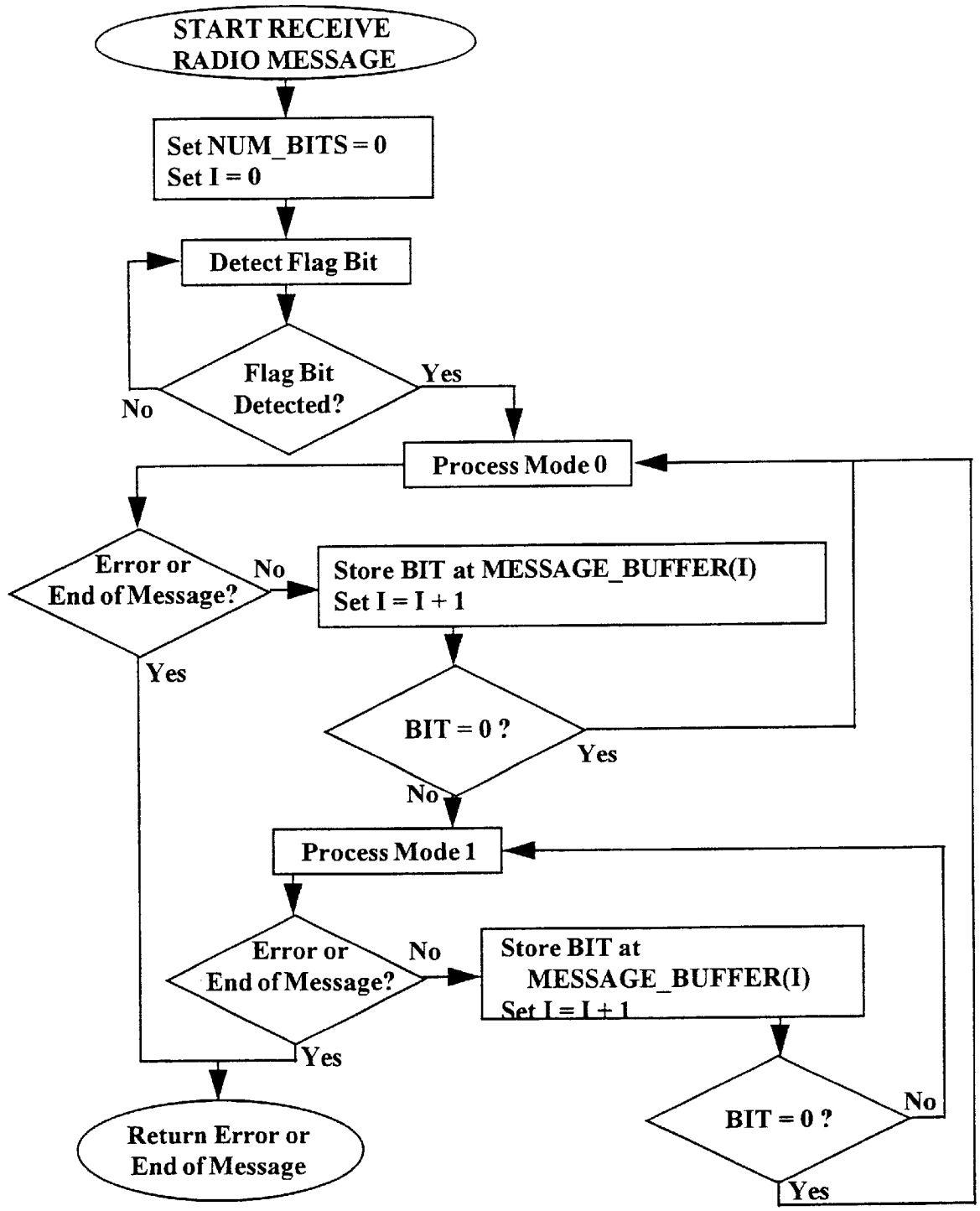
FIGS. 27A–27J are preferred flowchart illustrations of a preferred radio coding technique which is an alternative to the radio coding technique described above with reference to FIGS. 8E, 8G–8M and 10A–C.
Figure 27B:
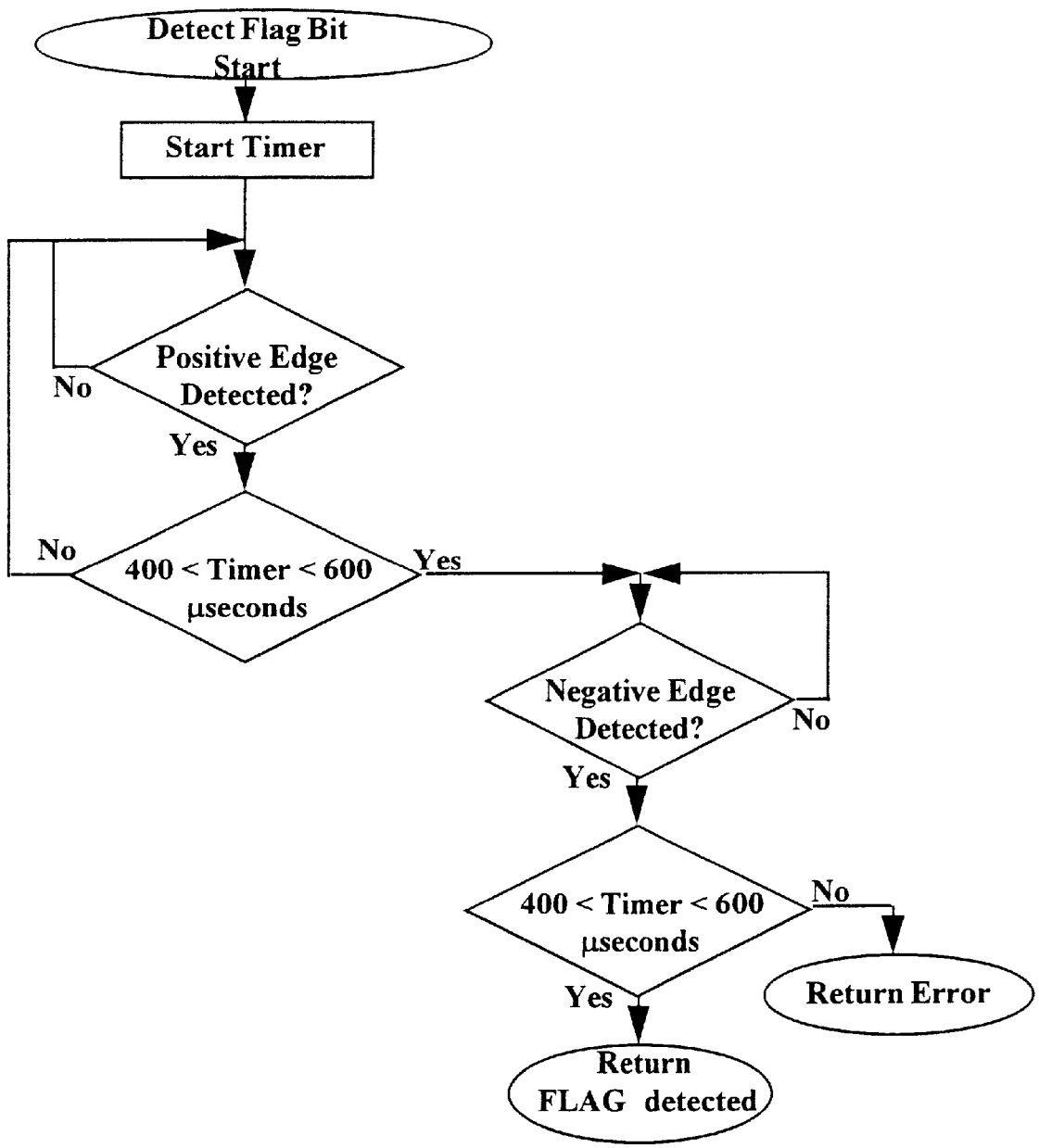
Figure 27C:
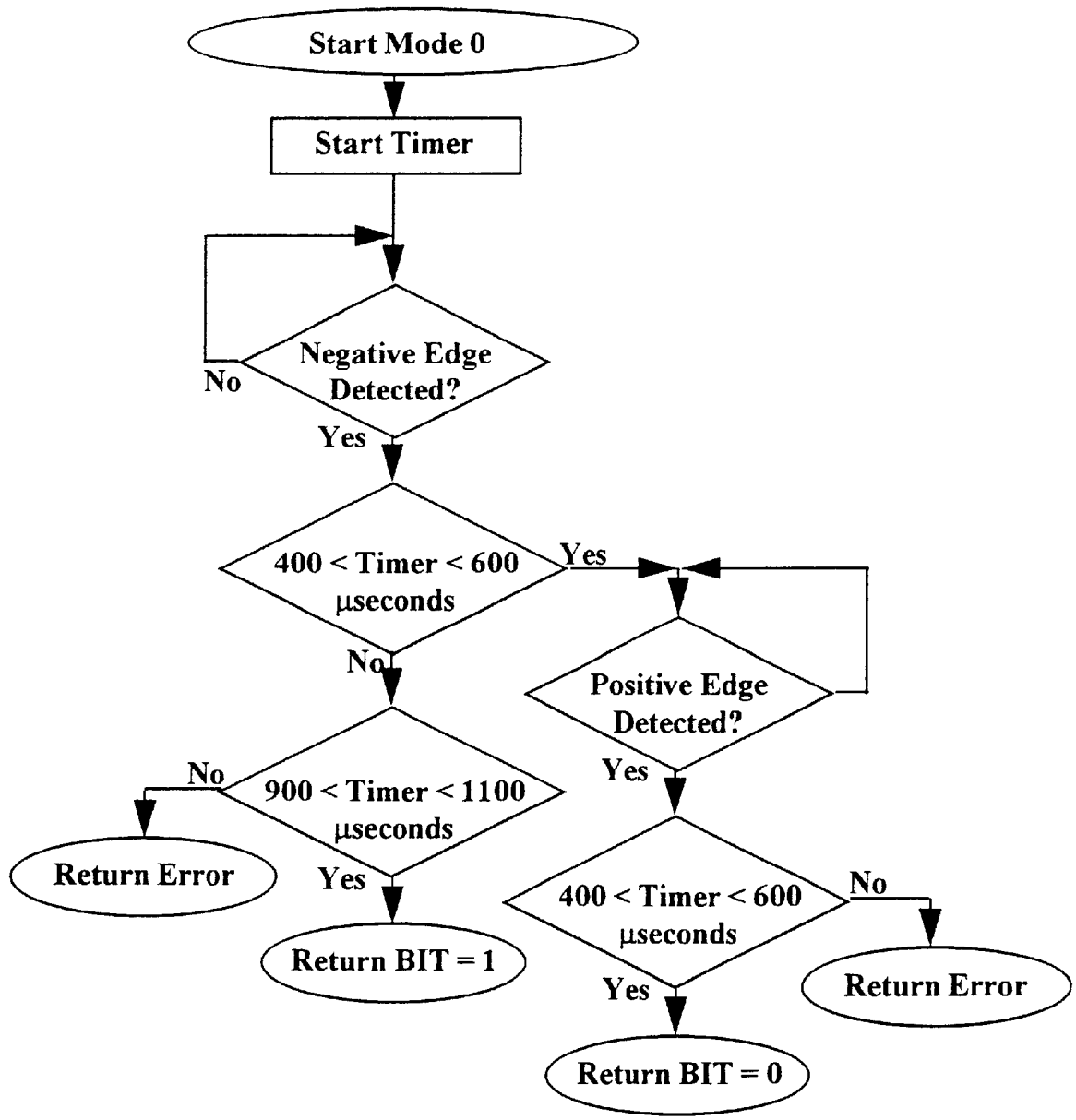
Figure 27D:
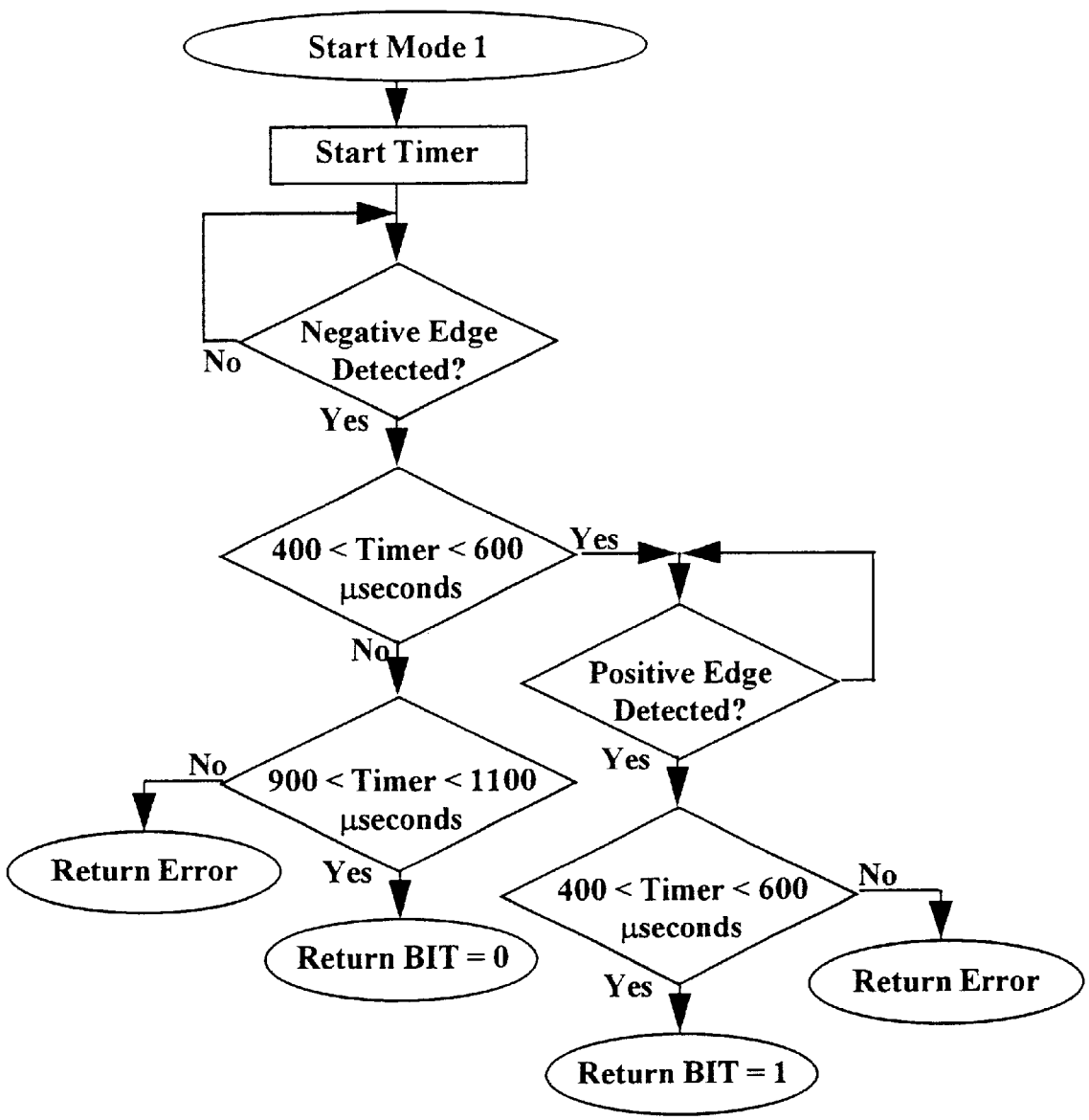
Figure 27E:
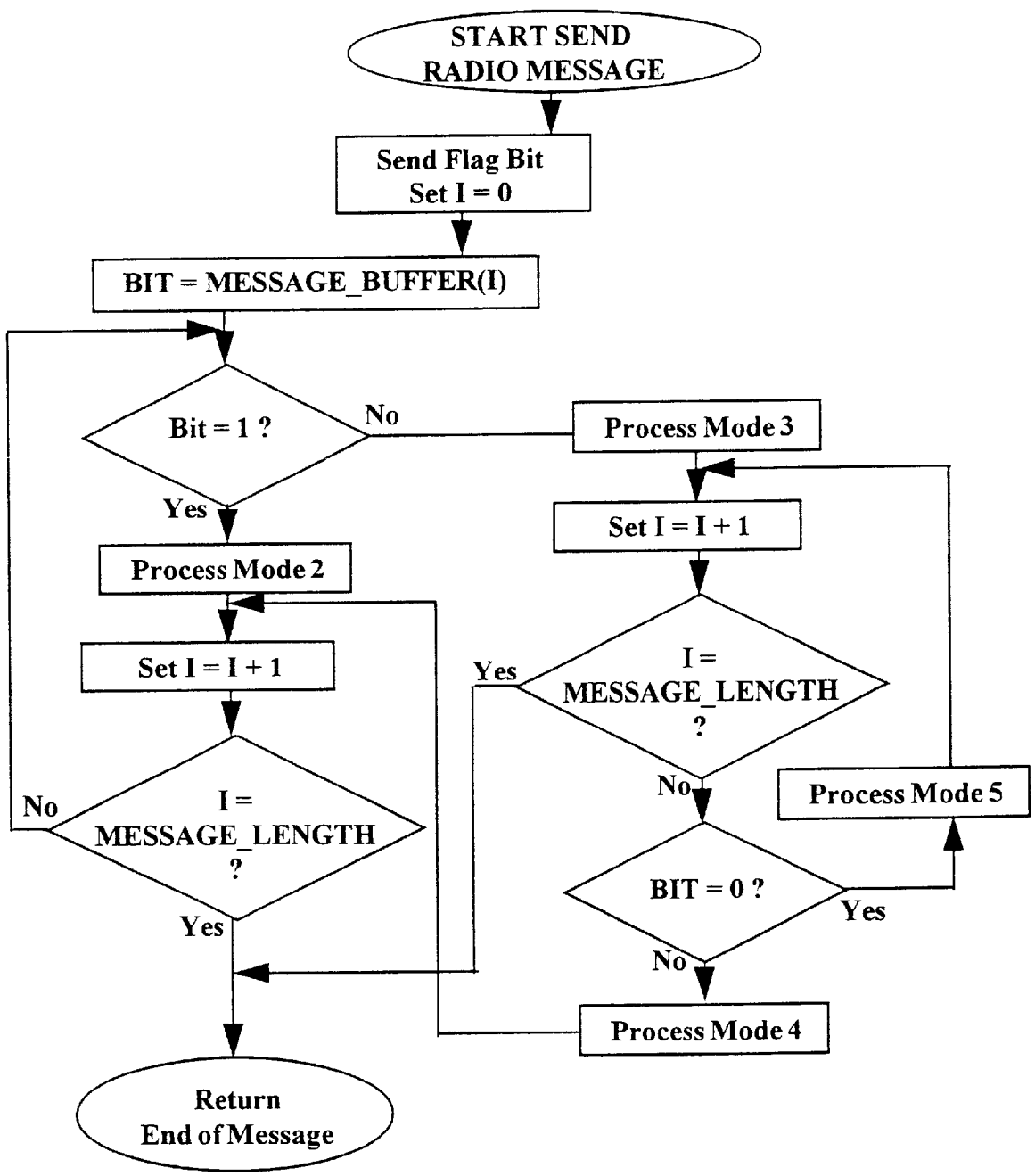
Figure 27F:
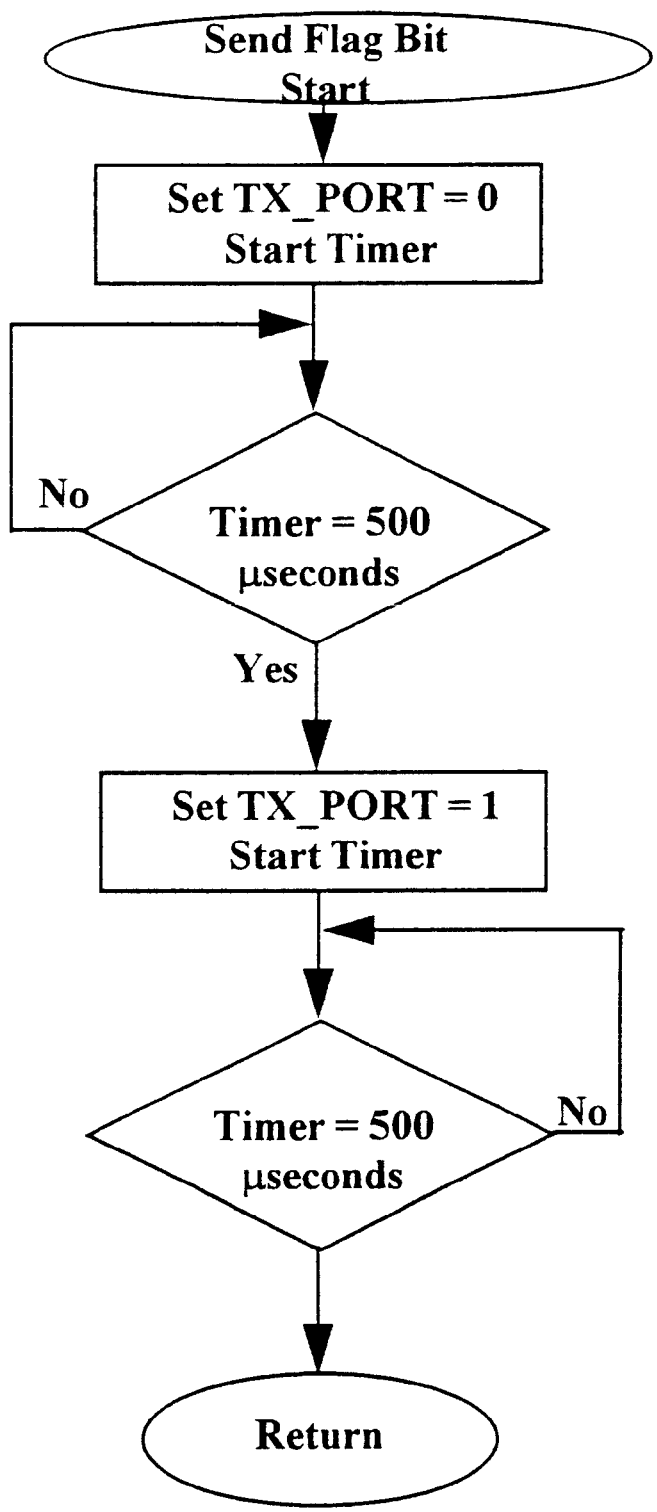
Figure 27G:
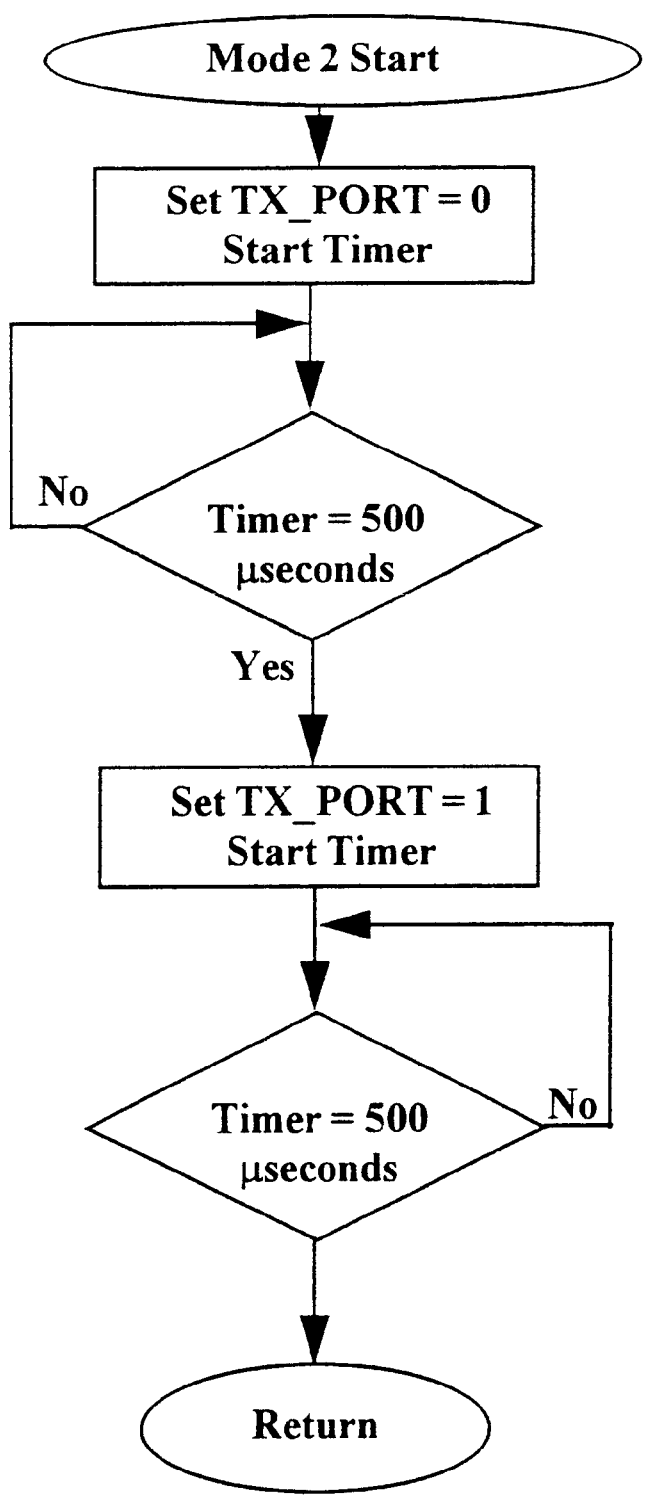
Figure 27H:
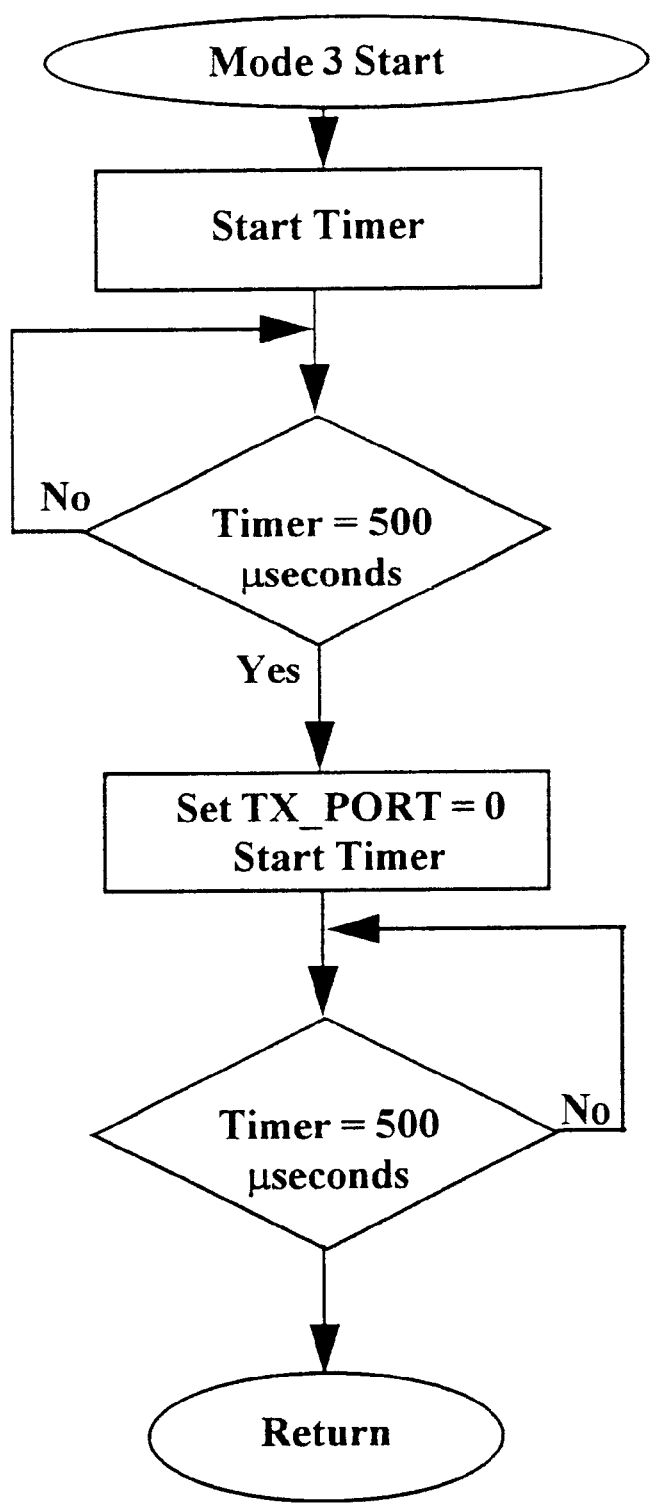
Figure 27I:
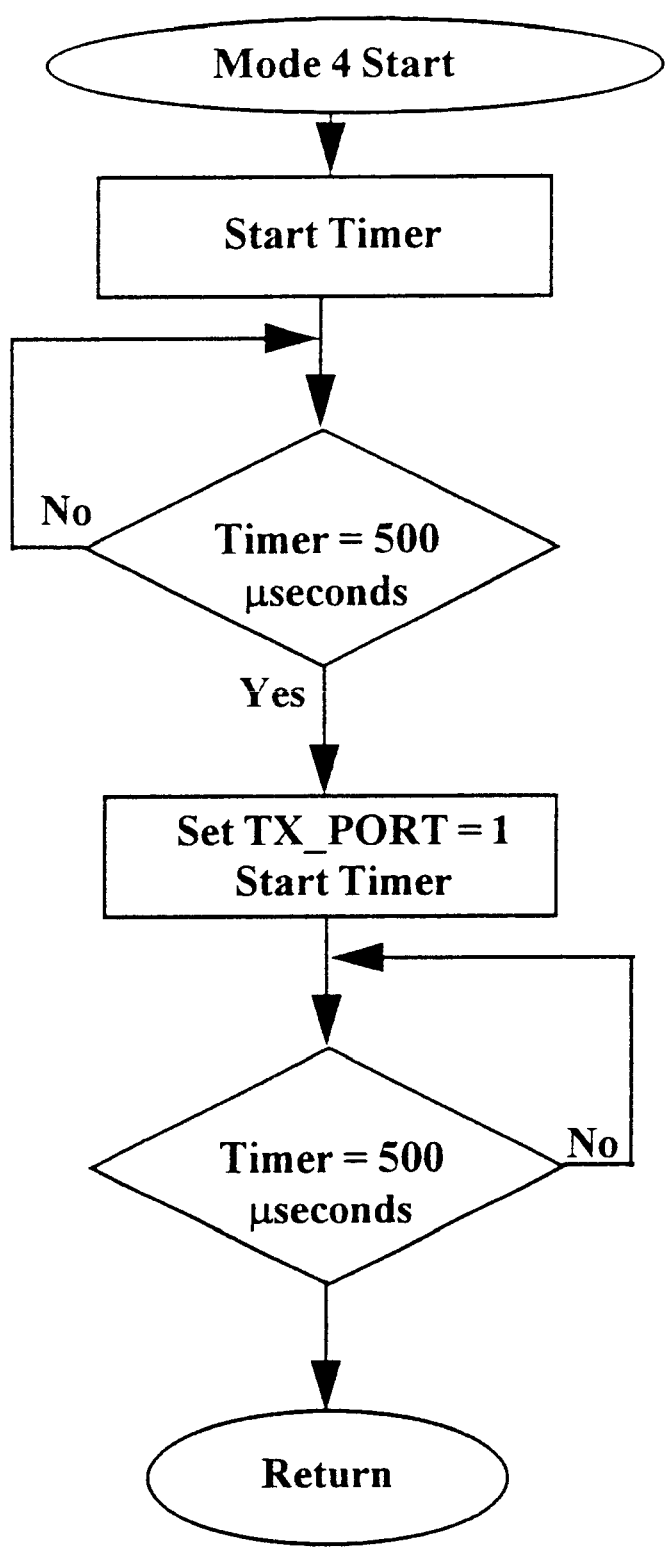
Figure 27J:
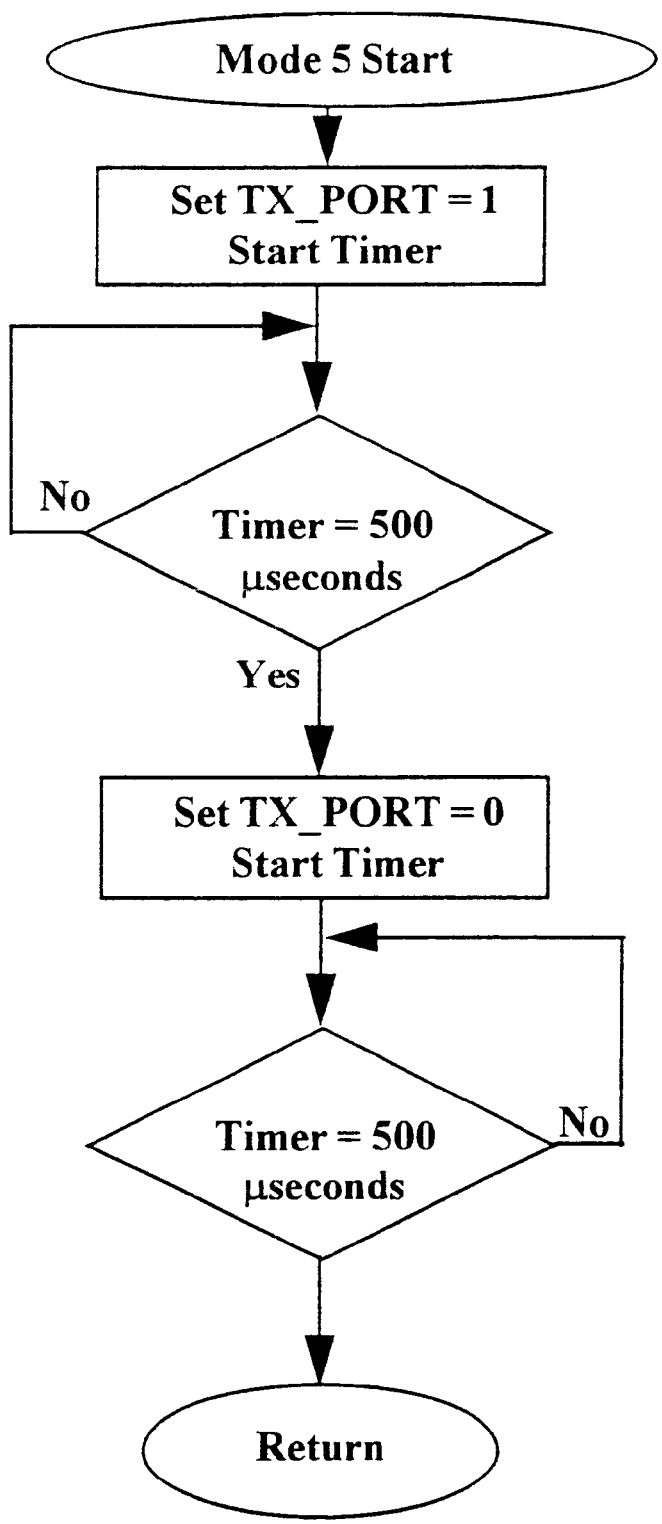

FIG. 23 is a semi-pictorial semi-block diagram illustration of a wireless computer controlled toy system including a toy 1500 having a toy control device 1504, a computer 1510 communicating with the toy control device 1504 by means of a computer-radio interface 1514 and a proximity detection subsystem operative to detect proximity between the toy and the computer. The proximity detection subsystem may for example include a pair of ultrasound transducers 1520 and 1530 associated with the toy and computer respectively. The toy's ultrasound transducer 1520 typically broadcasts ultrasonic signals which the computer's ultrasound transducer 1530 detects if the computer and toy are within ultrasonic communication range, e.g. are in the same room.

FIGS. 24A–24E, taken together, form a detailed electronic schematic diagram of a multi-channel implementation of the computer radio interface 110 of FIG. 3 which is similar to the detailed electronic schematic diagrams of FIGS. 5A–5D except for being multi-channel, therefore capable of supporting full duplex applications, rather than single-channel.

FIGS. 25A–25F, taken together, form a detailed schematic illustration of a computer radio interface which connects to a serial port of a computer rather than to the sound board of the computer.

FIGS. 26A–26D, taken together, form a detailed schematic illustration of a computer radio interface which connects to a parallel port of a computer rather than to the sound board of the computer.

FIGS. 27A–27J are preferred self-explanatory flowchart illustrations of a preferred radio coding technique, based on the Manchester coding, which is an alternative to the radio coding technique described above with reference to FIGS. 8E, 8G–8M and 10A–C.

FIGS. 28A–28K, taken together, form a detailed electronic schematic diagram of the multi-port multi-channel computer radio interface sub-unit of FIG. 13.

FIGS. 29A–29I, taken together, form a detailed electronic schematic diagram of the multi-port multi-channel computer radio interface sub-unit of FIG. 14.

Figure 30:
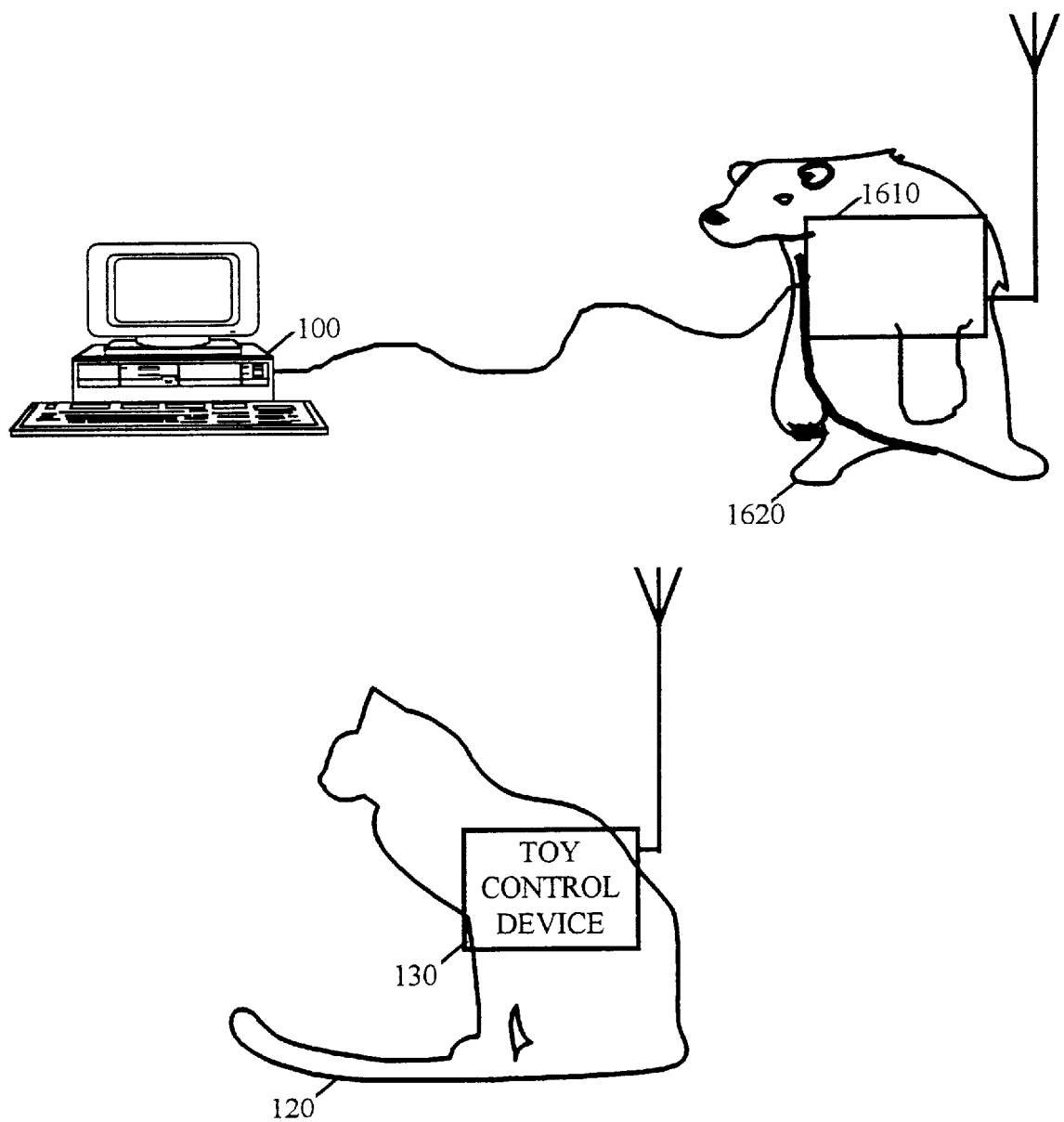

FIG. 30 illustrates a further embodiment of the present invention which includes a combination of a Computer Radio Interface (CRI) and a Toy Control Device (TCD), 1610.

The combined unit 1610 controls a toy 1620 which is connected to the computer 100 by a device, such as a cable, and communicates with other toys, 120, by means such as radio communication, using the computer radio interface 110. The toy 1620 is operated in a similar manner as the toy device 120.

Figure 31:
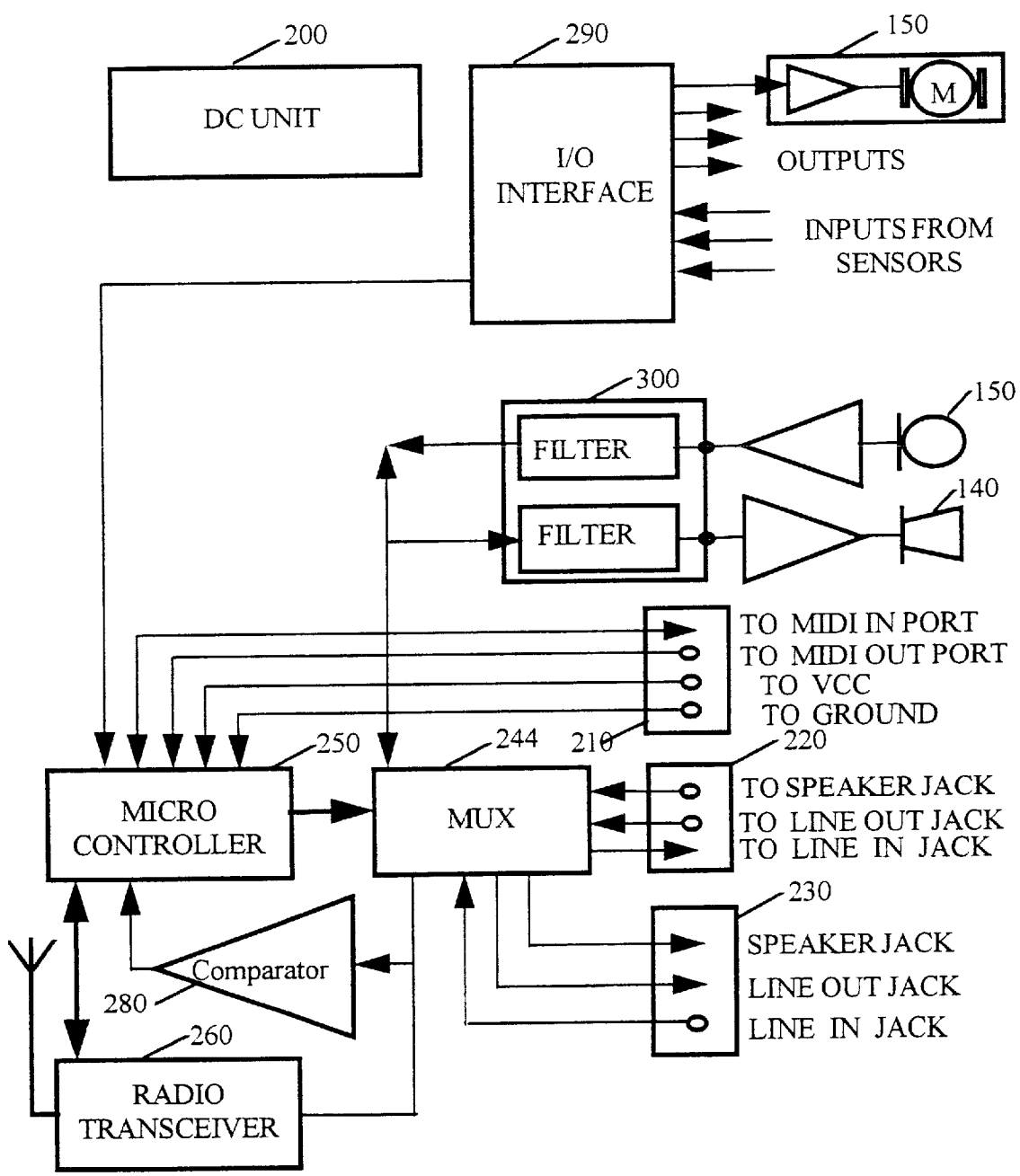

FIG. 31 illustrates a simplified block diagram of the combined unit 1610.

Figure 28A:
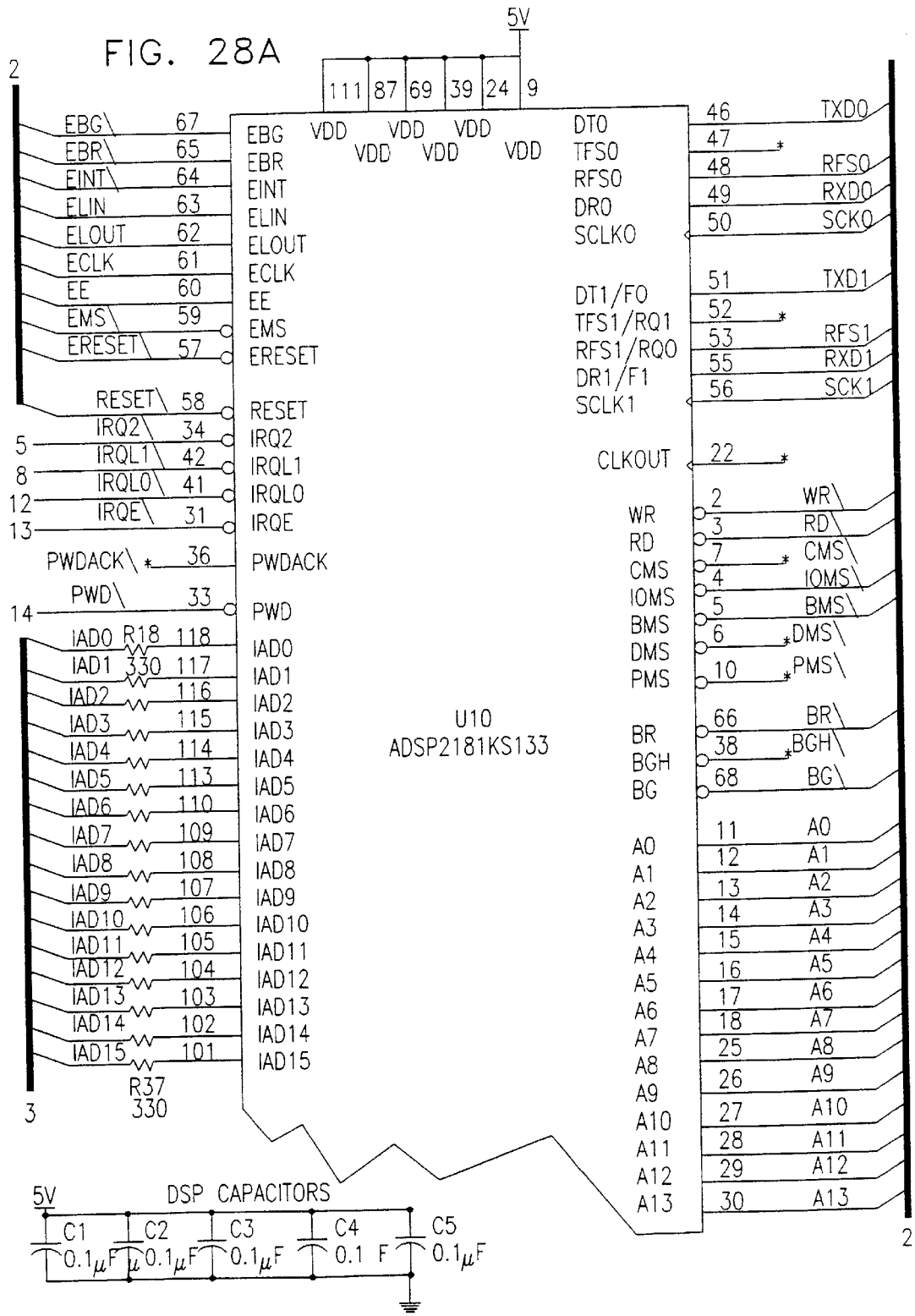
Figure 28B:
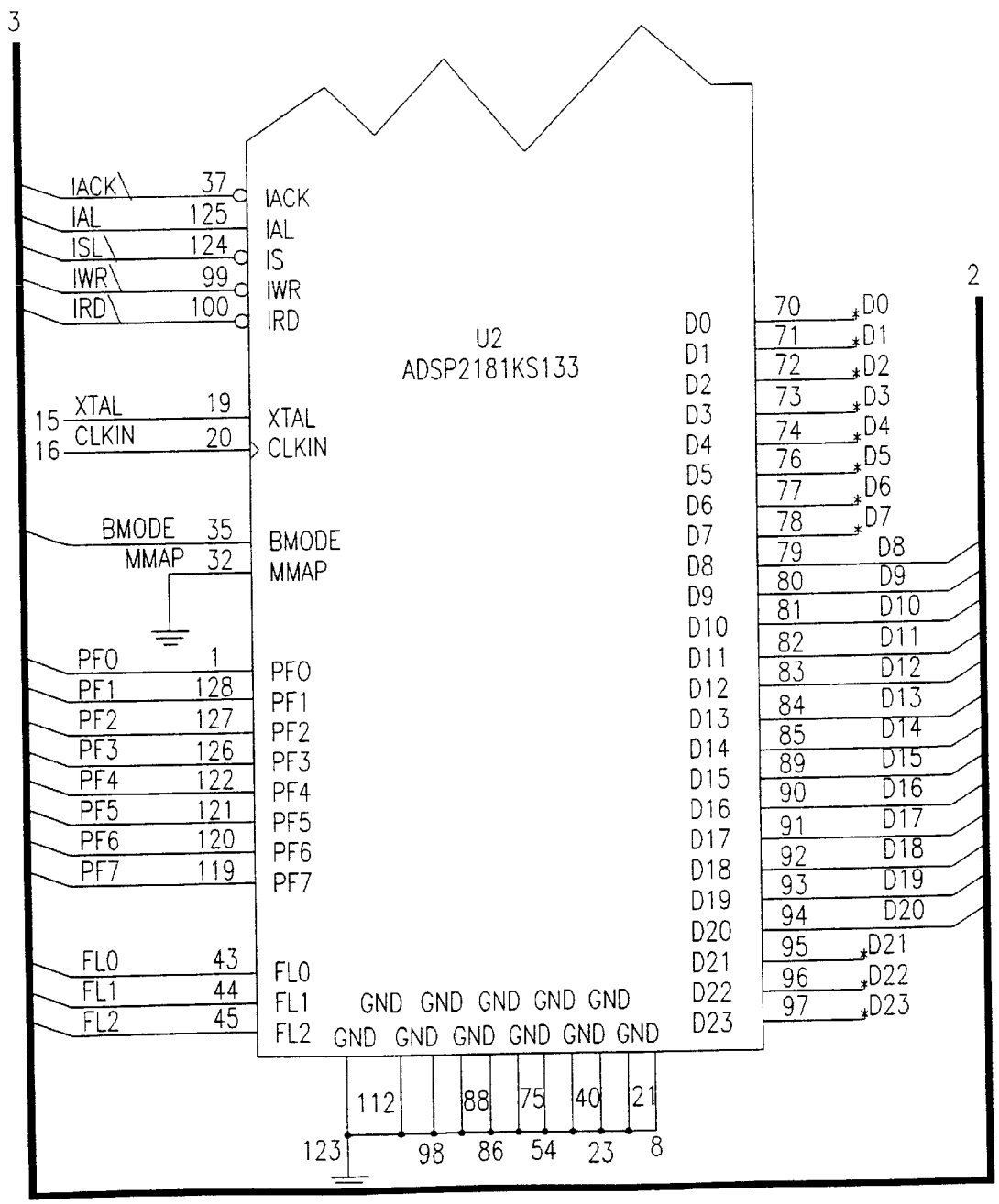
Figure 28C:
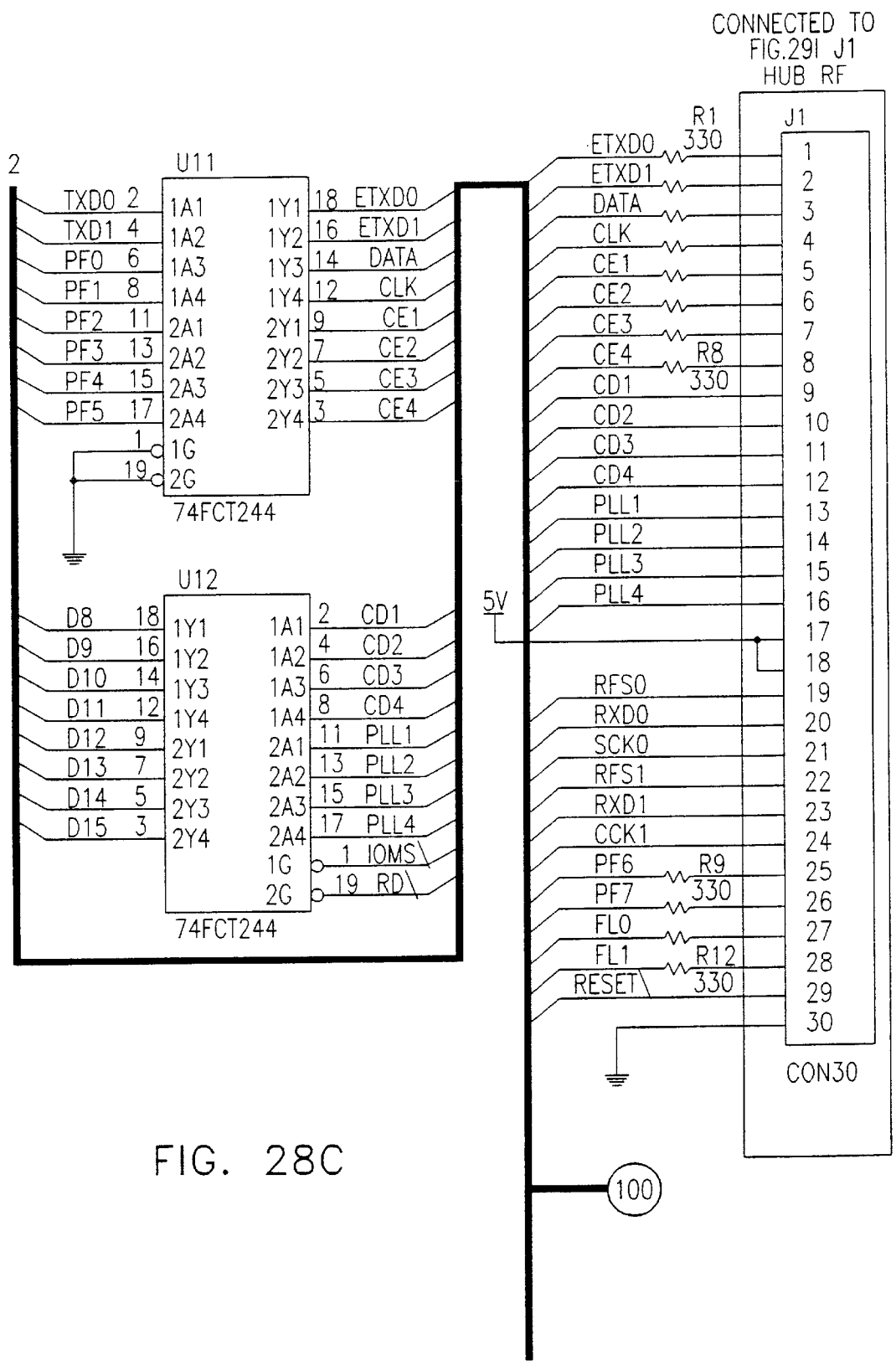
Figure 28D:
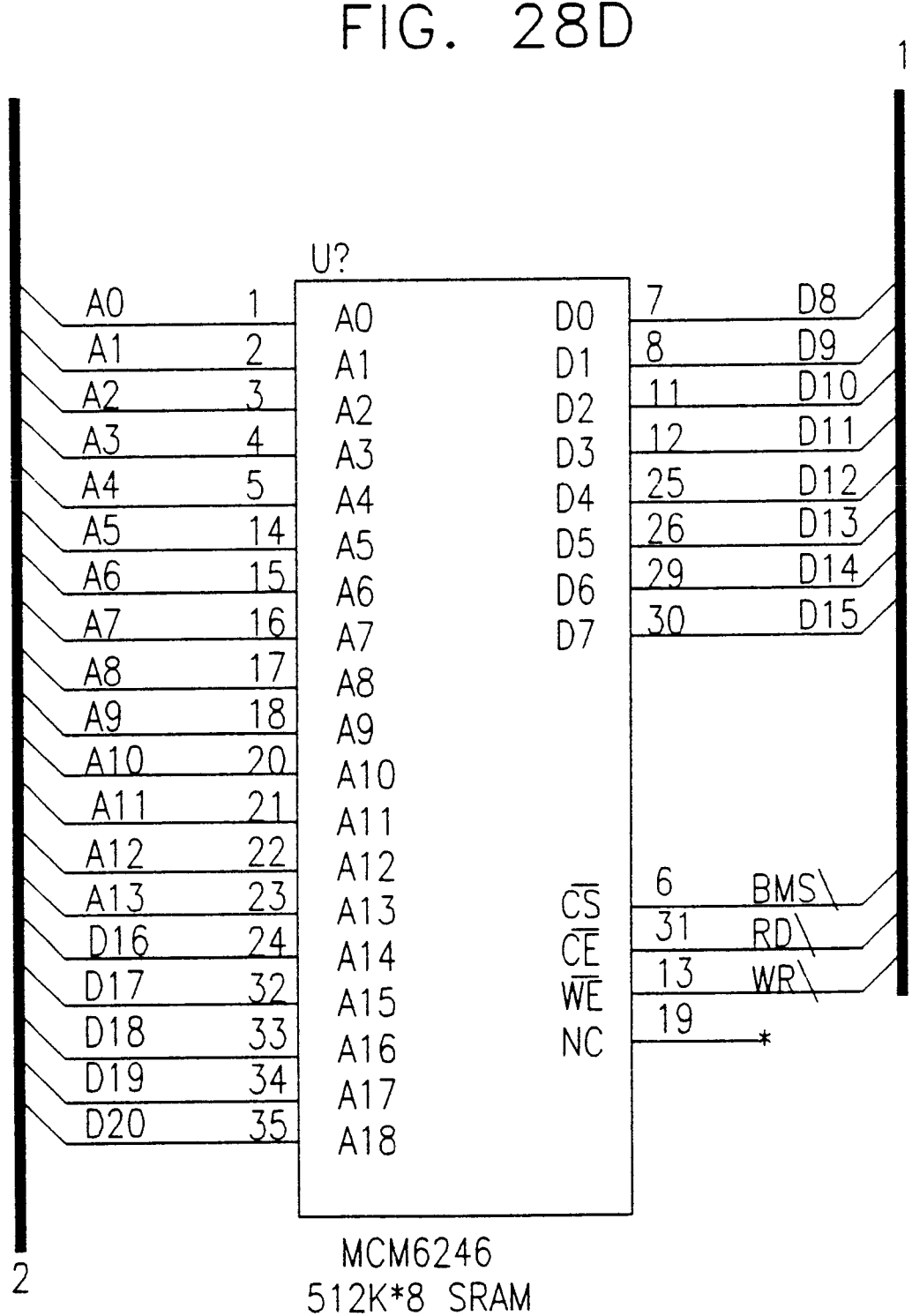
Figure 28E:
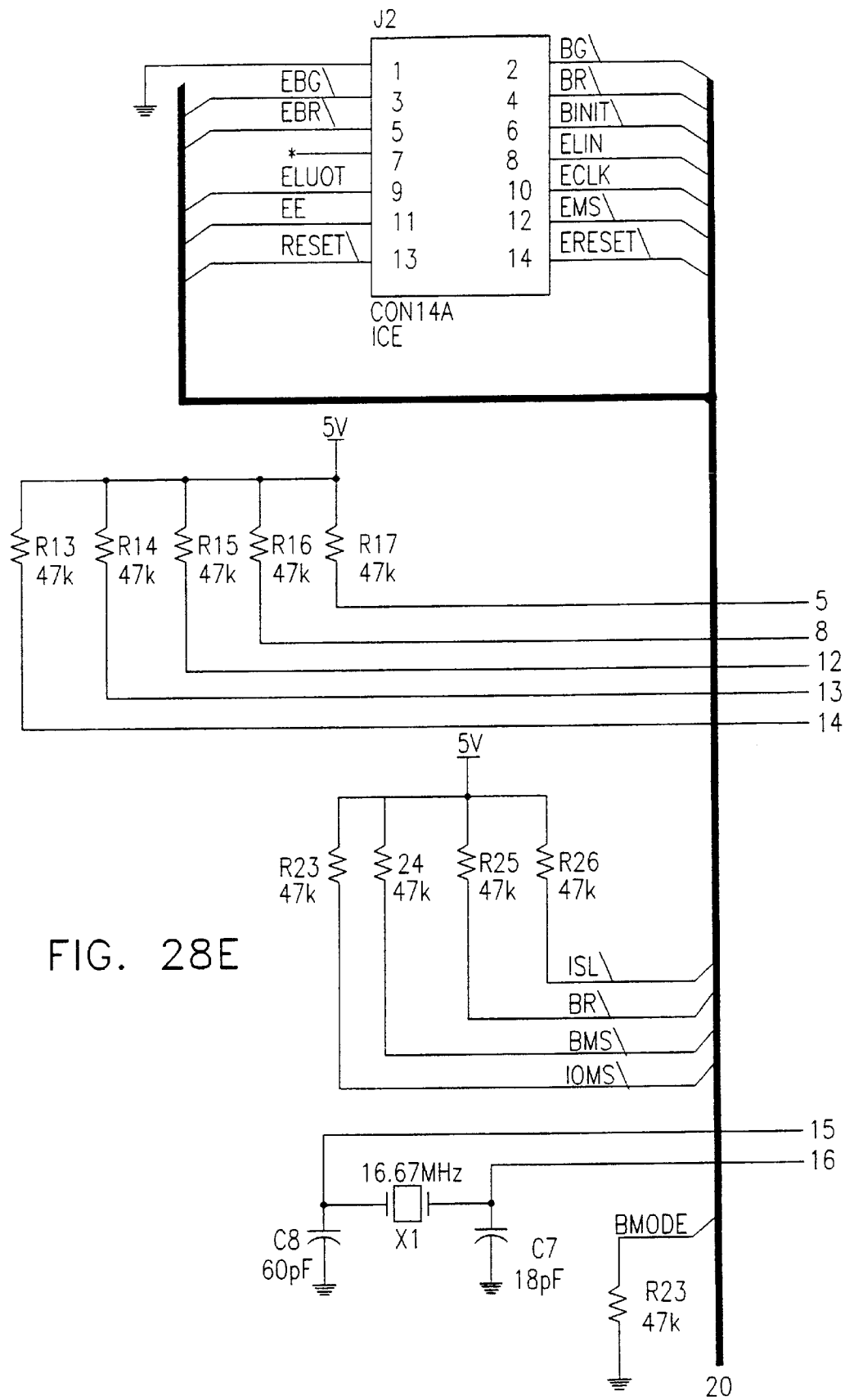
Figure 28F:
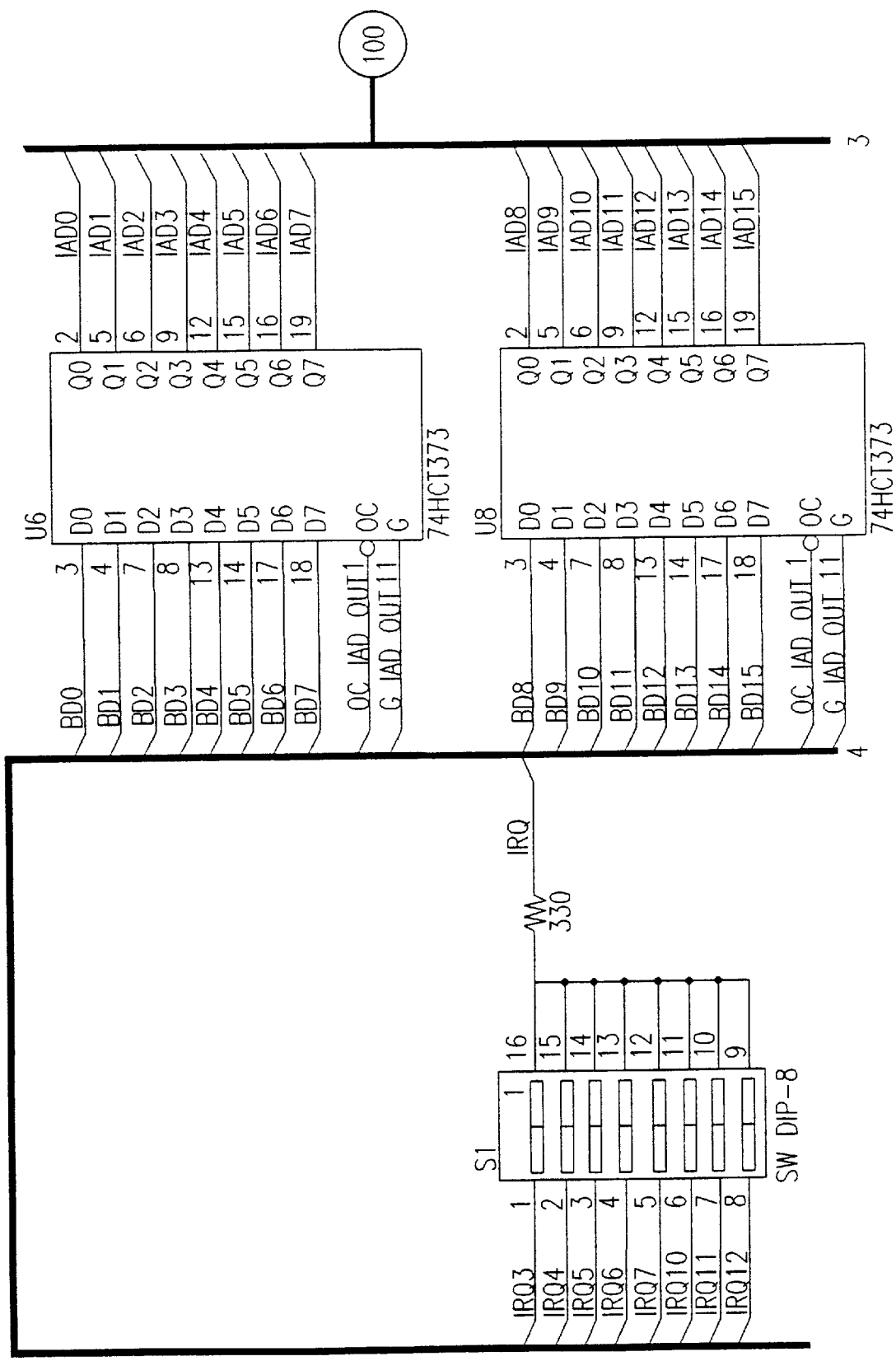
Figure 28G:
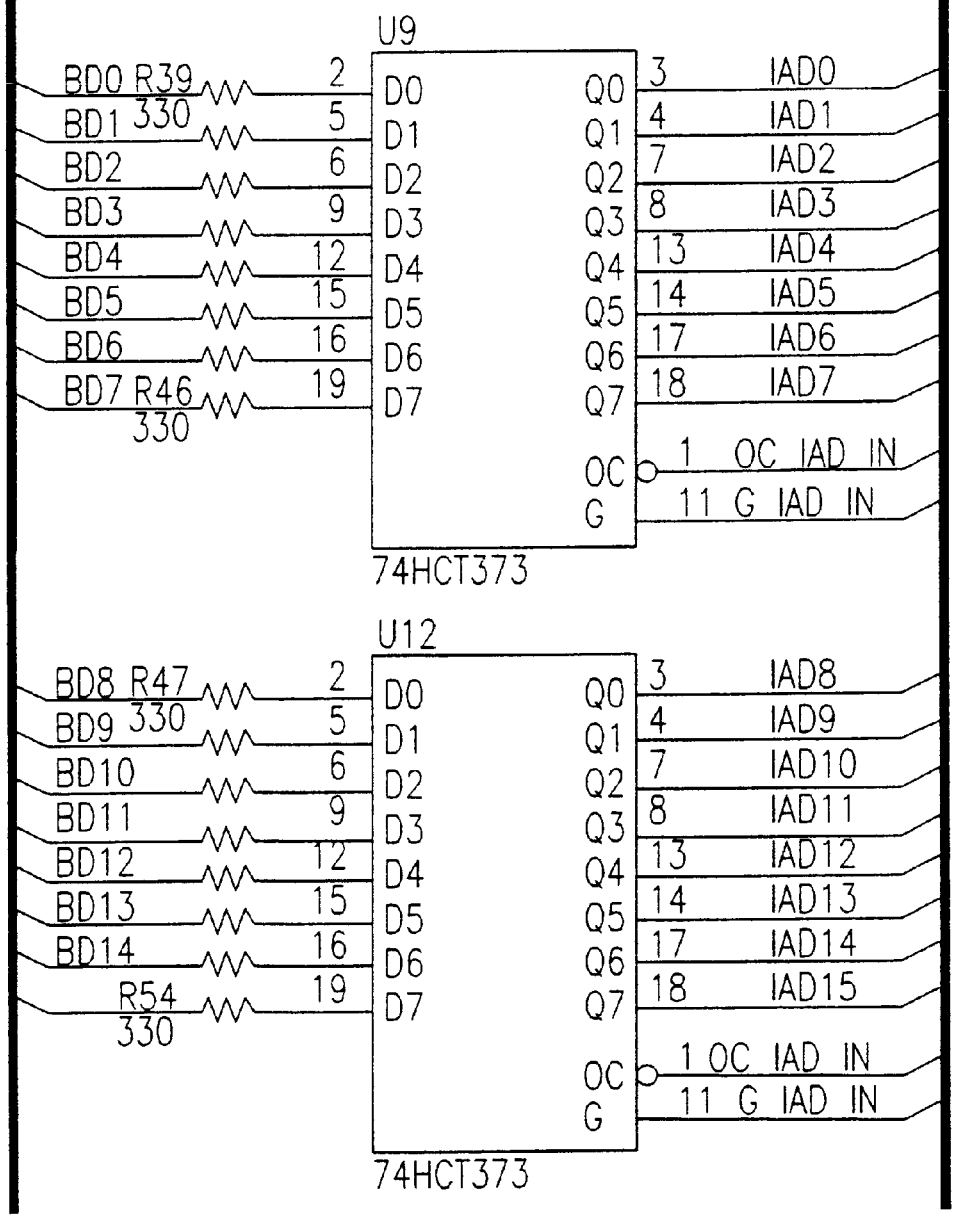
Figure 28H:
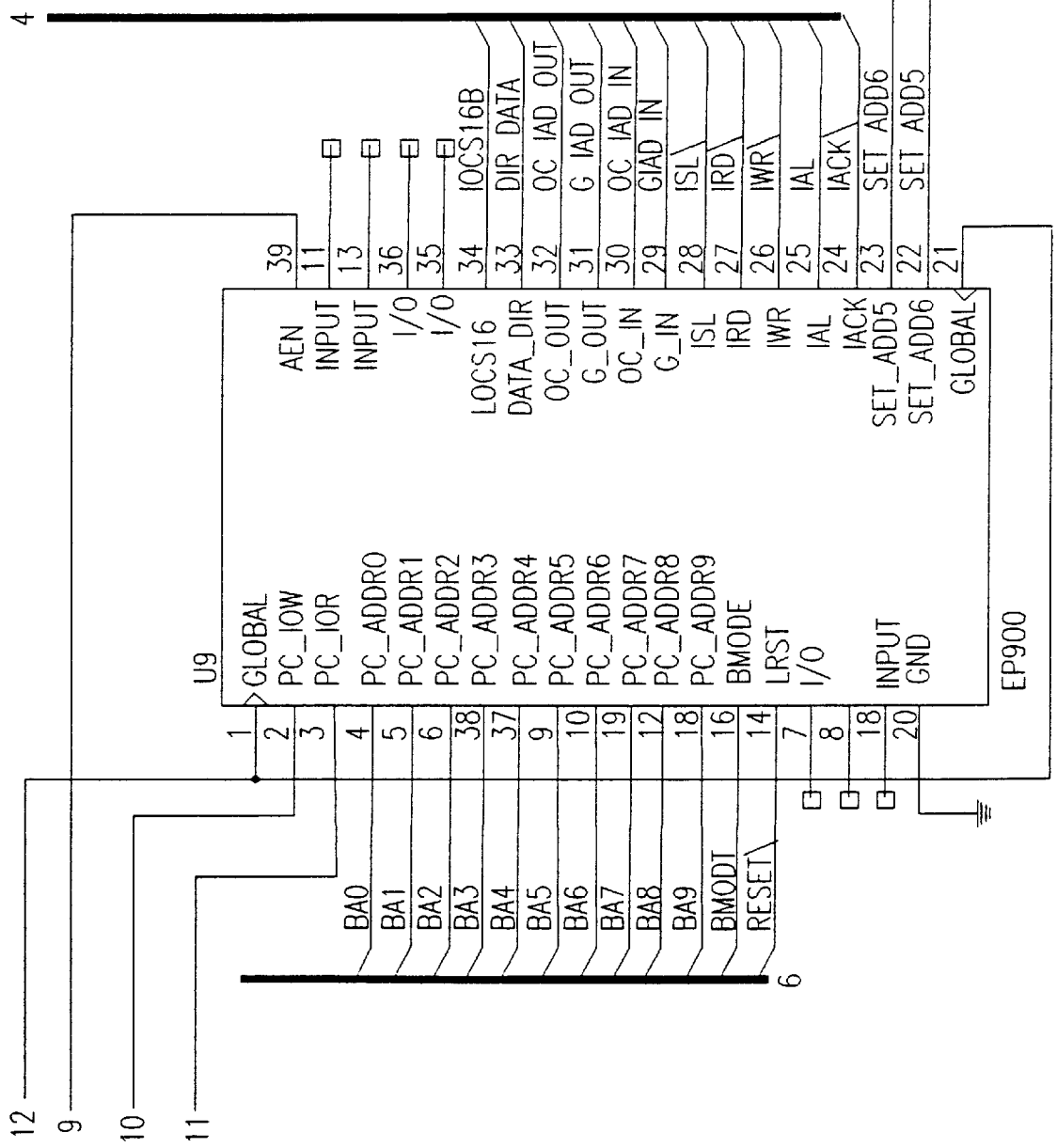
Figure 28J:
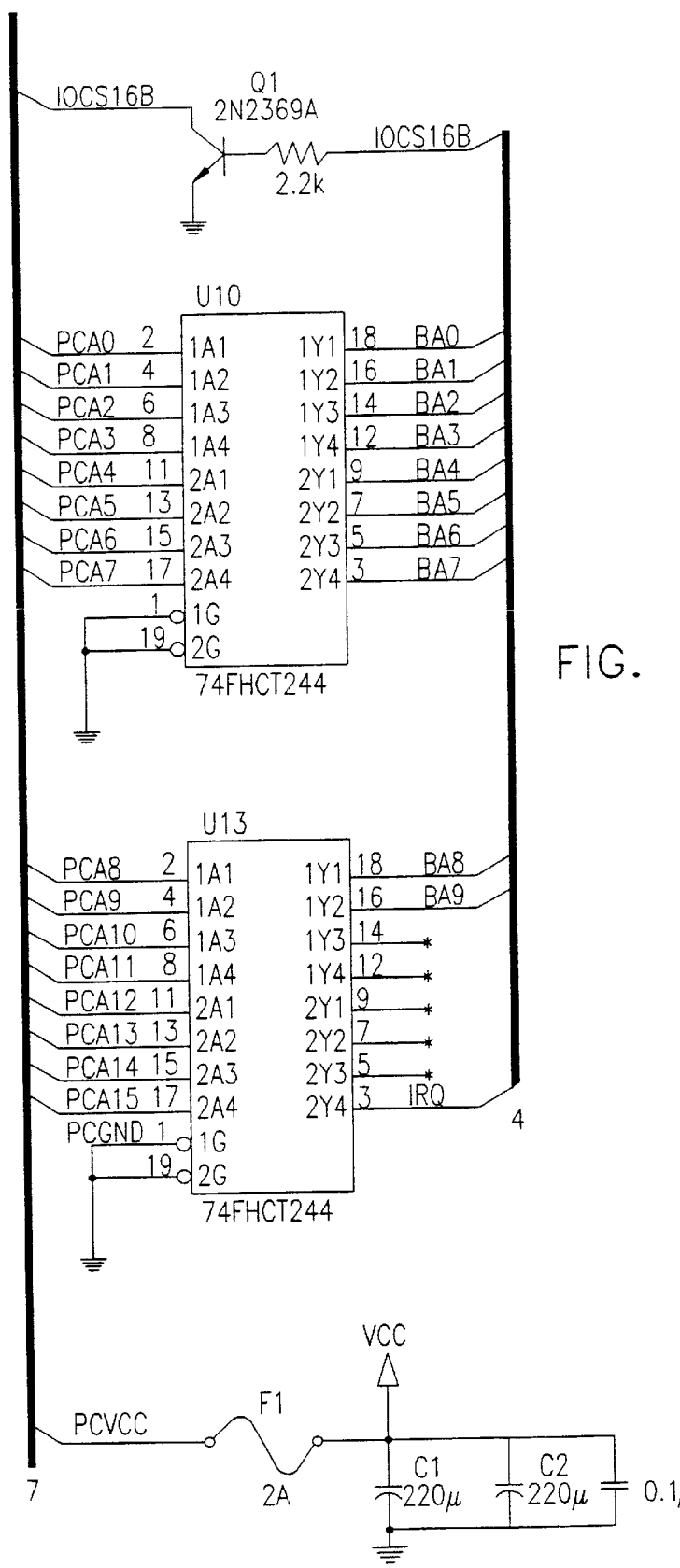
Figure 28K:
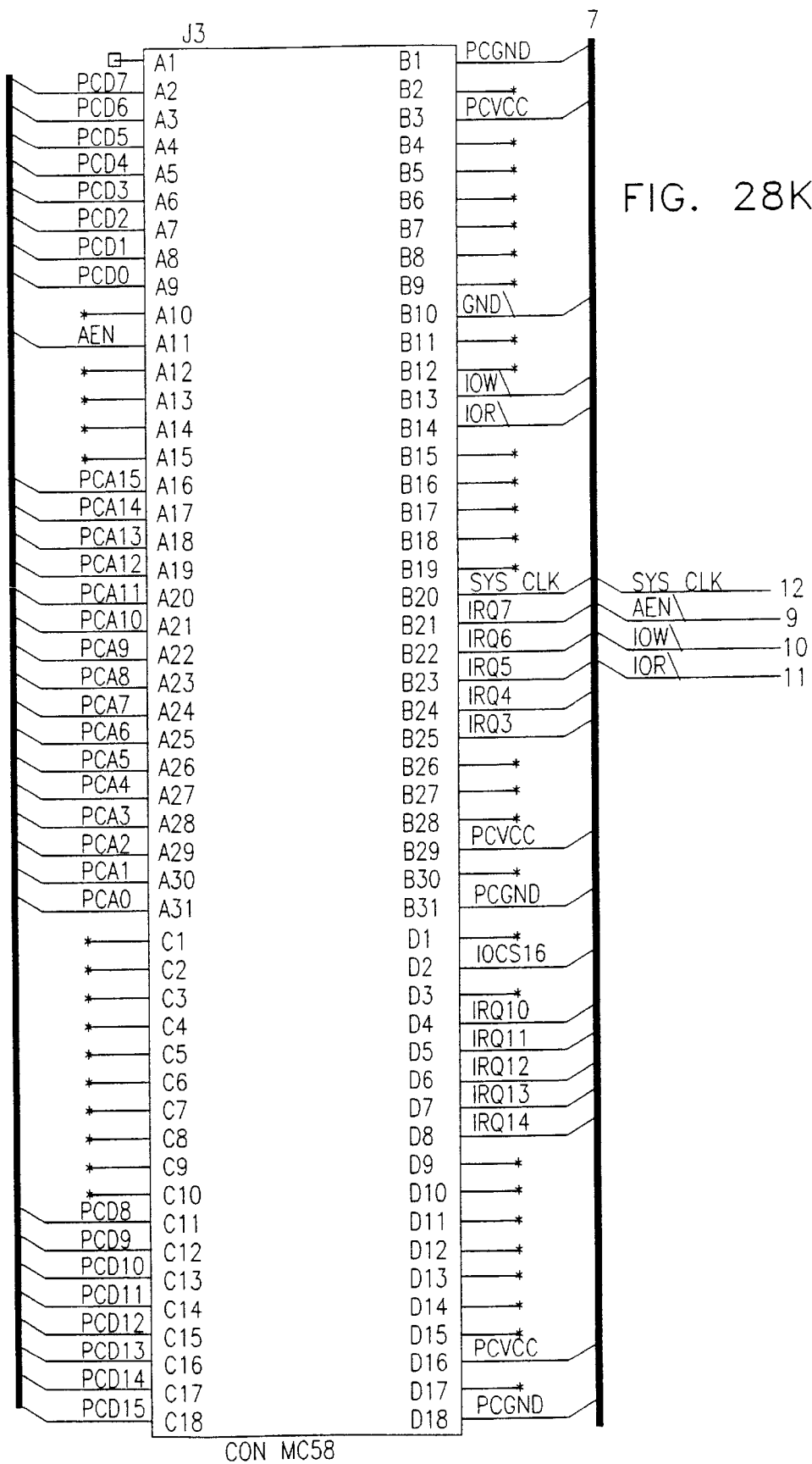
Figure 29A:
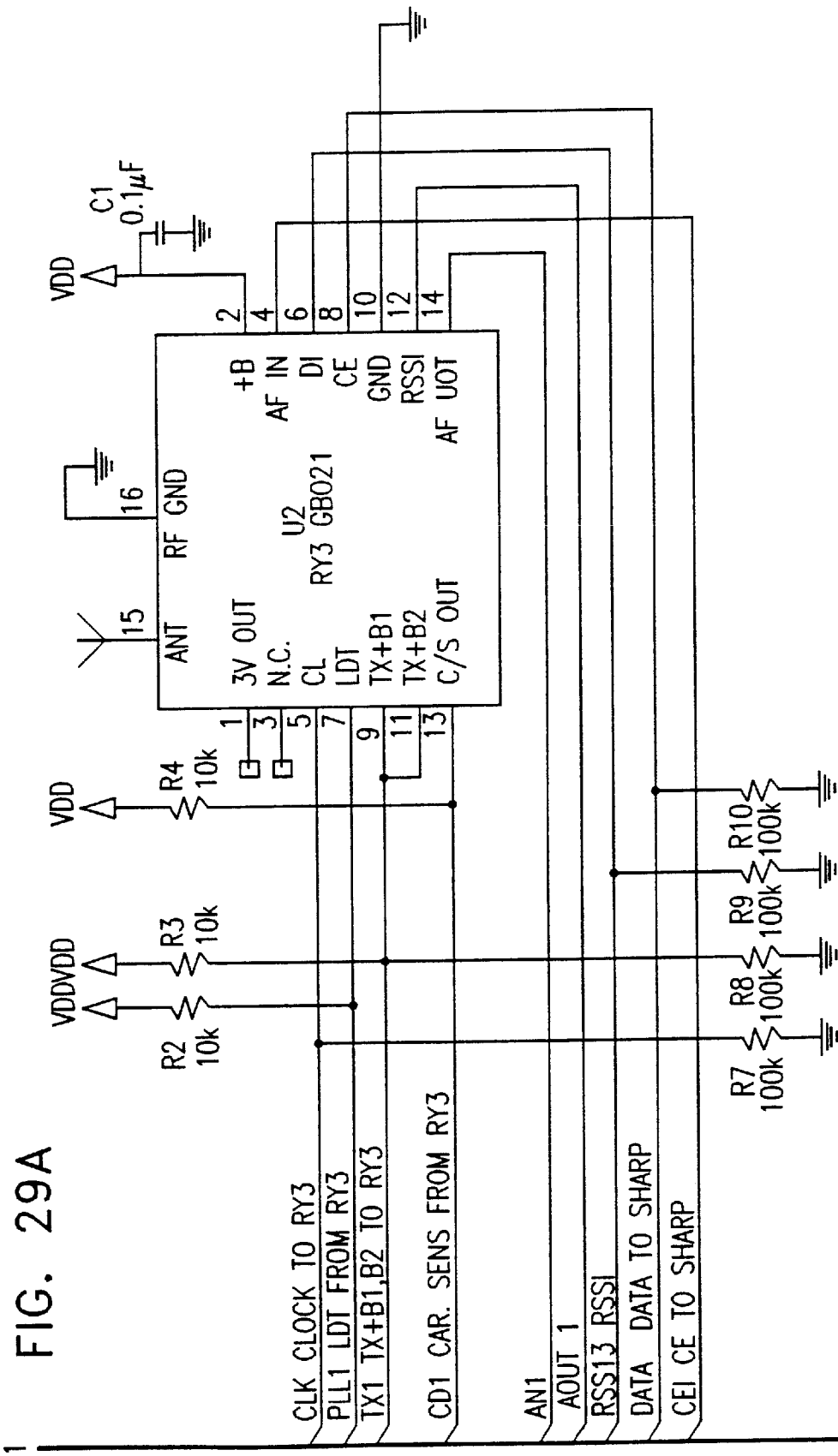
FIGS. 29A–29I, taken together, form a detailed electronic schematic diagram of the multi-port multi-channel computer radio interface sub-unit of FIG. 14.
Figure 29B:
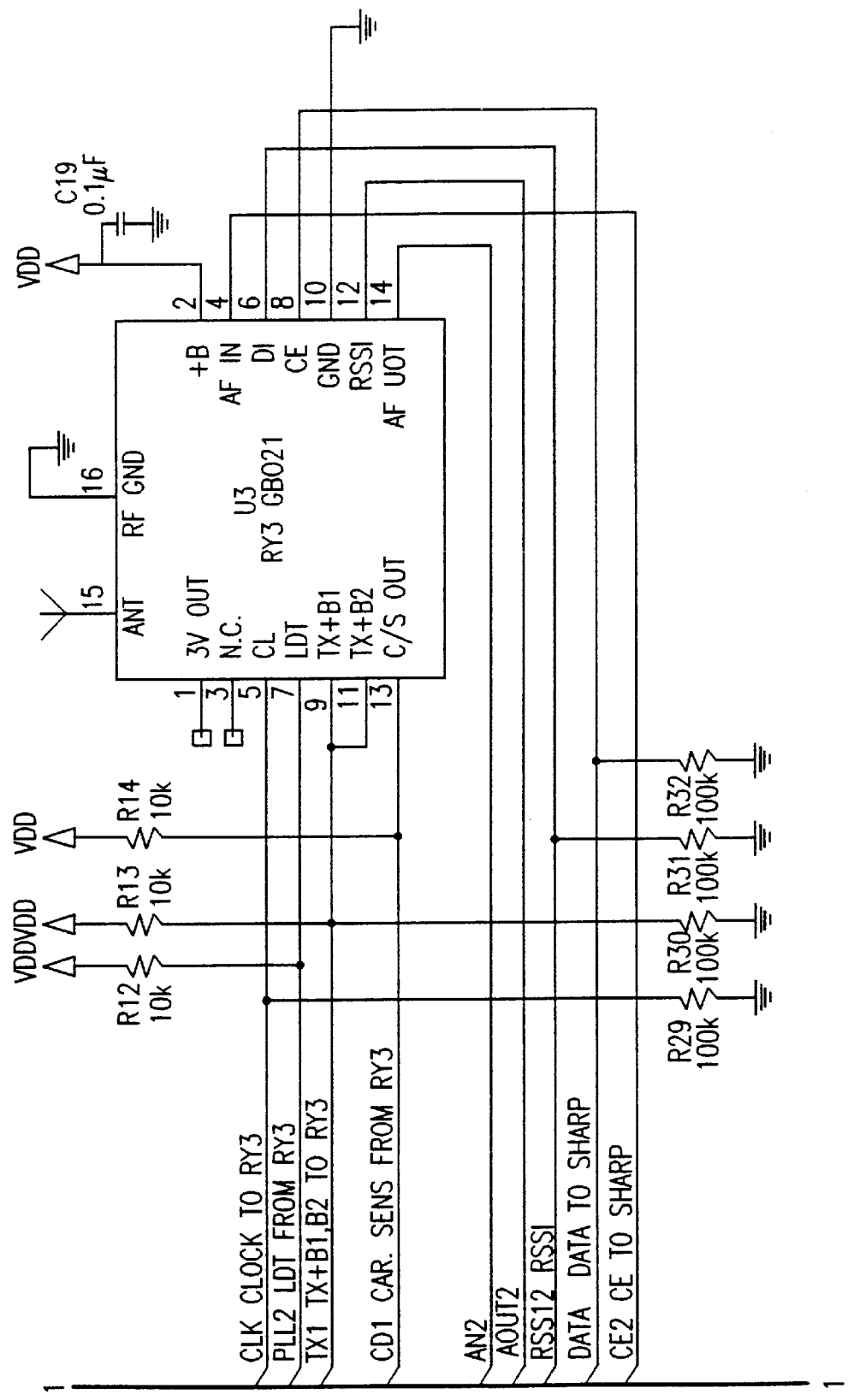
Figure 29C:
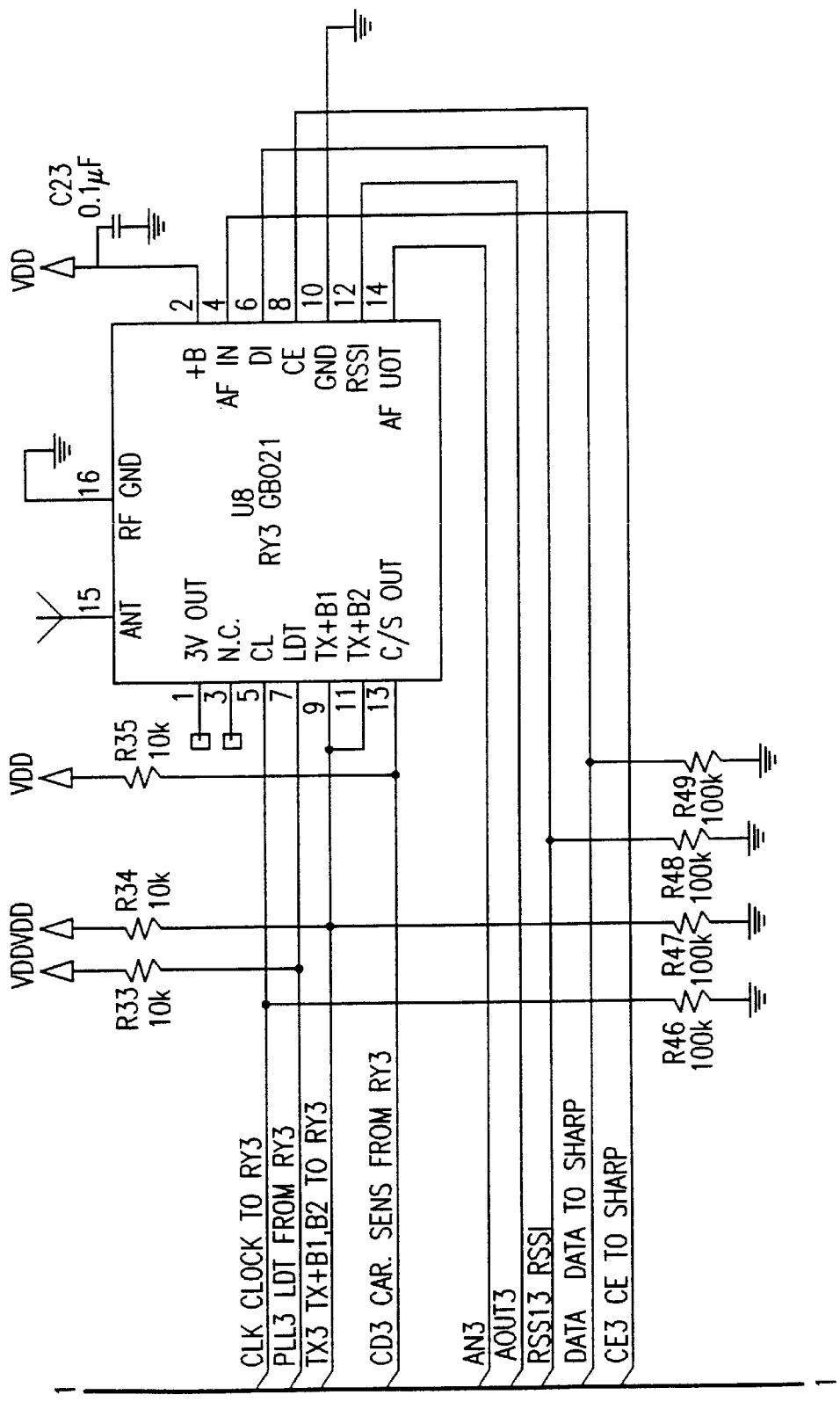
Figure 29D:
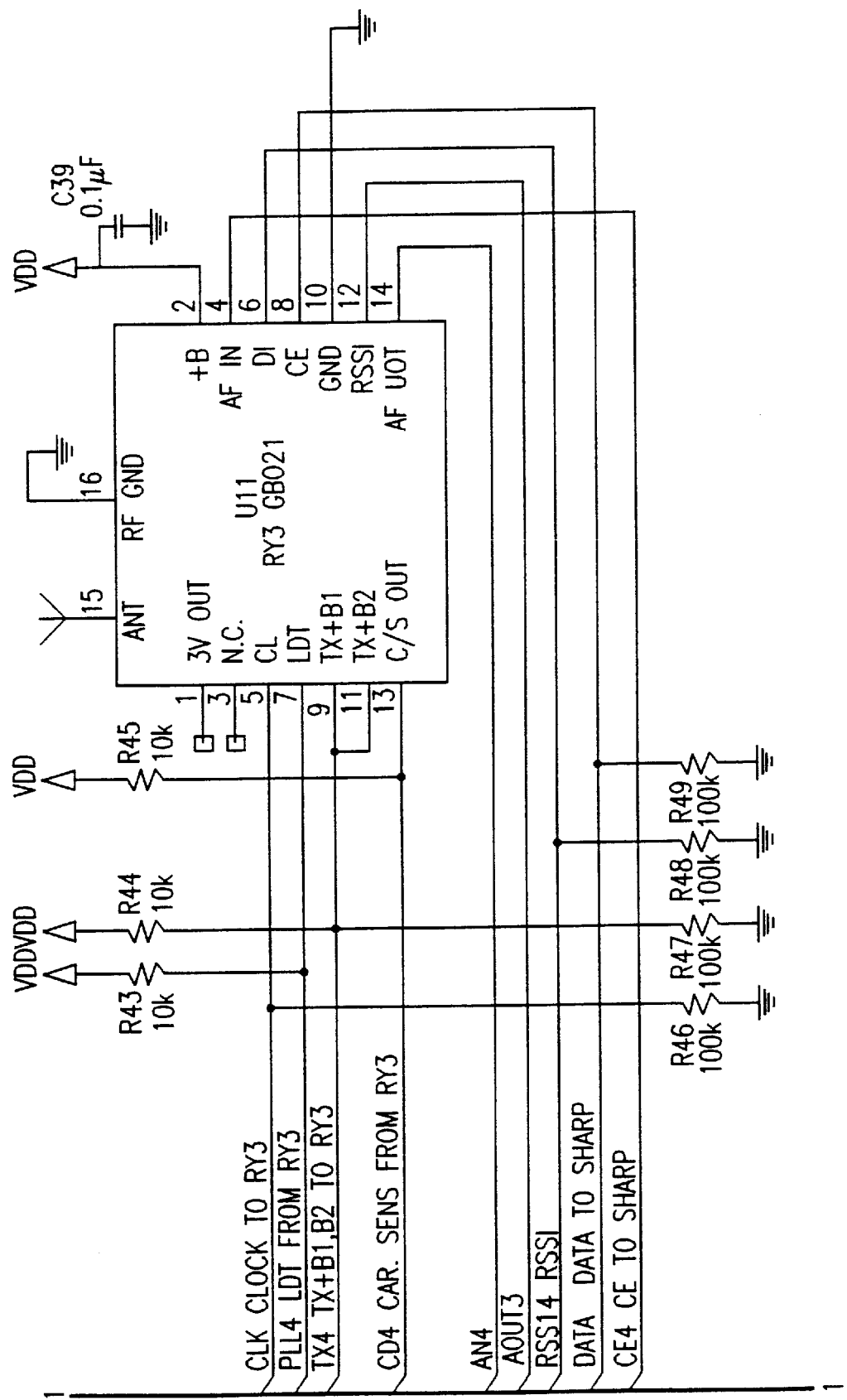
Figure 29E:
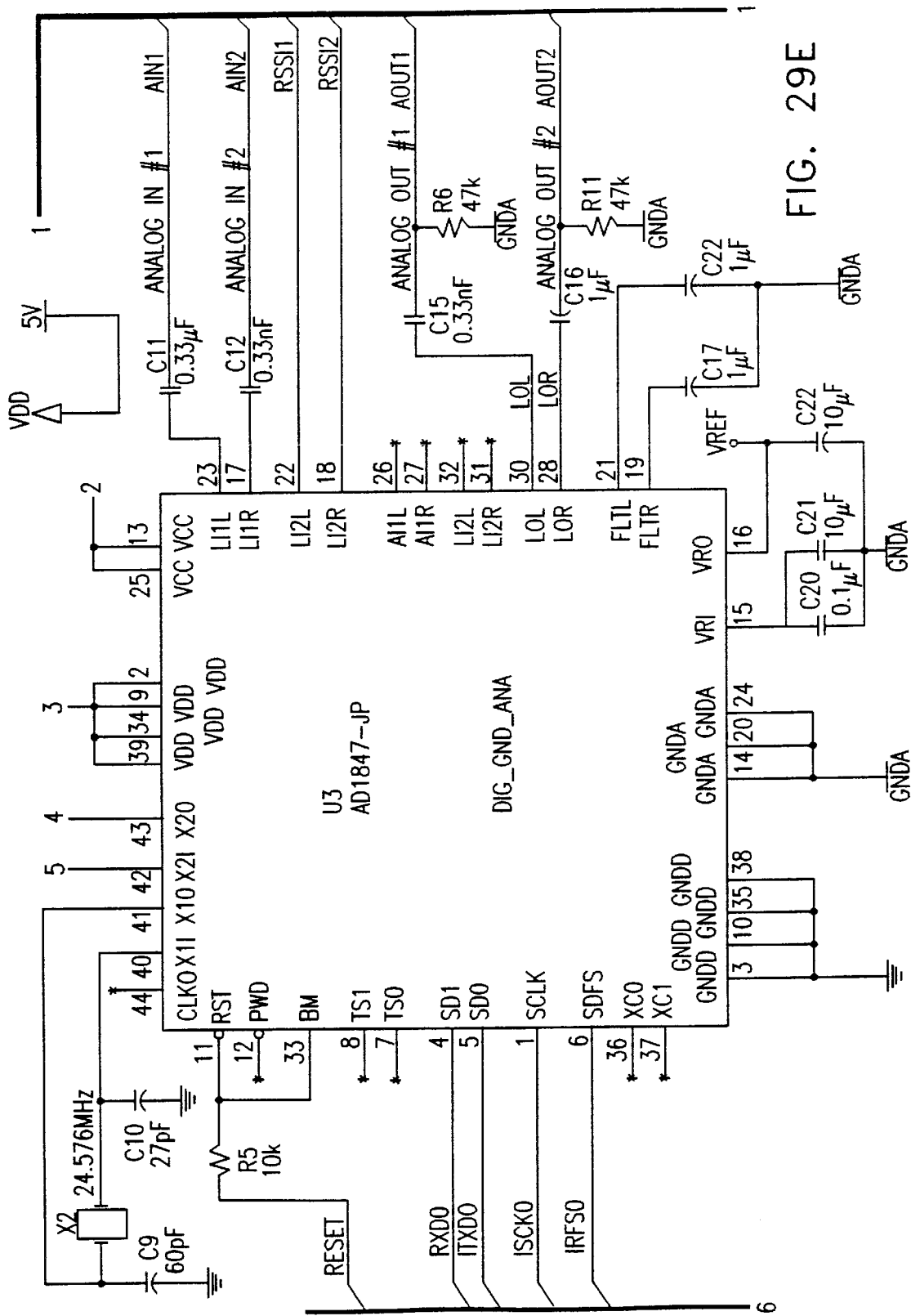
Figure 29F:
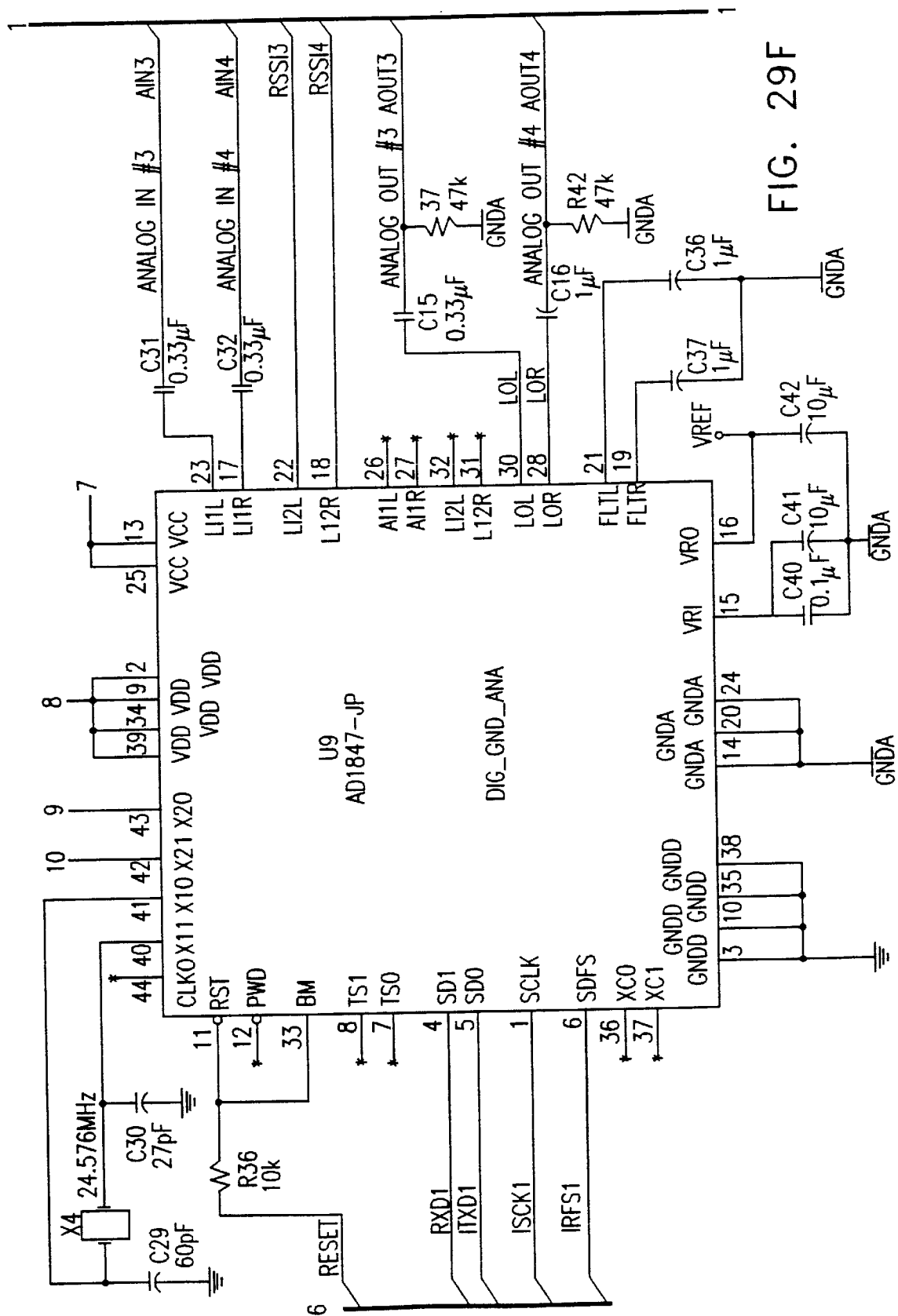
Figure 29G:
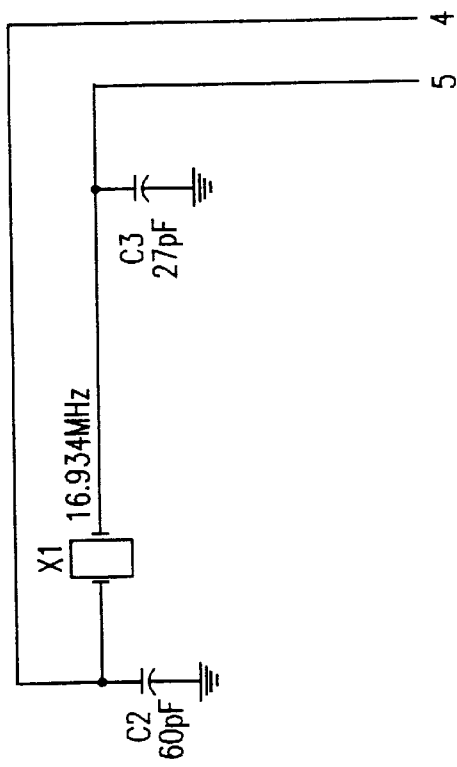
Figure 29H:
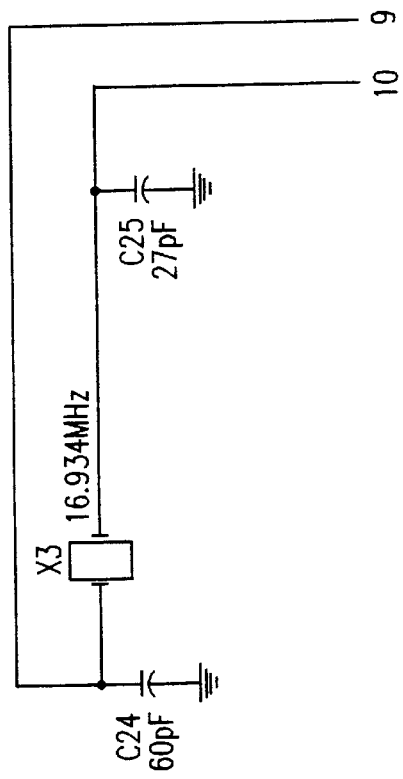
Figure 29I:
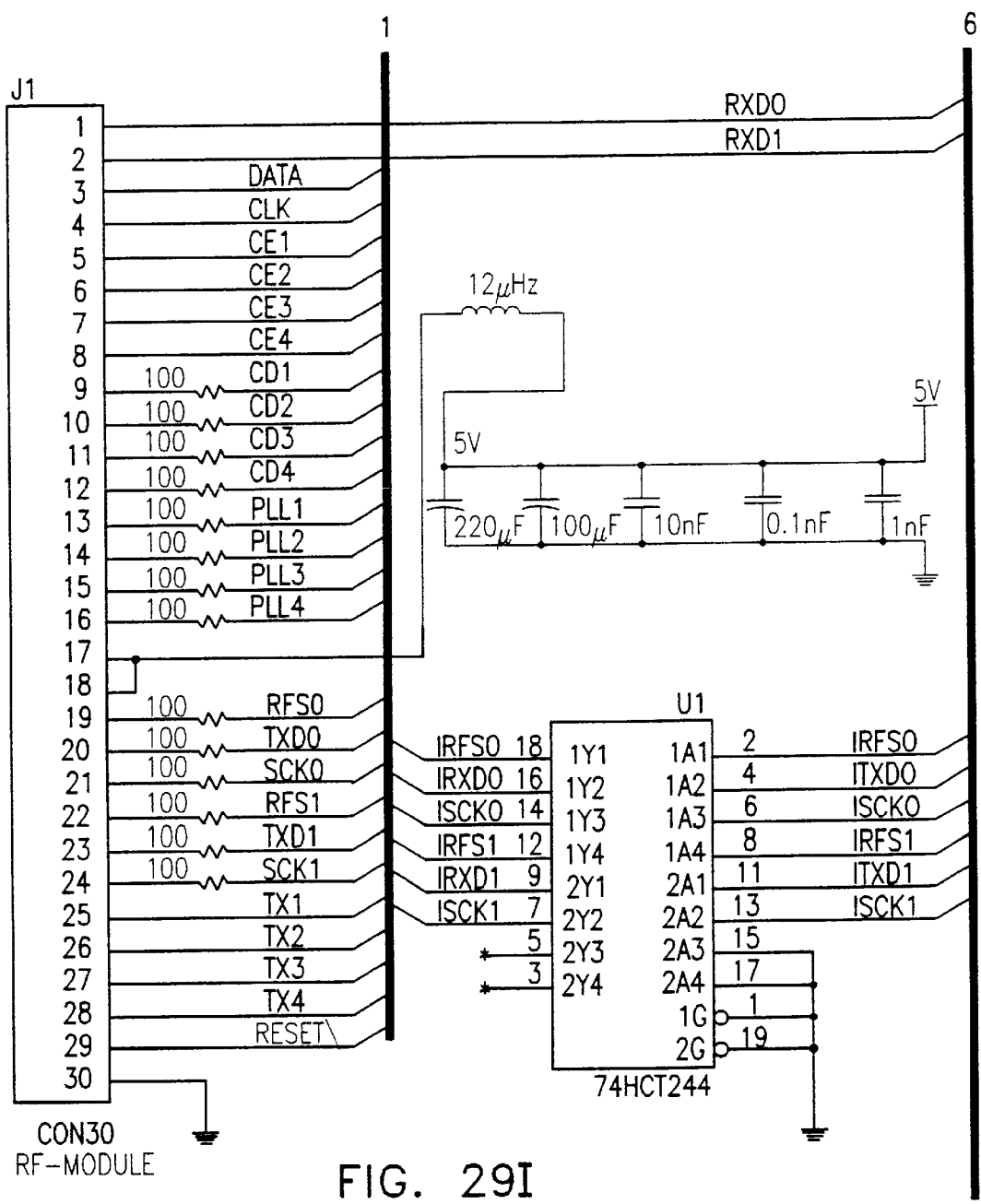
Figure 32A:
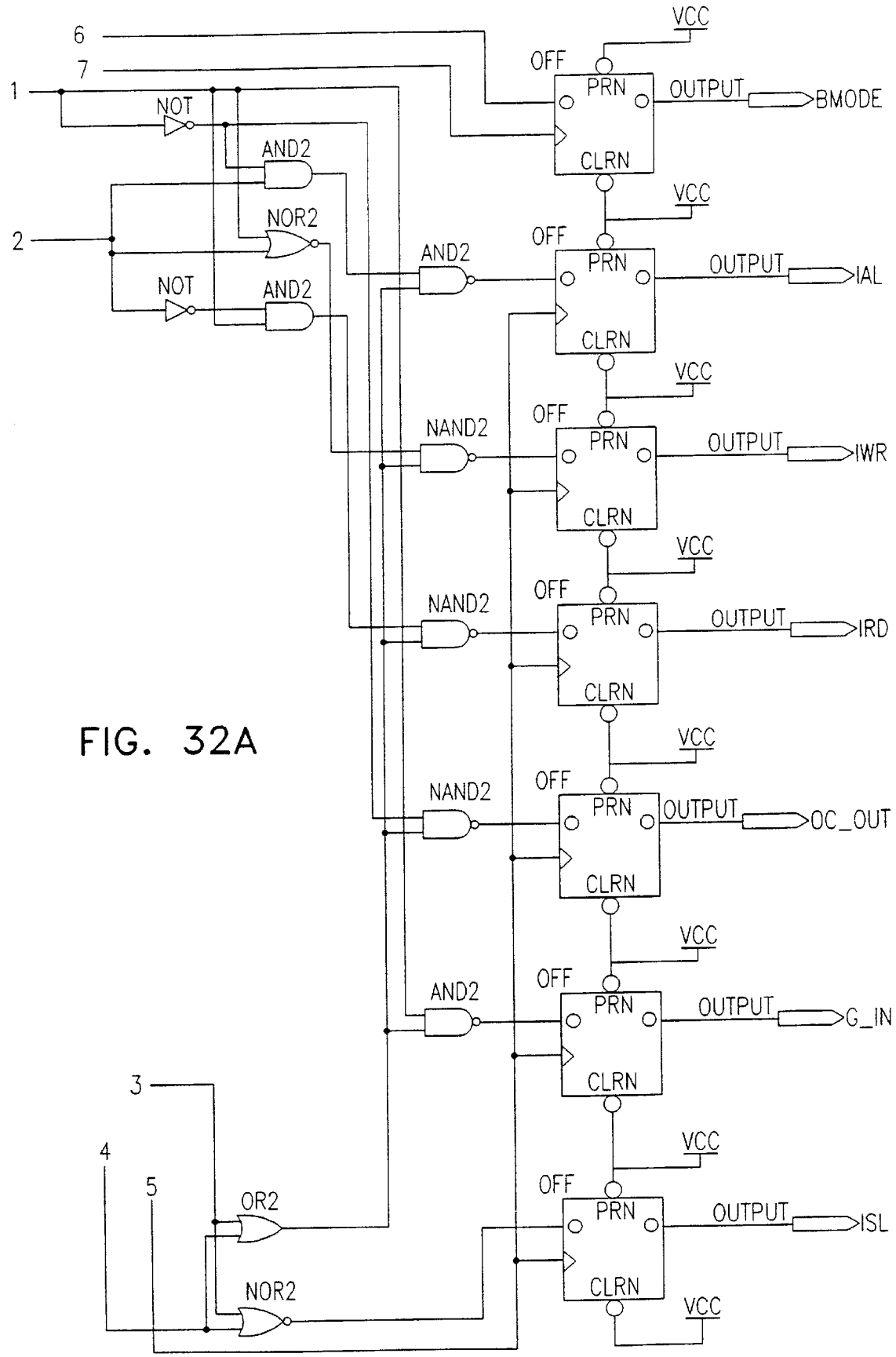
Figure 32B:
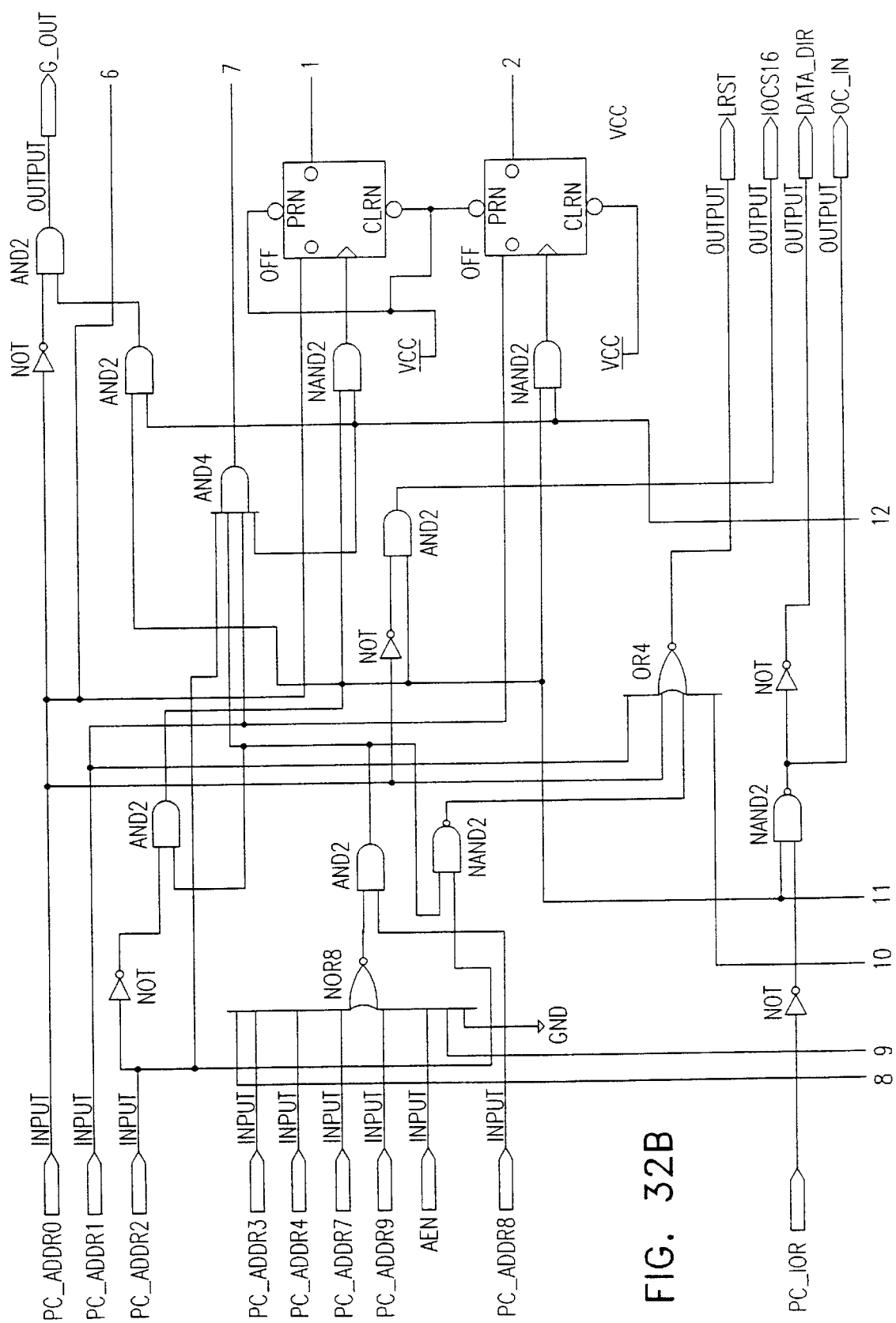
Figure 32C:
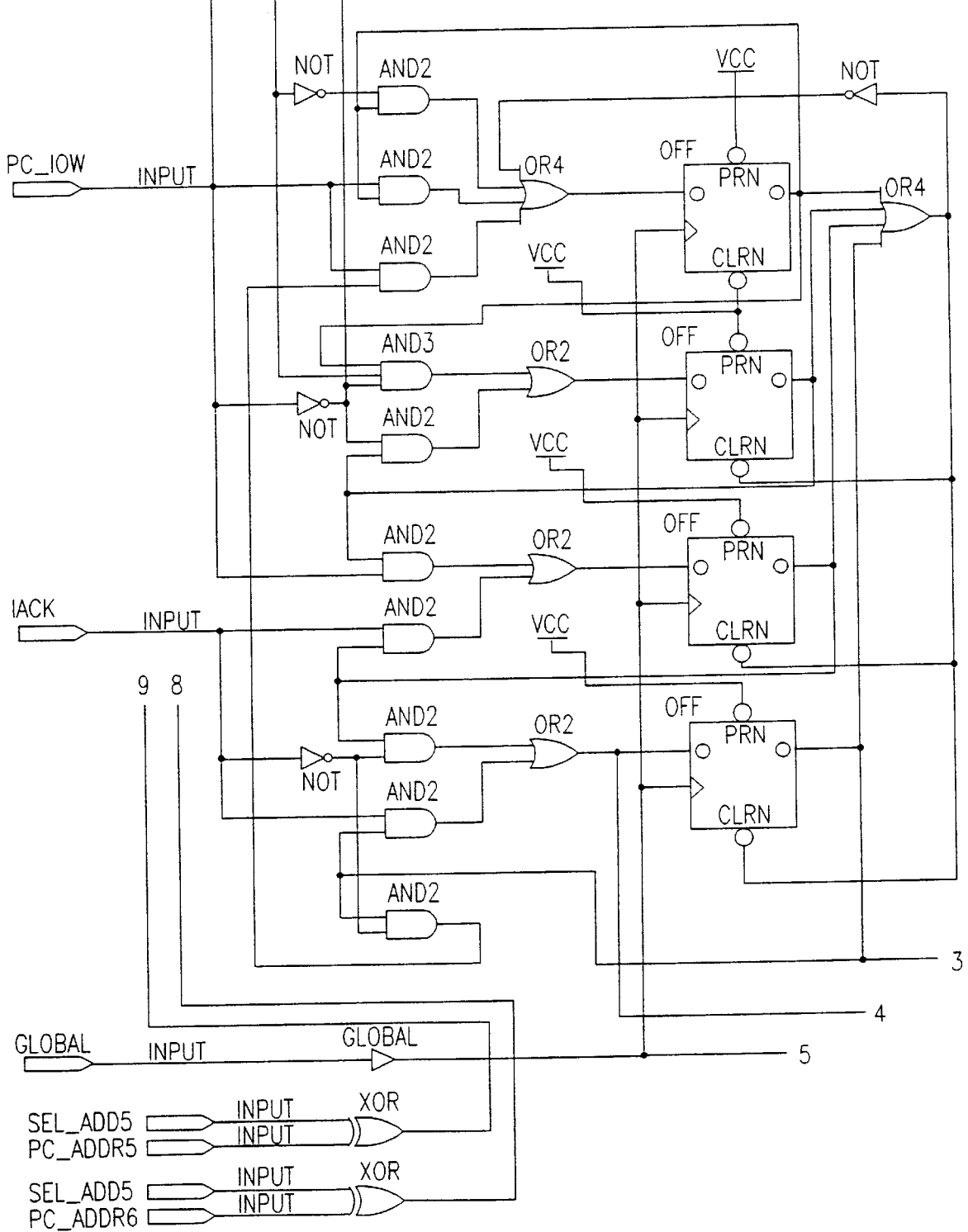

FIGS. 32A, 32B and 32C taken together form a simplified schematic diagram of the EP900 EPLD chip (U9) of FIG. 28H. The code to program the EPLD chip for this schematic diagram preferably uses the programming package "Max Plus II Ver. 6.2" available from Altera Corporation, 3525 Monroe Street, Santa Clara, Calif. 5051, USA.

FIGS. 33–81, described hereinbelow, illustrate embodiments of the toy system of FIGS. 1–32C in the context of an amusement park system.

Figure 33B:
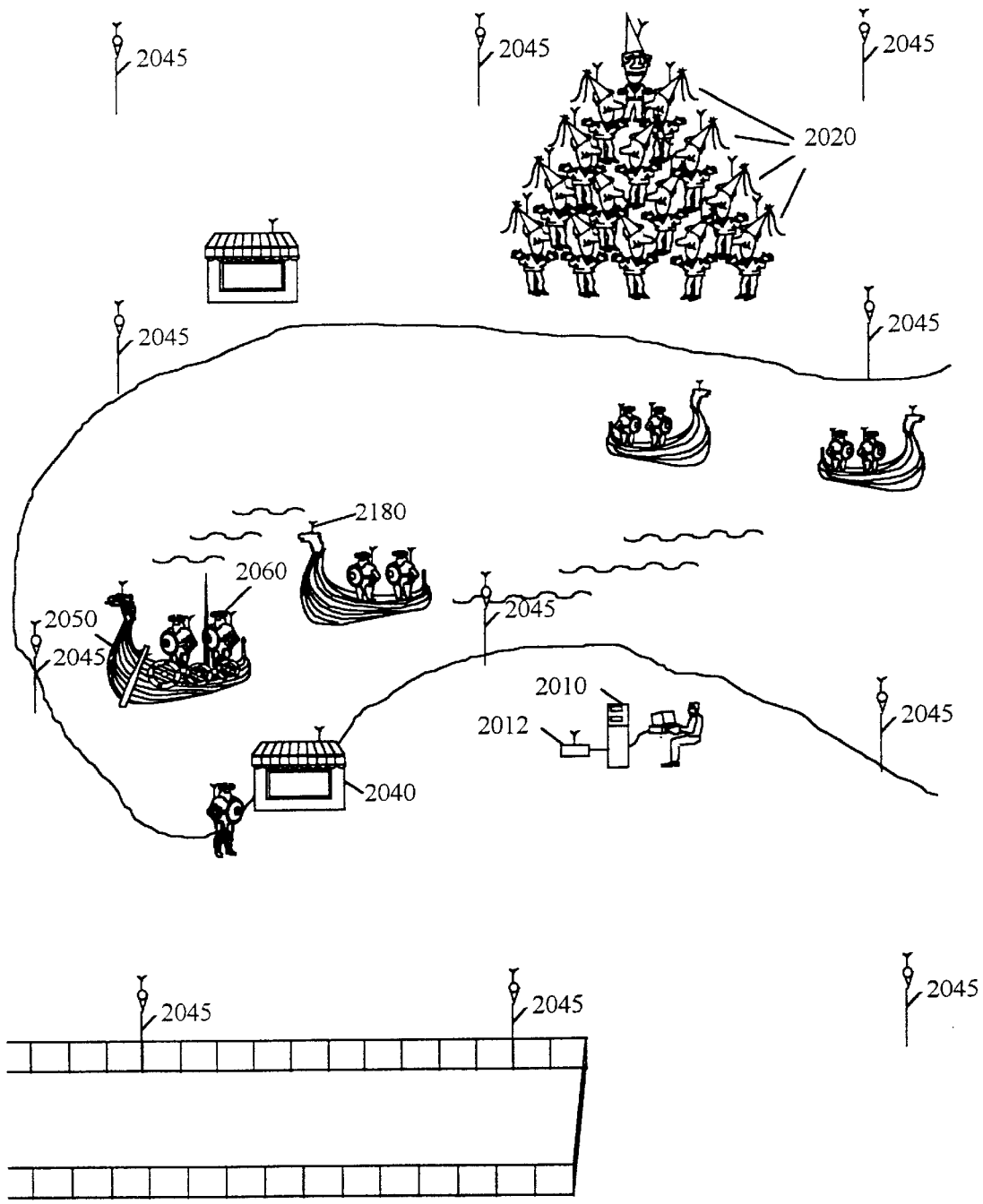
Figure 33C:
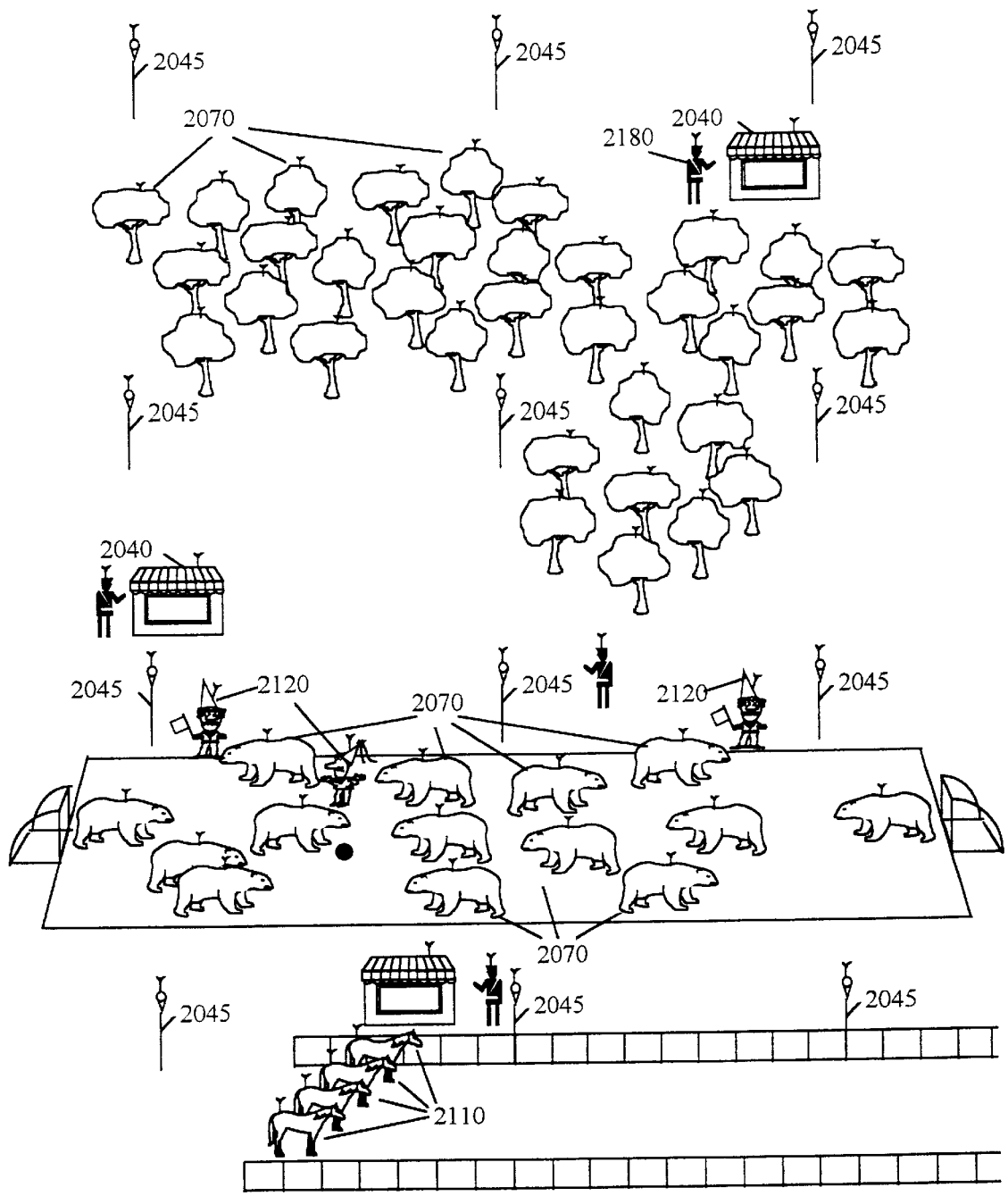

FIGS. 33A–33C, taken together, form a simplified pictorial illustration of an amusement park system constructed and operative in accordance with a preferred embodiment of the present invention. The amusement park system includes a multiplicity of fanciful toy figures or nodes which are in cable or wireless, such as radio, communication with a central amusement park controller 2010, also termed herein the "central node controller". The central node controller typically includes a computer node interface 2012. A preferred embodiment of computer node interface 2012, for wireless applications, is described in detail below with reference to FIGS. 72–73. A preferred embodiment of computer node interface 2012, for cable applications, is described in detail below with reference to FIG. 75.

The multiplicity of fanciful toy figures may, for example, number dozens or even hundreds of fanciful toy figures, including life-size figures. According to one embodiment of the present invention, the fanciful toy figures and/or their surroundings are configured so as to clarify to visitors to the amusement park, the location at which a visitor must stand in order for the figure to "hear" what the visitor is saying and to "participate" in an encounter with the visitor. For example, fanciful toy figures may include a microphone seated within an ear and the visitor may be instructed to speak into the ear of each toy figure with which he wishes to converse.

In the illustrated embodiment, the nodes or radio-communicating toy figures include clown dolls 2020 playing an acrobatic game, elephant dolls 2030 playing a parading game, automatic booths 2040 for dispensing food services and/or for dispensing value such as tickets, tokens, or prizes. Other radio communicating toy figures include boats 2050, boat riding FIGS. 2060 such as Viking figures, talking trees 2070, cow FIGS. 2080, a dairy farmer FIG. 2090, bear FIGS. 2100 playing a ball game, horse FIGS. 2110 playing a horse race game and referee FIGS. 2120.

Preferably, the amusement park apparatus includes a matrix of stationary locating poles 2045 which are operative to continuously scan their vicinities and identify visitors and/or mobile nodes and/or portable nodes which have entered these vicinities and to report on the identities of these visitors and/or nodes to the central node controller 2010.

Figure 34:
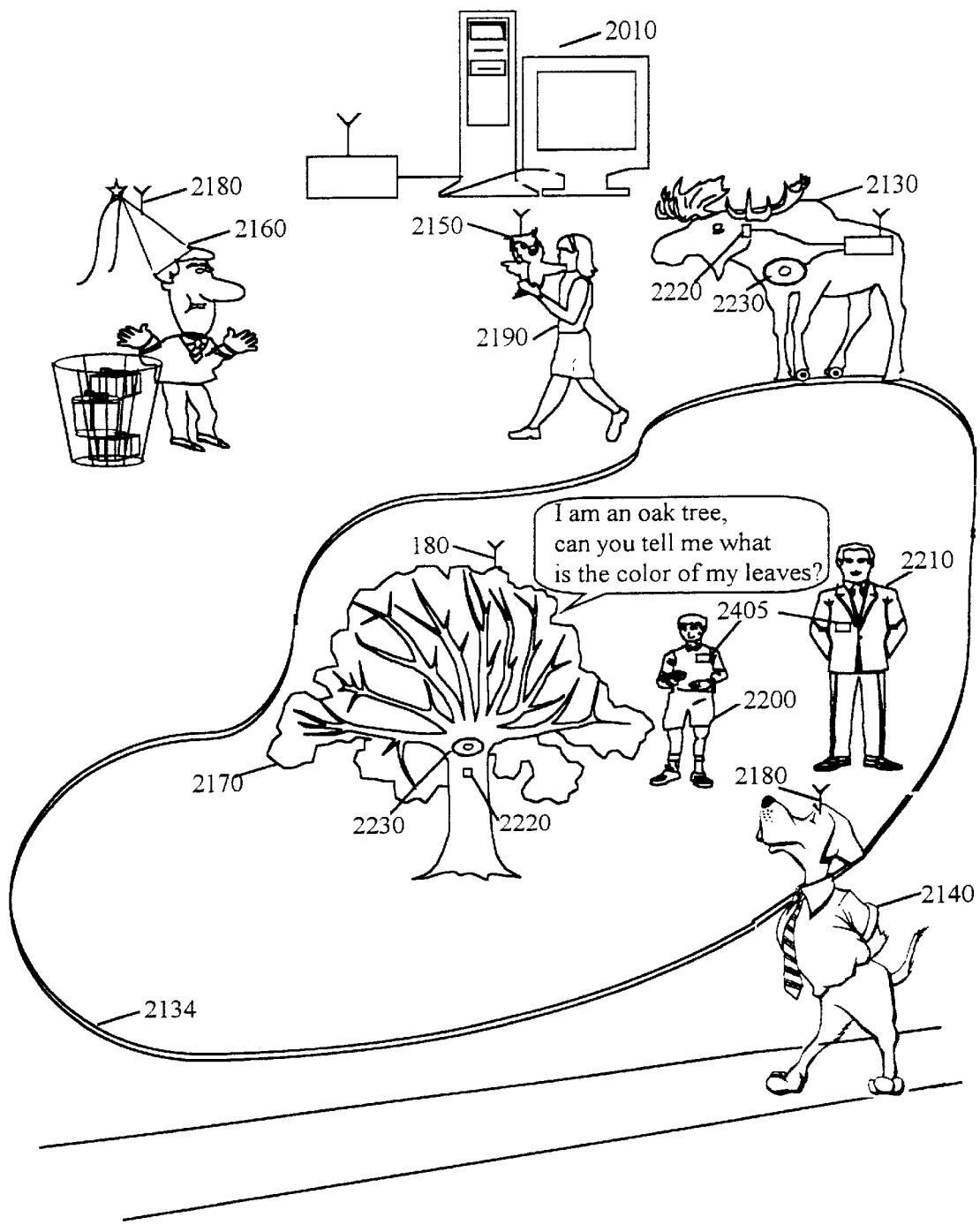
Figure 35:
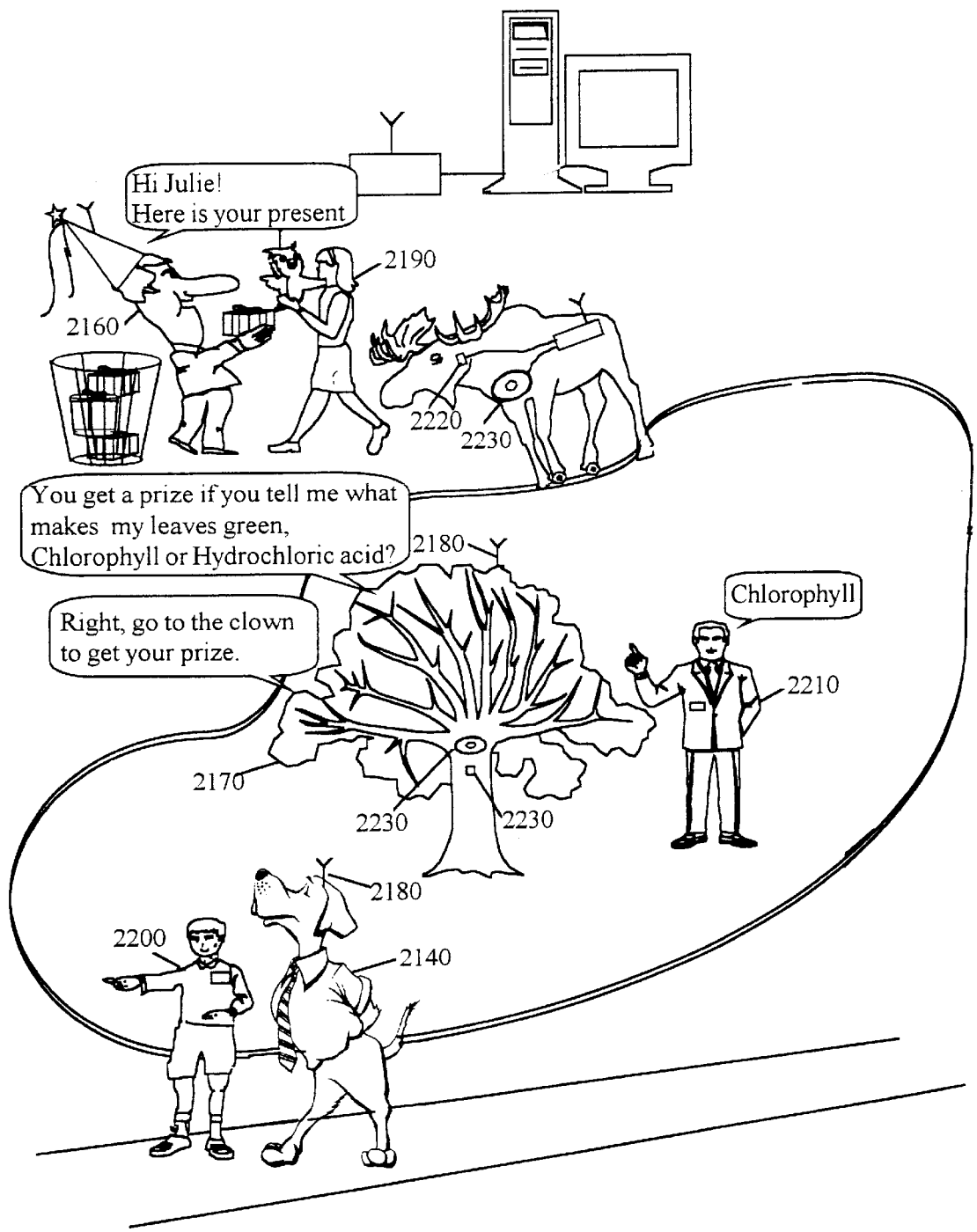

FIGS. 34 and 35 are simplified pictorial illustrations of some of the elements of an amusement park system constructed and operative in accordance with another preferred embodiment of the present invention. The amusement park system of FIG. 34 includes central amusement park controller 2010 and also a restrictedly mobile reindeer doll 2130 operative to advance along a track 2134, a freely mobile cartoon figure doll 2140, a portable owl doll 2150, a talking, freely mobile clown doll 2160, and a talking stationary tree doll 2170.

Each of the radio communicating elements in FIGS. 33 and 34 is preferably equipped with a radio transceiver of which only the antenna 2180 is shown.

FIG. 35 is a simplified pictorial illustration of a second state of the amusement park system of FIG. 34. As may be appreciated by comparing FIGS. 34 and 35, the reindeer doll 2130 has advanced along the track 2134, the freely mobile cartoon figure doll 2140 has moved, and a human visitor 2190 has carried the portable owl doll 2150 from one location to another. The clown doll 2160 has moved toward the human visitor 2190, extended his hand, issued a greeting including the name of the visitor, and presented the visitor with a prize. The tree doll 2170, in FIG. 34, is playing a quiz game with a child visitor 2200 whose level of quiz game skill and/or age is preferably known to the tree doll as described in detail below. An adult visitor 2210 is waiting his turn. In FIG. 35, the child visitor 2200 has moved on, and the tree doll 2170 is now quizzing the adult visitor 2210.

Figure 36:
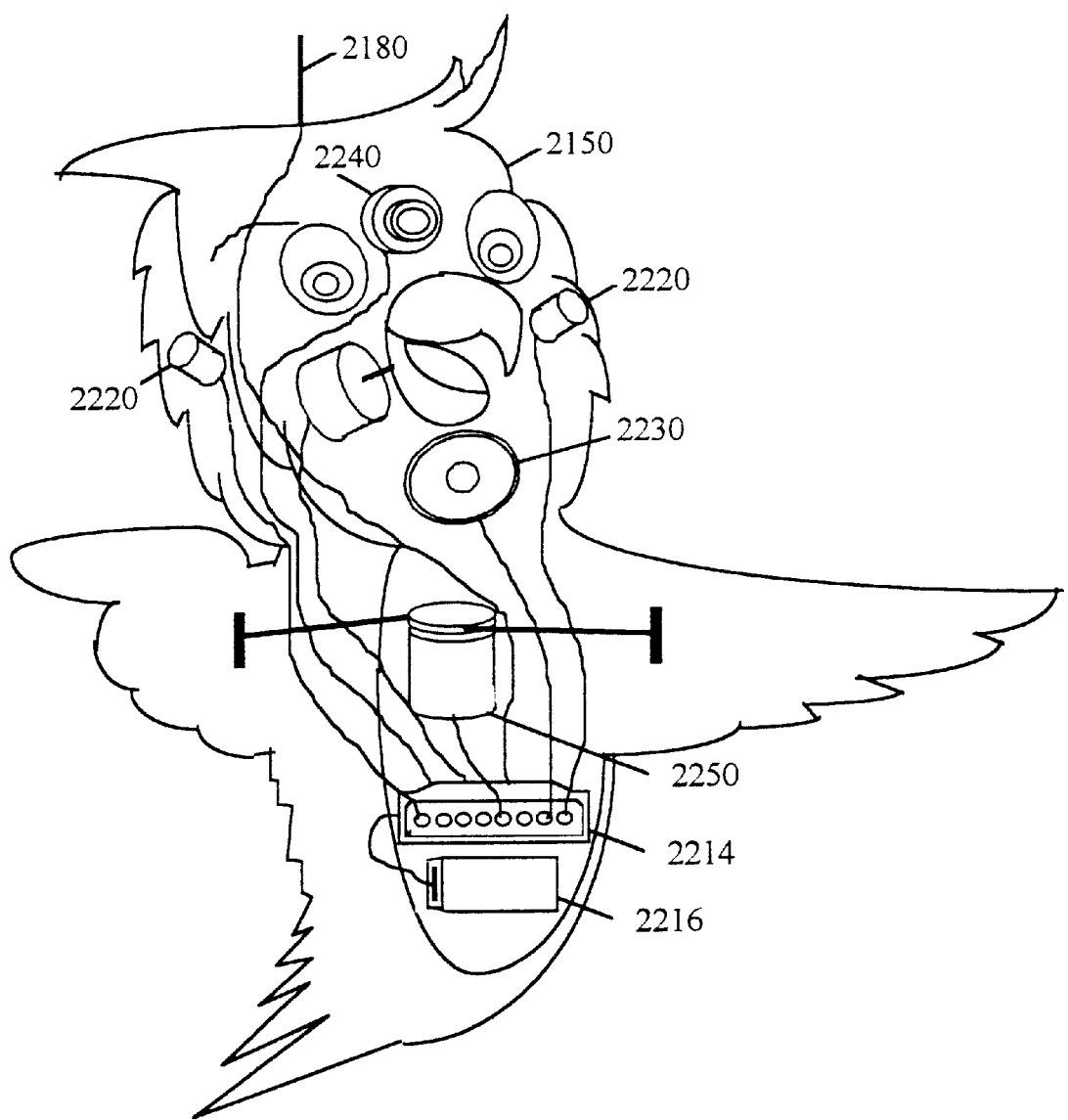

FIG. 36 is a simplified pictorial illustration of one of the radio-communicating elements of the amusement park system of FIGS. 34–35, specifically the portable owl 2150. Each of the radio-communicating elements typically includes an antenna 2180, a node-control device 2214 and an associated power supply 2216. Preferably, some or all of the following functional devices are also provided:
a. A microphone 2220 and loudspeaker 2230 for communicating with visitors;
b. A video camera 2240 operative to provide artificial vision;
c. A motor 2250 for providing motion of the radio-communicating element itself or of portions thereof, such as limbs. In FIG. 36, the motor 2250 flaps the wings.

Figure 71:
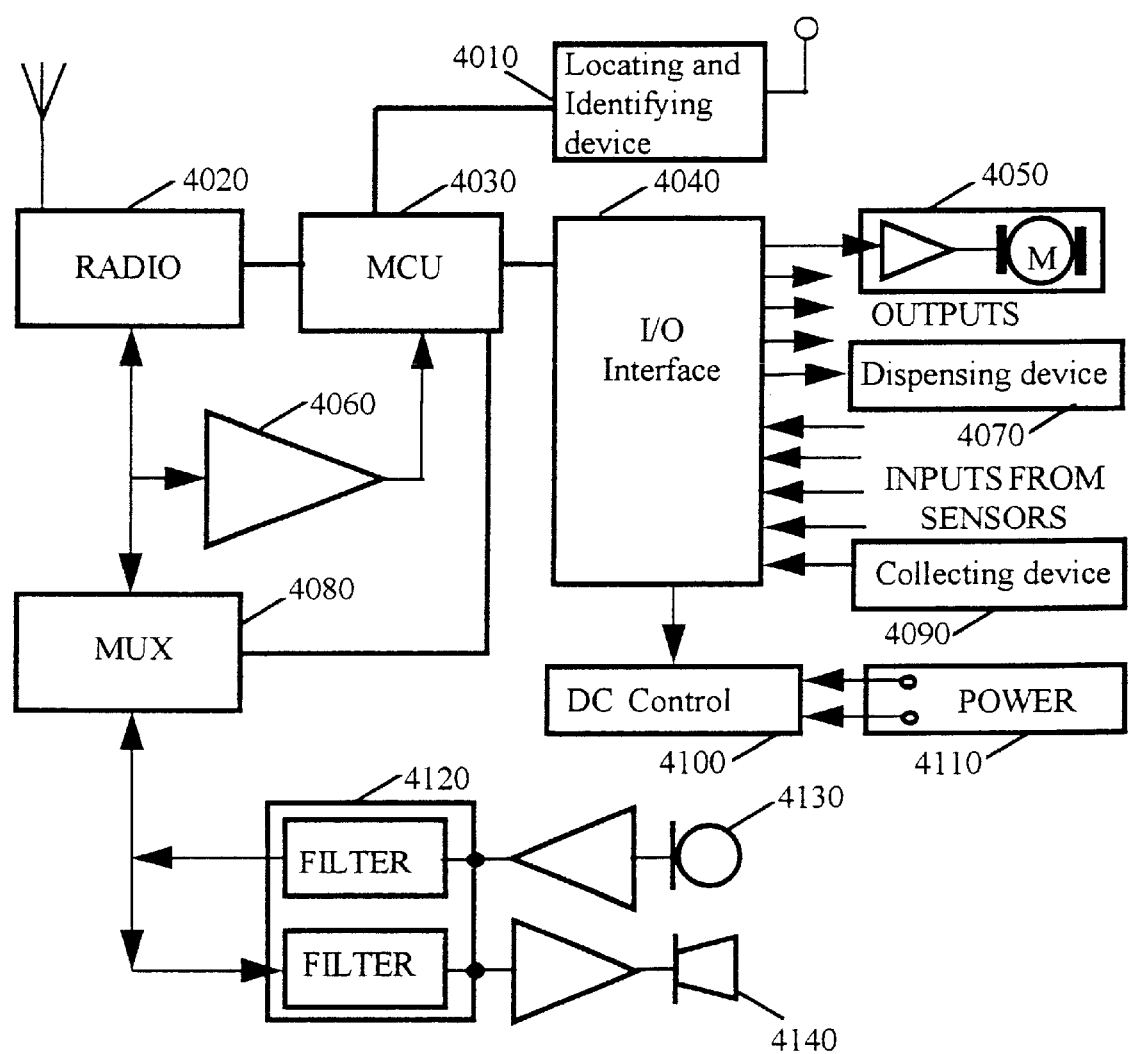
Figure 74:
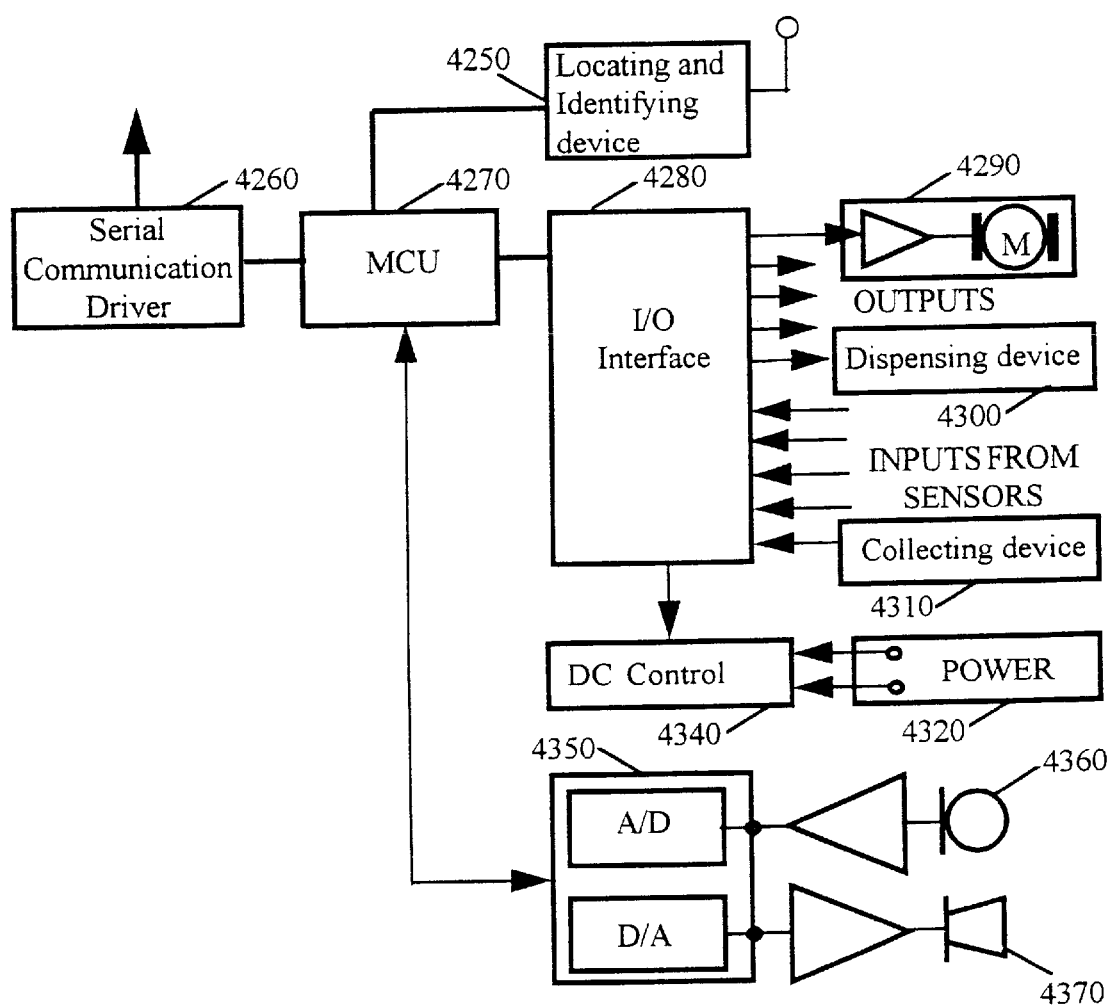

A preferred hardware implementation of node control device 2214 of FIG. 36 which is suitable for a node whose connection to the central node controller comprises a wireless connection is illustrated in FIG. 71. A preferred hardware implementation of node control device 2214 of FIG. 36 which is suitable for a node whose connection to the central node controller comprises a cable connection is illustrated in FIG. 74.

The dolls of FIGS. 33–36 may be formed of any suitable material such as suitable plastics.

Figure 41:
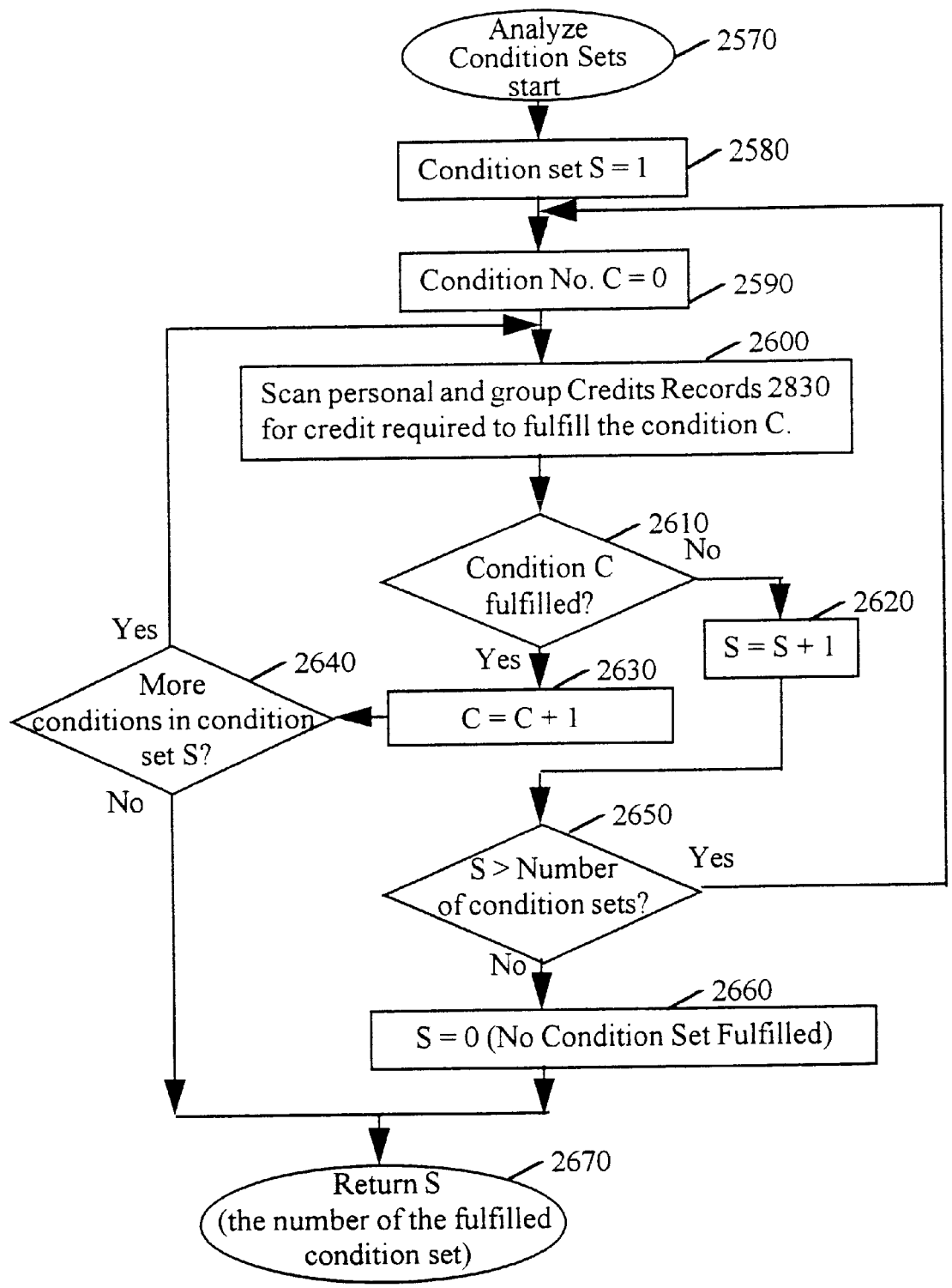
Figure 42:
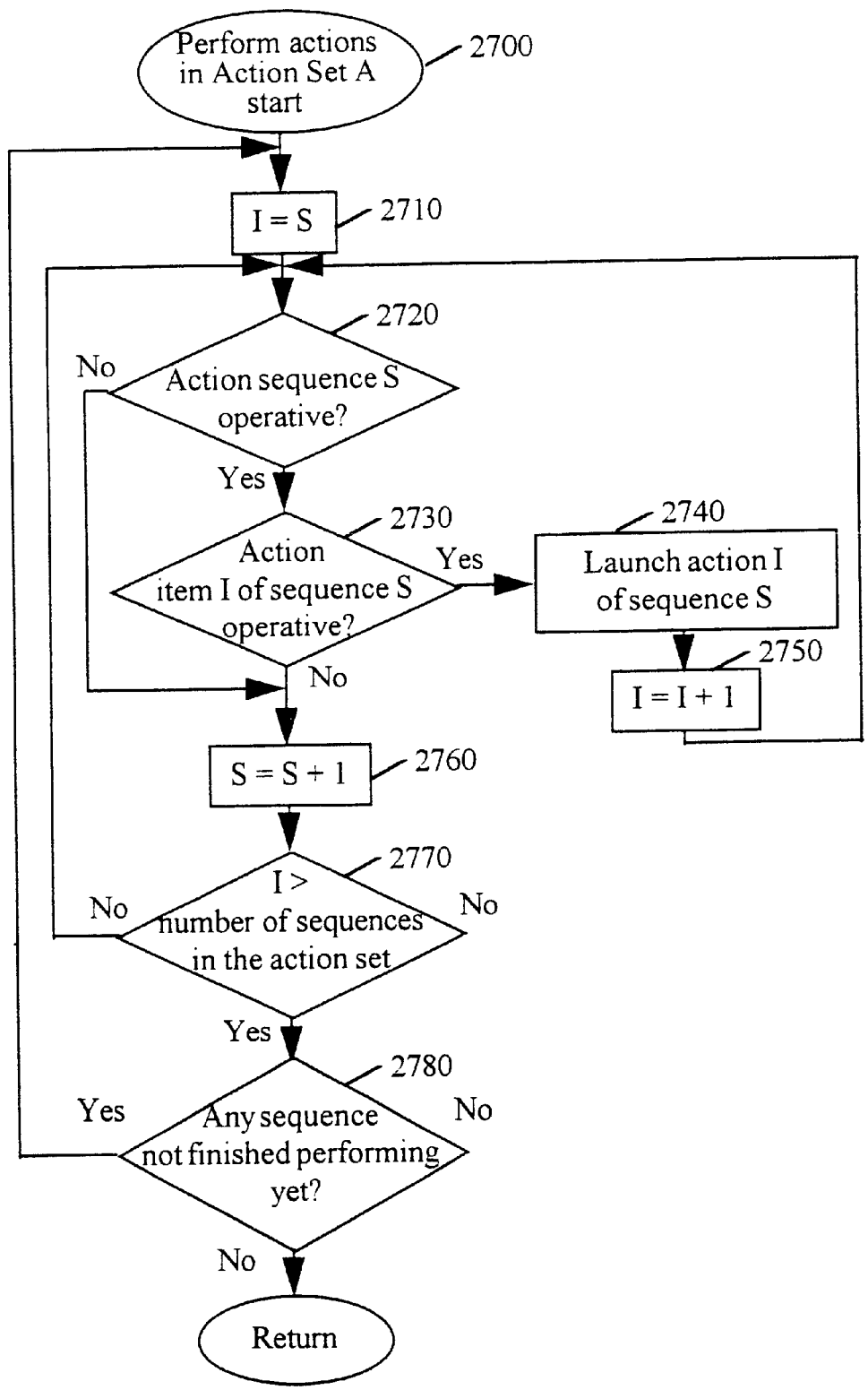
Figure 43A:
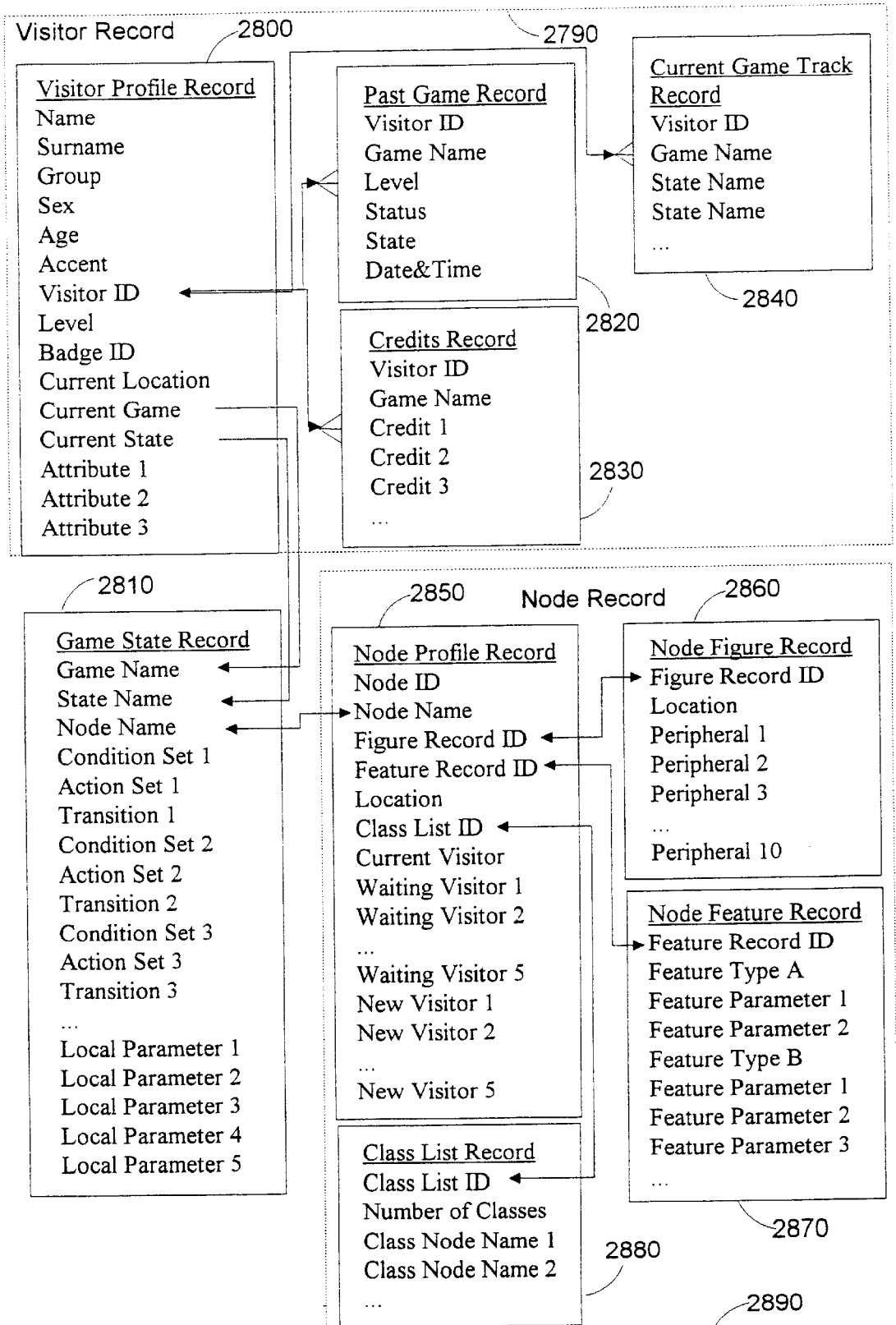
Figure 43B:
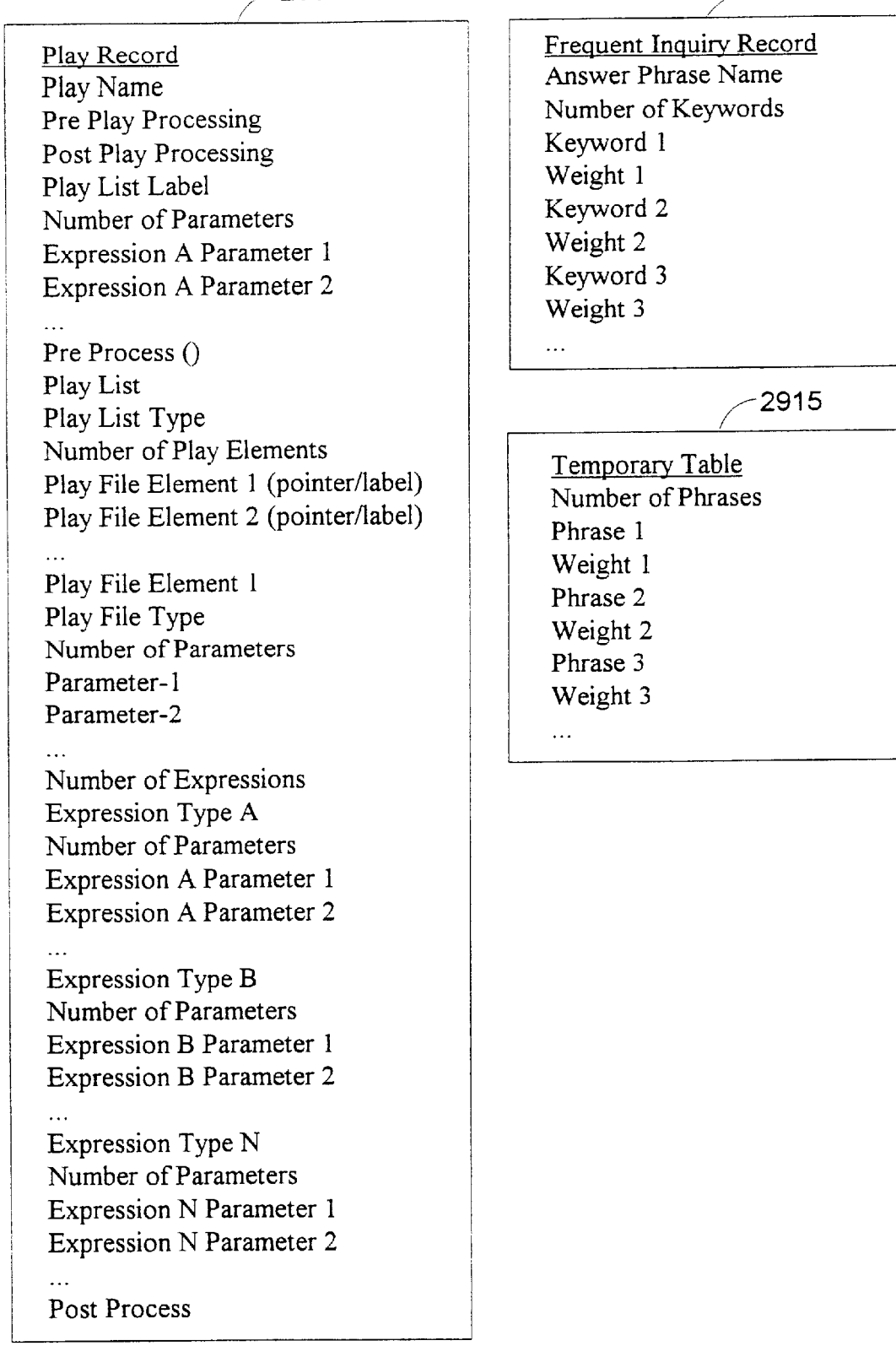

FIGS. 37–42 are simplified flowchart illustrations of preferred methods of operation for the central amusement park controller of FIG. 33 which are more easily understood with reference to the data structure illustrated in FIGS. 43A–43C.

Figure 37:
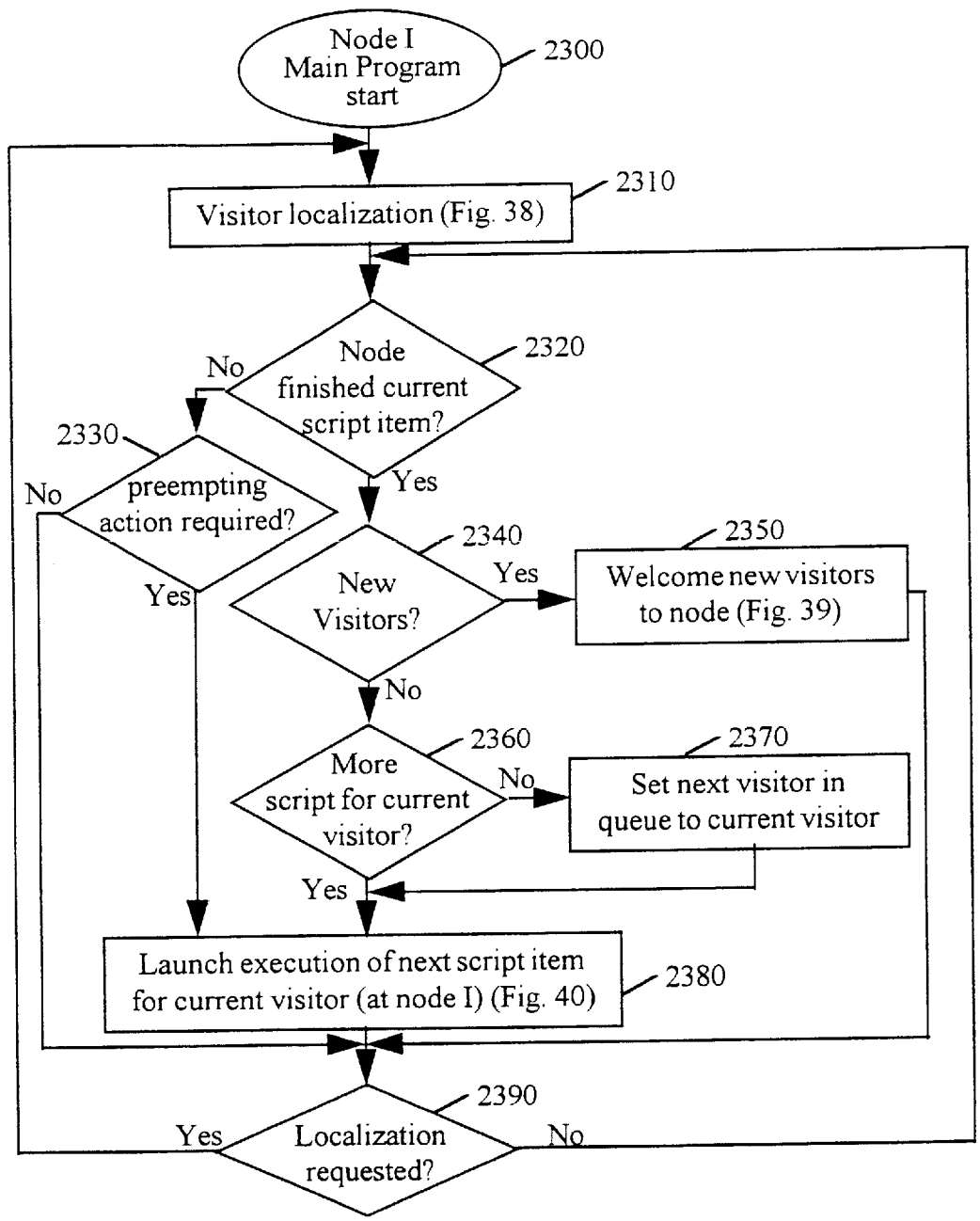

FIG. 37 is a simplified flowchart illustration of a preferred method of operation by which the central amusement park controller of FIG. 33 performs each of a multiplicity of node control tasks for each of a corresponding multiplicity of nodes. Preferably, the method of FIG. 37 is repeated constantly or periodically.

The central amusement park controller 2010 preferably includes a multi-tasking operating system such as Unix or Windows NT residing within one or more suitable computers such as one or more Sun workstations or IBM-compatible personal computers interconnected by a suitable network such as an Ethernet LAN. The controller 2010 typically operates an array of DSP boards such as the Antaref boards marketed by Dialogic Corporation, 1515 Route Ten, Parsippany N.J. 07054-4596, USA and speech recognition software such as the software marketed by Lernaut and Hauspies, Koning Albert 1 Laan 64, 1780 Wemmel, Belgium. The controller 2010 also typically includes suitable wireless communication circuitry such as a suitable number of the boards illustrated in FIGS. 72–73. The controller 2010 also or alternatively typically includes cable communication circuitry, such as the circuitry illustrated in FIG. 75.

Each node from among a multiplicity of nodes is preferably operated by a dedicated task. Each node typically communicates with its dedicated task over an independent dedicated communication channel such as that described hereinabove with reference to FIGS. 1–32C.

More than one task at a time may be involved in control of a single node in order to support concurrent node functions such as playing voice in parallel to moving lips or other portions of the body.

As shown, the method of FIG. 37 includes a visitor localization step 2310, in which each task scans the vicinity of the node which it is controlling, identifies all visitors currently within that vicinity, and reports this "visitor localization information" to the central node controller 2010. A preferred method by which central node controller 2010 handles the visitor localization information arriving from the various tasks and nodes is described in detail below with reference to FIG. 38.

Typically, each game comprises a script including a multiplicity of script items. The relationship between the script items can be represented by a state machine, as described in detail below. Typically, each script item corresponds to a state, represented in FIGS. 44, 49, 55 and 61 as a bubble and represented in memory, according to a preferred embodiment of the present invention, as game state record 2810 of FIGS. 43A–43C.

A task which a node performs may include any of the following: a script item 2380; the locating routine of step 2310; and the welcoming routine of step 2350.

Preferably, between script items, the node is instructed to welcome whichever new (i.e. not-yet-welcomed) visitors have arrived thereat. This is psychologically relieving to the new visitors because it clarifies that their presence is recognized and assures them that they are to receive attention in due course.

In step 2360, the central computer determines whether node I is involved in the next script item in the game currently being played by the current visitor at node I. If so, the current visitor remains current. If not, i.e. if node I is not involved in the next script item in the current visitor's game, then the highest priority visitor (typically the longest-waiting visitor) becomes the current visitor (step 2370).

The term "launch" refers to performance by the central computer 2010 of all foreground operations required in order to cause a particular node to perform a particular task. The "launch" is over when only background operations are required to allow the task to go forward.

Figure 38:
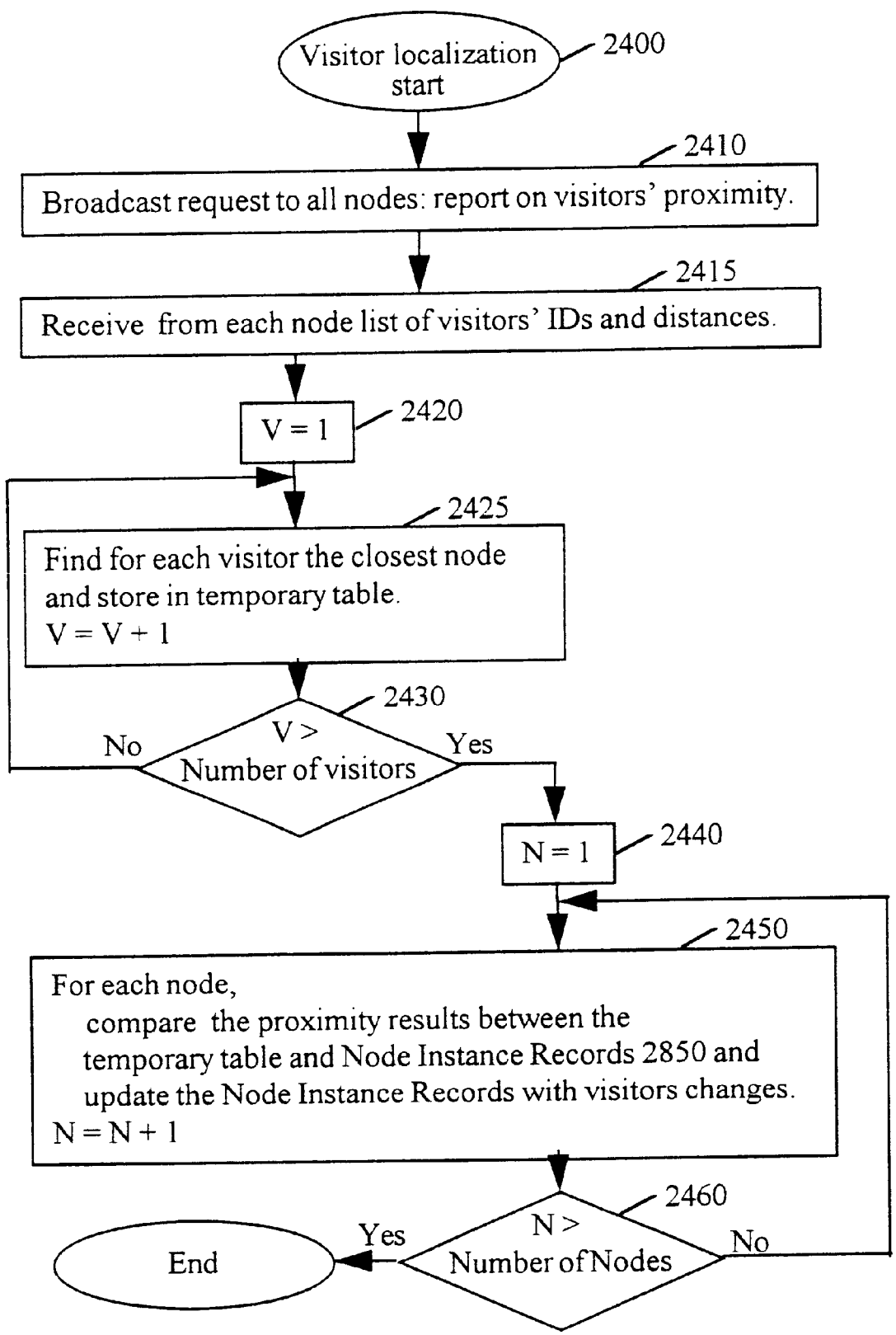

FIG. 38 is a simplified flowchart illustration of a preferred method by which the central computer 2010 is operative to perform the visitor localization step of FIG. 37. Typically, each visitor wears an identification badge 2405 (FIG. 34) which typically receives radio query signals from the nodes. Typically, the nodes are operative to automatically and periodically generate radio query signals.

Each badge broadcasts a radio acknowledgment signal comprising unique visitor-identification data. Each node, upon receiving a radio acknowledgment signal, measures that signal's energy level. Upon request of the central computer (step 2420), the node transmits the visitor-identification data and the associated energy level to the central computer (step 2430). For each visitor (step 2460), the node who detected the visitor's identification data with the highest energy level is regarded as being the location of the visitor.

For example, RFID (radio frequency identification) technology such as a U227OB interrogator device may be installed in the node and an e5530 identifying transponder device may be worn by each visitor. Both of the above devices are commercially available from TEMIC, RYODEN Trading Co. Ltd. 3-15-15 Higashi Icobokuru, Toshima Ku, Tokyo 170. Another alternative implementation of the above-described feature is by means of infra-red technology such as the EIRIS system from Elpas Electro-optic Systems Ltd., 11 Hasadna St. Raanana 43650, Israel.

Figure 39:
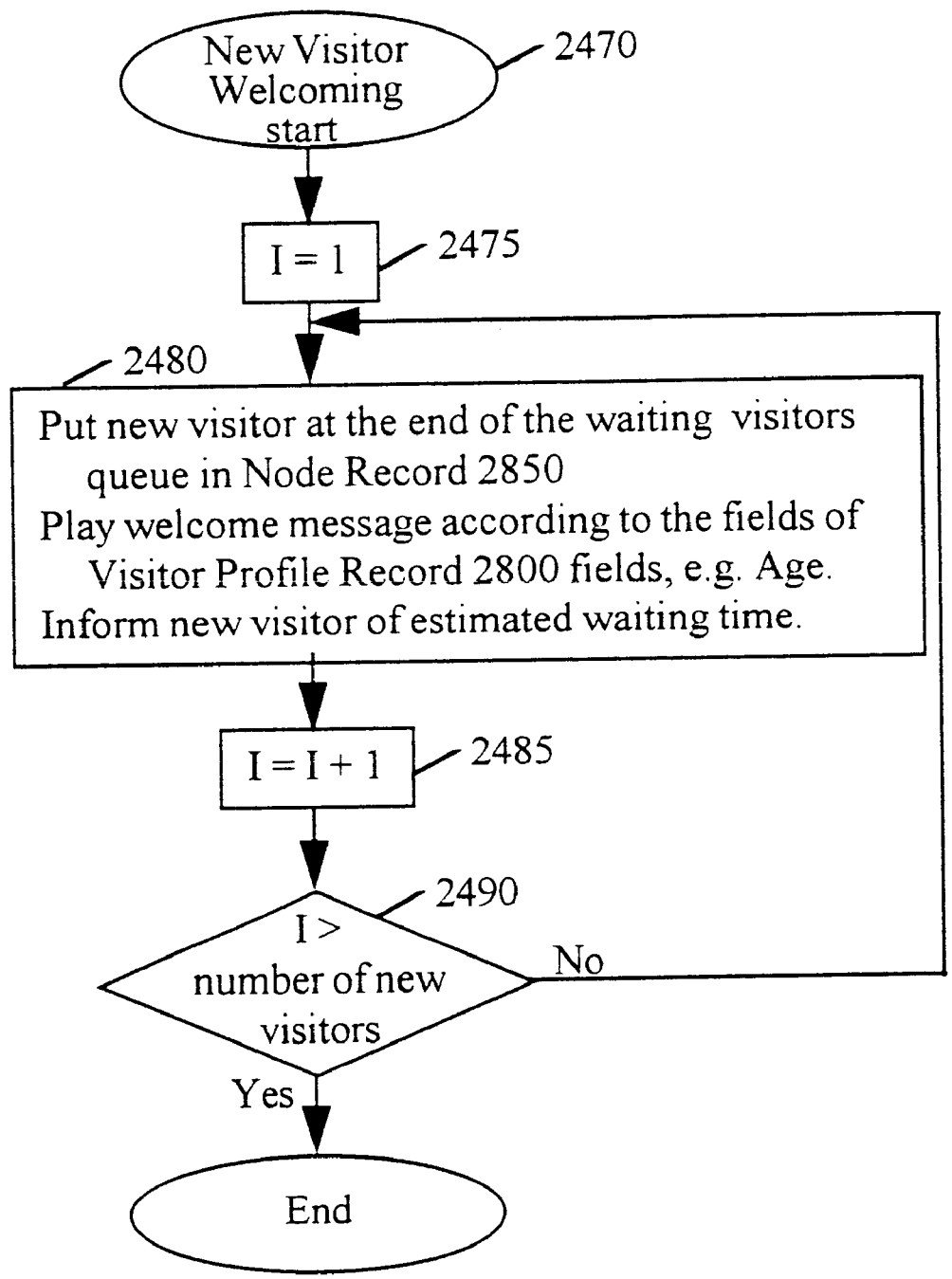

FIG. 39 is a simplified flowchart illustration of a preferred method for performing the "welcome new visitors" step 2350 of FIG. 37. In this step, a welcome message is played to each visitor. Preferably, different welcome messages are played to different visitors, depending, e.g., on the visitors' ages.

Figure 40:
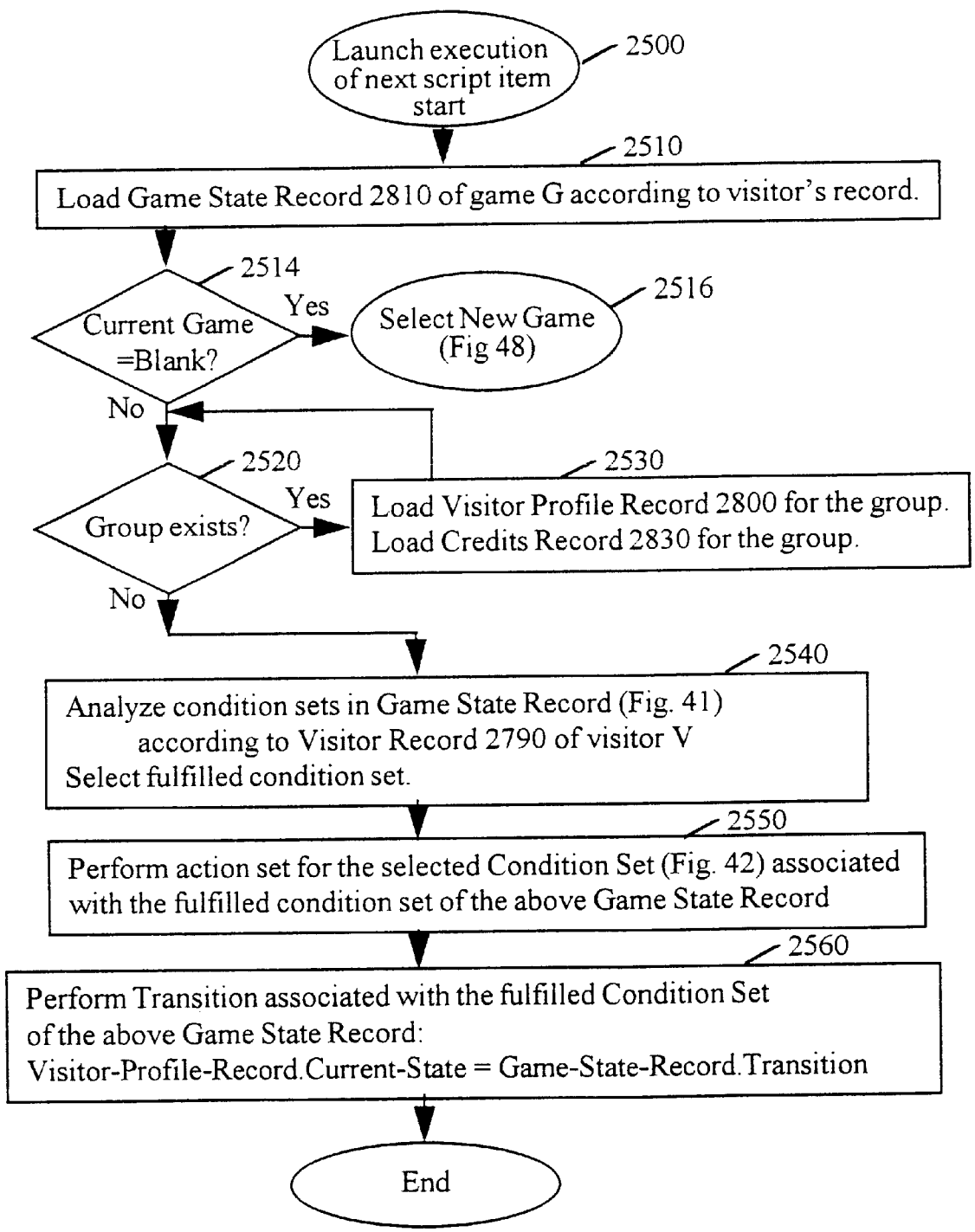

FIG. 40 is a simplified flowchart illustration of a preferred method for performing the "launch execution of next script item" step of FIG. 37.

In steps 2520–2530, all groups and sub-groups of the current visitor are loaded into the system's memory.

Preferably, players of games can accumulate credits or powers which facilitate later stages of the game. The credits and/or powers are stored in the Credit Record 2830 of FIGS. 43A–43C.

FIG. 41 is a simplified flowchart illustration of a preferred method for performing the "analyze conditions" step of FIG. 40. In FIG. 41, an analysis is performed of all the condition sets of the Game State Record 2810 (FIG. 43A) of the current state of the game currently being played. Typically the analysis is effected by comparison to the relevant credits accumulated either by the visitor or by the group to which he/she belongs, in order to determine which condition set has been fulfilled.

FIG. 42 is a simplified flowchart illustration of a preferred method for performing step 2550 of FIG. 40.

A "state" is a state of the system in which a system performs one or more predefined actions, forming an action set, upon fulfillment of one or more conditions, forming a condition set, and transfers itself into another state once the action set has been completed. A state may include several condition sets, each associated with one action set and one transition.

An "action sequence" comprises at least a subset of an action set which includes action items which are performed in sequence rather than in parallel. Different action sequences within the same action set may be performed in parallel.

FIGS. 43A–43C, taken together, form a diagram of a data structure typically residing in the central amusement park controller 2010 and suitable for storing information pertaining to the amusement park and its visitors. The data structure includes the following substructures: A Visitor Record 2790, which is comprised of Visitor Profile Record 2800, Past Game Record 2820, Credit Record 2830 and Current Game Track Record 2840; Node Record 2890 which is comprised of Node Profile record 2850, Node Figure Record 2860, Node feature Record 2870 and Class List Record 2880; Game State Record 2810; Play Record 2900; Frequent Inquiry record 2910; Temporary Table 2915; and Game Record 2920.

Past Games Record 2820 is useful, for example, if a first game is interrupted and, after an interval, which may or may not be spent playing a second game, a visitor wishes to return to his first, interrupted game. For example, a child may be playing Zookeeper and may then be declared lost by a parent, teacher or guardian, at which point the child's Current Game is changed from Zookeeper to Lost Person. Once the child has been found (i.e. the End Game state of the Lost Person game has been reached) the Zookeeper game may be resumed.

Other uses of the Past Games Record include recording the level at which the visitor has been playing a particular game in order to perhaps assign the visitor henceforth to the next level; allowing a plurality of games to be defined as a sequence such that the visitor is "led" from game to game in accordance with the sequence; and allowing a user to temporarily leave the park and upon returning to the park, resume the game he left in the state he left it in.

Three examples of games are now described in FIGS. 44–48 ("find lost person" game), FIGS. 49–54B ("Zoo Keeper") respectively, and FIGS. 55–60 ("tree quiz" game).

The "find lost person" game is now described with reference to FIGS. 44–47.

Figure 44:
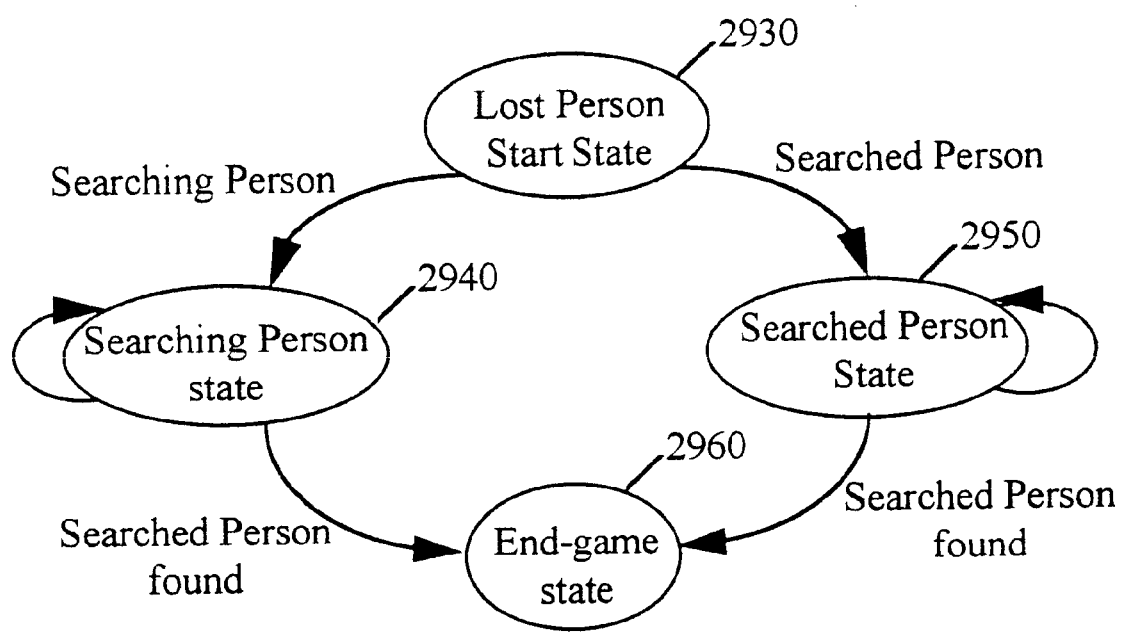

FIG. 44 is a bubble diagram of a "find lost person" game.

FIG. 45 is a diagram of two "Visitor Record" data structures 2790 of FIG. 43A storing information regarding two respective visitors playing the "find lost person" game of FIG. 44. The bottom data structure is that of the searched-for person (typically a child) and the top data structure is that of the searching person (typically an adult). The visitor-characterizing information stored in the data structures of FIG. 45 preferably includes some or all of the following:

a. Visitor's name, sex, age, level of skill for a selected game, and accent (to facilitate speech recognition).

b. Game visitor wishes to play, the visitor's level of skill within the game (if game is multi-skill), the visitor's state from among the states in the state chart of the game, and the visitor's location in the park, i.e. the node with which the visitor is presently interacting or for which he is presently waiting.

c. Group and sub-group affiliation, if the visito r is playing a group game. Typically, there is no specific field for defining sub-groups. Instead, a chain of parent group/s can be extended to form a complex tree. Typically, an entire chain of parent groups of parent groups of the current visitor is loaded.

d. Credits earned by the visitor personally, or by the visitor's subgroup or group.

e. The visitor's "game history", preferably including all games played by the visitor in the past, or all games played by the visitor in a predetermined window of time, and, for each such game, the date and time the game was played, the group to which the visitor belonged when playing that game, the level which the visitor reached when playing that game, and the current status of the game (terminated, paused).

Information regarding the game currently being played by the visit or is stored in Current Game Record 2840.

Attribute 3 in the visitor profile record 2800 of the searching person stores the visitor ID of the searched person.

Attribute 2 in the visitor profile record of the searched person stores the visitor ID of the searching person.

It is appreciated that alternatively, the "find lost person" game can be played as a group game in which more than one person try to find a single lost person or more than one lost persons. In this case, attributes 2 and 3 store the names of the groups to which the searching and searched persons, respectively, belong.

FIG. 46A is a diagram of three "Game State Record" data structures of FIGS. 43A–43C storing information regarding the following three of the four respective game states within the "find lost person" game of FIG. 44: "start", "searching person" and "searched person".

FIG. 46B is a diagram of the fourth "Game State Record" data structure 2890 of FIG. 43A which stores information regarding the fourth of the four respective game states within the "find lost person" game of FIG. 44, namely the "end game" state.

FIG. 47 is a diagram of a "Node Record" data structure 2890 of FIG. 43A storing information regarding an individual node. For simplicity, the diagram includes only the information within the node's "Node record" data structure which is applicable to the "find lost person" game of FIG. 44.

Figure 48:
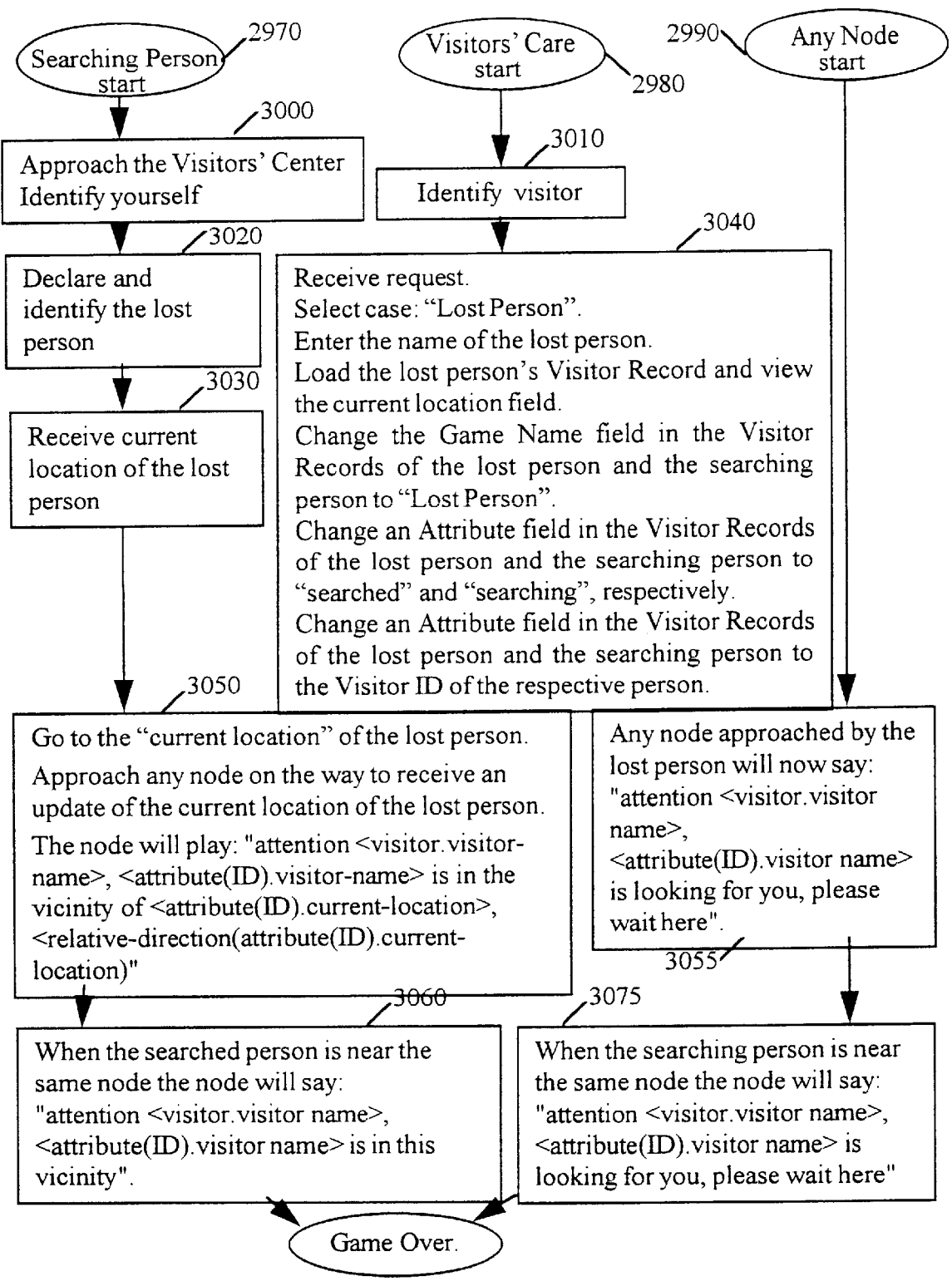

FIG. 48 is a simplified flowchart illustration of a preferred chain of events which typically occur in setting up for and playing the "find lost person" game of FIGS. 44–47.

The "find lost person" game may, for example, proceed as follows, as described in detail below with reference to FIG. 48:

a. An adult who arrived at the amusement part of FIG. 33A–33C accompanied by a child finds that the child has been separated from him.

b. The adult approaches the central amusement park controller 2010. A human operator at the central amusement park controller 2010 initiates the "find lost person" game and is then prompted by the controller 2010 to stipulate the name of the person who is lost. The identity of the seeker is known to the controller 2010 by reading the adult's visitor ID off the badge of the adult who has arrived at the controller. The controller 2010 then retrieves the child's current location which is stored in the Current Location field of the child's Visitor Profile Record 2800, and instructs the adult to proceed toward that current location.

The controller 2010 then enters the following information into the database of FIGS. 43A–43C;

i. Current Game field in the Visitor Profile Records of the adult and of the child receives the value "find lost person";

ii. Attribute 1 of Visitor Profile Record of child receives the value "searched person" and attribute 2 receives the visitor ID of the searching person (or group)

iii. Attribute 2 of Visitor Profile Record of adult receives the value "searching person" and attribute 3 receives the visitor ID of the searched person.

c. The node at which the child is located (the "current location" node) completes the interaction with the player he is currently interacting with and (preferably before continuing on to the player next on line) informs the child that the adult is searching for him and requests that he stay at that node.

d. The adult proceeds to the node which has been stipulated to be the current location of the child, however by the time the adult arrives at the node, the child may no longer be at the node. The adult may approach any node he encounters, including the node to which he was directed to proceed, and receive an update as to the current location of the child.

e. Once the adult has approached the node which is the child's current location, he is so informed and the game terminates. If the adult finds the child at a location which is external to the vicinities of the various nodes, the game does not terminate until the adult and the child approach a node together at which point the node terminates the "find lost person" game and restores the adult and the child to the game they had previously played, at the game state they had previously been in. This information is available to the central node controller because the visitor records 2790 of the adult and of the child include a Past Games record 2820 which stores information regarding each game which the adult and child have played in the past.

Figure 49:
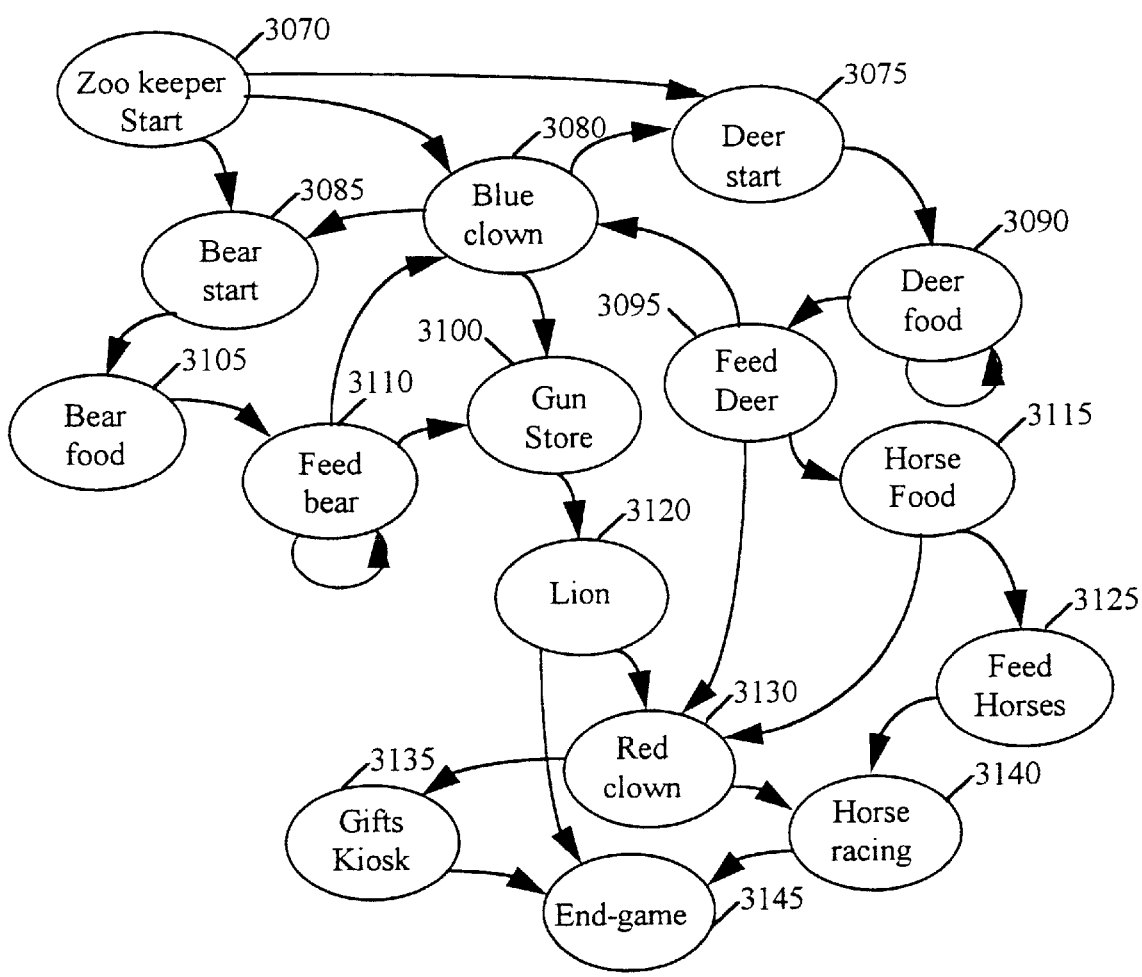

FIG. 49 is a bubble diagram of a game for groups, "zoo-keeper", in which powers or credits are accumulated.

A group is defined as a set of visitors each of whom, of course, has a visitor record 2790 which includes a visitor profile record 2800 whose "group" field has a common value. Typically, each group has its own Visitor Record data structure 2790. Typically, the credits accumulated by a group (i.e. accumulated by visitors belonging to the group, on behalf of the group) are stored in the Credits record 2830 of the Visitor record 2790 of the group (FIGS. 50A and 50B) and are not stored in the Credits records 2830 of the individual visitors belonging to the group.

The Name field in the Visitor Profile Record of a group typically stores the same string as does the Group field of the Visitor Profile Record of each visitor belonging to that group.

It is possible to define a hierarchy of groups and subgroups, e.g. a school visits the amusement park and all pupils in the school form a group whereas all pupils in an individual class in the school form a subgroup. The Group field in the Visitor Profile Record of a subgroup stores the same string as does the Name field in the Visitor Profile Record of the group of which the subgroup is part.

Figure 50C:
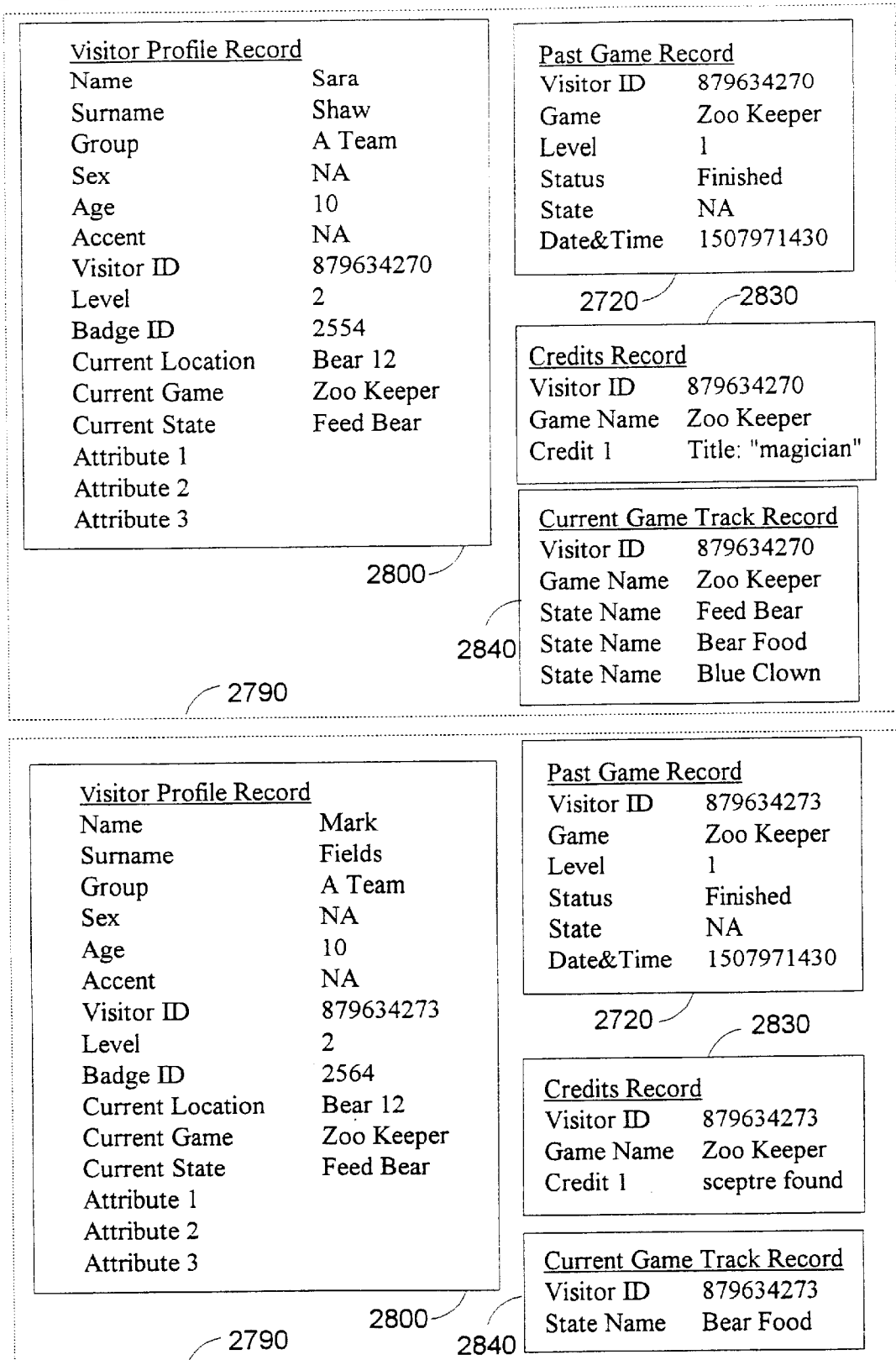

FIGS. 50A–50E, taken together, form a diagram of 10 "Visitor Record" data structures of FIGS. 43A–43C storing information regarding seven visitors (Tony, Sara, Mark, Sheila, Frank, Barbara, and Dean) playing the group game of FIG. 48, the visitors being arranged into two sub-groups (A Team and Dragons), the two sub-groups defining a "main group" or "parent group" (Camp Oriole), wherein:

FIG. 50A comprises two "Visitor Record" data structures 2790 representing the main group, Camp Oriole, and one of the sub-groups (A Team) respectively;

FIG. 50B comprises two "Visitor Record" data structures 2790 representing the other of the sub-groups (Dragons) and one of the visitors, Tony, respectively;

FIGS. 50C–50E each comprise two "Visitor Record" data structures 2790 representing two of the visitors, respectively. FIG. 50C pertains to Sara and Mark, FIG. 50D pertains to Sheila and Frank, and FIG. 50E pertains to Barbara and Dean.

FIG. 51 is a diagram of a "Node Record" data structure 2890 of FIGS. 43A–43C storing information regarding a node, "deer", which is operating within the group game of FIG. 48.

FIG. 52 is a diagram of a "Game State Record" data structure of FIGS. 43A–43C storing information regarding one of the game states, "feed bear", within the group game of FIGS. 49–51.

FIG. 53 is a diagram of another "Game State Record" data structure of FIGS. 43A–43C storing information regarding another of the game states, "feed deer", within the group game of FIGS. 49–51. As shown, the Game State Record includes four condition sets, four corresponding action sets and four corresponding transitions. Therefore, in the "feed deer" game state, if any of the four conditions stipulated in Condition Sets 1–4 are fulfilled, then:

a. the actions stipulated in the appropriate action sets from among action sets 1–4 are carried out; and
b. the game moves into a different state as stipulated in the appropriate Transition from among Transitions 1–4.

For example, if (Condition 1) Credit=Bear Fed, i.e. if the player has already fed the bear, then the phrase "thank you very much for this delicious meal" is played, followed by the phrase "I will tell you a secret, the red clown knows how to pass the lions' gate" (Action Set 1). Then, the game moves from the Feed Deer state into the Red Clown state (Transition 1).

Figure 54A:
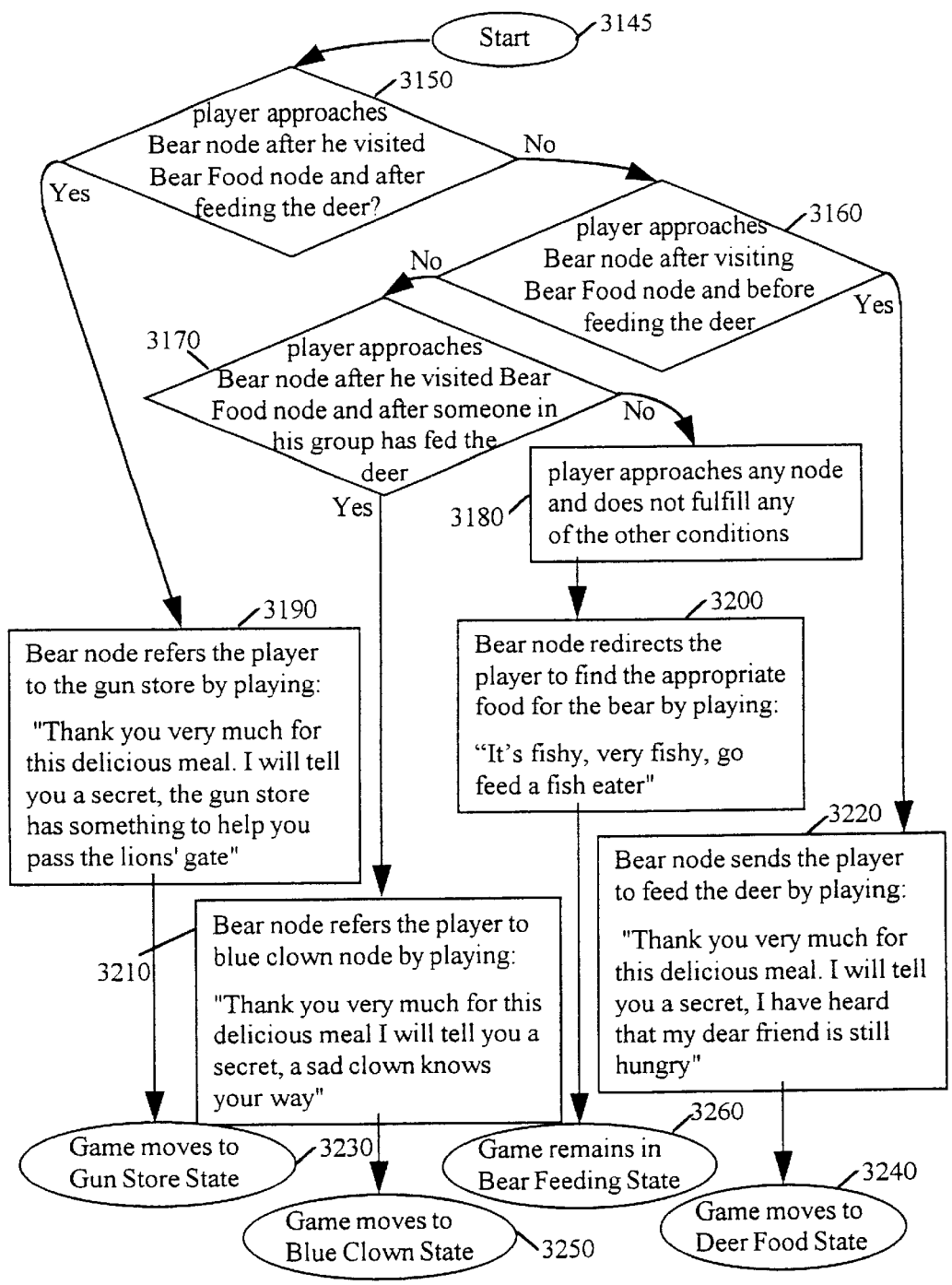
FIGS. 54A–54B are simplified flowchart illustrations of different aspects of a preferred chain of events including some of the events which typically occur in playing the "zoo-keeper" game of FIGS. 49–53.
Figure 54B:
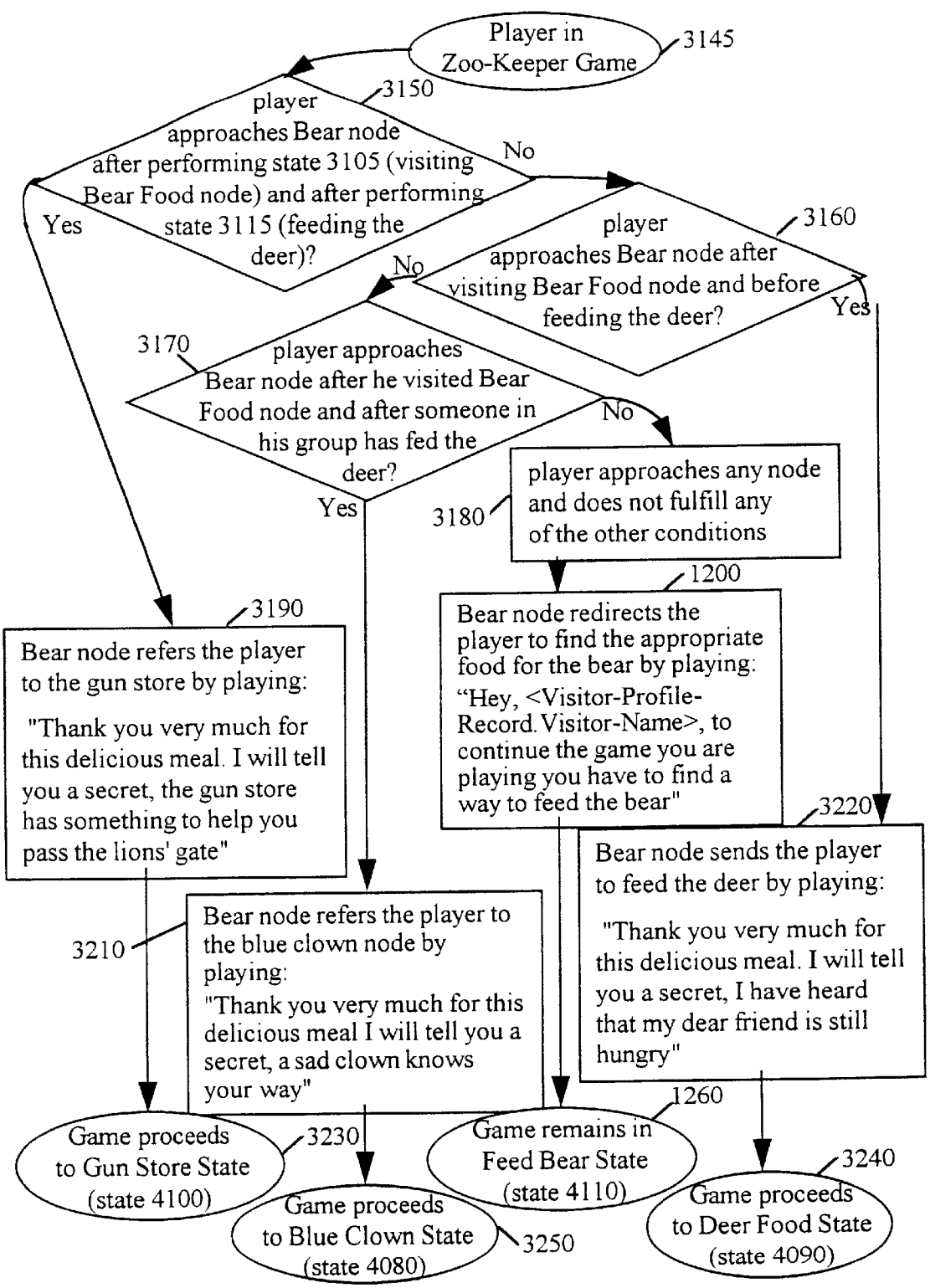

FIGS. 54A–54B are simplified flowchart illustrations of different aspects of a preferred chain of events including some of the events which typically occur in playing the "zoo-keeper" game of FIGS. 49–53 and specifically, the events which occur while the "zoo-keeper" game is within its "Feed Deer" state.

Figure 76:
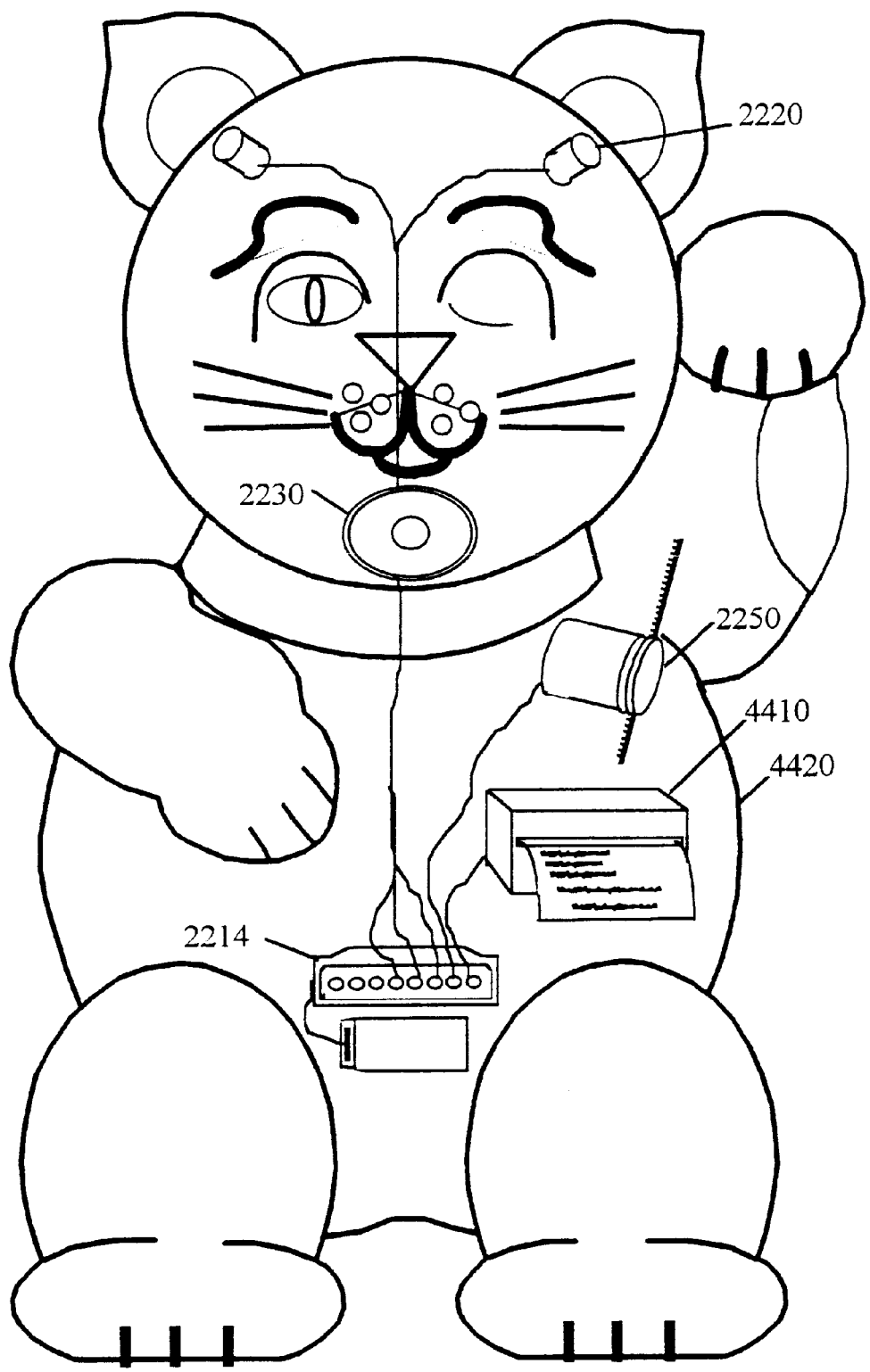

A game called "tree-quiz" is now described, with reference to FIGS. 55–60B, in which a node ask questions of visitors and/or give tasks to the visitors, as illustrated in FIG. 35. If the question is appropriately answered and/or if the task is completed, the same node or another node dispenses a prize, coupon or other valued item to the visitor. Preferably, as illustrated in FIG. 35, the node which dispenses the valued item physically extends the valued item toward the visitor and preferably hands the valued item to the visitor. Alternatively, as shown in FIG. 76, the coupon or other valued item is positioned such that the visitor extends his hand and takes the valued item. In FIG. 35, the tree 2170 asks a question and since the question is answered correctly by the visitor 2210, the tree directs the visitor to proceed to clown 2160 to receive a present.

According to a preferred embodiment of the present invention, some or all of the nodes are actuated by insertion of coins, tokens or other credits into a suitable slot associated with the node and typically formed on the node. Alternatively, the player may be debited electronically for some or all node actuations. According to this alternative, the node recognizes the player and decrements a suitable field associated with that player and storing that player's balance, such as the Credit2 field in the Credits Record 2830 belonging to visitor Tonny Dunn, as illustrated in FIG. 50B.

Figure 55:
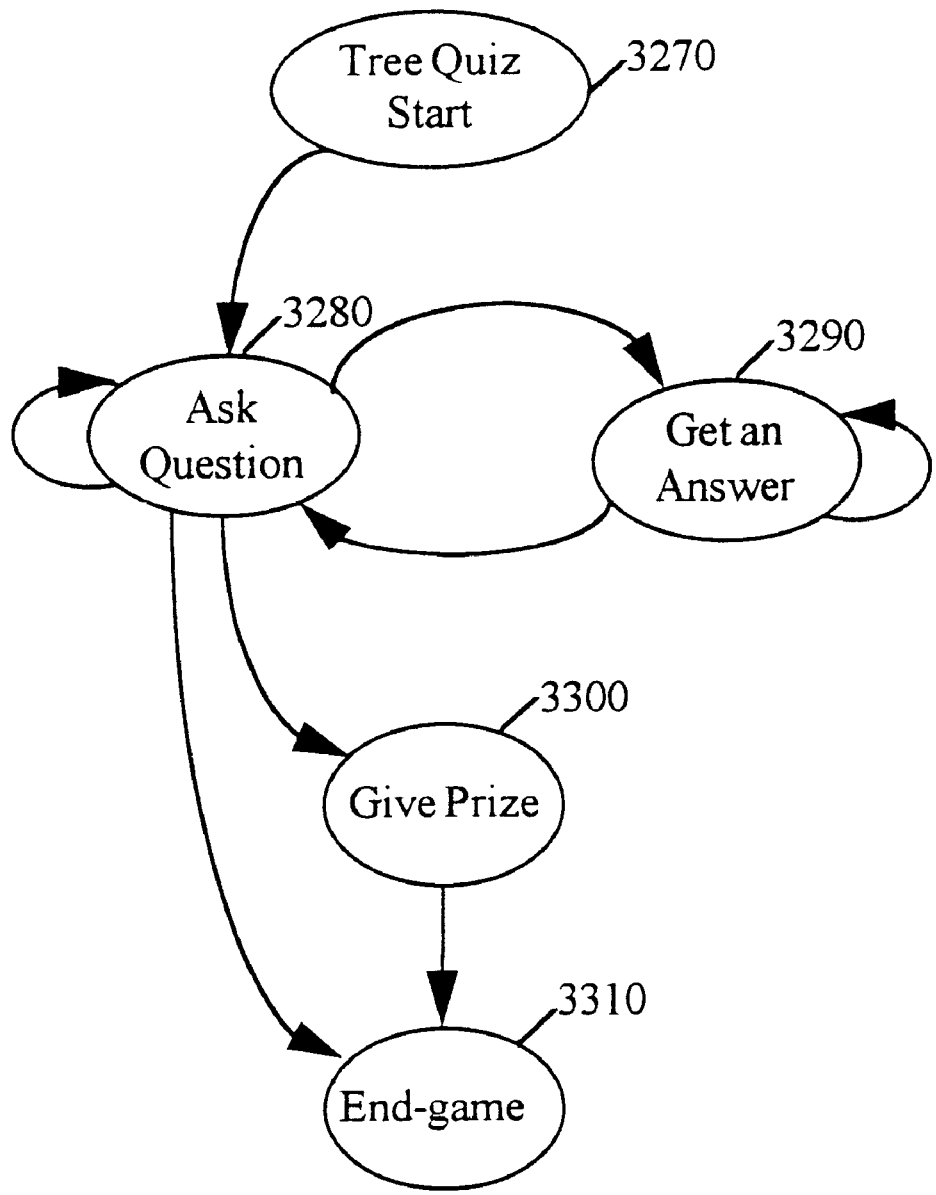

FIG. 55 is a bubble diagram of a game for an individual, "tree-quiz", in which a prize or other token is dispensed to the individual player by one of the nodes in the amusement park.

FIGS. 56A–B, taken together, form a diagram of one alternative "Game State Record" data structure of FIGS. 43A–43C, storing information regarding one of the game states, "ask question", within the individual game of FIG. 55.

FIGS. 56A and 56C, taken together, form a diagram of another alternative "Game State Record" data structure of FIGS. 43A–43C, storing information regarding one of the game states, "ask question", within the individual game of FIG. 55. In FIG. 56C, each correct answer increments a counter filed in the Visitor Profile Record and each incorrect answer decrements the counter. This counter is available for several different games and enables the visitor to gain a point that can later be converted in a gift or coupon.

FIG. 57 is a diagram of two "Game State Record" data structures of FIGS. 43A–43C storing information regarding two additional game states, "record answer" and "give present", within the individual game of FIG. 55.

FIG. 58 is a diagram of two "Visitor Record" data structures of FIGS. 43A–43C storing information regarding two visitors playing the individual game of FIGS. 55–57.

Figure 59:
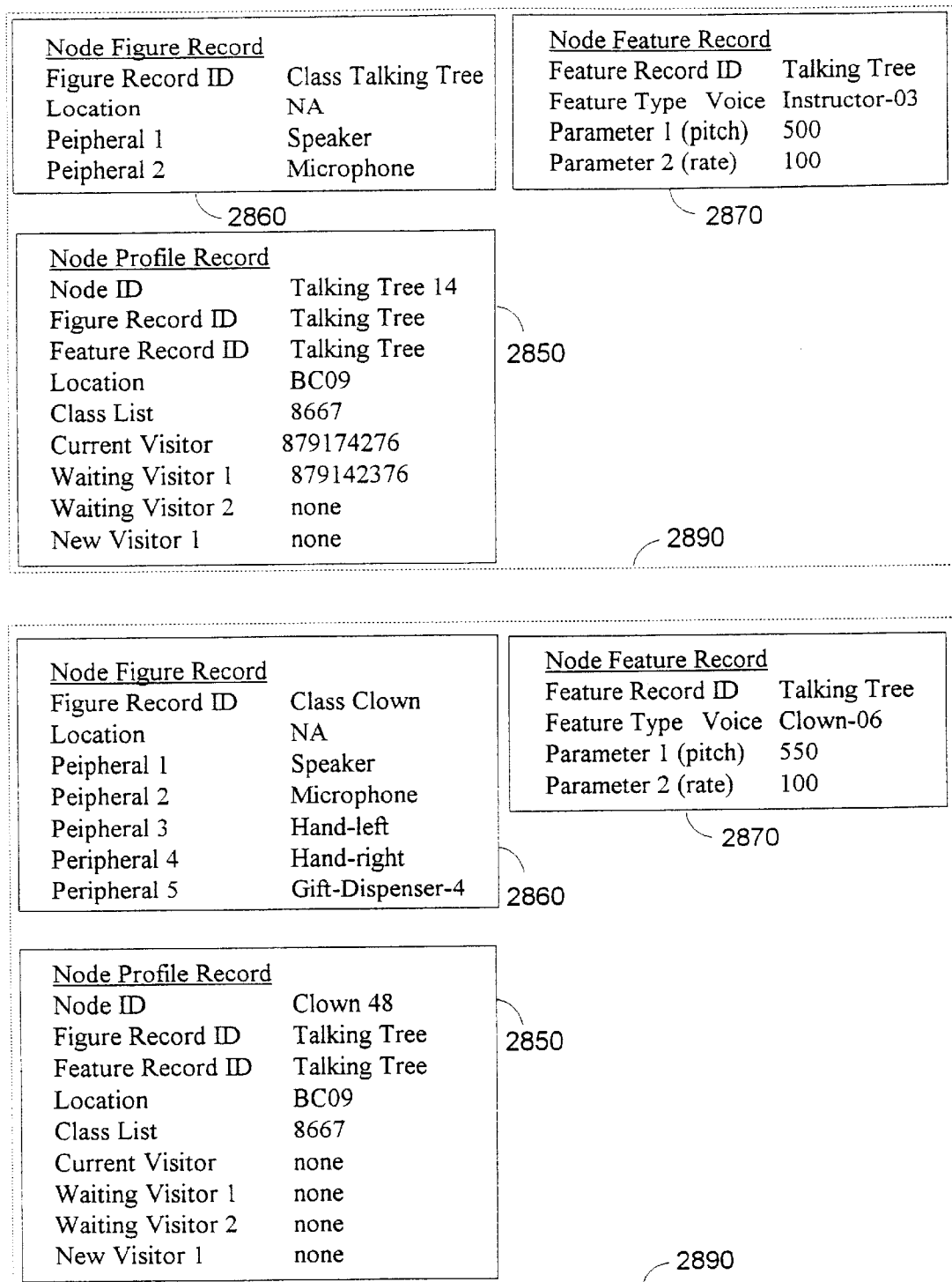

FIG. 59 is a diagram of a "Node Record" data structure of FIGS. 43A–43C storing information regarding a node, "tree", which is operating within the individual game of FIGS. 55–58.

Figure 60A:
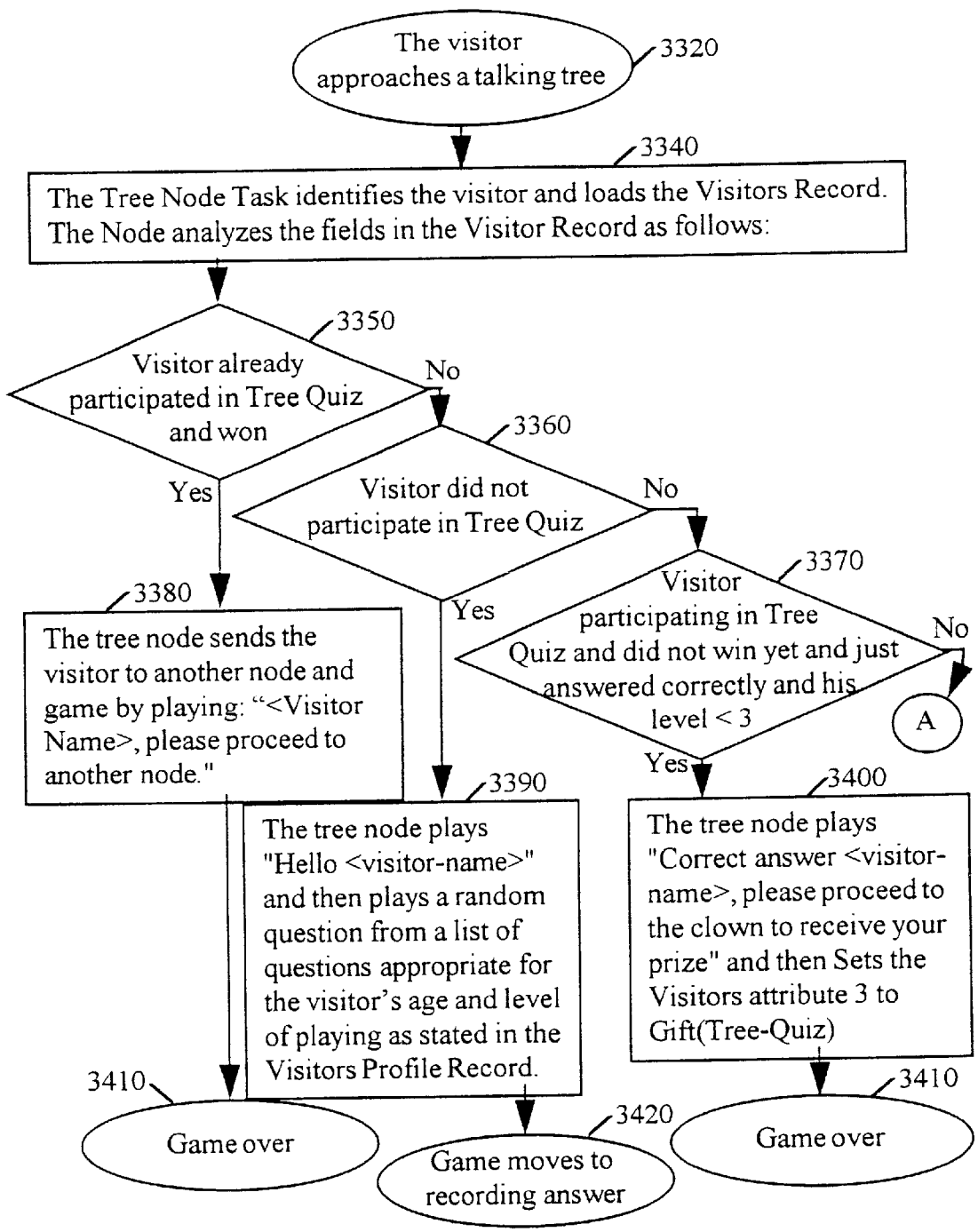
FIGS. 60A–60B, taken together, form a simplified flowchart illustration of a preferred chain of events including the events which typically occur in playing the "tree-quiz" game of FIGS. 55–59.
Figure 60B:
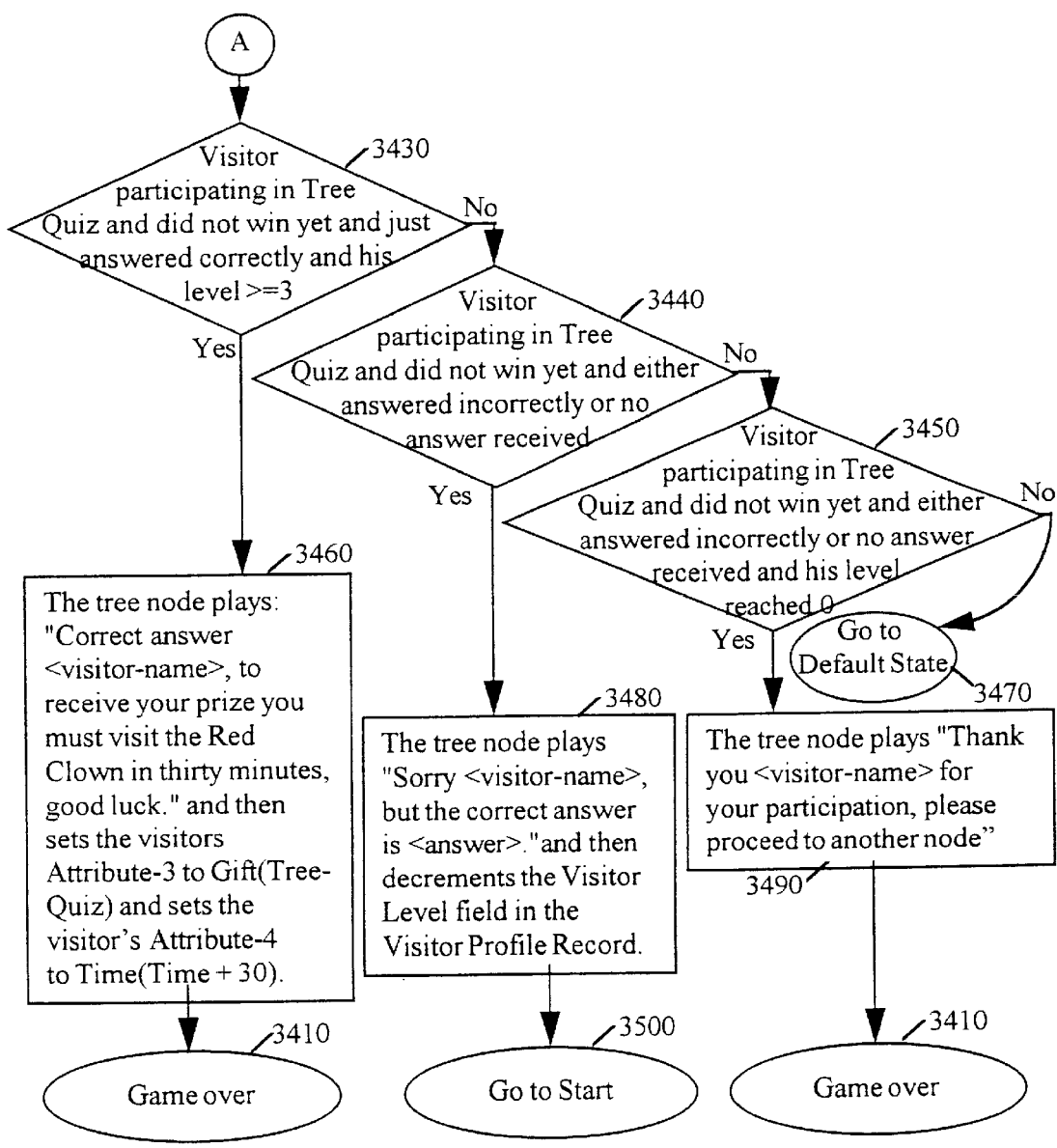

FIG. 60A–60B, taken together, form a simplified flowchart illustration of a preferred chain of events including the events which typically occur in playing the "tree-quiz" game of FIGS. 55–59.

A game called "common encounters" is now described, with reference to FIGS. 61–69. In the illustrated embodiment, the "common encounters" game is initiated by the central node controller when a visitor approaches a node and the Game Name in the visitor's Visitor Profile Record indicates that the game does not require the visitor to approach that node. Alternatively, the cue for initiating the "common encounters" game is simply that key words such as "bathroom" or "help" are recognized in the speech of a visitor approaching the node, even if the contact between the visitor and the node is within the normal course of the game whose name is stored in the Game Name of the visitor's Visitor Profile Record.

Preferably, because the entire game is played between a single visitor and a single node, the Game Name and State Name fields in the visitor's Visitor Profile Record are not changed. Alternatively, the game in the visitor's Game Name field is suspended and Common Encounters is entered as a value to the visitor's Game Name field. After the Common Encounters game is terminated, the previous game and the last state reached in that game is resurrected from the Past Games Record and that previous game can then be resumed.

Figure 61:
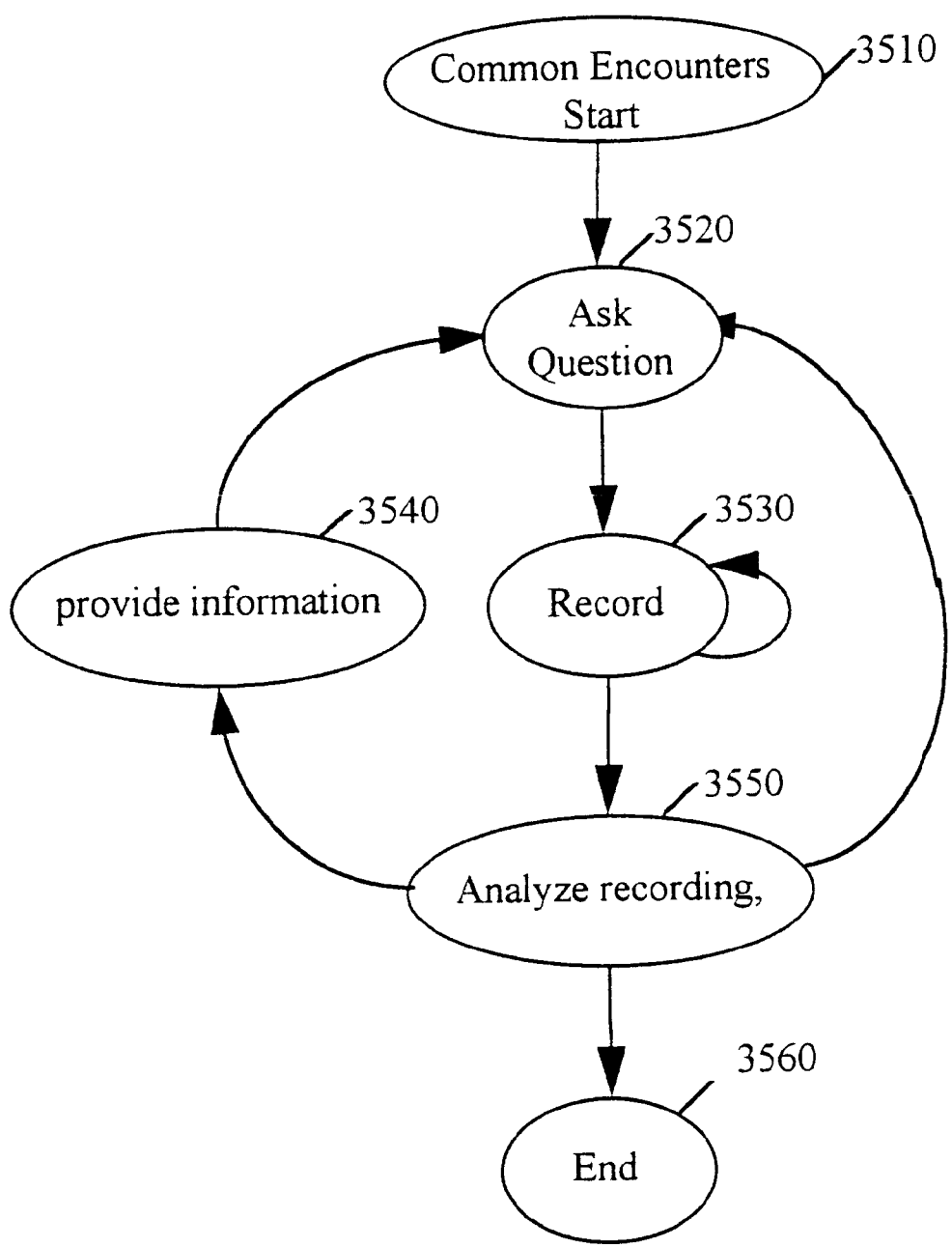

FIG. 61 is a bubble diagram of a game for an individual, "common encounters", in which a player makes a common comment or complaint or asks a common question such as "where are the restrooms" of one of the nodes in the amusement park and a suitable answer is provided to the individual player by that node;

FIG. 62 is a diagram of two "Game State Record" data structure elements of FIGS. 43A–43C storing information regarding two game states of the "common encounters" game of FIG. 61;

FIG. 63A is a diagram of a "Game State Record" data structure element of FIGS. 43A–43C storing information regarding a game state, "analyze", of the "common encounters" game of FIG. 61.

FIG. 63B is a diagram of two "Game State Record" data structure elements of FIGS. 43A–43C storing information regarding two respective game states, "provide information" and "record", of the "common encounters" game of FIG. 61.

Figure 64:
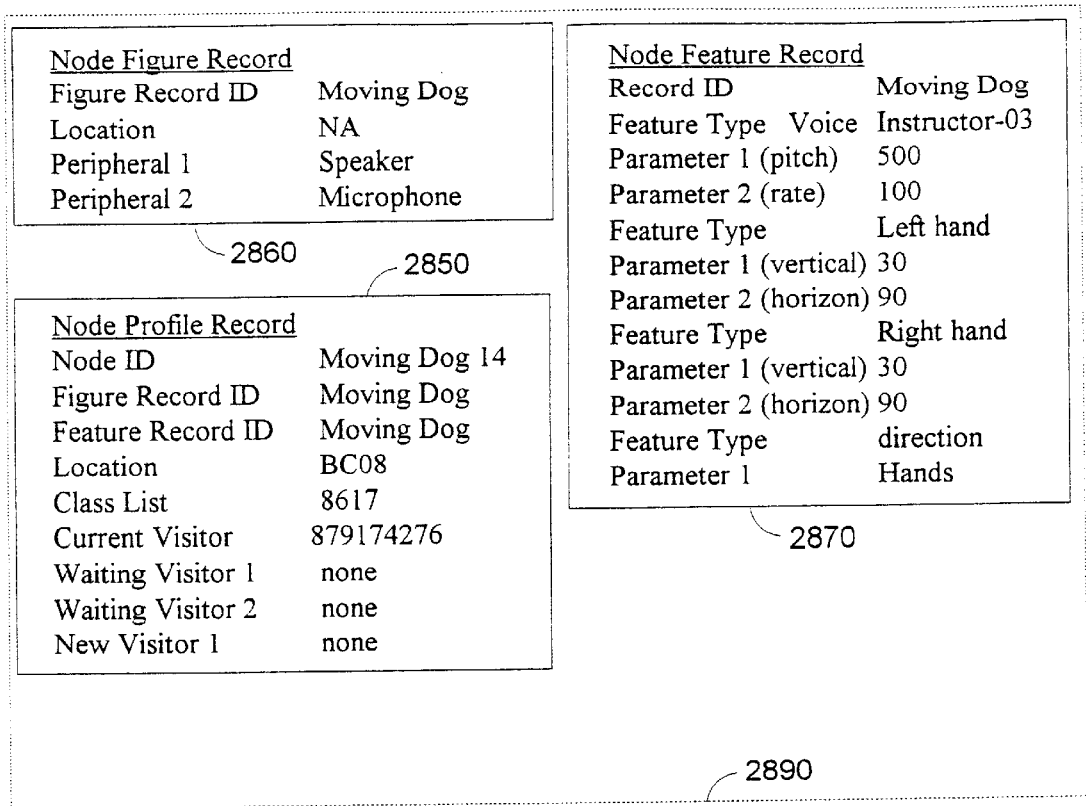

FIG. 64 is a diagram of a "Node Record" data structure of FIGS. 43A–43C storing information regarding a node, "moving dog" 2140, which is operating within the game of FIGS. 61–63;

FIGS. 65A–65B, taken together, form a play record data structure of an example of a play record operative to store oral and/or textual information to be played (i.e. orally presented) to a user who has asked for directions to the restrooms. Typically, a play record also includes information other than that which is to be orally presented to the user such as information defining expressions, gestures or other physical acts which are to accompany the oral presentation of the information.

FIGS. 65A–65B mention the following 5 voice files containing sound information which may, for example, include representations of the following phrases:

VR03025.wav "THE RESTROOMS ARE"
VR03120.wav "IN FRONT OF ME AND"
VR03121.wav "BEHIND ME AND"
VR03122.wav "TO MY RIGHT"
VR03123.wav "TO MY LEFT"

FIG. 66 is a diagram of 2 "Frequent inquiry record" data structures of FIGS. 43A–43C storing information regarding two frequently posed inquiries: "where is the bathroom" and "please clean the bathroom".

Figure 67A:
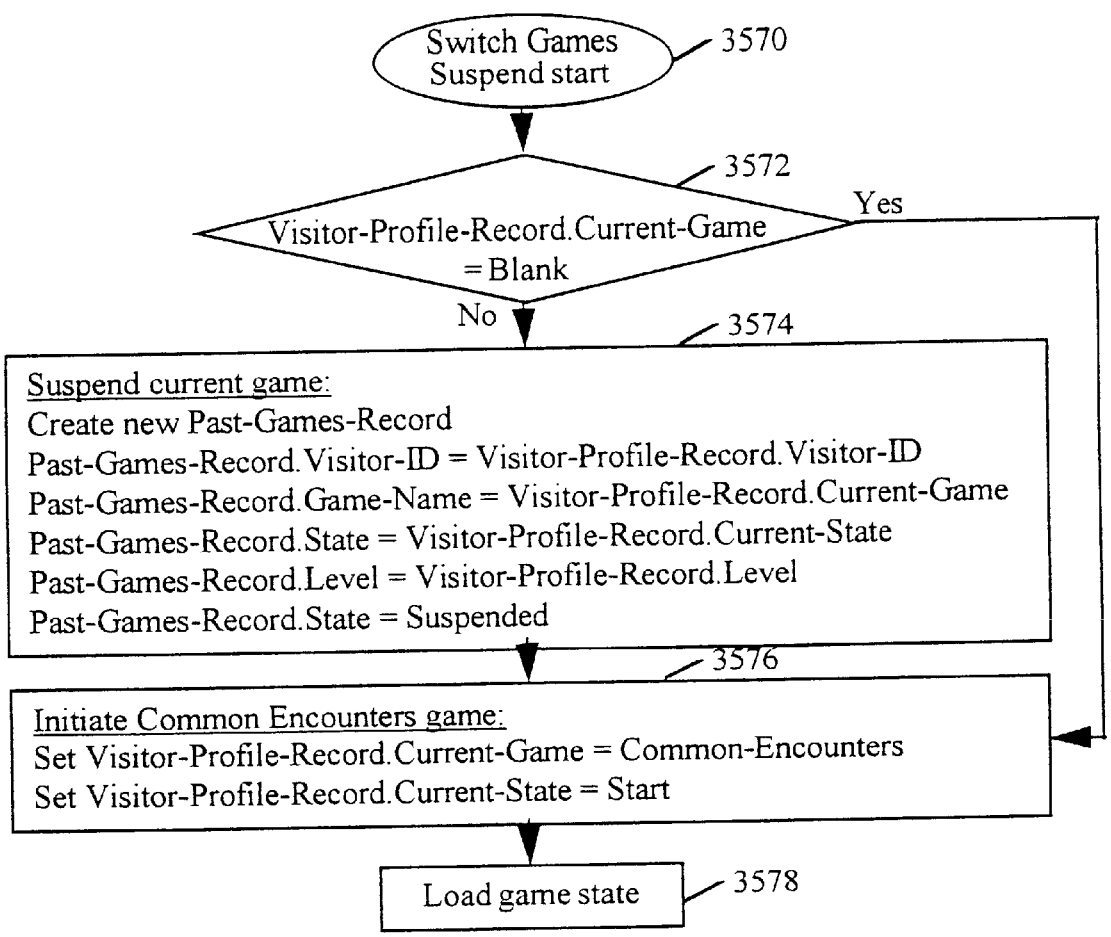
FIG. 67A is a simplified flowchart illustration of a process that suspends a game.
Figure 67B:
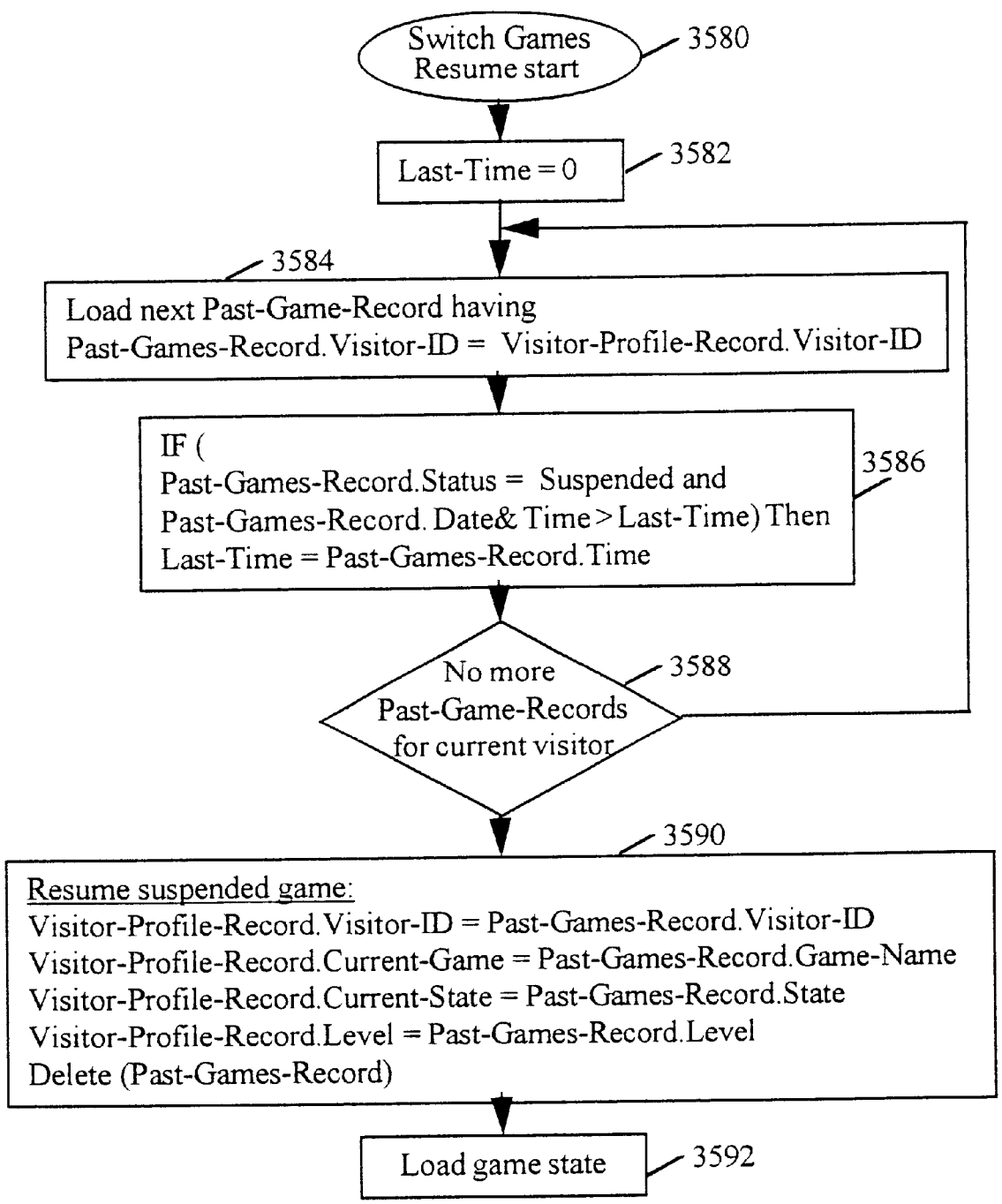
FIG. 67B is a simplified flowchart illustration of a process that resumes a game.

FIG. 67A is a simplified flowchart illustration of a process that suspends a game. FIG. 67B is a simplified flowchart illustration of a process that resumes a game. In FIG. 67A a game is suspended, suitable details documenting the state of the game when suspended are copied to a Past Game Record 2820, and a new game is set and loaded. In FIG. 67B, the latest suspended game is resumed using the Past Game Record 2820 defined for that game.

Figure 68A:
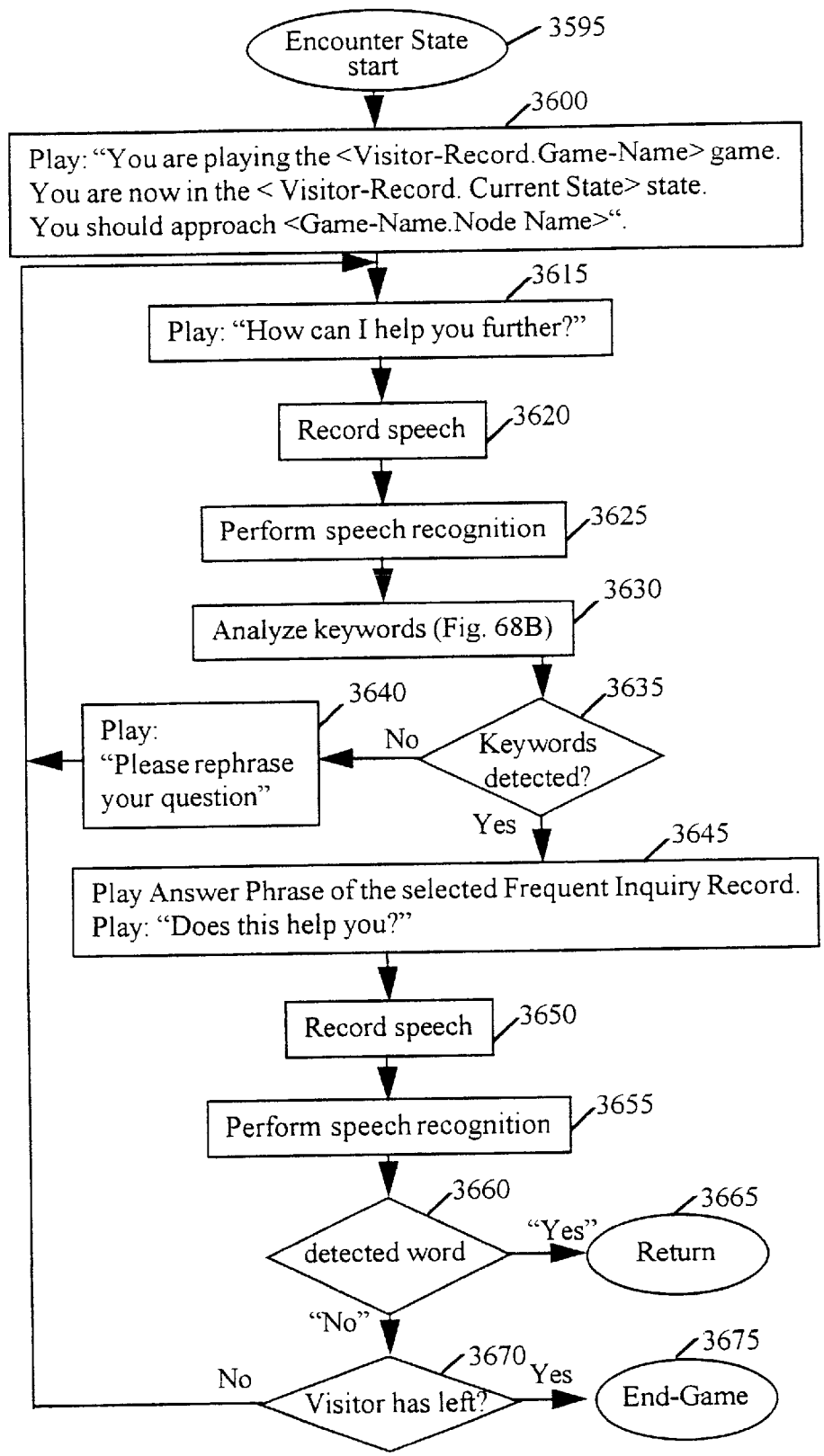
FIG. 68A is a simplified flowchart illustration of a first preferred chain of events including all operations performed by the central node controller 2010, on behalf of a node approached by a player in the course of playing a "common encounters" game of FIGS. 62–66 provided in accordance with a first preferred embodiment of the present invention.

FIG. 68A is a simplified flowchart illustration of a first preferred chain of events including all operations performed by the central node controller 2010, on behalf of a node approached by a player in the course of playing a "common encounters" game of FIGS. 62–66 provided in accordance with a first preferred embodiment of the present invention.

Figure 68B:
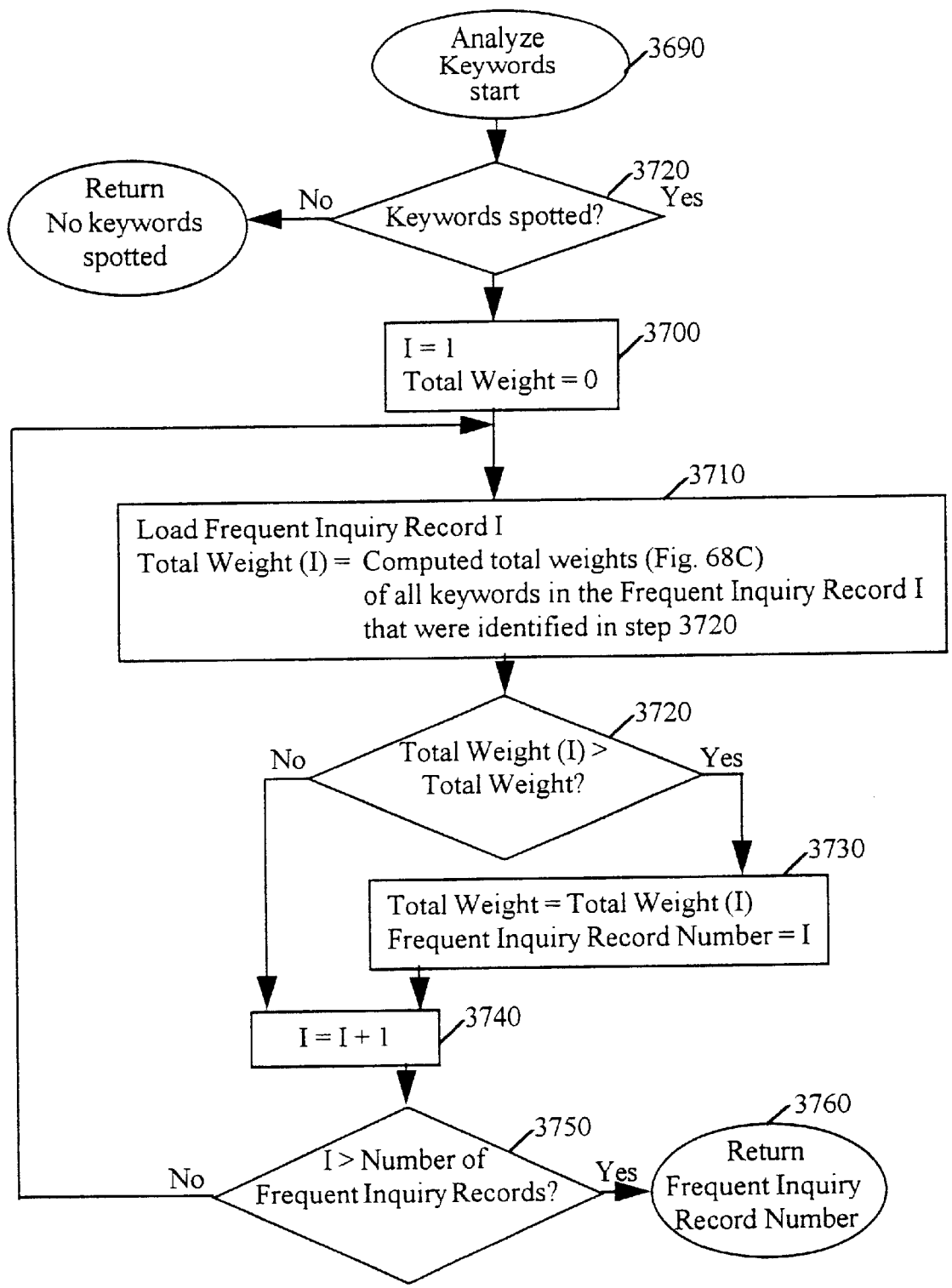
FIG. 68B is a simplified flowchart illustration of a preferred method by which the central node controller effects the "analyze keywords" step of FIG. 68A.

FIG. 68B is a simplified flowchart illustration of a preferred method by which the central node controller effects the "analyze keywords" step of FIG. 68A.

Figure 68C:
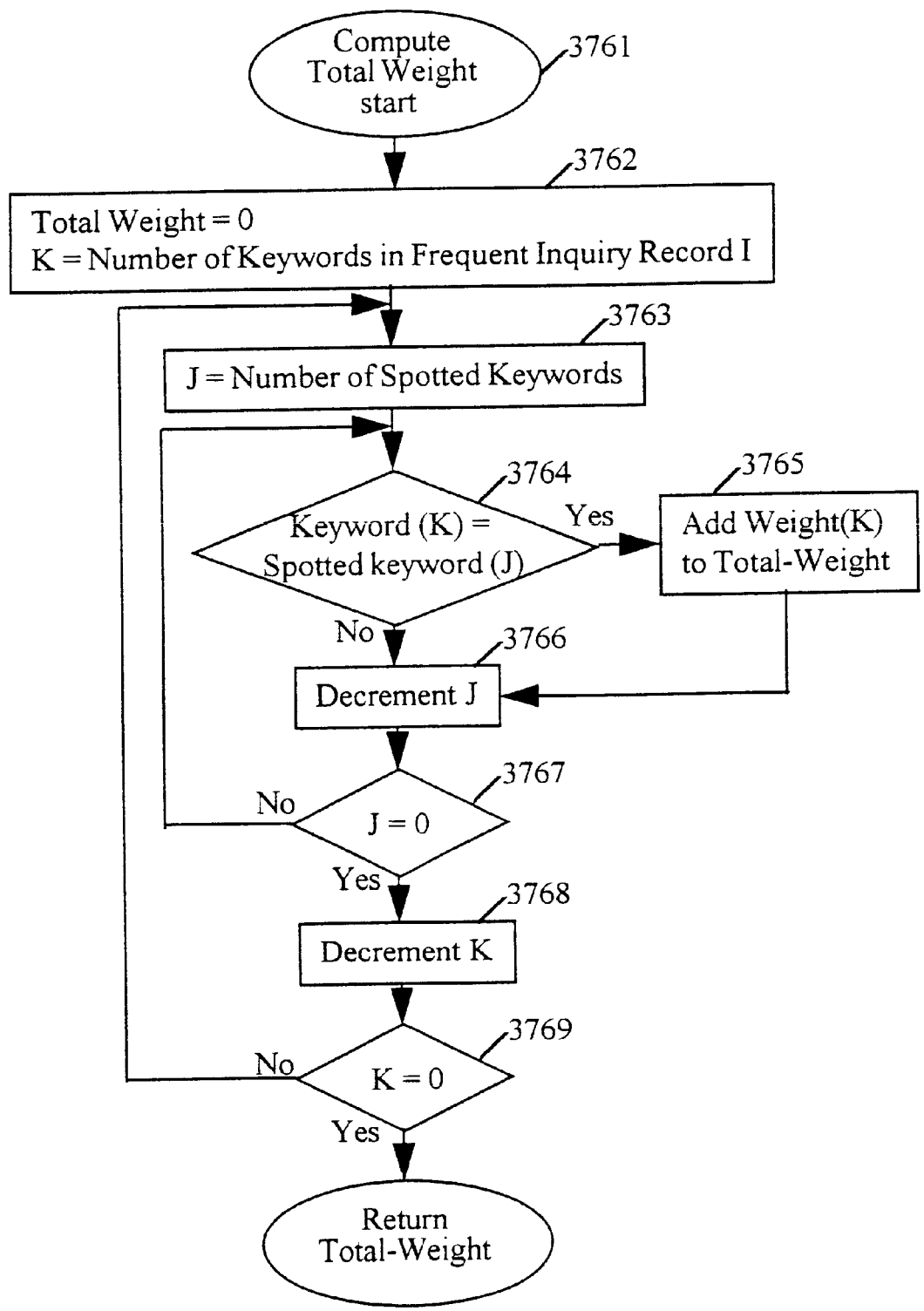
FIG. 68C is a simplified flowchart illustration of the "compute total weights" step of FIG. 68B.

FIG. 68C is a simplified flowchart illustration of the "compute total weights" step of FIG. 68B.

Figure 69:
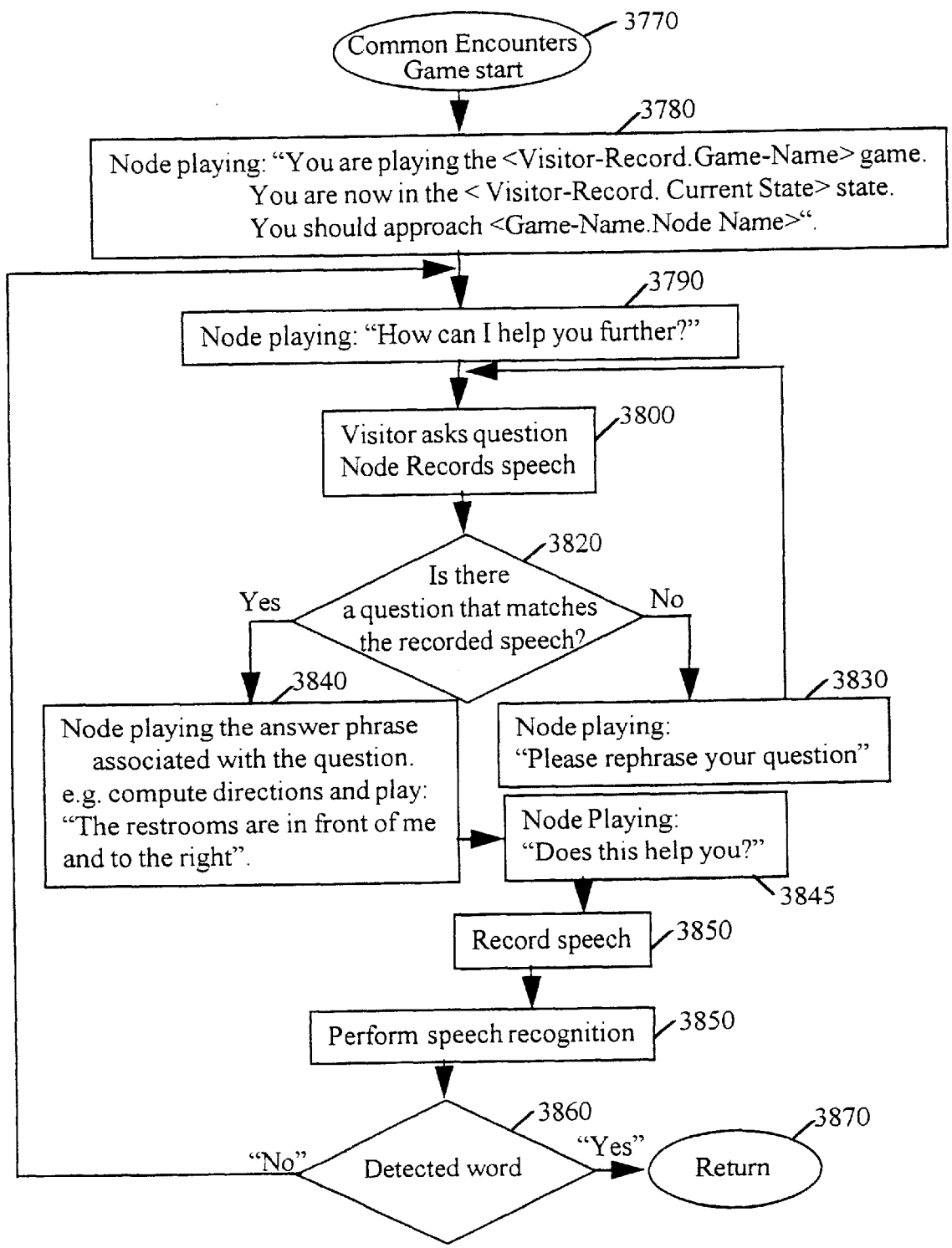

FIG. 69 is a simplified flowchart illustration of a second preferred chain of events including all operations performed by the central node controller 2010, on behalf of a node approached by a player in the course of playing a "common encounters" game of FIGS. 62–66 provided in accordance with a second preferred embodiment of the present invention.

Figure 70:
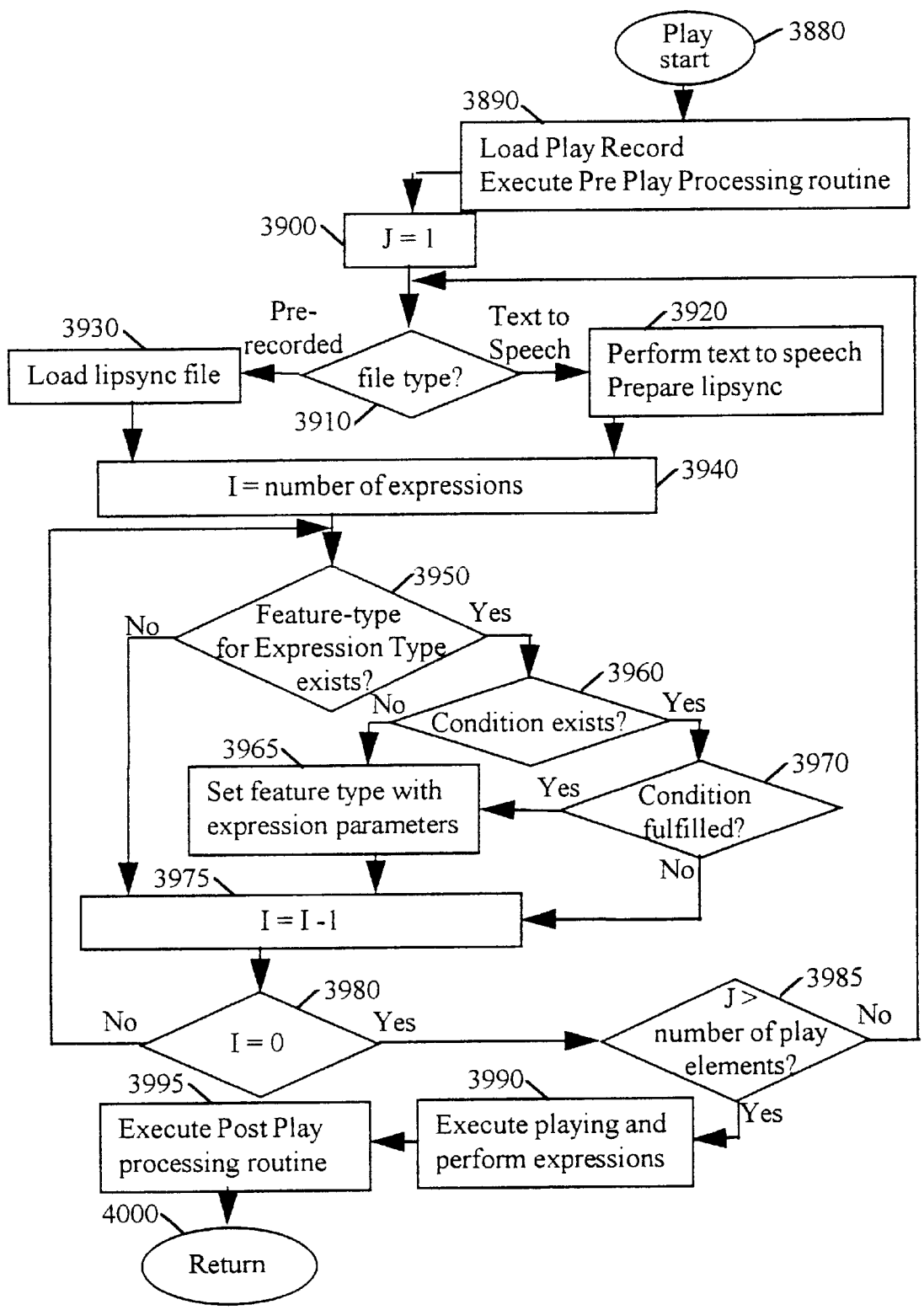

FIG. 70 is a simplified flowchart illustration of a preferred method for playing speech and simultaneously appropriately moving at least one body part so as to provide an appropriate physical expression or demeanor. The method of FIG. 70 is suitable for implementing any of the "play" steps shown and described herein such as steps 3600 and 3645 of FIG. 68A or step 3050 in FIG. 48. In the FIG. 70, the "lypsync" file includes a temporal string of commands that implements a movement of the mouth in synchronization with the spoken syllables, as is known in the art.

FIG. 71 is a simplified block diagram of a preferred hardware implementation of node control device 2214 of FIG. 36 which is suitable for a node whose connection to the central node controller comprises a wireless connection. A suitable implementation of FIG. 71, in schematic block diagram form, are FIGS. 7A–7F.

Figure 72:
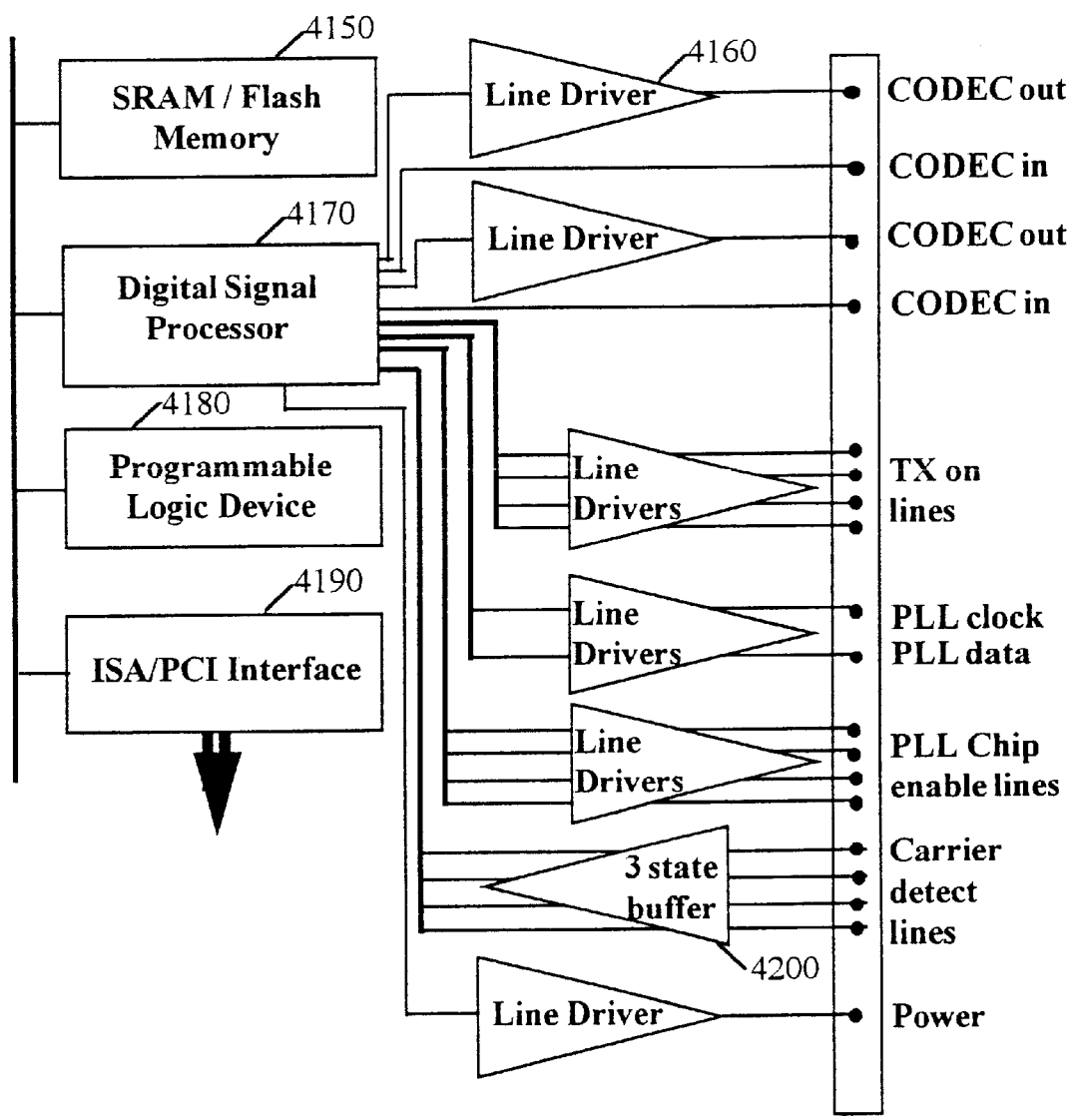
Figure 73:
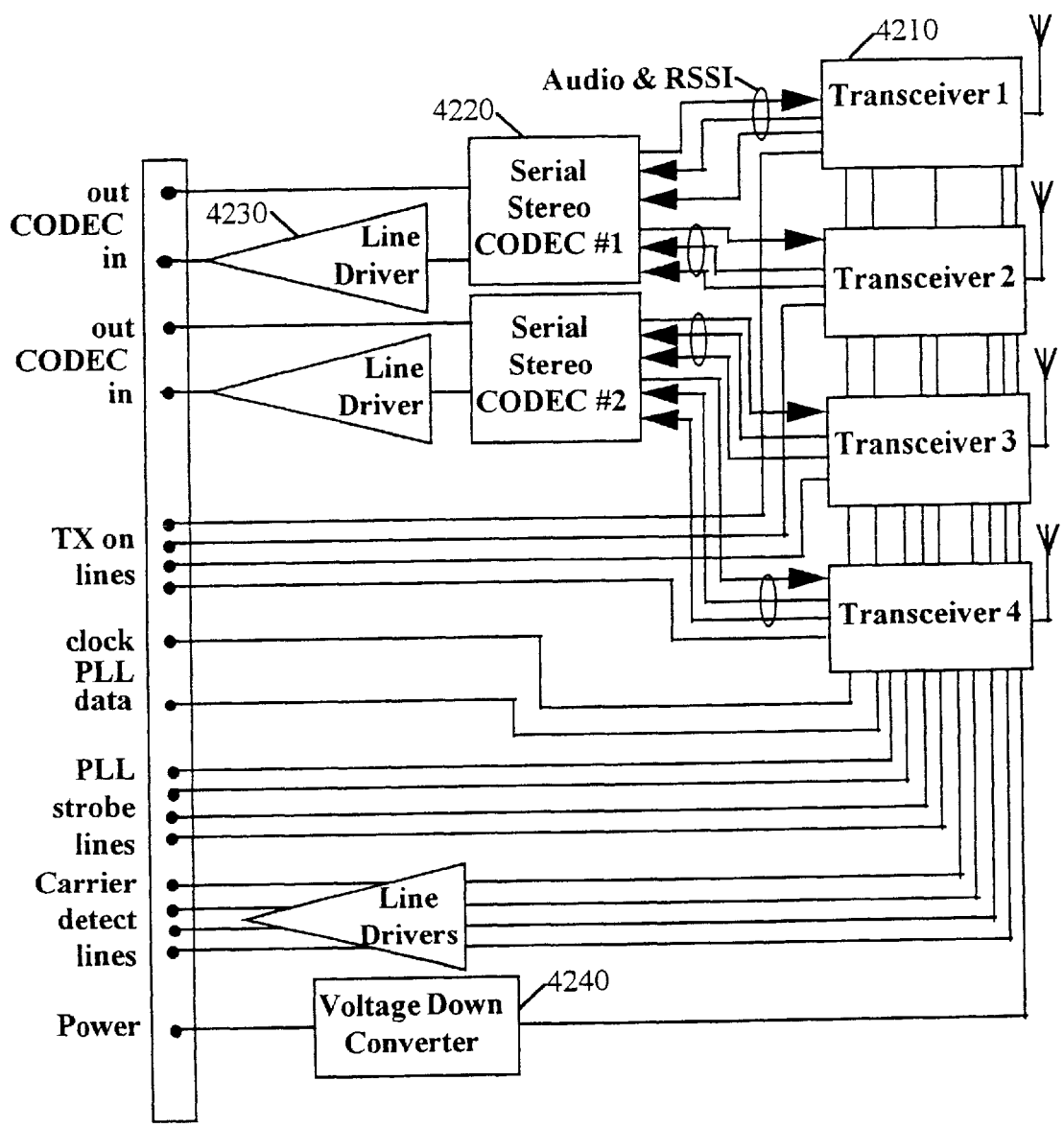

FIG. 72 is a simplified block diagram of a first computer board which, in conjunction with the computer board of FIG. 73, comprises a preferred implementation of the computer-node interface of the central node controller 2010 of FIG. 33B, for wireless applications.

FIG. 73 is a simplified block diagram of a second computer board which, in conjunction with the computer board of FIG. 72, comprises a preferred implementation of the computer-node interface of the central node controller 2010 of FIG. 33B, for wireless applications.

FIG. 74 is a simplified block diagram of a preferred hardware implementation of node control device 2214 of FIG. 36 which is suitable for a node whose connection to the central node controller comprises a cable connection.

Figure 75:
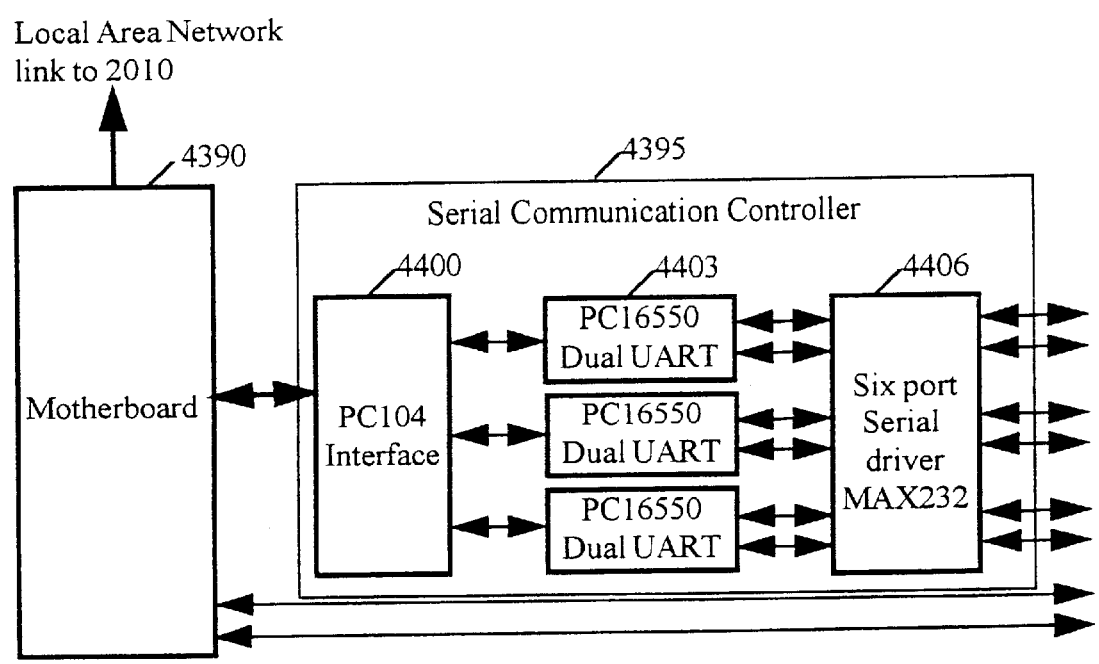

FIG. 75 is a simplified block diagram of circuitry which comprises a preferred implementation of the computer-node interface of the central node controller of FIG. 33B, for cable applications in which nodes are connected via cables to the central node controller 2010 of FIG. 33B. Element 4390 may, for example, comprise a Viper806 and element 4395 may, for example, comprise a TEK 857, both commercially available from Teknor Industrial Computers, Inc., 7900 Glaes Road, Boca Raton, Fla. 33434, USA.

It is appreciated that in order to increase the number of nodes which the central node controller 2010 is capable of supporting, a number of board pairs such as a suitable number of the board pairs illustrated in FIGS. 72–73 and/or a suitable number of the board pairs illustrated in FIG. 75 can be provided.

FIG. 76 is a pictorial illustration of a node 4420 which is operative to dispense an item of value to a player and specifically to print coupons and dispense them to players in accordance with control instructions, arriving from the central node controller, which determine differential entitlement of different players.

Figure 77:
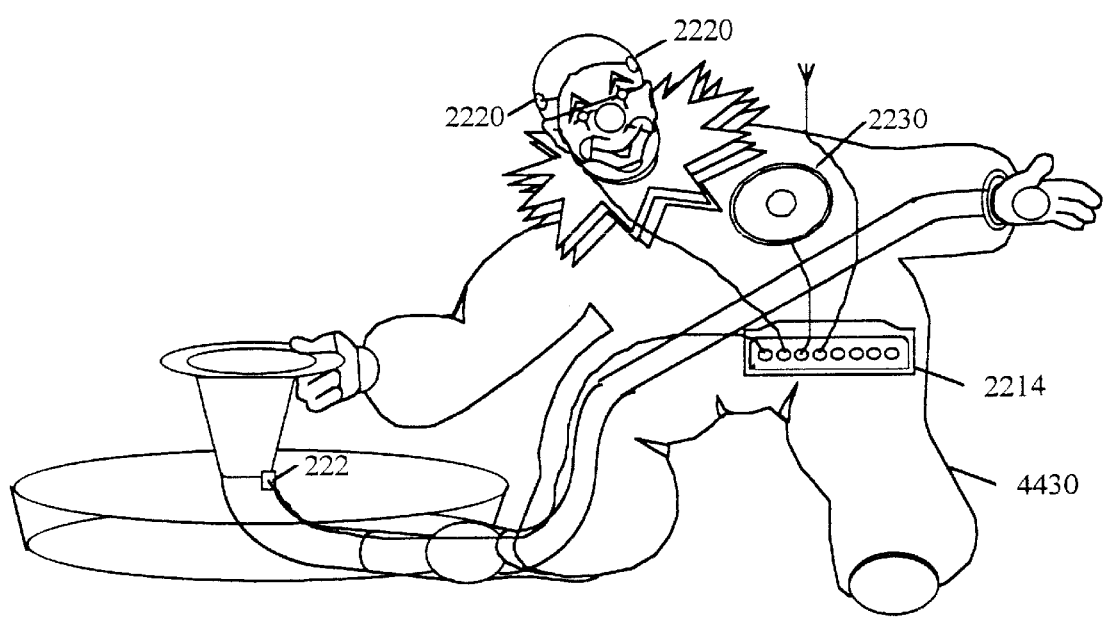

FIG. 77 is a pictorial illustration of a node 4430 which is operative to interact physically with a player and specifically to sense at least one physical, non-verbal aspect of a player's performance of a task which typically forms part of a game and to provide an evaluation thereof to the central node controller.

Figure 78:
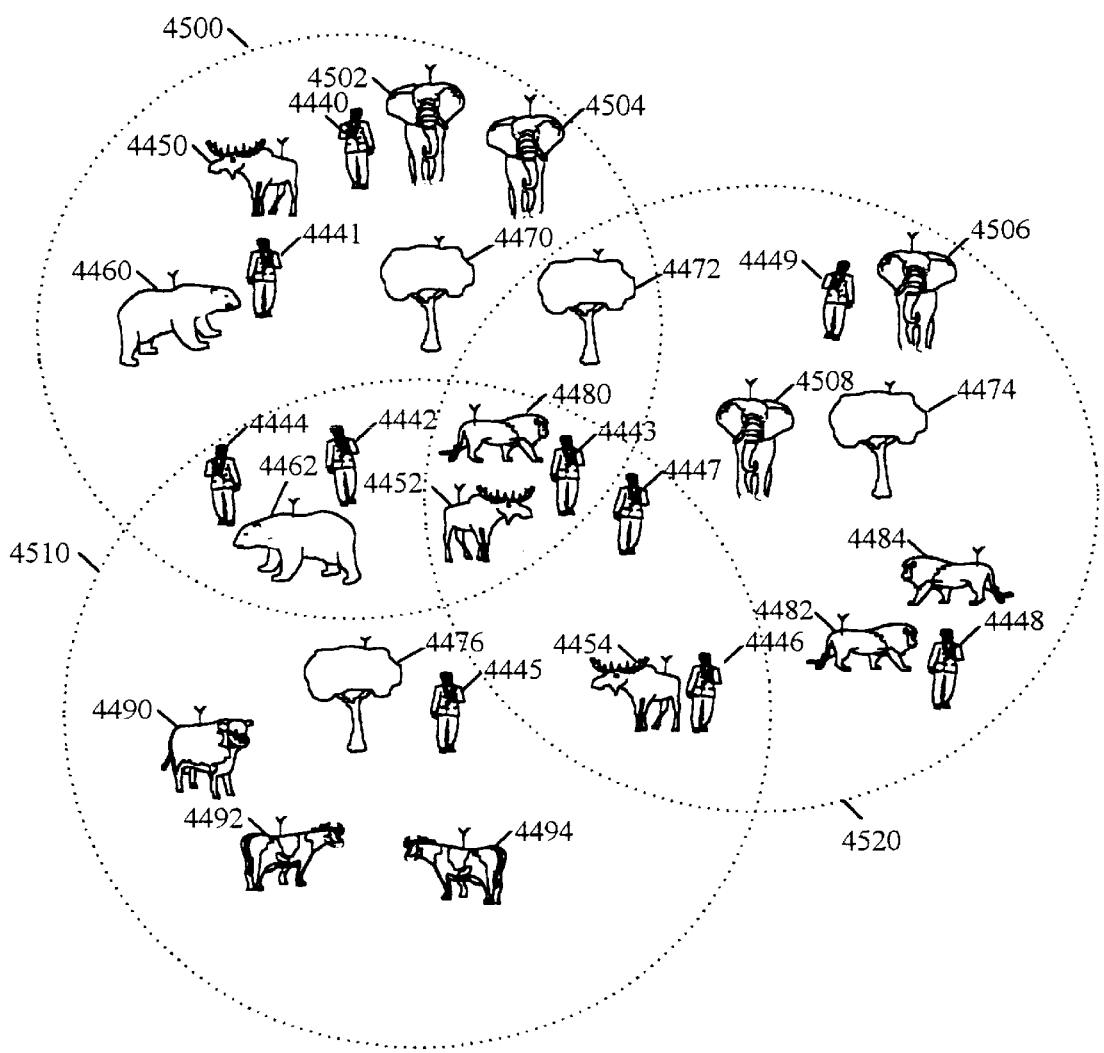

FIG. 78 is a pictorial illustration of a plurality of nodes such as animals and trees participating in various games played by a plurality of visitors 4440–4449. The players and nodes participating in a first game are encircled by imaginary circle 4500. The players and nodes participating in a second game are encircled by imaginary circle 4510. The players and nodes participating in a third game are encircled by imaginary circle 4520. As shown, each player typically plays only one game at a time, however at least some of the nodes participate in more than one simultaneously ongoing games. For example, lion 4480 participates in all three games and therefore is included in the intersection of circles 4500, 4510 and 4520. It is appreciated that, of course, the geographic areas including the players and nodes involved in various games are not generally configured as overlapping circles and that the circles shown in FIG. 78 are imaginary circles showing relationships between games being played and nodes and players participating in those games.

For at least some nodes, such as node 4452, there is a queue of visitors playing different games. For node 4452 the queue includes a first visitor 4443 playing the first game (corresponding to circle 4500) and a second visitor 4447 playing the second game (corresponding to circle 4510).

The node controller 2010 (not shown) is preferably operative to assign each player including the illustrated players 4440–4449 to an individual game such as one of the three games corresponding to the three circles 4500, 4510 and 4520. Preferably, a player playing an individual game interacts with each of the nodes participating in that game. For example, preferably, visitor 4441 interacts with all of the nodes included within circle 4500. The players playing the same game (such as the 4 players 4446–4449 playing the game corresponding to circle 4520) may each be playing in a different state of the game.

The node controller is also preferably operative to control each individual node such that when the individual node enters into an interaction with an individual player, the node plays, with the individual player, the game assigned to that individual player. For example, node 4460 plays the first game (the game corresponding to circle 4500) with visitor 4441. Thereby, the nodes can sequentially participate in any of a plurality of games being played simultaneously by any of a number of players and at least one node, and preferably many or even all nodes, participates in each of at least two ongoing games.

The games may include group games in which at least one encounter between an individual player of the group game and a node participating in the group game is affected by at least one previous encounter between at least one other player of the group game and that node or some other node. For example, the game corresponding to circle 4510 may be a group game and visitors 4443, 4444 and 4445 may all be members of a single group. A game may be played as a competition between two competing groups. For example, game 4520 may be played as a competition between first and second competing groups, the first comprising visitors 4446 and 4447 and the second comprising visitors 4448 and 4449.

Figure 79:
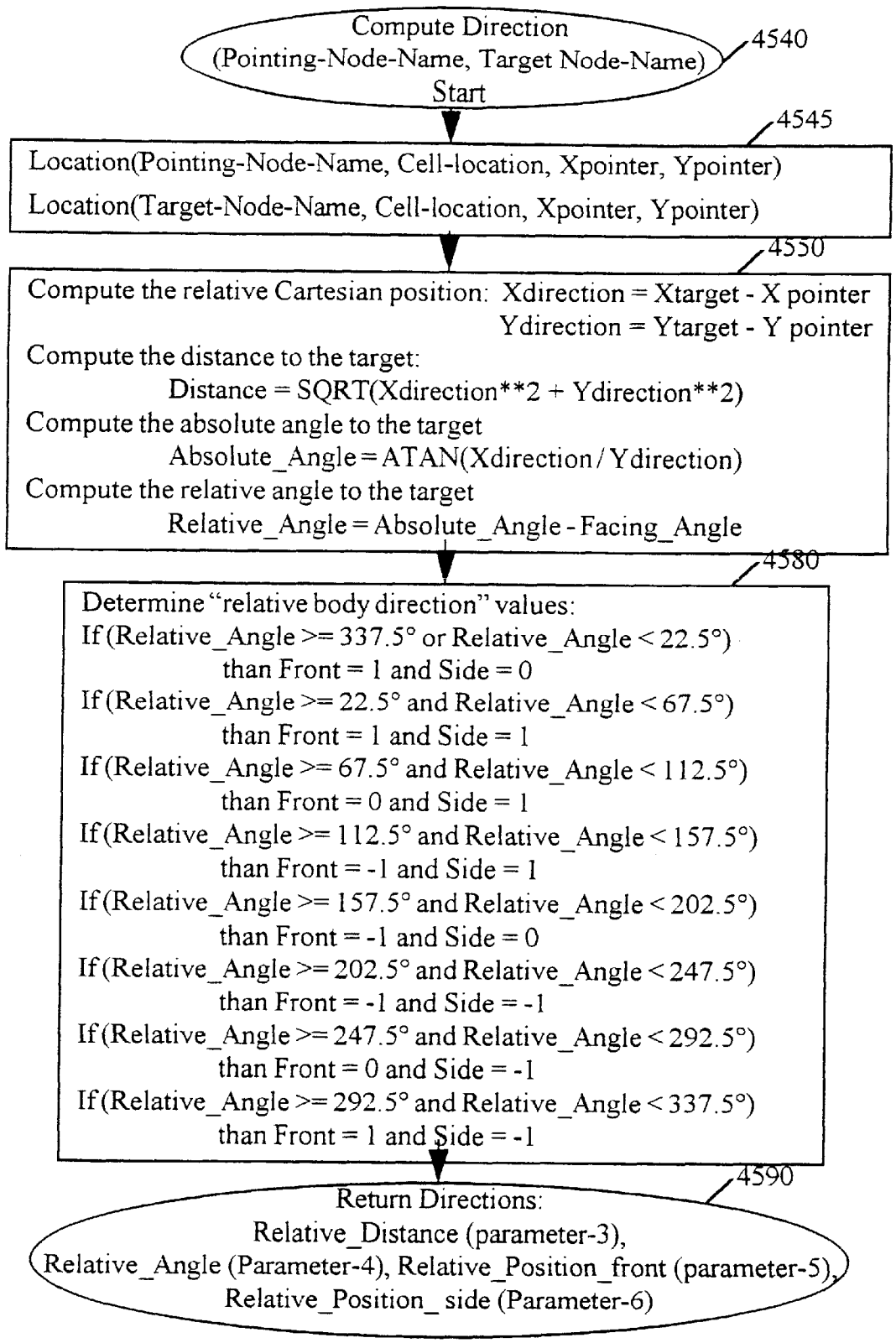

FIG. 79 is a simplified flowchart illustration of a preferred method for computing the Direction function stored in the Begin field of the Play Record of FIG. 65A, as a function of a pointing node (Parameter 1) and a target node (Parameter 2), wherein Direction represents the direction in which a visitor must proceed in order to move from the pointing node to the target node.

Figure 80A:
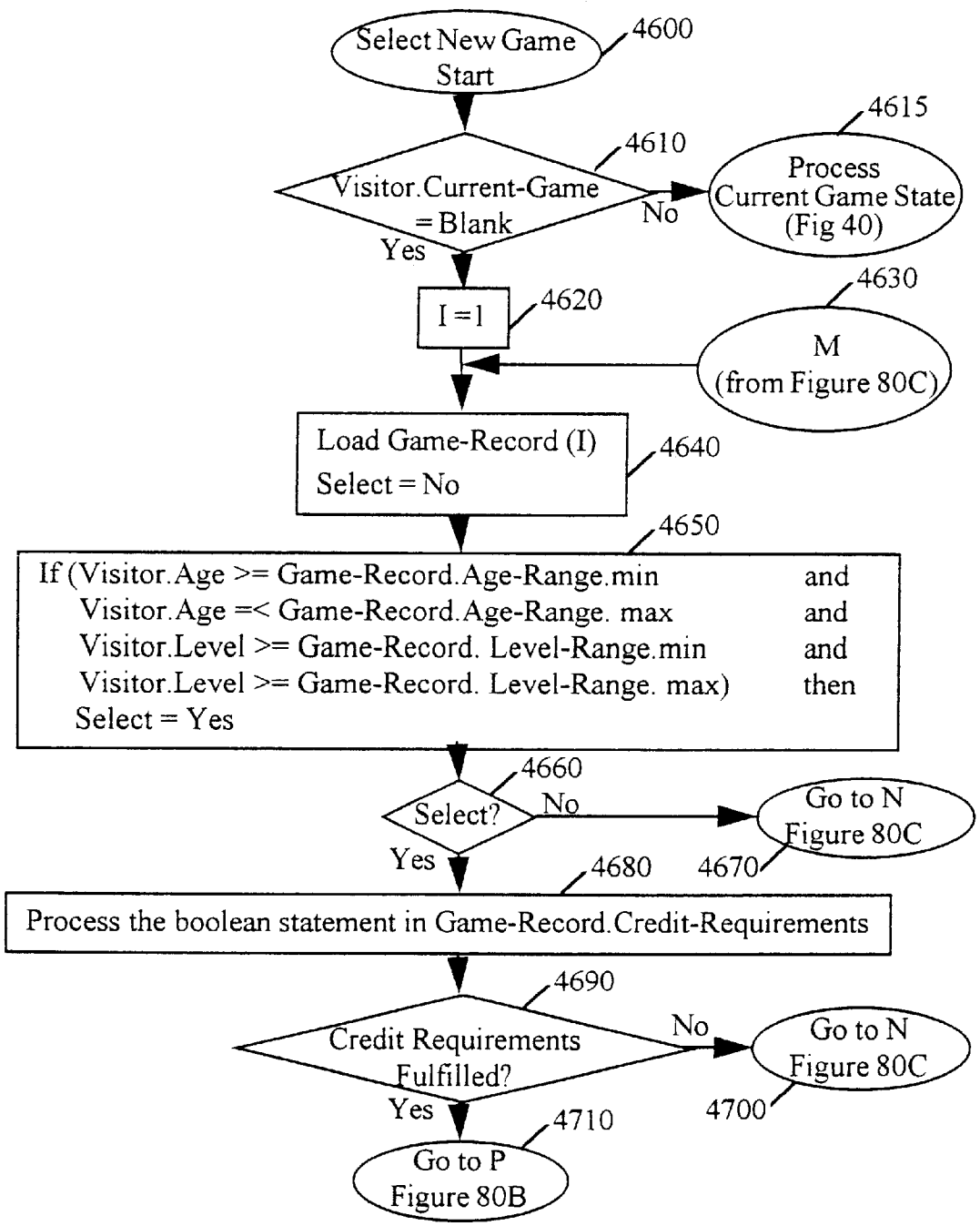
FIGS. 80A–80C, taken together, form a simplified flowchart illustration of a preferred method by which a node can suggest a new game to a visitor who approaches the node and who is not playing any game.
Figure 80B:
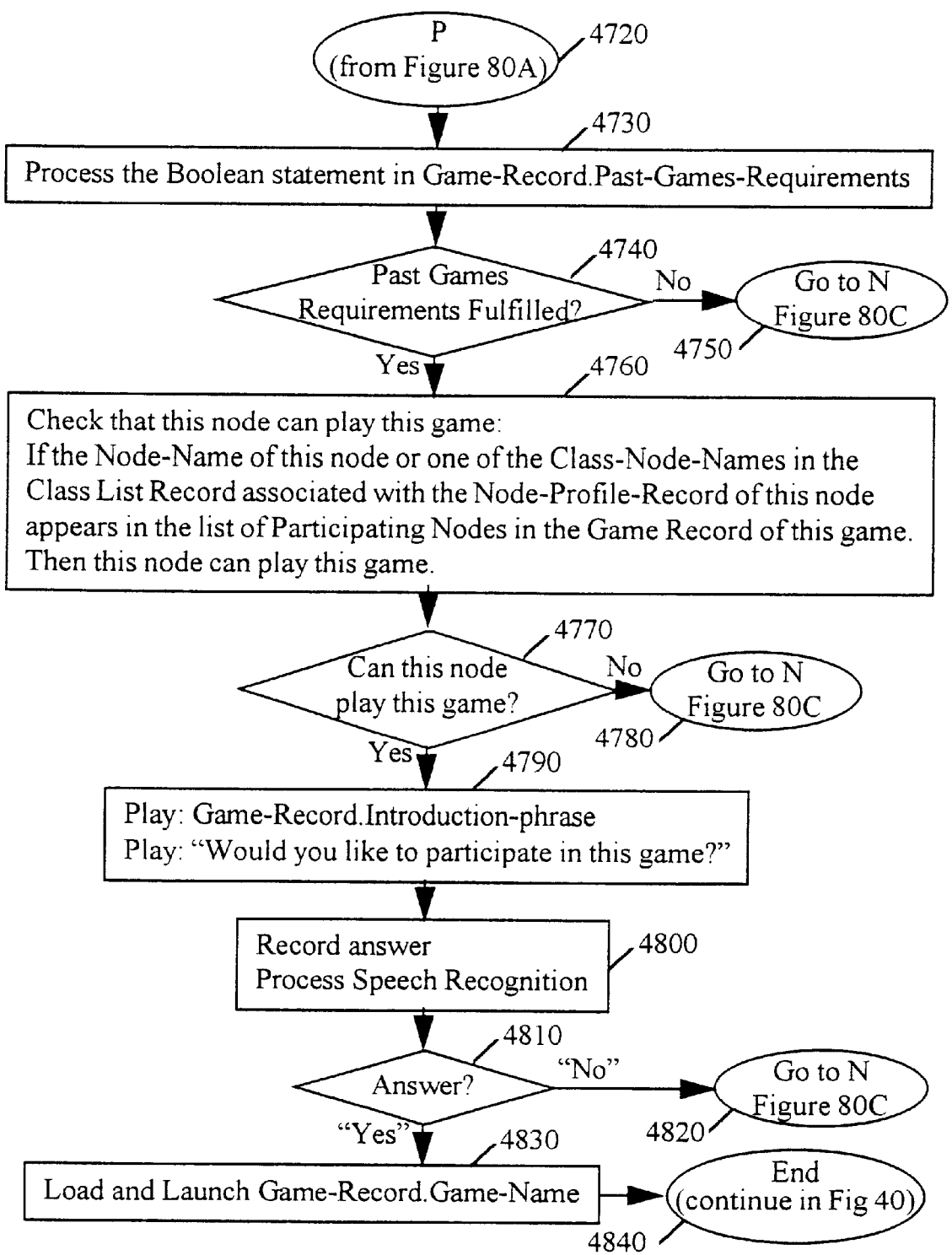
Figure 80C:
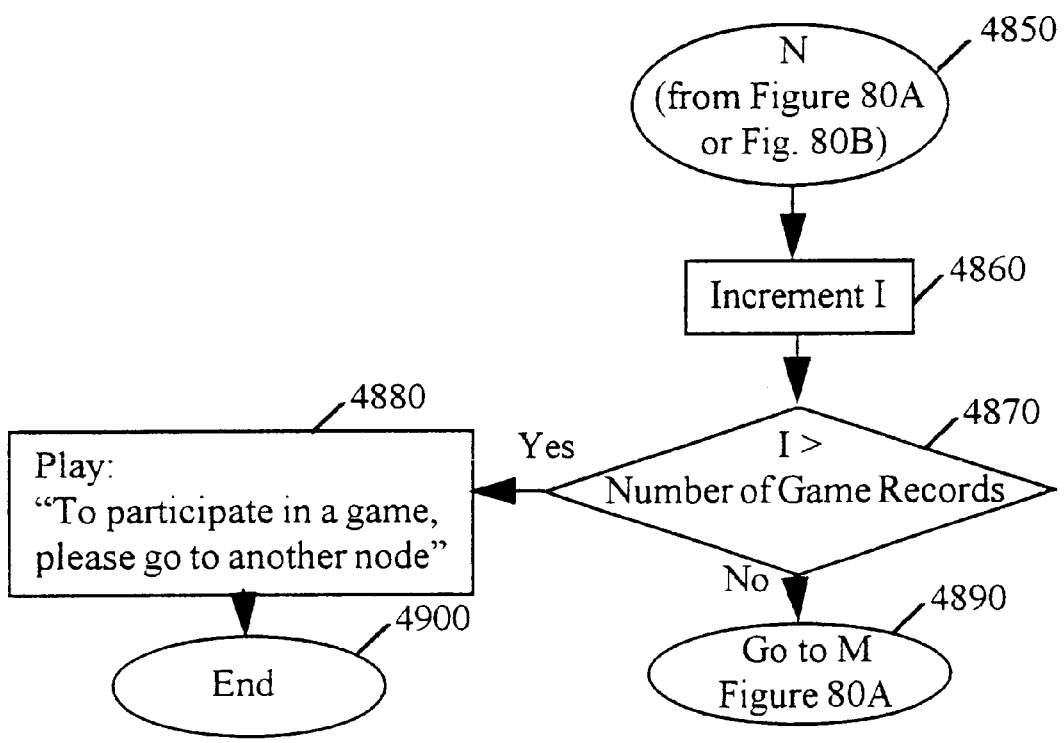

FIGS. 80A–C, taken together, form a simplified flowchart illustration of a preferred method by which a node can suggest a new game to a visitor who approaches the node and who is not playing any game.

Figure 81:
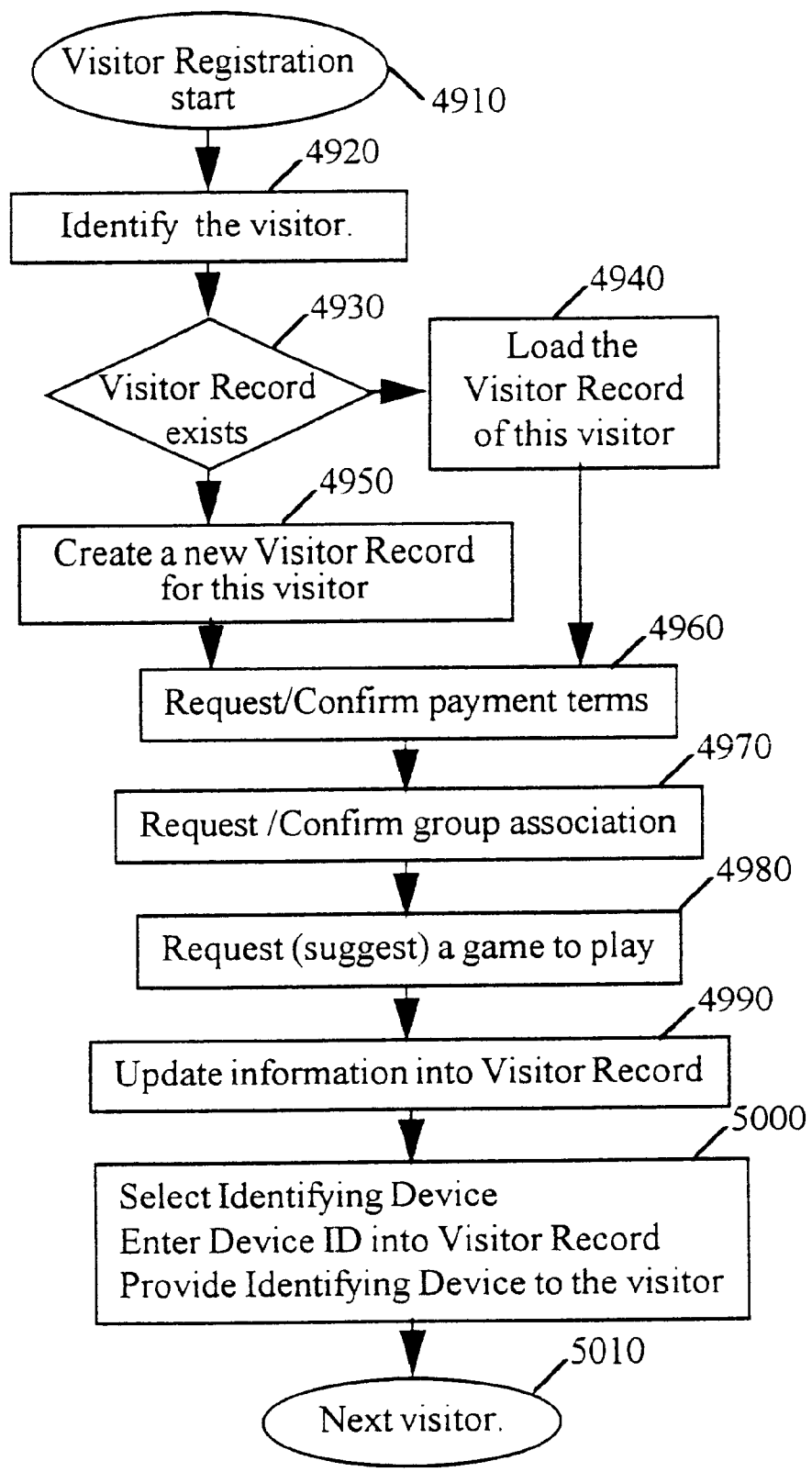

FIG. 81 is a simplified flowchart illustration of a preferred procedure followed by a human attendant servicing an entrance to the park and for registering new visitors to the park.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow which are:

We claim:

1. Amusement park apparatus comprising:
   a first plurality of entertainment-providing nodes playing a second plurality of games with a third plurality of players who are simultaneously playing said second plurality of games, each player employing plural entertainment-providing nodes to play a single game;
   a node controller operative to assign each player from among the third plurality of players to an individual game from among the second plurality of games and operative to control each individual node from among said first plurality of nodes such that when the individual node enters into an interaction with an individual player, the node plays, with the individual player, the game assigned to said individual player, and
   a communication network operative to associate each of said first plurality of nodes with said node controller.

2. Amusement park apparatus comprising:
   a first plurality of entertainment-providing nodes each operative to sequentially participate in a second plurality of games being played simultaneously with any of a third plurality of players, each player employing plural entertainment-providing nodes to play a single game;
   a node controller operative to control said first plurality of nodes;
   a communication network operative to associate each of said first plurality of nodes with said node controller.

3. Amusement park apparatus comprising:
   a first plurality of entertainment-providing nodes providing entertainment to players, each player employing plural entertainment-providing nodes to play a single game;
   a node controller operative to control said first plurality of nodes to play a second plurality of games such that at least one of the first plurality of nodes participates in each of at least two ongoing ones of said second plurality of games; and
   a communication network operative to associate each of said first plurality of nodes with said node controller.

4. Apparatus according to claim 3 wherein said node controller is operative to control said first plurality of nodes so as to accommodate a third plurality of players participating in at least two ongoing ones of said second plurality of games.

5. Apparatus according to claim 1 wherein said second plurality of games comprises at least one group game in which at least one encounter between an individual player of the group game and one of said first plurality of nodes is affected by at least one previous encounter between at least one other player of the group game and at least one of said first plurality of nodes.

6. A method of providing entertainment, the method comprising:
   providing a first plurality of entertainment-providing nodes playing a second plurality of games with a third plurality of players who are simultaneously playing said second plurality of games, each player employing plural entertainment-providing nodes to play a single game;
   providing a node controller operative to assign each player from among the third plurality of players to an individual game from among the second plurality of games and operative to control each individual node from among said first plurality of nodes such that when the individual node enters into an interaction with an individual player, the node plays, with the individual player, the game assigned to said individual player, and
   networking each of said first plurality of nodes with said node controller.

7. A method of providing entertainment, the method comprising:
   providing a first plurality of entertainment-providing nodes each operative to sequentially participate in a second plurality of games being played simultaneously with any of a third plurality of players who are simultaneously playing said second plurality of games, each player employing plural entertainment-providing nodes to play a single game;
   controlling said first plurality of nodes; and
   networking each of said first plurality of nodes with said node controller.

8. A method of providing entertainment, the method comprising:
- providing a first plurality of entertainment-providing nodes providing entertainment to players, each player employing plural entertainment-providing nodes to play a single game;
- controlling said first plurality of nodes to play a second plurality of games such that at least one of the first plurality of nodes participates in each of at least two ongoing ones of said second plurality of games; and
- networking each of said first plurality of nodes with said node controller.

9. Apparatus according to claim 2 wherein said second plurality of games comprises at least one group game in which at least one encounter between an individual player of the group game and one of said first plurality of nodes is affected by at least one previous encounter between at least one other player of the group game and at least one of said first plurality of nodes.

10. Apparatus according to claim 3 wherein said second plurality of games comprises at least one group game in which at least one encounter between an individual player of the group game and one of said first plurality of nodes is affected by at least one previous encounter between at least one other player of the group game and at least one of said first plurality of nodes.

11. Apparatus according to claim 4 wherein said second plurality of games comprises at least one group game in which at least one encounter between an individual player of the group game and one of said first plurality of nodes is affected by at least one previous encounter between at least one other player of the group game and at least one of said first plurality of nodes.

* * * * *